US011738334B2

(12) United States Patent
Holtcamp et al.

(10) Patent No.: US 11,738,334 B2
(45) Date of Patent: Aug. 29, 2023

(54) SUPPORTED CATALYST SYSTEMS AND PROCESSES FOR USE THEREOF

(71) Applicant: ExxonMobil Chemical Patents Inc., Baytown, TX (US)

(72) Inventors: Matthew W. Holtcamp, Huffman, TX (US); Dongming Li, Houston, TX (US); Kevin A. Stevens, Houston, TX (US); Jo Ann M. Canich, Houston, TX (US); John R. Hagadorn, Houston, TX (US); Ramyaa Mathialagan, Mont Belvieu, TX (US); Timothy M. Boller, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 318 days.

(21) Appl. No.: 17/165,618

(22) Filed: Feb. 2, 2021

(65) Prior Publication Data
US 2022/0048016 A1 Feb. 17, 2022

Related U.S. Application Data

(60) Provisional application No. 63/064,392, filed on Aug. 11, 2020.

(51) Int. Cl.
| | |
|---|---|
| *C08F 4/646* | (2006.01) |
| *C08F 4/80* | (2006.01) |
| *B01J 31/22* | (2006.01) |
| *B01J 31/16* | (2006.01) |
| *B01J 21/08* | (2006.01) |
| *C08F 4/64* | (2006.01) |
| *C08F 4/659* | (2006.01) |

(52) U.S. Cl.
CPC ........... *B01J 31/2243* (2013.01); *B01J 21/08* (2013.01); *B01J 31/1616* (2013.01); *C08F 4/646* (2013.01); *C08F 4/64124* (2013.01); *C08F 4/64151* (2013.01); *C08F 4/65908* (2013.01); *C08F 4/65916* (2013.01); *C08F 4/80* (2013.01); *B01J 2531/0238* (2013.01); *B01J 2531/48* (2013.01); *B01J 2531/49* (2013.01); *B01J 2531/842* (2013.01)

(58) Field of Classification Search
CPC .............................. C08F 4/653; C08F 4/64151
See application file for complete search history.

(56) References Cited

U.S. PATENT DOCUMENTS

| | | | |
|---|---|---|---|
| 5,516,848 A | 5/1996 | Canich et al. ................ 525/240 |
| 6,825,296 B2 | 11/2004 | Chan et al. .................... 526/161 |
| 7,030,256 B2 | 4/2006 | Boussie et al. ................ 556/54 |
| 7,847,099 B2 | 12/2010 | Agapie et al. ................. 546/2 |
| 8,088,867 B2 | 1/2012 | Jiang et al. .................... 525/240 |
| 2019/0144577 A1 | 5/2019 | Holtcamp et al. ..... C08F 210/16 |
| 2020/0254431 A1 | 8/2020 | Goryunov et al. ... C08F 210/16 |
| 2020/0255553 A1 | 8/2020 | Goryunov et al. ..... C08F 10/02 |
| 2020/0255555 A1 | 8/2020 | Goryunov et al. ..... C08F 10/14 |
| 2020/0255556 A1 | 8/2020 | Goryunov et al. ..... C08F 10/14 |
| 2020/0255561 A1 | 8/2020 | Harlan et al. ......... C08F 210/16 |

FOREIGN PATENT DOCUMENTS

| | | | | |
|---|---|---|---|---|
| EP | 2003166 A1 | 12/2008 | ............. | C08L 23/08 |
| KR | 2018/022137 | 3/2018 | ............. | B01J 23/00 |
| WO | 2007/080081 | 7/2007 | ........... | C07D 213/53 |
| WO | 2016/172110 | 10/2016 | ................ | C07F 7/00 |

OTHER PUBLICATIONS

U.S. Appl. No. 62/948,681, filed Dec. 16, 2019, Holtcamp, M. et al.
U.S. Appl. No. 62/972,962, filed Feb. 11, 2020, Xie, Ru et al.
U.S. Appl. No. 62/972,943, filed Feb. 11, 2020, Jiang, Peijun et al.
U.S. Appl. No. 62/972,936, filed Feb. 11, 2020, Jiang, Peijun et al.
Baier, M. C. (2014) "Post-Metallocenes in the Industrial Production of Polyolefins," *Angew. Chem. Int. Ed.*, v.53(37), pp. 9722-9744.
Britovsek, G. et al. (1999) "Iron and Cobalt Ethylene Polymerization Catalysts Bearing 2,6-Bis(Imino)Pyridyl Ligands: Synthesis, Structures, and Polymerization Studies," *J. Am. Chem. Soc.*, v.121(38), pp. 8728-8740.
Cámpora, J., et al. (2005) "2,6-Diiminopyridine Iron(II) Dialkyl Complexes. Interaction with Aluminum Alkyls and Ethylene Polymerization Catalysis" *Organometallics*, v.24(21), pp. 4878-4881.
Golisz, S. et al. (2009) "Synthesis of Early Transition Metal Bisphenolate Complexes and Their Use as Olefin Polymerization Catalysts," *Macromolecules*, v.42(22), pp. 8751-8762.
Lonkin, A. S. et al. (2006) "High-Temperature Catalysts for the Production of α-Olefins Based on Iron(II) and Iron(III) Tridentate Bis(imino)pyridine Complexes with Double Pattern of Substitution: ort/zo-Methyl plus meta-Aryl," *Organometallics*, v.25(12), pp. 2978-2992.
Small, B. L. (2015) "Discovery and Development of Pyridine-bis(imine) and Related Catalysts for Olefin Polymerization and Oligomerization," *Acc. Chem. Res.*, v.48, pp. 2599-2611.
Williams, B. et al. (2010) "Drying of Organic Solvents: Quantitative Evaluation of the Efficiency of Several Desiccants," *J. Org. Chem.*, v.75(24), pp. 8351-8354.
Zhang, W. et al. (2013) "Tailoring Iron Complexes for Ethylene Oligomerization and/or Polymerization," *Dalton Trans.*, v.42, pp. 8988-8997.

*Primary Examiner* — Caixia Lu

(57) ABSTRACT

This invention relates to a supported catalyst system comprising: (i) at least one first catalyst component comprising a group 4 bis(phenolate) complex; (ii) at least one second catalyst component comprising a 2,6-bis(imino)pyridyl iron complex; (iii) activator; and (iv) support. The catalyst system may be used for preparing polyolefins, such a bimodal polyethylene, typically in a gas phase polymerization.

20 Claims, 4 Drawing Sheets

SUPPORTED CATALYST SYSTEMS AND PROCESSES FOR USE THEREOF

CROSS-REFERENCE OF RELATED APPLICATIONS

This application claims the priority benefit of U.S. Provisional Application No. 63/064,392, filed Aug. 11, 2020, the disclosure of which is incorporated herein by reference.

This application is related to U.S. Provisional Application No. 62/972,962, filed on Feb. 11, 2020, the disclosure of which are incorporated herein by reference in its entirety.

FIELD OF THE INVENTION

The present disclosure relates to mixed catalyst systems comprising a group 4 bis(phenolate) complex and a 2,6-bis(imino)pyridyl iron complex, polyolefins, such polyethylene, compositions made therefrom and articles made therefrom.

BACKGROUND OF THE INVENTION

Olefin polymerization catalysts are of great use in industry to produce olefin polymers. Hence, there is strong interest in finding new catalyst systems to use in polymerization processes that increase the commercial usefulness of the catalyst systems and allow the production of polyolefin polymers having improved properties or a new combination of properties.

Catalysts for olefin polymerization can be based on bis(phenolate) complexes as catalyst precursors, which are activated typically by an alumoxane or an activator containing a non-coordinating anion.

KR 2018-022137 (LG Chem.) describes transition metal complexes of bis(methylphenyl phenolate)pyridine.

U.S. Pat. No. 7,030,256 (Symyx Technologies, Inc.) describes bridged bi-aromatic ligands, catalysts, processes for polymerizing and polymers therefrom.

U.S. Pat. No. 6,825,296 (University of Hong Kong) describes transition metal complexes of bis(phenolate) ligands that coordinate to metal with two 6-membered rings.

U.S. Pat. No. 7,847,099 (California Institute of Technology) describes transition metal complexes of bis(phenolate) ligands that coordinate to metal with two 6-membered rings.

WO 2016/172110 (Univation Technologies) describes complexes of tridentate bis(phenolate) ligands that feature a non-cyclic ether or thioether donor.

U.S. Ser. No. 16/788,022, filed Feb. 11, 2020, claiming priority to U.S. Ser. No. 62/804,353, Feb. 12, 2019) discloses Lewis base catalysts and polymerization therewith.

U.S. Ser. No. 16/788,088, filed Feb. 11, 2020, claiming priority to U.S. Ser. No. 62/804,372, Feb. 12, 2019 discloses bis(aryl phenolate) Lewis base transition metal complexes, and polymerization therewith.

U.S. Ser. No. 62/972,962, filed Feb. 11, 2020 discloses transition metal bis(phenolate) catalyst complexes having adamantyl substituents and polymerization therewith.

Iron-containing catalysts have been shown to be high activity catalysts capable of forming polyethylene. Typical iron-containing catalysts have a nitrogen atom of a heterocyclic moiety (such as pyridine) that chelates the iron atom. More specifically, iron-containing catalysts are typically tridentate in that they have a pyridyl ligand and two imine ligands that each chelate the iron atom. Chelation of a nitrogen atom of the pyridyl and imine ligands to the iron atom occurs via the lone pair of π-electrons on each of the nitrogen atoms. Such iron-containing catalysts, for example 2,6-bis(imino)pyridyliron(II) dihalide, typically provide low molecular weight polymers. (W. Zhang, et al. (2013) "Tailoring Iron Complexes for Ethylene Oligomerization and/or Polymerization," *Dalton Trans.*, v.42, pp. 8988-8997; B. L. Small, (2015) "Discovery and Development of Pyridine-bis(imine) and Related Catalysts for Olefin Polymerization and Oligomerization," *Acc. Chem. Res.*, v.48, pp. 2599-2611). Other iron-containing catalysts include 2-[1-(2,6-dibenzhydryl-4-methylphenylimino)ethyl]-6-[1-(aryl-imino)-ethyl] pyridyl iron catalysts. Some of these catalysts have relatively high activity but produce low molecular weight polymers and don't incorporate linear alpha olefins with narrow molecular weight distribution. Commonly, such iron-containing catalysts have low/poor solubility in hydrophobic solvents used in polymerizations, such as gas phase polymerizations to form polyethylenes. Without being bound by theory, it is believed that the solubility of the iron-containing catalysts affects the effectiveness of the polymerization, such as the molecular weight, comonomer incorporation, and molecular weight distribution of the polymer products. Moreover, due to the low solubility of iron-containing catalysts in hydrophobic solvents, the use of such catalysts for production of mixed catalyst systems is very limited.

U.S. Ser. No. 62/948,681, filed Dec. 16, 2019 discloses 2,6-bis(imino)pyridyl iron compounds.

Catalysts are often combined with other catalysts to attempt to modify polymer properties. See, for example, U.S. Pat. Nos. 8,088,867 and 5,516,848 (which discloses the use of two different cyclopentadienyl based transition metal compounds activated with alumoxane or non-coordinating anions).

It is advantageous to conduct commercial solution polymerization reactions at elevated temperatures. New catalysts capable of polymerizing olefins to yield high molecular weight and/or high tacticity polymers at high process temperatures are desirable for the industrial production of polyolefins. Hence, there is still a need in the art for new and improved catalyst systems for the polymerization of olefins, in order to achieve specific polymer properties, such as high molecular weight and/or high tacticity polymers, preferably at higher process temperatures.

There is a need for catalysts capable of forming polyolefins. In particular, there is a need to develop new and improved mixed catalysts systems capable of forming polymers having high or low molecular weight, low molecular weight, low comonomer content, and narrow molecular weight distribution.

New mixed catalyst systems are provided herein as well as polymerization processes therewith, that provide new copolymers having good properties that can be produced with increased reactor throughput and at higher polymerization temperatures during polymer production.

Likewise this process produces new copolymers having high molecular weight at high polymerization temperatures. The catalyst productivity can reach or exceed 1,500,000 kg polymer per kg of catalyst at typical polymerization conditions. Copolymers containing significant levels of long-chain branching may also be prepared with or without the addition of diene monomers.

There is still a need in the art for new and improved catalyst systems for the polymerization of olefins, in order to achieve increased activity or enhanced polymer properties, such as high melting point, higher density, high molecular weights, to increase conversion or comonomer incorporation, or to alter comonomer distribution without impacting the resulting polymer's properties.

It is also an object of the present invention to provide novel supported catalysts systems and processes for the polymerization of olefins (such as ethylene) using such catalyst systems.

Additional references of interest include:
U.S. Ser. No. 16/788,022, filed Feb. 11, 2020; U.S. Ser. No. 16/788,088, filed Feb. 11, 2020; U.S. Ser. No. 16/788,124, filed Feb. 11, 2020; U.S. Ser. No. 16/787,909, filed Feb. 11, 2020; U.S. Ser. No. 16/787,837, filed Feb. 11, 2020; concurrently filed PCT application number PCT/US2020/045819 entitled "Propylene Copolymers Obtained Using Transition Metal Bis(Phenolate) Catalyst Complexes and Homogeneous Process for Production Thereof"; concurrently filed PCT application number PCT/US2020/045822 entitled "Ethylene-Alpha-Olefin-Diene Monomer Copolymers Obtained Using Transition Metal Bis(Phenolate) Catalyst Complexes and Homogeneous Process for Production Thereof"; concurrently filed PCT application number PCT/US2020/045823 entitled "Polyethylene Compositions Obtained Using Transition Metal Bis(Phenolate) Catalyst Complexes and Homogeneous Process for Production Thereof"; Baier, M. C. (2014) "Post-Metallocenes in the Industrial Production of Polyolefins," *Angew. Chem. Int. Ed.*, v.53, pp. 9722-9744; Golisz, S. et al. (2009) "Synthesis of Early Transition Metal Bisphenolate Complexes and Their Use as Olefin Polymerization Catalysts," *Macromolecules*, v.42(22), pp. 8751-8762; Cámpora, J., et al. (2005) "2,6-Diiminopyridine Iron(II) Dialkyl Complexes. Interaction with Aluminum Alkyls and Ethylene Polymerization Catalysis" *Organometallics*, v.24(21), pp. 4878-4881; Williams, B. et al. (2010) "Drying of Organic Solvents: Quantitative Evaluation of the Efficiency of Several Desiccants," *J. Org. Chem.*, v.75(24), pp. 8351-8354; EP 2003166A1; WO 2007/080081 A2; US 2019/0144577; Britovsek, G. et al. (1999) "Iron and Cobalt Ethylene Polymerization Catalysts Bearing 2,6-Bis(Imino)Pyridyl Ligands: Synthesis, Structures, and Polymerization Studies," *J. Am. Chem. Soc.*, v.121(38), pp. 8728-8740; Ionkin, A. S. et al. (2006) "High-Temperature Catalysts for the Production of α-Olefins Based on Iron(II) and Iron(III) Tridentate Bis(imino)pyridine Complexes with Double Pattern of Substitution: ortho-Methyl plus meta-Aryl," *Organometallics*, v.25(12), pp. 2978-2992; and Small, B. (2015) "Discovery and Development of Pyridine-bis(imine) and Related Catalysts for Olefin Polymerization and Oligomerization," *Acc. Chem. Res.*, v.48(9), pp. 2599-2611.

SUMMARY OF INVENTION

This invention relates to a supported catalyst system comprising: (i) at least one first catalyst component comprising a group 4 bis(phenolate) complex; (ii) at least one second catalyst component comprising a 2,6-bis(imino) pyridyl iron complex; (iii) activator; and (iv) a support; wherein, the group 4 bis(phenolate) complex is preferably represented by Formula (A):

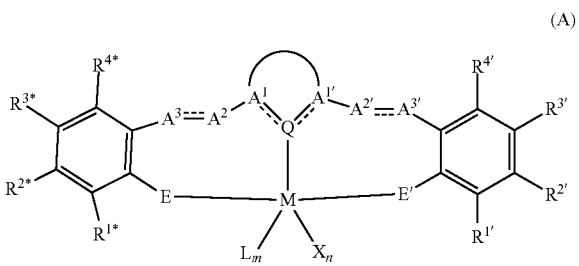

wherein:
M is a group 3-6 transition metal or Lanthanide;

E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group;

Q is group 14, 15, or 16 atom that forms a dative bond to metal M;

$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is selected from hydrogen, $C_1$-$C_{20}$ hydrocarbyl, $C_1$-$C_{20}$ substituted hydrocarbyl;

$A^3$----$A^2$ is a divalent group containing 2 to 40 non-hydrogen atoms that links $A^1$ to the E'-bonded aryl group via a 2-atom bridge;

$A^{2'}$---$A^{3'}$ is a divalent group containing 2 to 40 non-hydrogen atoms that links $A^{1'}$ to the E'-bonded aryl group via a 2-atom bridge;

L is a neutral Lewis base;

X is an anionic ligand;

n is 1, 2 or 3;

m is 0, 1, or 2;

n+m is not greater than 4;

each of $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group; and the 2,6-bis(imino)pyridyl iron complex is preferably represented by Formula (I):

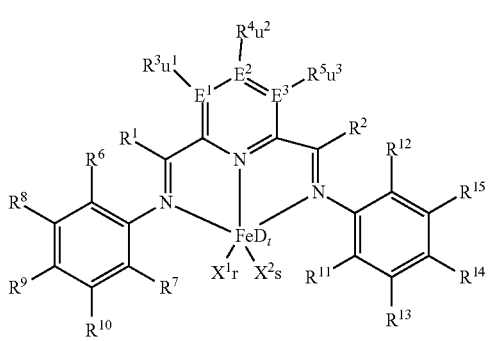

wherein:
- each of $R^1$ and $R^2$ is independently hydrogen, $C_1$-$C_{22}$ alkyl, $C_2$-$C_{22}$ alkenyl, $C_6$-$C_{22}$ aryl, arylalkyl wherein alkyl has from 1 carbon atom to 10 carbon atoms and aryl has from 6 carbon atoms to 20 carbon atoms, or five-, or six-, or seven-membered heterocyclic ring comprising at least one atom selected from the group consisting of N, P, O and S; wherein each of $R^1$ and $R^2$ is optionally substituted by halogen, $-OR^{16}$, $-NR^{17}{}_2$, or $-SiR^{18}{}_3$; wherein $R^1$ optionally bonds with $R^3$, and $R^2$ optionally bonds with $R^5$, in each case to independently form a five-, six-, or seven-membered ring;
- each of $R^3$, $R^4$, $R^5$, $R^8$, $R^9$, $R^{10}$, $R^{13}$, $R^{14}$, and $R^{15}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, $-OR^{16}$, $-NR^{17}{}_2$, halogen, $-SiR^{18}{}_3$ or five-, six- or seven-membered heterocyclic ring comprising at least one atom selected from the group consisting of N, P, O and S;
- wherein $R^3$, $R^4$, $R^5$, $R^8$, $R^9$, $R^{10}$, $R^{13}$, $R^{14}$, and $R^{15}$ are optionally substituted by halogen, $-OR^{16}$, $-NR^{17}{}_2$, or $-SiR^{18}{}_3$; wherein $R^3$ optionally bonds with $R^4$, $R^4$ optionally bonds with $R^5$, $R^7$ optionally bonds with $R^{19}$, $R^{10}$ optionally bonds with $R^9$, $R^9$ optionally bonds with $R^8$, $R^8$ optionally bonds with $R^6$, $R^{15}$ optionally bonds with $R^{14}$, $R^{14}$ optionally bonds with $R^{13}$, and $R^{13}$ optionally bonds with $R^{11}$, in each case to independently form a five-, six- or seven-membered carbocyclic or heterocyclic ring, the heterocyclic ring comprising at least one atom from the group consisting of N, P, O and S;
- each of $R^6$, $R^7$, $R^{11}$, and $R^{12}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, a heteroatom or a heteroatom-containing group (such as $-OR^{16}$, $-NR^{17}{}_2$, halogen, $-SiR^{18}{}_3$ or five-, six- or seven-membered heterocyclic ring comprising at least one atom selected from the group consisting of N, P, O and S); wherein $R^6$, $R^7$, $R^{11}$, and $R^{12}$ are optionally substituted by halogen, $-OR^{16}$, $-NR^{17}{}_2$, or $-SiR^{18}{}_3$, wherein $R^6$ optionally bonds with $R^8$, $R^{11}$ optionally bonds with $R^{13}$, or $R^{15}$ optionally bonds with $R^{12}$ in each case to independently form a five-, six- or seven-membered carbocyclic or heterocyclic ring, the heterocyclic ring comprising at least one atom from the group consisting of N, P, O and S; wherein at least one of $R^6$, $R^7$, $R^{11}$, and $R^{12}$ is independently a heteroatom or a heteroatom-containing group, or at least one of the $R^6$, $R^7$, $R^{11}$, and $R^{12}$ is not methyl, or if $R^{11}$ is H and $R^{12}$ is iPr, then at least one of $R^6$ and $R^7$ is not methyl;
- each of $R^{16}$, $R^{17}$, and $R^{18}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or $-SiR^{19}{}_3$, wherein each $R^{16}$, $R^{17}$, and $R^{18}$ is independently optionally substituted by halogen, or two $R^{16}$ radicals optionally bond to form a five- or six-membered ring, or two $R^{17}$ radicals optionally bond to form a five- or six-membered ring, or two $R^{18}$ radicals optionally bond to form a five- or six-membered ring;
- each $R^{19}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or two $R^{19}$ radicals optionally bond to form a five- or six-membered ring;
- each of $E^1$, $E^2$, and $E^3$ is independently carbon, nitrogen or phosphorus;
- each of $u^1$, $u^2$, and $u^3$ is independently 0 if $E^1$, $E^2$, or $E^3$ is nitrogen or phosphorus, and each of $u^1$, $u^2$, and $u^3$ is independently 1 if $E^1$, $E^2$, or $E^3$ is carbon;
- each of $X^1$ and $X^2$ is independently substituted hydrocarbyl, and the radicals X can be bonded with one another;
- r is 1 or 2;
- s is 1 or 2;
- D is a neutral donor; and
- t is 0 to 2.

This invention also relates to a process for polymerization of monomers (such as olefin monomers) comprising contacting one or more monomers with the above supported catalyst systems.

This invention also relates to a process to produce ethylene polymer compositions comprising: i) contacting in a single reaction zone, in the gas phase or slurry phase, ethylene and $C_3$ to $C_{20}$ comonomer with the catalyst system described above.

In another class of embodiments, the invention provides for articles made from the polyolefin composition and processes for making the same.

DETAILED DESCRIPTION

Definitions

Figure 1:
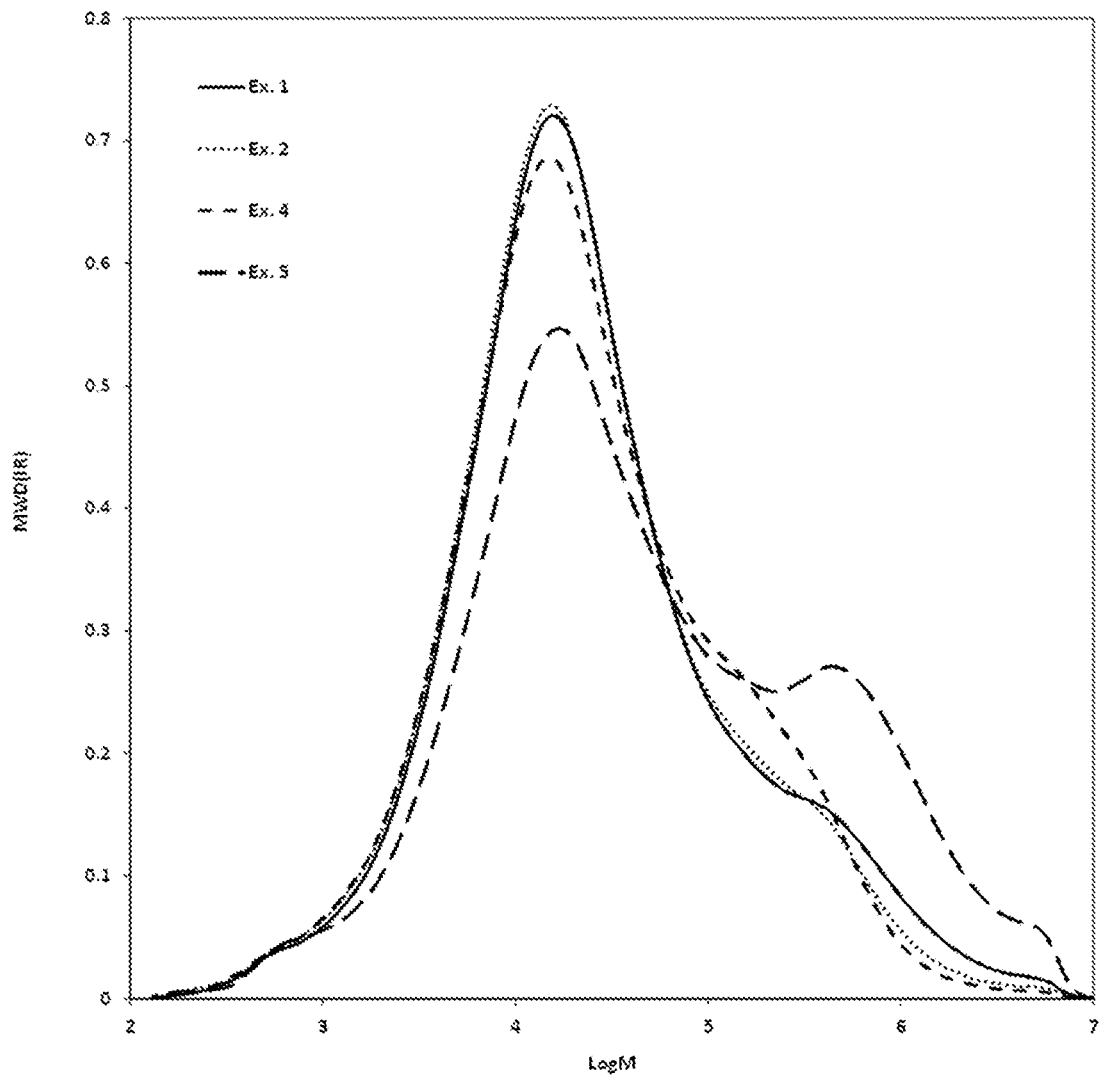
FIG. 1 is an overlay of GPC plots for Mw/Mn for examples 1, 2, 4 and 5.

For the purposes of this invention and the claims thereto, the new numbering scheme for the Periodic Table Groups is used as described in *Chemical and Engineering News*, v.63(5), pg. 27 (1985). Therefore, a "group 4 metal" is an element from group 4 of the Periodic Table, e.g. Hf, Ti, or Zr.

For purposes of this invention and the claims thereto, a "catalyst system" is a combination of at least two catalyst compounds, an activator, and a support material. The catalyst systems may further comprise one or more additional catalyst compounds. The terms "mixed catalyst system", "dual catalyst system", "mixed catalyst", and "supported catalyst system" may be used interchangeably herein with "catalyst system." For the purposes of this invention and the claims thereto, when catalyst systems are described as comprising neutral stable forms of the components, it is well understood by one of ordinary skill in the art, that the ionic form of the component is the form that reacts with the monomers to produce polymers.

The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal. "Complex," as used herein, is also often referred to as "catalyst precursor", "pre-catalyst", "catalyst", "catalyst compound", "metal compound", "transition metal compound", or "transition metal complex". These words are used interchangeably.

As used herein, "polymerization catalyst(s)" refers to any catalyst, typically an organometallic complex or compound that is capable of coordination polymerization, i.e., where successive monomers are added in a monomer chain at the organometallic active center to create and/or grow a polymer chain.

The terms "activator" and "cocatalyst" are used herein interchangeably and are defined to be any compound which can activate any one of the catalyst compounds herein by converting the neutral catalyst compound to a catalytically active catalyst compound cation.

The term "contact product" or "the product of the combination of" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another or react in the manner as theorized. Similarly, the term "contacting" is used herein to refer to materials which may be blended, mixed, slurried, dissolved, reacted, treated, or otherwise contacted in some other manner.

The terms "substituent," "radical," "group," and "moiety" may be used interchangeably.

Unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of Cn.

The terms "hydrocarbyl," "hydrocarbyl radical" and "hydrocarbyl group" are used interchangeably throughout this document. For purposes of this invention, "hydrocarbyl radical" is defined to be, a radical consisting of carbon and hydrogen, such as a $C_1$-$C_{100}$ radical, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues.

For purposes of this invention and claims thereto, unless otherwise indicated (e.g., the definition of "substituted hydrocarbyl" below, etc.), the term "substituted" means that a hydrogen group has been replaced with at least one non-hydrogen group, such as a hydrocarbyl group, a heteroatom, or a heteroatom containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q$-$SiR^*_3$, and the like, where q is 1 to 10 and each $R^*$ is independently hydrogen, a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q$-$SiR^*_3$, and the like, where q is 1 to 10 and each $R^*$ is independently hydrogen, a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

The term "aryl" or "aryl group" means an aromatic ring (typically made of 6 carbon atoms) and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S.

Unless otherwise indicated, the term "aromatic" refers to unsaturated cyclic hydrocarbons having a delocalized conjugated π system and having from 5 to 20 carbon atoms (aromatic $C_5$-$C_{20}$ hydrocarbon), particularly from 5 to 12 carbon atoms (aromatic $C_5$-$C_{12}$ hydrocarbon), and particularly from 5 to 10 carbon atoms (aromatic $C_5$-$C_{12}$ hydrocarbon). Exemplary aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof. As used herein, the term "aromatic" also refers to pseudoaromatic heterocycles which are heterocyclic substituents that have similar properties and structures (nearly planar) to aromatic heterocyclic ligands, but are not by definition aromatic.

A "heterocyclic ring" is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

The terms "alkoxy" or "alkoxide" and "aryloxy" or "aryloxide" mean an alkyl or aryl group bound to an oxygen atom, such as an alkyl ether or aryl ether group/radical connected to an oxygen atom and can include those where the alkyl group is a $C_1$ to $C_{10}$ hydrocarbyl. The alkyl group may be straight chain, branched, or cyclic. The alkyl group may be saturated or unsaturated. Examples of suitable alkoxy and aryloxy radicals can include methoxy, ethoxy, n-propoxy, iso-propoxy, n-butoxy, iso-butoxy, sec-butoxy, tert-butoxy, phenoxyl, and the like.

The terms "alkyl," and "alkyl radical" are used interchangeably throughout this disclosure. For purposes of this disclosure, "alkyl radical" is defined to be $C_1$-$C_{100}$ alkyls, that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

A "halocarbyl" is a halogen substituted hydrocarbyl group.

A "substituted phenolate" is a phenolate group where at least one, two, three, four or five hydrogen atoms in the 2, 3, 4, 5, and/or 6 positions has been replaced with at least one non-hydrogen group, such as a hydrocarbyl group, a heteroatom or heteroatom-containing group, such as halogen (such as Br, Cl, F or I) or at least one functional group such as —NR*, —OR*, —SeR*, —TeR*, —AsR*$_2$, —SbR*$_2$, —SR*, —BR*, —SiR*$_3$, —GeR*$_3$, —SnR*$_3$, —PbR*$_3$, —(CH$_2$)$_q$—SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), where the 1 position is the phenolate group (Ph-O—, Ph-S—, and Ph-N(R△)— groups, where R△ is hydrogen, $C_1$-$C_{40}$ hydrocarbyl, $C_1$-$C_{40}$ substituted hydrocarbyl, a heteroatom or a heteroatom-containing group). Preferably, a "substituted phenolate" group in the catalyst compounds described herein is represented by the formula:

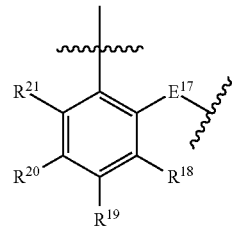

where $R^{18}$ is hydrogen, $C_1$-$C_{40}$ hydrocarbyl (such as $C_1$-$C_{40}$ alkyl) or $C_1$-$C_{40}$ substituted hydrocarbyl, a heteroatom or a heteroatom-containing group, $E^{17}$ is oxygen, sulfur, or $NR^{17}$, and each of $R^{17}$, $R^{19}$, $R^{20}$, and $R^{21}$ is independently selected from hydrogen, $C_1$-$C_{40}$ hydrocarbyl (such as $C_1$-$C_{40}$ alkyl) or $C_1$-$C_{40}$ substituted hydrocarbyl, a heteroatom or a heteroatom-containing group, or two or more of $R^{18}$, $R^{19}$, $R^{20}$, and $R^{21}$ are joined together to form a $C_4$-$C_{62}$ cyclic or polycyclic ring structure, or a combination thereof, and the wavy lines show where the substituted phenolate group forms bonds to the rest of the catalyst compound.

An "alkyl substituted phenolate" is a phenolate group where at least one, two, three, four or five hydrogen atoms in the 2, 3, 4, 5, and/or 6 positions has been replaced with at least one alkyl group, such as a $C_1$ to $C_{40}$, alternately $C_2$ to $C_{20}$, alternately $C_3$ to $C_{12}$ alkyl, such as methyl, ethyl, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, adamantanyl and the like including their substituted analogues.

An "aryl substituted phenolate" is a phenolate group where at least one, two, three, four or five hydrogen atoms in the 2, 3, 4, 5, and/or 6 positions has been replaced with at least one aryl group, such as a $C_1$ to $C_{40}$, alternately $C_2$ to $C_{20}$, alternately $C_3$ to $C_{12}$ aryl group, such as phenyl, 4-fluorophenyl, 2-methylphenyl, 2-propylphenyl, 2,6-dimethylphenyl, mesityl, 2-ethylphenyl, naphthalenyl and the like including their substituted analogues.

For purposes of the present disclosure, in relation to catalyst compounds (e.g., substituted bis(phenolate) catalyst compounds), the term "substituted" means that a hydrogen group has been replaced with a hydrocarbyl group, a heteroatom or heteroatom-containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)$_q$—SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

An "anionic ligand" is a negatively charged ligand which donates one or more pairs of electrons to a metal ion. The term "anionic donor" is used interchangeably with "anionic ligand". Examples of anionic donors in the context of the present invention include, but are not limited to, methyl, chloride, fluoride, alkoxide, aryloxide, alkyl, alkenyl, thiolate, carboxylate, amido, methyl, benzyl, hydrido, amidinate, amidate, and phenyl. Two anionic donors may be joined to form a dianionic group.

A "neutral Lewis base" or "neutral donor group" is an uncharged (i.e. neutral) group which donates one or more pairs of electrons to a metal ion. Non-limiting examples of neutral Lewis bases include ethers, thioethers, amines, phosphines, ethyl ether, tetrahydrofuran, dimethylsulfide, triethylamine, pyridine, alkenes, alkynes, allenes, and carbenes. Lewis bases may be joined together to form bidentate or tridentate Lewis bases.

For purposes of this invention and the claims thereto, phenolate donors include Ph-O—, Ph-S—, and Ph-N(R^∧)- groups, where R^∧ is hydrogen, $C_1$-$C_{40}$ hydrocarbyl, $C_1$-$C_{40}$ substituted hydrocarbyl, a heteroatom or a heteroatom-containing group, and Ph is optionally substituted phenyl.

A tertiary hydrocarbyl group possesses a carbon atom bonded to three other carbon atoms. When the hydrocarbyl group is an alkyl group, tertiary hydrocarbyl groups are also referred to as tertiary alkyl groups. Examples of tertiary hydrocarbyl groups include tert-butyl, 2-methylbutan-2-yl, 2-methylhexan-2-yl, 2-phenylpropan-2-yl, 2-cyclohexylpropan-2-yl, 1-methylcyclohexyl, 1-adamantyl, bicyclo[2.2.1]heptan-1-yl and the like. Tertiary hydrocarbyl groups can be illustrated by Formula (A):

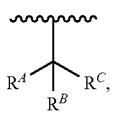

wherein $R^A$, $R^B$ and $R^C$ are hydrocarbyl groups or substituted hydrocarbyl groups that may optionally be bonded to one another, and the wavy line shows where the tertiary hydrocarbyl group forms bonds to other groups.

A cyclic tertiary hydrocarbyl group is defined as a tertiary hydrocarbyl group that forms at least one alicyclic (non-aromatic) ring. Cyclic tertiary hydrocarbyl groups are also referred to as alicyclic tertiary hydrocarbyl groups. When the hydrocarbyl group is an alkyl group, cyclic tertiary hydrocarbyl groups are also referred to as cyclic tertiary alkyl groups or alicyclic tertiary alkyl groups. Examples of cyclic tertiary hydrocarbyl groups include 1-adamantanyl, 1-methylcyclohexyl, 1-methylcyclopentyl, 1-methylcyclooctyl, 1-methylcyclodecyl, 1-methylcclododecyl, bicyclo[3.3.1]nonan-1-yl, bicyclo[2.2.1]heptan-1-yl, bicyclo[2.3.3]hexan-1-yl, bicycle[1.1.1]pentan-1-yl, bicycle[2.2.2]octan-1-yl, and the like. Cyclic tertiary hydrocarbyl groups can be illustrated by Formula (B):

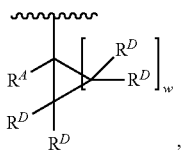

wherein $R^A$ is a hydrocarbyl group or substituted hydrocarbyl group, each $R^D$ is independently hydrogen or a hydrocarbyl group or substituted hydrocarbyl group, w is an integer from 1 to about 30, and $R^A$, and one or more $R^D$, and or two or more $R^D$ may optionally be bonded to one another to form additional rings.

When a cyclic tertiary hydrocarbyl group contains more than one alicyclic ring, it can be referred to as polycyclic tertiary hydrocarbyl group or if the hydrocarbyl group is an alkyl group, it may be referred to as a polycyclic tertiary alkyl group.

The term "continuous" means a system that operates without interruption or cessation. For example, a continuous process to produce a polymer would be one where the reactants are continually introduced into one or more reactors and polymer product is continually withdrawn.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

The term "alpha-olefin" refers to an olefin having a terminal carbon-to-carbon double bond in the structure thereof (($R^1R^2$)—C=$CH_2$, where $R^1$ and $R^2$ can be independently hydrogen or any hydrocarbyl group; preferably $R^1$ is hydrogen and $R^2$ is an alkyl group). A "linear alpha-olefin" is an alpha-olefin defined in this paragraph wherein $R^1$ is hydrogen, and $R^2$ is hydrogen or a linear alkyl group.

For the purposes of this invention, ethylene shall be considered an α-olefin.

A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For purposes of this invention and the claims thereto, an ethylene polymer having a density of 0.86 g/cm³ or less is referred to as an ethylene elastomer or elastomer; an ethylene polymer having a density of more than 0.86 to less than 0.910 g/cm³ is referred to as an ethylene plastomer or plastomer; an ethylene polymer having a density of 0.910 to 0.940 g/cm³ is referred to as a low density polyethylene; and an ethylene polymer having a density of more than 0.940 g/cm³ is referred to as a high density polyethylene (HDPE). Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm³).

Polyethylene in an overlapping density range, i.e., 0.890 to 0.930 g/cm³, typically from 0.915 to 0.930 g/cm³, which is linear and does not contain long chain branching is referred to as "linear low density polyethylene" (LLDPE) and can be produced with conventional Ziegler-Natta catalysts, vanadium catalysts, or with metallocene catalysts in gas phase reactors and/or in slurry reactors and/or in solution reactors. "Linear" means that the polyethylene has no long chain branches, typically referred to as a branching index ($g'_{vis}$) of 0.97 or above, preferably 0.98 or above. Branching index, $g'_{vis}$, is determined by GPC-4D as described below.

As used herein, Mn is number average molecular weight, Mw is weight average molecular weight, Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are reported in g/mol (g mol$^{-1}$).

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Cy is cyclohexyl, Oct is octyl, Ph is phenyl, dme is 1,2-dimethoxyethane, p-tBu is para-tertiary butyl, TMS is trimethylsilyl, TIBAL is triisobutylaluminum, TNOAL is tri(n-octyl) aluminum, p-Me is para-methyl, Bz and Bn are benzyl (i.e., $CH_2Ph$), THF (also referred to as thf) is tetrahydrofuran, RT is room temperature (and is 23° C. unless otherwise indicated), tol is toluene, EtOAc is ethyl acetate, Cbz is Carbazole, Np is neopentyl, Cp is cyclopentadienyl, Cp* is pentamethyl cyclopentadienyl, Ind is indenyl, Flu is fluorenyl, and MAO is methylalumoxane.

Description

This invention relates to catalyst systems and their use in polymerization processes to produce polyolefin polymers such as polyethylene polymers and polypropylene polymers.

In another class of embodiments, the present disclosure is directed to polymerization processes to produce polyolefin polymers from catalyst systems comprising the product of the combination of two or more olefin polymerization catalysts, at least one activator, and at least one support.

In particular, the present disclosure is directed to a polymerization process to produce an ethylene polymer, the process comprising contacting a catalyst system comprising the product of the combination of two or more catalysts, at least one activator, and at least one support, with ethylene and one or more $C_3$-$C_{10}$ alpha-olefin comonomers under polymerization conditions.

This invention also relates to a supported catalyst system comprising: (i) at least one first catalyst component comprising a group 4 bis(phenolate) complex; (ii) at least one second catalyst component comprising a 2,6-bis(imino) pyridyl iron complex; (iii) activator; and (iv) a support; wherein, the group 4 bis(phenolate) complex is preferably represented by Formulas (A) and (A-II) as described herein; and the 2,6-bis(imino)pyridyl iron complex is preferably represented by Formula (I) as described herein.

Group 4 Bis(phenolate) Complexes

The catalyst complexes of the present invention comprise a metal selected from groups 3, 4, 5 or 6 or Lanthanide metals of the Periodic Table of the Elements, a tridentate dianionic ligand containing two anionic donor groups and a neutral heterocyclic Lewis base donor, wherein the heterocyclic donor is covalently bonded between the two anionic donors. Preferably the dianionic, tridentate ligand features a central heterocyclic donor group and two phenolate donors and the tridentate ligand coordinates to the metal center to form two eight-membered rings.

The metal is preferably selected from group 3, 4, 5, or 6 elements. Preferably the metal, M, is a group 4 metal. Most preferably the metal, M, is zirconium or hafnium.

Preferably the heterocyclic Lewis base donor features a nitrogen or oxygen donor atom. Preferred heterocyclic groups include derivatives of pyridine, pyrazine, pyrimidine, triazine, thiazole, imidazole, thiophene, oxazole, thiazole, furan, and substituted variants of thereof. Preferably the heterocyclic Lewis base lacks hydrogen(s) in the position alpha to the donor atom. Particularly preferred heterocyclic Lewis base donors include pyridine, 3-substituted pyridines, and 4-substituted pyridines.

The anionic donors of the tridentate dianionic ligand may be arylthiolates, phenolates, or anilides. Preferred anionic donors are phenolates. It is preferred that the tridentate dianionic ligand coordinates to the metal center to form a complex that lacks a mirror plane of symmetry. It is preferred that the tridentate dianionic ligand coordinates to the metal center to form a complex that has a two-fold rotation axis of symmetry; when determining the symmetry of the bis(phenolate) complexes only the metal and dianionic tridentate ligand are considered (i.e. ignore remaining ligands).

The bis(phenolate) ligands useful in the present invention are preferably tridentate dianionic ligands that coordinate to the metal M in such a fashion that a pair of 8-membered metallocycle rings are formed. The bis(phenolate) ligands wrap around the metal to form a complex with a 2-fold rotation axis, thus giving the complexes $C_2$ symmetry. The $C_2$ geometry and the 8-membered metallocycle rings are features of these complexes that make them effective catalyst components for the production of polyolefins, particularly isotactic poly(alpha olefins). If the ligands were coordinated to the metal in such a manner that the complex had mirror-plane ($C_s$) symmetry, then the catalyst would be expected to produce only atactic poly(alpha olefins); these symmetry-reactivity rules are summarized by Bercaw, J. E. (2009) in *Macromolecules*, v.42, pp. 8751-8762. The pair of 8-membered metallocycle rings of the inventive complexes is also a notable feature that is advantageous for catalyst activity, temperature stability, and isoselectivity of monomer enchainment. Related group 4 complexes featuring smaller 6-membered metallocycle rings are known (Bercaw, J. E. (2009) in *Macromolecules*, v.42, pp. 8751-8762) to form mixtures of $C_2$ and $C_s$ symmetric complexes when used in olefin polymerizations and are thus not well suited to the production of highly isotactic poly(alpha olefins).

Bis(phenolate) ligands that contain oxygen donor groups (i.e. E=E'=oxygen in Formula (I)) in the present invention are preferably substituted with alkyl, substituted alkyl, aryl, or other groups. It is advantageous that each phenolate group be substituted in the ring position that is adjacent to the oxygen donor atom. It is preferred that substitution at the position adjacent to the oxygen donor atom be an alkyl group containing 1-20 carbon atoms. It is preferred that substitution at the position next to the oxygen donor atom be a non-aromatic cyclic alkyl group with one or more five- or six-membered rings. It is preferred that substitution at the position next to the oxygen donor atom be a cyclic tertiary alkyl group. It is highly preferred that substitution at the position next to the oxygen donor atom be adamantan-1-yl or substituted adamantan-1-yl.

The neutral heterocyclic Lewis base donor is covalently bonded between the two anionic donors via "linker groups" that join the heterocyclic Lewis base to the phenolate groups. The "linker groups" are indicated by ($A^3A^2$) and ($A^{2'}A^{3'}$) in Formula (I). The choice of each linker group may affect the catalyst performance, such as the tacticity of the poly(alpha olefin) produced. Each linker group is typically a $C_2$-$C_{40}$ divalent group that is two-atoms in length. One or both linker groups may independently be phenylene, substituted phenylene, heteroaryl, vinylene, or a non-cyclic two-carbon long linker group. When one or both linker groups are phenylene, the alkyl substituents on the phenylene group may be chosen to optimize catalyst performance. Typically, one or both phenylenes may be unsubstituted or may be independently substituted with $C_1$ to $C_{20}$ alkyl, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, or an isomer thereof, such as isopropyl, etc.

This invention further relates to catalyst compounds, and catalyst systems comprising such compounds, represented by the Formula (A):

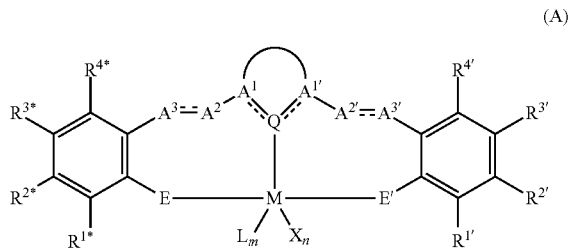

(A)

wherein:
M is a group 3, 4, 5, or 6 transition metal or a Lanthanide (such as Hf, Zr or Ti);
E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group, preferably O, preferably both E and E' are O;
Q is group 14, 15, or 16 atom that forms a dative bond to metal M, preferably Q is C, O, S or N, more preferably Q is C, N or O, most preferably Q is N;
$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge ($A^1QA^{1'}$ combined with the curved line joining $A^1$ and $A^{1'}$ represents the heterocyclic Lewis base), $A^1$ and $A^{2'}$ are independently C, N, or $C(R^{22})$, where $R^{22}$ is selected from hydrogen, $C_1$-$C_{20}$ hydrocarbyl, and $C_1$-$C_{20}$ substituted hydrocarbyl. Preferably $A^1$ and $A^{1'}$ are C;
$A^3 \text{----} A^2$ is a divalent group containing 2 to 40 non-hydrogen atoms that links $A^1$ to the E-bonded aryl group via a 2-atom bridge, such as ortho-phenylene, substituted ortho-phenylene, ortho-arene, indolene, substituted indolene, benzothiophene, substituted benzothiophene, pyrrolene, substituted pyrrolene, thiophene, substituted thiophene, 1,2-ethylene (—$CH_2CH_2$—), substituted 1,2-ethylene, 1,2-vinylene (—HC═CH—), or substituted 1,2-vinylene, preferably $A^3 \text{----} A^2$ is a divalent hydrocarbyl group;
$A^{2'} \text{---} A^{3'}$ is a divalent group containing 2 to 40 non-hydrogen atoms that links $A^{1'}$ to the E'-bonded aryl group via a 2-atom bridge such as ortho-phenylene, substituted ortho-phenylene, ortho-arene, indolene, substituted indolene, benzothiophene, substituted benzothiophene, pyrrolene, substituted pyrrolene, thiophene, substituted thiophene, 1,2-ethylene (—$CH_2CH_2$—), substituted 1,2-ethylene, 1,2-vinylene (—HC═CH—), or substituted 1,2-vinylene, preferably $A^{2'} \text{---} A^{3'}$ is a divalent hydrocarbyl group;
each L is independently a Lewis base;
each X is independently an anionic ligand;
n is 1, 2 or 3;
m is 0, 1, or 2;
n+m is not greater than 4;

each of $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group (preferably $R^{1'}$ and $R^{1*}$ are independently a cyclic group, such as a cyclic tertiary alkyl group), or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;
any two L groups may be joined together to form a bidentate Lewis base;
an X group may be joined to an L group to form a monoanionic bidentate group;
any two X groups may be joined together to form a dianionic ligand group.

This invention is further related to catalyst compounds, and catalyst systems comprising such compounds, represented by the Formula (A-II):

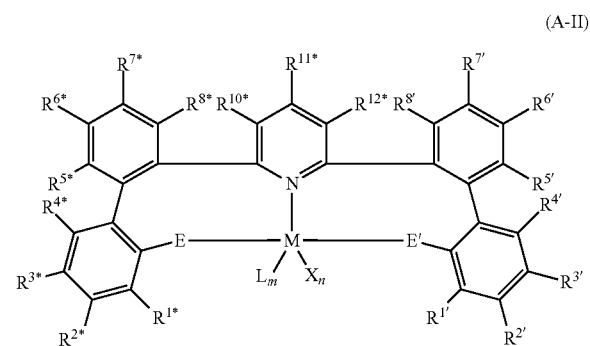

(A-II)

wherein:
M is a group 3, 4, 5, or 6 transition metal or a Lanthanide (such as Hf, Zr or Ti);
E and E' are each independently O, S, or $NR^{9*}$, where $R^{9*}$ is independently hydrogen, $C_1$-$C_{40}$ hydrocarbyl, $C_1$-$C_{40}$ substituted hydrocarbyl, or a heteroatom-containing group, preferably O, preferably both E and E' are O;
each L is independently a Lewis base;
each X is independently an anionic ligand;
n is 1, 2 or 3;
m is 0, 1, or 2;
n+m is not greater than 4;
each of $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;
any two L groups may be joined together to form a bidentate Lewis base;
an X group may be joined to an L group to form a monoanionic bidentate group;

any two X groups may be joined together to form a dianionic ligand group;

each of $R^{5*}$, $R^{6*}$, $R^{7*}$, $R^{8*}$, $R^{5'}$, $R^{6'}$, $R^{7'}$, $R^{8'}$, $R^{10*}$, $R^{11*}$, and $R^{12*}$ is independently hydrogen, $C_1$-$C_{40}$ hydrocarbyl, $C_1$-$C_{40}$ substituted hydrocarbyl, a heteroatom or a heteroatom-containing group, or one or more of $R^{5*}$ and $R^{6*}$, $R^{6*}$ and $R^{7*}$, $R^{7*}$ and $R^{8*}$, $R^{5'}$ and $R^{6'}$, $R^{6'}$ and $R^{7'}$, $R^{7'}$ and $R^{8'}$, $R^{10*}$ and $R^{11*}$, or $R^{11*}$ and $R^{12*}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

The metal, M, is preferably selected from group 3, 4, 5, or 6 elements, more preferably group 4. Most preferably the metal, M, is zirconium or hafnium.

The donor atom Q of the neutral heterocyclic Lewis base (in Formula (A)) is preferably nitrogen, carbon, or oxygen. Preferred Q is nitrogen.

Non-limiting examples of neutral heterocyclic Lewis base groups include derivatives of pyridine, pyrazine, pyrimidine, triazine, thiazole, imidazole, thiophene, oxazole, thiazole, furan, and substituted variants of thereof. Preferred heterocyclic Lewis base groups include derivatives of pyridine, pyrazine, thiazole, and imidazole.

Each $A^1$ and $A^{1'}$ of the heterocyclic Lewis base (in Formula (I)) are independently C, N, or $C(R^{22})$, where $R^{22}$ is selected from hydrogen, $C_1$-$C_{20}$ hydrocarbyl, and $C_1$-$C_{20}$ substituted hydrocarbyl. Preferably $A^1$ and $A^{1'}$ are carbon. When Q is carbon, it is preferred that $A^1$ and $A^{1'}$ be selected from nitrogen and $C(R^{22})$. When Q is nitrogen, it is preferred that $A^1$ and $A^{1'}$ be carbon. It is preferred that Q=nitrogen, and $A^1$=$A^{1'}$=carbon. When Q is nitrogen or oxygen, is preferred that the heterocyclic Lewis base in Formula (A) not have any hydrogen atoms bound to the $A^1$ or $A^{1'}$ atoms. This is preferred because it is thought that hydrogens in those positions may undergo unwanted decomposition reactions that reduce the stability of the catalytically active species.

The heterocyclic Lewis base (of Formula (A)) represented by $A^1QA^{1'}$ combined with the curved line joining $A^1$ and $A^{1'}$ is preferably selected from the following, with each $R^{23}$ group selected from hydrogen, heteroatoms, $C_1$-$C_{20}$ alkyls, $C_1$-$C_{20}$ alkoxides, $C_1$-$C_{20}$ amides, and $C_1$-$C_{20}$ substituted alkyls.

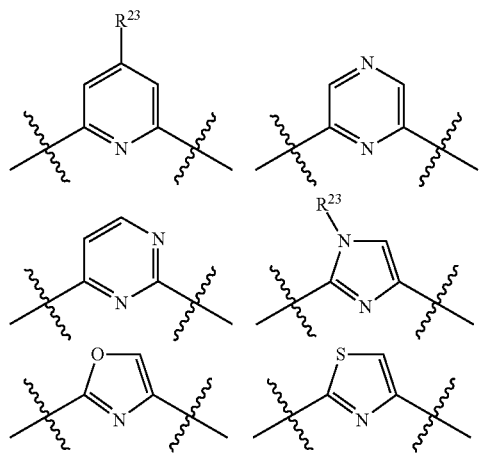

-continued

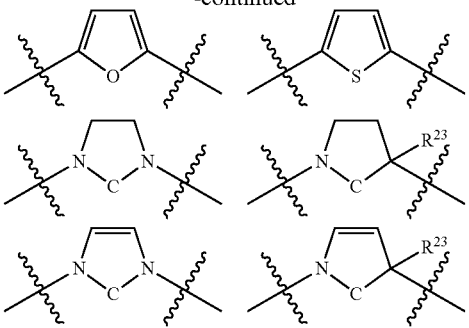

In Formula (A) or (A-II), E and E' are each selected from oxygen or $NR^{9*}$, where $R^{9*}$ is independently hydrogen, $C_1$-$C_{40}$ hydrocarbyl, $C_1$-$C_{40}$ substituted hydrocarbyl, or a heteroatom-containing group. It is preferred that E and E' are oxygen. When E and/or E' are $NR^{9*}$ it is preferred that $R^{9*}$ be selected from $C_1$ to $C_{20}$ hydrocarbyls, alkyls, or aryls. In one embodiment E and E' are each selected from O, S, or N(alkyl) or N(aryl), where the alkyl is preferably a $C_1$ to $C_{20}$ alkyl, such as methyl, ethyl, propyl, butyl, pentyl, hexyl, octyl, nonyl, decyl, undecyl, dodeceyl and the like, and aryl is a $C_6$ to $C_{40}$ aryl group, such as phenyl, naphthalenyl, benzyl, methylphenyl, and the like.

In embodiments, $A^3$ ---- $A^2$ and $A^{2'}$ ---- $A^{3'}$ are independently a divalent hydrocarbyl group, such as $C_1$ to $C_{12}$ hydrocarbyl group.

In complexes of Formula (A) or (A-II), when E and E' are oxygen it is advantageous that each phenolate group be substituted in the position that is next to the oxygen atom (i.e. $R^{1*}$ and $R^{1'}$ in Formula (A) and (A-II)). Thus, when E and E' are oxygen it is preferred that each of $R^{1*}$ and $R^{1'}$ is independently a $C_1$-$C_{40}$ hydrocarbyl, a $C_1$-$C_{40}$ substituted hydrocarbyl, a heteroatom or a heteroatom-containing group, more preferably, each of $R^{1*}$ and $R^{1'}$ is independently a non-aromatic cyclic alkyl group with one or more five- or six-membered rings (such as cyclohexyl, cyclooctyl, adamantanyl, or 1-methylcyclohexyl, or substituted adamantanyl), most preferably a non-aromatic cyclic tertiary alkyl group (such as 1-methylcyclohexyl, adamantanyl, or substituted adamantanyl).

In some embodiments of the invention of Formula (A) or (A-II), each of $R^{1*}$ and $R^{1'}$ is independently a tertiary hydrocarbyl group. In other embodiments of the invention of Formula (A) or (A-II), each of $R^{1*}$ and $R^{1'}$ is independently a cyclic tertiary hydrocarbyl group. In other embodiments of the invention of Formula (A) or (A-II), each of $R^{1*}$ and $R^{1'}$ is independently a polycyclic tertiary hydrocarbyl group.

In some embodiments of the invention of Formula (A) or (A-II), each of $R^{1*}$ and $R^{1'}$ is independently a tertiary hydrocarbyl group. In other embodiments of the invention of Formula (A) or (A-II), each of $R^{1*}$ and $R^{1'}$ is independently a cyclic tertiary hydrocarbyl group. In other embodiments of the invention of Formula (A) or (A-II), each of $R^{1*}$ and $R^{1'}$ is independently a polycyclic tertiary hydrocarbyl group.

The linker groups (i.e. $A^3$ ---- $A^2$ and $A^{2'}$ ---- $A^{3'}$ in Formula (A)) are each preferably part of an ortho-phenylene group, preferably a substituted ortho-phenylene group. It is preferred for the $R^{7*}$ and $R^{7'}$ positions of Formula (A-II) to be hydrogen, or $C_1$ to $C_{20}$ alkyl, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, or an isomer thereof, such as iospropyl, etc. For applications targeting polymers with high tacticity it is preferred for the $R^{7*}$ and $R^{7'}$ positions of Formula (A-II) to be a $C_1$ to $C_{20}$ alkyl, most preferred for both $R^{7*}$ and $R^{7'}$ to be a $C_1$ to $C_3$ alkyl.

In embodiments of Formula (A) herein, Q is C, N or O, preferably Q is N.

In embodiments of Formula (A) herein, $A^1$ and $A^{1'}$ are independently carbon, nitrogen, or $C(R^{22})$, with $R^{22}$ selected from hydrogen, $C_1$-$C_{20}$ hydrocarbyl, $C_1$-$C_{20}$ substituted hydrocarbyl. Preferably $A^1$ and $A^{1'}$ are carbon.

In embodiments of Formula (A) herein, $A^1QA^{1'}$ in Formula (I) is part of a heterocyclic Lewis base, such as a pyridine, pyrazine, pyrimidine, triazine, thiazole, imidazole, thiophene, oxazole, thiazole, furan, or a substituted variant of thereof.

In embodiments of Formula (A) herein, $A^1QA^{1'}$ are part of a heterocyclic Lewis base containing 2 to 20 non-hydrogen atoms that links $A^2$ to $A^{2'}$ via a 3-atom bridge with Q being the central atom of the 3-atom bridge. Preferably each $A^1$ and $A^{1'}$ is a carbon atom and the $A^1QA^{1'}$ fragment forms part of a pyridine, pyrazine, pyrimidine, triazine, thiazole, imidazole, thiophene, oxazole, thiazole, furan, or a substituted variant of thereof group, or a substituted variant thereof.

In one embodiment of Formula (A) herein, Q is carbon, and each $A^1$ and $A^{1'}$ is N or $C(R^{22})$, where $R^{22}$ is selected from hydrogen, $C_1$-$C_{20}$ hydrocarbyl, $C_1$-$C_{20}$ substituted hydrocarbyl, a heteroatom or a heteroatom-containing group. In this embodiment, the $A^1QA^{1'}$ fragment forms part of a cyclic carbene, N-heterocyclic carbene, cyclic amino alkyl carbene, or a substituted variant of thereof group, or a substituted variant thereof.

In embodiments of Formula (A) herein, $A^3 \text{====} A^2$ is a divalent group containing 2 to 20 non-hydrogen atoms that links $A^1$ to the E-bonded aryl group via a 2-atom bridge, where the $A^3 \text{====} A^2$ is a linear alkyl or forms part of a cyclic group (such as an optionally substituted ortho-phenylene group, or ortho-arylene group) or a substituted variant thereof.

$A^{2'} \text{====} A^{3'}$ is a divalent group containing 2 to 20 non-hydrogen atoms that links $A^{1'}$ to the E'-bonded aryl group via a 2-atom bridge, where the $A^{2'} \text{====} A^{3'}$ is a linear alkyl or forms part of a cyclic group (such as an optionally substituted ortho-phenylene group, or ortho-arylene group or, or a substituted variant thereof.

In embodiments of the invention herein, in Formula (A) or (A-II), M is a group 4 metal, such as Hf or Zr.

In embodiments of the invention herein, in Formula (A) or (A-II), E and E' are O.

In embodiments of the invention herein, in Formula (A) or (A-II), $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings, preferably hydrogen, methyl, ethyl, propyl, butyl, pentyl, hexyl, or an isomer thereof.

In embodiments of the invention herein, in Formula (A) or (A-II), $R^{1*}$, $R^{2*}$, $R^{3*}$, $R^{4*}$, $R^{1'}$, $R^{2'}$, $R^{3'}$, $R^{4'}$, and $R^{9*}$ are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthalenyl, cyclohexyl, cyclohexenyl, methylcyclohexyl, and isomers thereof.

In embodiments of the invention herein, in Formula (A) or (A-II), $R^{4*}$ and $R^{4'}$ is independently hydrogen or a $C_1$ to $C_3$ hydrocarbyl, such as methyl, ethyl or propyl.

In embodiments of the invention herein, in Formula (A) or (A-II), $R^{9*}$ is hydrogen, $C_1$-$C_{40}$ hydrocarbyl, $C_1$-$C_{40}$ substituted hydrocarbyl, or a heteroatom-containing group, preferably hydrogen, methyl, ethyl, propyl, butyl, pentyl, hexyl, or an isomer thereof. Preferably $R^{9*}$ is methyl, ethyl, propyl, butyl, $C_1$ to $C_6$ alkyl, phenyl, 2-methylphenyl, 2,6-dimethylphenyl, or 2,4,6-trimethylphenyl.

In embodiments of the invention herein, in Formula (A) or (A-II), each X is, independently, selected from the group consisting of hydrocarbyl radicals having from 1 to 20 carbon atoms (such as alkyls or aryls), hydrides, amides, alkoxides, sulfides, phosphides, halides, alkyl sulfonates, and a combination thereof, (two or more X's may form a part of a fused ring or a ring system), preferably each X is independently selected from halides, aryls, and $C_1$ to $C_5$ alkyl groups, preferably each X is independently a hydrido, dimethylamido, diethylamido, methyltrimethylsilyl, neopentyl, phenyl, benzyl, methyl, ethyl, propyl, butyl, pentyl, fluoro, iodo, bromo, or chloro group.

Alternatively, each X may be, independently, a halide, a hydride, an alkyl group, an alkenyl group or an arylalkyl group.

In embodiments of the invention herein, in Formula (A) or (A-II), each L is a Lewis base, independently, selected from the group consisting of ethers, thioethers, amines, nitriles, imines, pyridines, halocarbons, and phosphines, preferably ethers and thioethers, and a combination thereof, optionally two or more L's may form a part of a fused ring or a ring system, preferably each L is independently selected from ether and thioether groups, preferably each L is a ethyl ether, tetrahydrofuran, dibutyl ether, or dimethylsulfide group.

In embodiments of the invention herein, in Formula (A) or (A-II), $R^{1*}$ and $R^{1'}$ are independently cyclic tertiary alkyl groups.

In embodiments of the invention herein, in Formula (A) or (A-II), n is 1, 2 or 3, typically 2. In embodiments of the invention herein, in Formula (A) or (A-II), m is 0, 1 or 2, typically 0.

In embodiments of the invention herein, in Formula (A) or (A-II), $R^{1*}$ and $R^{1'}$ are not hydrogen.

In embodiments of the invention herein, in Formula (A) or (A-II), M is Hf or Zr, E and E' are O; each of $R^{1*}$ and $R^{1'}$ is independently a $C_1$-$C_{40}$ hydrocarbyl, a $C_1$-$C_{40}$ substituted hydrocarbyl, a heteroatom or a heteroatom-containing group, each $R^{2*}$, $R^{3*}$, $R^{4*}$, $R^{2'}$, $R^{3'}$, and $R^{4'}$ is independently hydrogen, $C_1$-$C_{20}$ hydrocarbyl, $C_1$-$C_{20}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; each X is, independently, selected from the group consisting of hydrocarbyl radicals having from 1 to 20 carbon atoms (such as alkyls or aryls), hydrides, amides, alkoxides, sulfides, phosphides, halides, and a combination thereof, (two or more X's may form a part of a fused ring or a ring system); each L is, independently, selected from the group consisting of ethers, thioethers, and halo carbons (two or more L's may form a part of a fused ring or a ring system).

In embodiments of the invention herein, in Formula (A-II), each of $R^{5*}$, $R^{6*}$, $R^{7*}$, $R^{8*}$, $R^{5'}$, $R^{6'}$, $R^{7'}$, $R^{8'}$, $R^{10*}$, and $R^{12*}$ is independently hydrogen, $C_1$-$C_{40}$ hydrocarbyl, $C_1$-$C_{40}$ substituted hydrocarbyl, a heteroatom or a heteroatom-containing group, or one or more adjacent R groups may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

In embodiments of the invention herein, in Formula (A-II), each of $R^{5*}$, $R^{6*}$, $R^{7*}$, $R^{8*}$, $R^{5'}$, $R^{6'}$, $R^{7'}$, $R^{8'}$, $R^{10*}$, and $R^{12*}$ is independently hydrogen, methyl, ethyl, propyl, butyl, pentyl, hexyl, or an isomer thereof.

In embodiments of the invention herein, in Formula (A-II), each of $R^{5*}$, $R^{6*}$, $R^{7*}$, $R^{8*}$, $R^{5'}$, $R^{6'}$, $R^{7'}$, $R^{8'}$, $R^{10*}$, and $R^{12*}$ is are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthalenyl, cyclohexyl, cyclohexenyl, methylcyclohexyl, and isomers thereof.

In embodiments of the invention herein, in Formula (A-II), M is Hf or Zr, E and E' are O; each of $R^{1*}$ and $R^{1'}$ is independently a $C_1$-$C_{40}$ hydrocarbyl, a $C_1$-$C_{40}$ substituted hydrocarbyl, a heteroatom or a heteroatom-containing group, each $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{20}$ hydrocarbyl, $C_1$-$C_{20}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; $R^{9*}$ is hydrogen, $C_1$-$C_{20}$ hydrocarbyl, $C_1$-$C_{20}$ substituted hydrocarbyl, or a heteroatom-containing group, such as hydrogen, methyl, ethyl, propyl, butyl, pentyl, hexyl, or an isomer thereof;

each X is, independently, selected from the group consisting of hydrocarbyl radicals having from 1 to 20 carbon atoms (such as alkyls or aryls), hydrides, amides, alkoxides, sulfides, phosphides, halides, dienes, amines, phosphines, ethers, and a combination thereof, (two or more X's may form a part of a fused ring or a ring system); n is 2; m is 0; and each of $R^{5*}$, $R^{6*}$, $R^{7*}$, $R^{8*}$, $R^{5'}$, $R^{6'}$, $R^{7'}$, $R^{8'}$, $R^{10*}$, $R^{11*}$ and $R^{12*}$ is independently hydrogen, $C_1$-$C_{20}$ hydrocarbyl, $C_1$-$C_{20}$ substituted hydrocarbyl, a heteroatom or a heteroatom-containing group, or one or more adjacent R groups may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings, such as each of $R^{5*}$, $R^{6*}$, $R^{7*}$, $R^{8*}$, $R^{5'}$, $R^{6'}$, $R^{7'}$, $R^{8'}$, $R^{10*}$, $R^{11*}$ and $R^{12*}$ is are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthyl, cyclohexyl, cyclohexenyl, methylcyclohexyl, and isomers thereof.

Preferred embodiment of Formula (A) is M is Zr or Hf, Q is nitrogen, both $A^1$ and $A^{1'}$ are carbon, both E and E' are oxygen, and both $R^{1*}$ and $R^{1'}$ are $C_4$-$C_{20}$ cyclic tertiary alkyls.

Preferred embodiment of Formula (A) is M is Zr or Hf, Q is nitrogen, both $A^1$ and $A^{1'}$ are carbon, both E and E' are oxygen, and both $R^{1*}$ and $R^{1'}$ are adamantan-1-yl or substituted adamantan-1-yl.

Preferred embodiment of Formula (A) is M is Zr or Hf, Q is nitrogen, both $A^1$ and $A^{1'}$ are carbon, both E and E' are oxygen, and both $R^{1*}$ and $R^{1'}$ are $C_6$-$C_{20}$ aryls.

Preferred embodiment of Formula (A-II) is M is Zr or Hf, both E and E' are oxygen, and both $R^{1*}$ and $R^{1'}$ are $C_4$-$C_{20}$ cyclic tertiary alkyls.

Preferred embodiment of Formula (A-II) is M is Zr or Hf, both E and E' are oxygen, and both $R^{1*}$ and $R^{1'}$ are adamantan-1-yl or substituted adamantan-1-yl.

Preferred embodiment of Formula (A-II) is M is Zr or Hf, both E and E' are oxygen, and each of $R^{1*}$, $R^{1'}$, $R^{3*}$ and $R^{3'}$ are adamantan-1-yl or substituted adamantan-1-yl.

Preferred embodiment of Formula (A-II) is M is Zr or Hf, both E and E' are oxygen, both $R^{1*}$ and $R^{1'}$ are $C_4$-$C_{20}$ cyclic tertiary alkyls, and both $R^{7*}$ and $R^{7'}$ are $C_1$-$C_{20}$ alkyls.

Catalyst compounds that are particularly useful in this invention include one or more of: dimethylzirconium[2',2'''-(pyridine-2,6-diyl)bis(3-adamantan-1-yl)-5-(tert-butyl)-[1, 1'-biphenyl]-2-olate)], dimethylhafnium[2',2'''-(pyridine-2,6-diyl)bis(3-adamantan-1-yl)-5-(tert-butyl)-[1,1'-biphenyl]-2-olate)], dimethylzirconium[6,6'-(pyridine-2,6-diylbis(benzo[b]thiophene-3,2-diyl))bis(2-adamantan-1-yl)-4-methylphenolate)], dimethylhafnium[6,6'-(pyridine-2,6-diylbis(benzo[b]thiophene-3,2-diyl))bis(2-adamantan-1-yl)-4-methylphenolate)], dimethylzirconium[2',2'''-(pyridine-2, 6-diyl)bis(3-((3r, 5r,7r)-adamantan-1-yl)-5-methyl-[1,1'-biphenyl]-2-olate)], dimethylhafnium[2',2'''-(pyridine-2,6-diyl)bis(3-((3r,5r,7r)-adamantan-1-yl)-5-methyl-[1,1'-biphenyl]-2-olate)], dimethylzirconium[2',2'''-(pyridine-2,6-diyl)bis(3-((3r,5r,7r)-adamantan-1-yl)-4',5-dimethyl-[1,1'-biphenyl]-2-olate)], dimethylhafnium[2',2'''-(pyridine-2,6-diyl)bis(3-((3r,5r,7r)-adamantan-1-yl)-4',5-dimethyl-[1,1'-biphenyl]-2-olate)].

Catalyst compounds that are particularly useful in this invention include those represented by one or more of the formulas:

Complex 1

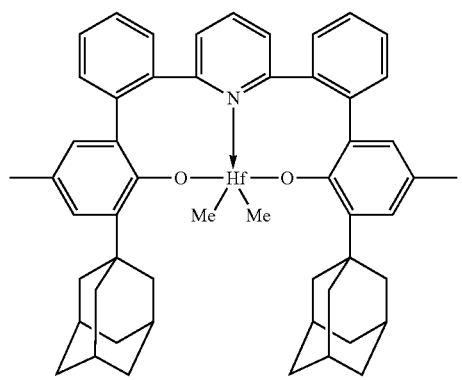

Complex 2

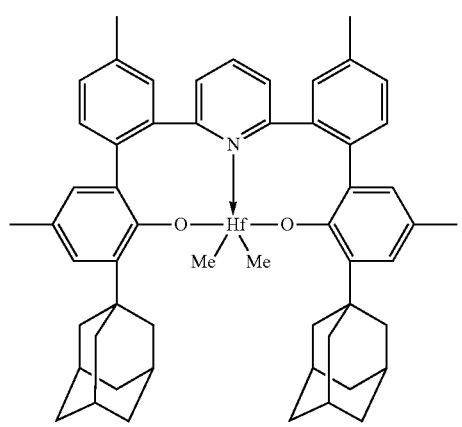

Complex 3

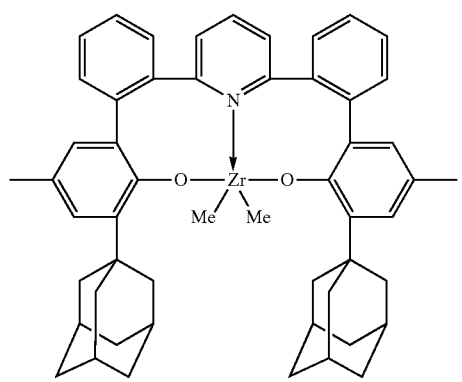

Complex 4

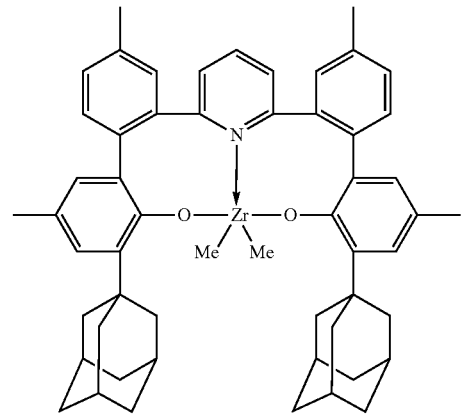

Complex 5

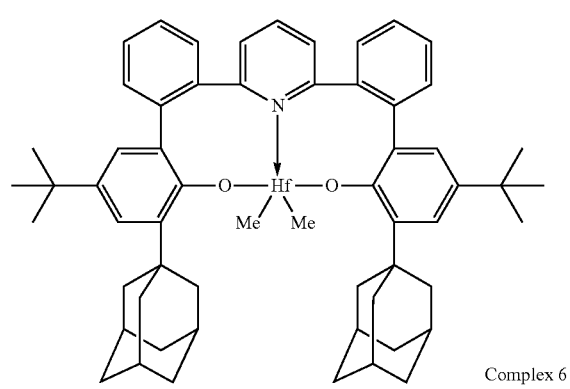

Complex 6

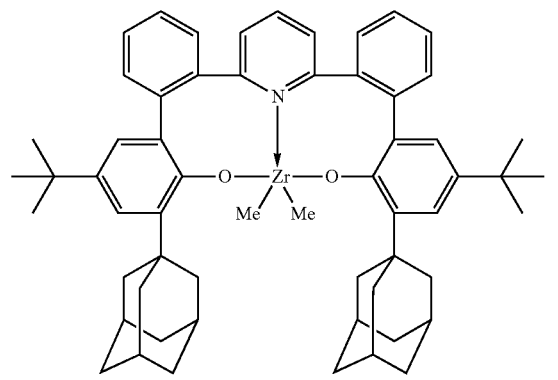

Complex 7

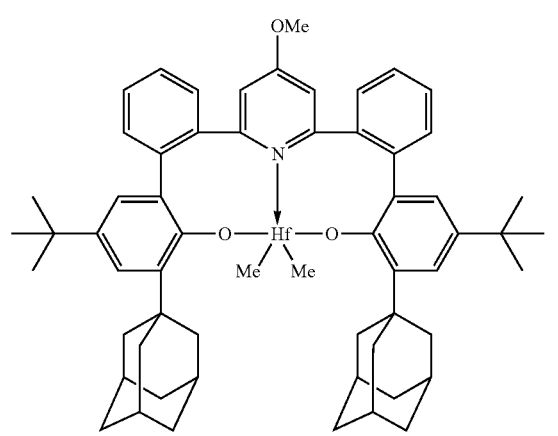

Complex 8
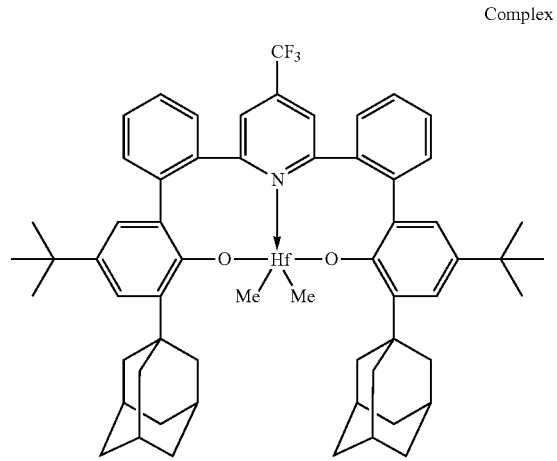
Complex 9
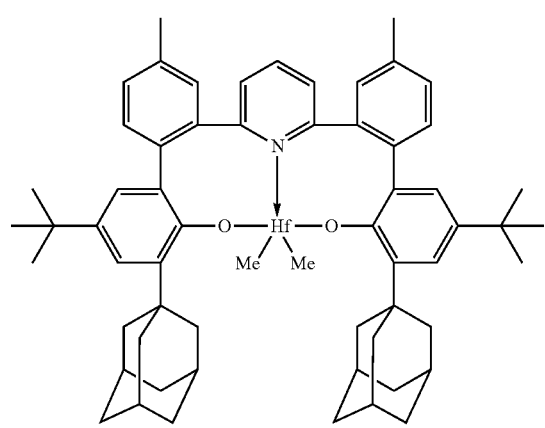
Complex 10
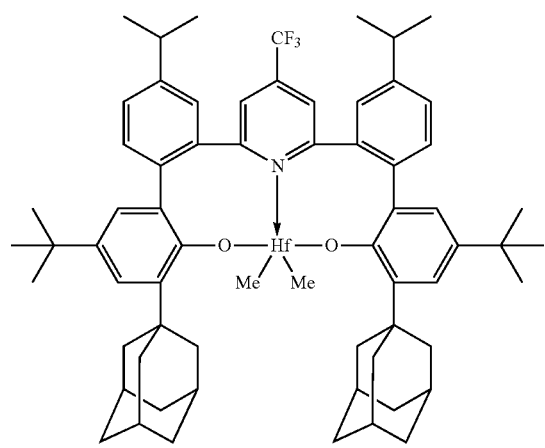
Complex 11
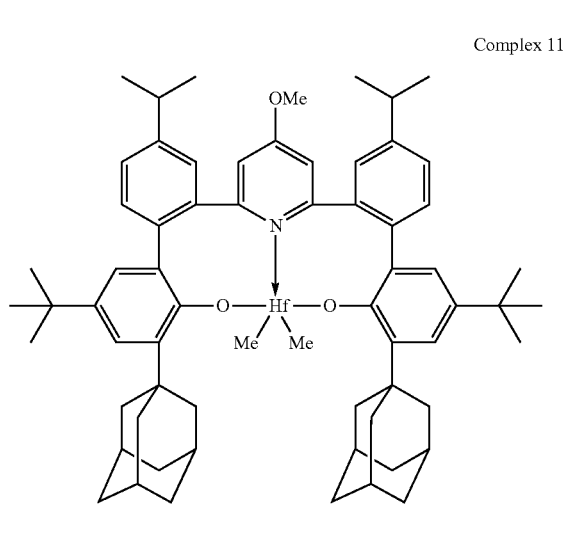
Complex 12
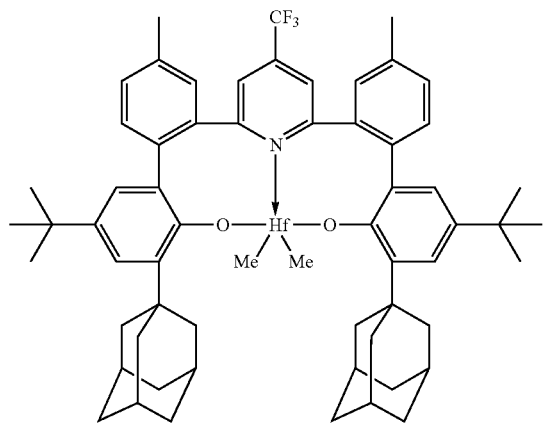
Complex 13
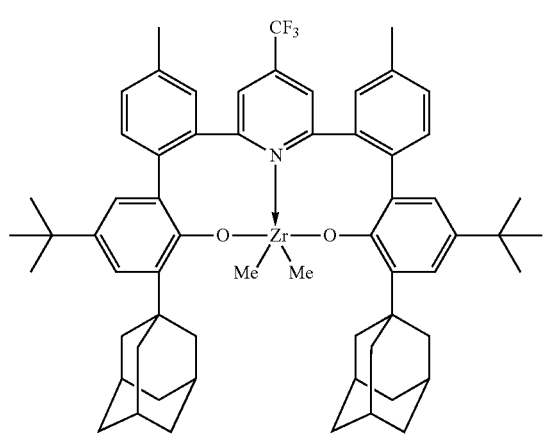

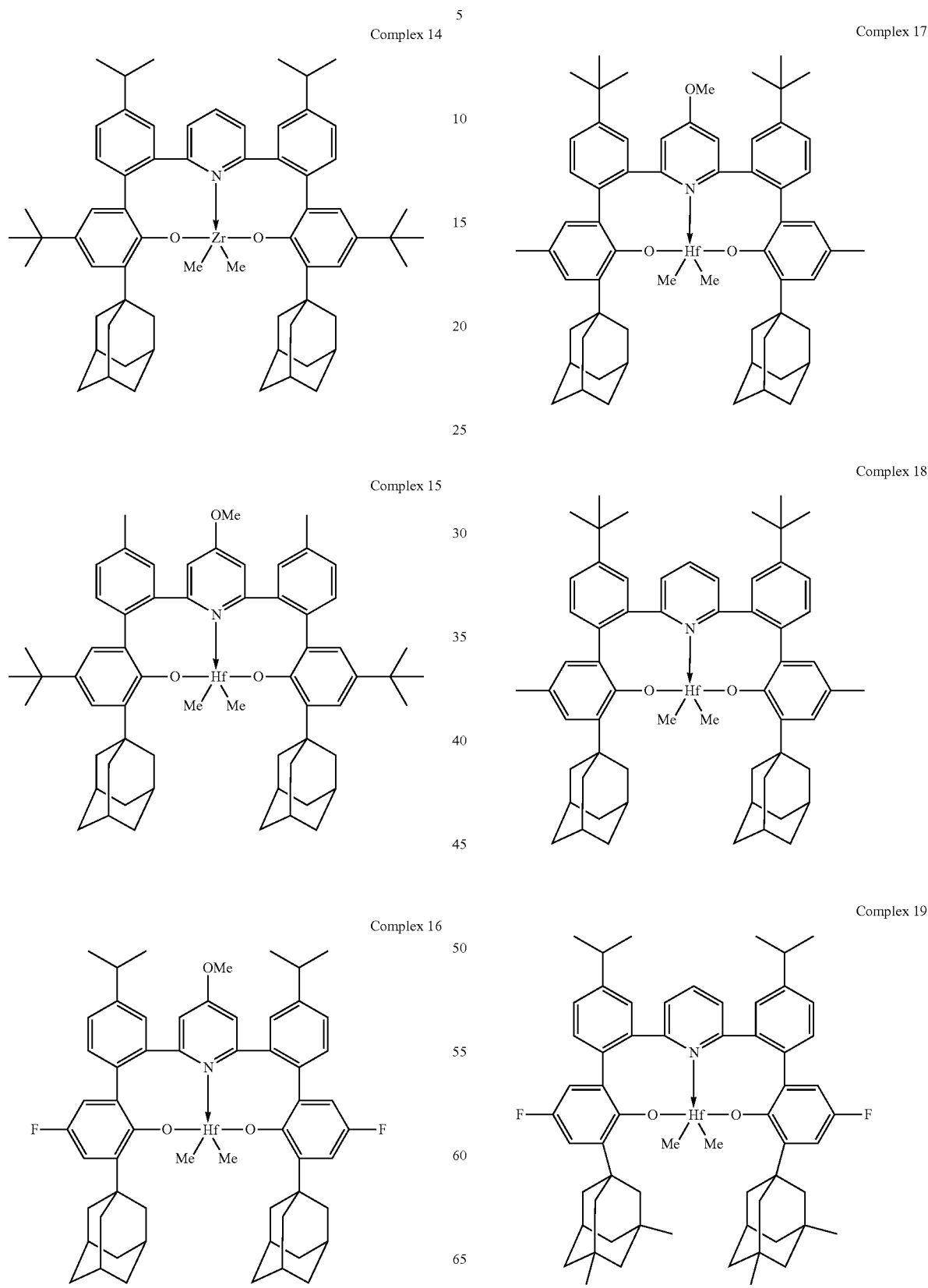
Complex 14
Complex 15
Complex 16
Complex 17
Complex 18
Complex 19

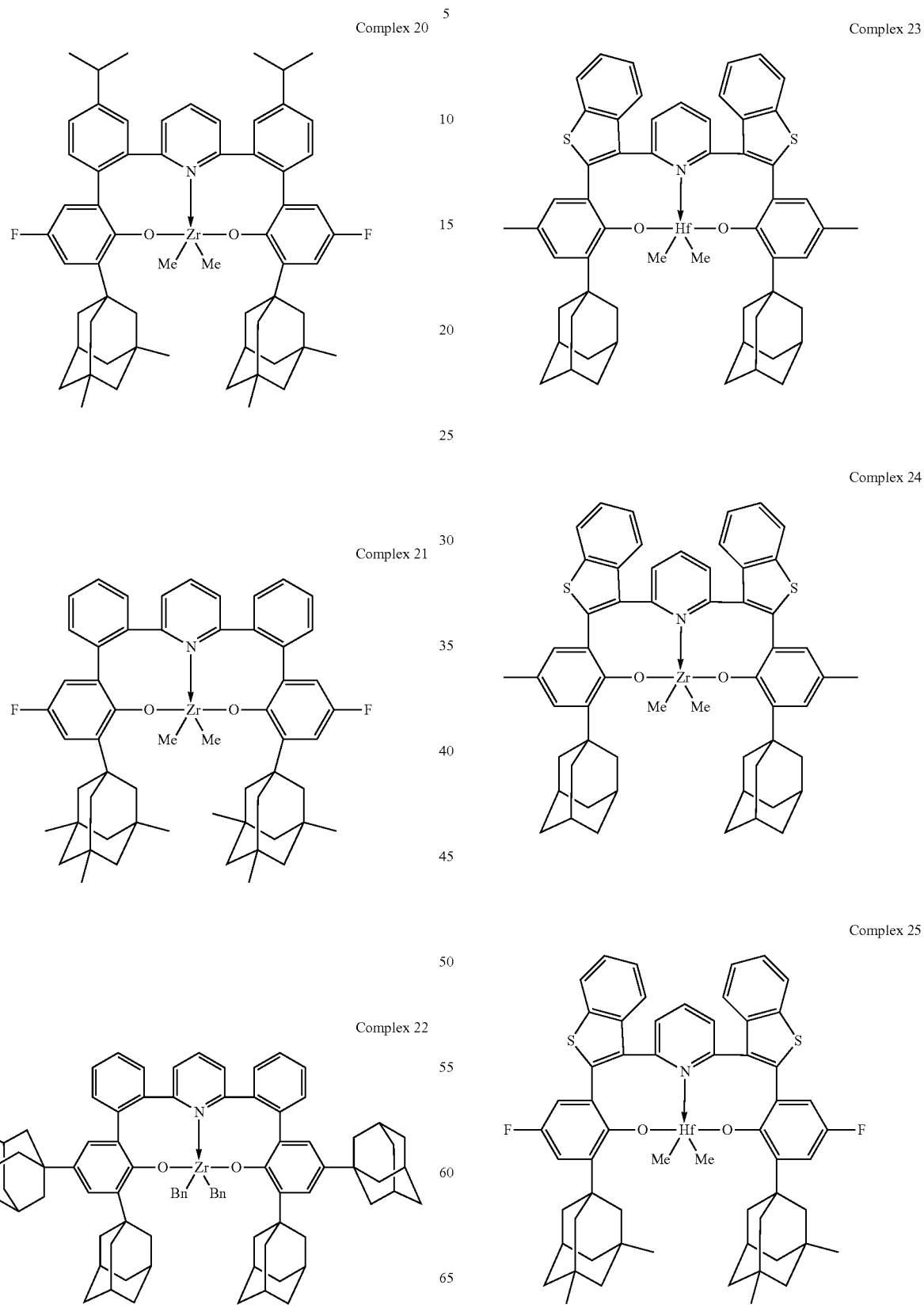

Complex 26
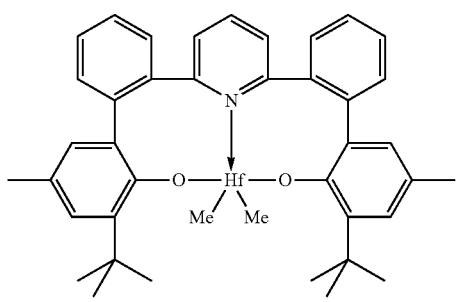

Complex 27
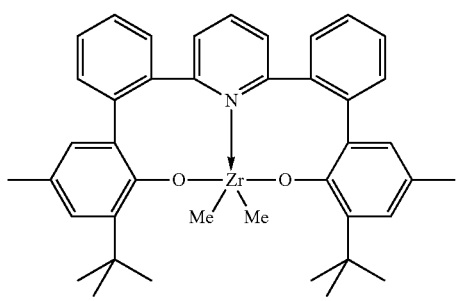

Complex 29
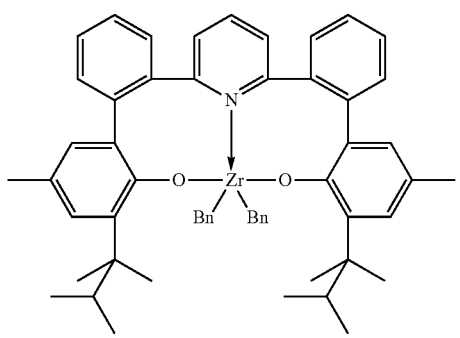

Complex 30
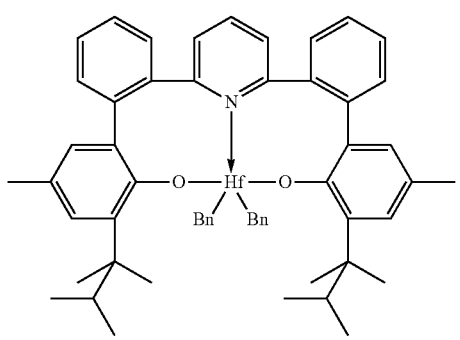

Complex 31
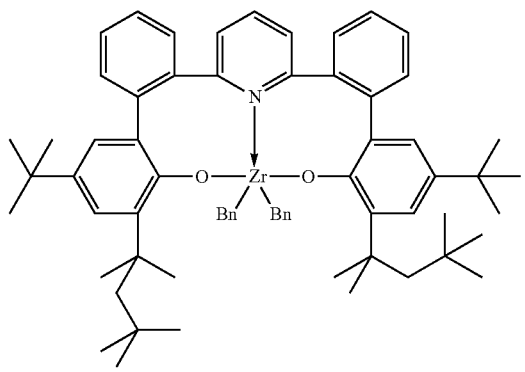

Complex 32
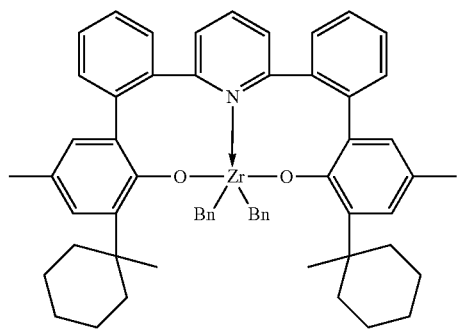

Methods to Prepare the Group 4 Bis(phenolate) Complexes
Ligand Synthesis

The bis(phenol) ligands may be prepared using the general methods shown in Scheme 1. The formation of the bis(phenol) ligand by the coupling of compound A with compound B (method 1) may be accomplished by known Pd- and Ni-catalyzed couplings, such as Negishi, Suzuki, or Kumada couplings. The formation of the bis(phenol) ligand by the coupling of compound C with compound D (method 2) may also be accomplished by known Pd- and Ni-catalyzed couplings, such as Negishi, Suzuki, or Kumada couplings. Compound D may be prepared from compound E by reaction of compound E with either an organolithium reagent or magnesium metal, followed by optional reaction with a main-group metal halide (e.g. $ZnCl_2$) or boron-based reagent (e.g. $B(O^iPr)_3$, $^iPrOB(pin)$). Compound E may be prepared in a non-catalyzed reaction from by the reaction of an aryllithium or aryl Grignard reagent (compound F) with a dihalogenated arene (compound G), such as 1-bromo-2-chlorobenzene. Compound E may also be prepared in a Pd- or Ni-catalyzed reaction by reaction of an arylzinc or arylboron reagent (compound F) with a dihalogenated arene (compound G).

Scheme 1.

(method 1)

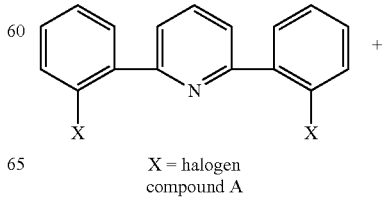

X = halogen
compound A

-continued

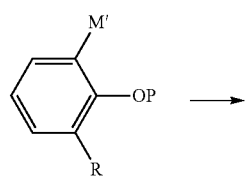

M' = metal or metalloid
P = protecting group
compound B

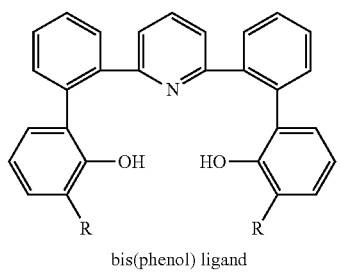

bis(phenol) ligand

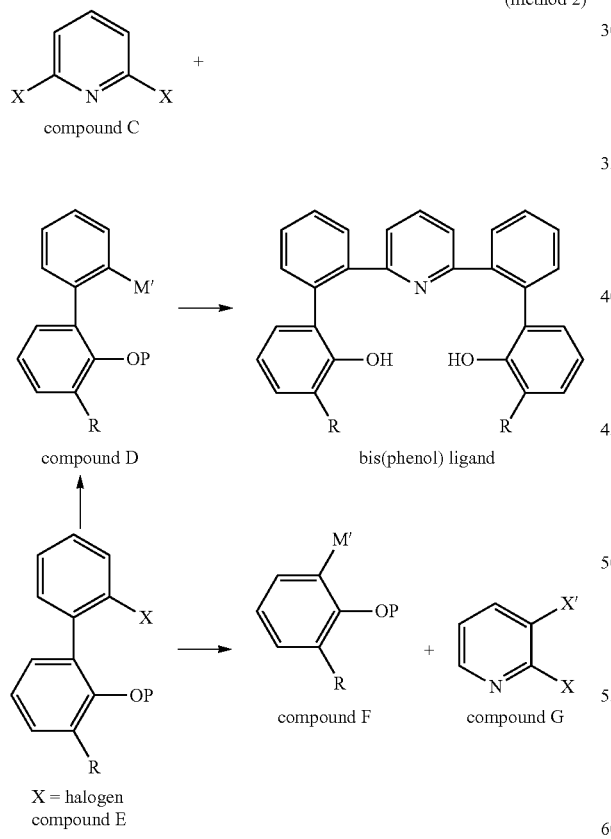

X = halogen
compound E where M' is a group 1, 2, 12, or 13 element or substituted element such as Li, MgCl, MgBr, ZnCl, B(OH)$_2$, B(pinacolate), P is a protective group such as methoxymethyl (MOM), tetrahydropyranyl (THP), t-butyl, allyl, ethoxymethyl, trialkylsilyl, t-butyldimethylsilyl, or benzyl, R is a C$_1$-C$_{40}$ alkyl, substituted alkyl, aryl, tertiary alkyl, cyclic tertiary alkyl, adamantanyl, or substituted adamantanyl and each X' and X is halogen, such as Cl, Br, F or I.

It is preferred that the bis(phenol) ligand and intermediates used for the preparation of the bis(phenol) ligand are prepared and purified without the use of column chromatography. This may be accomplished by a variety of methods that include distillation, precipitation and washing, formation of insoluble salts (such as by reaction of a pyridine derivative with an organic acid), and liquid-liquid extraction. Preferred methods include those described in Practical Process Research and Development—*A Guide for Organic Chemists* by Neal C. Anderson (ISBN: 1493300125X).

Synthesis of Carbene Bis(Phenol) Ligands

The general synthetic method to produce carbene bis (phenol) ligands is shown in Scheme 2. A substituted phenol can be ortho-brominated then protected by a known phenol protecting group, such as MOM, THP, t-butyldimethylsilyl (TBDMS), benzyl (Bn), etc. The bromide is then converted to a boronic ester (compound I) or boronic acid which can be used in a Suzuki coupling with bromoaniline. The biphenylaniline (compound J) can be bridged by reaction with dibromoethane or condensation with oxalaldehyde, then deprotected (compound K). Reaction with triethyl orthoformate forms an iminium salt that is deprotonated to a carbene.

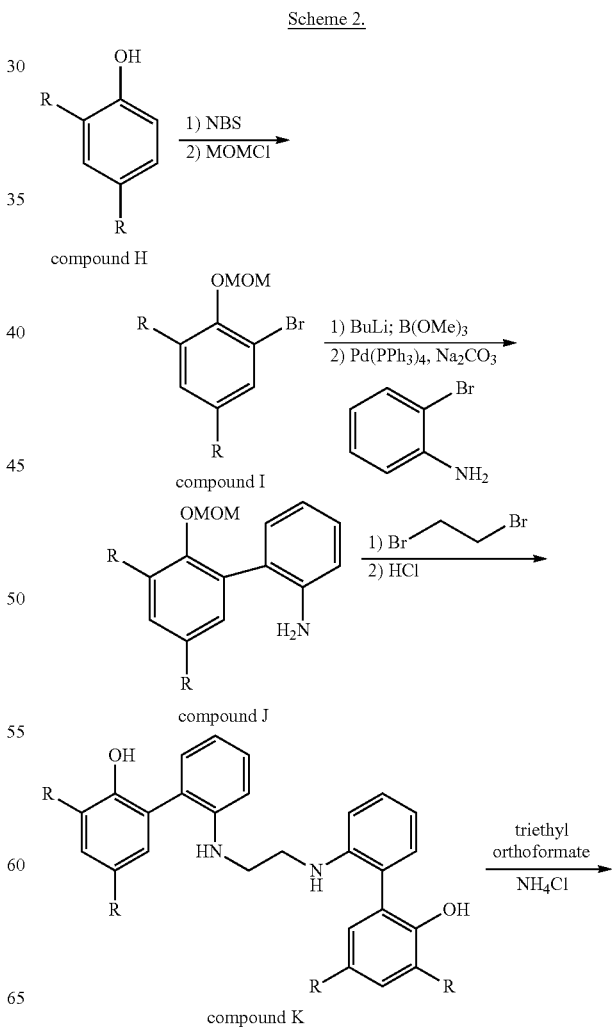

Scheme 2.

-continued

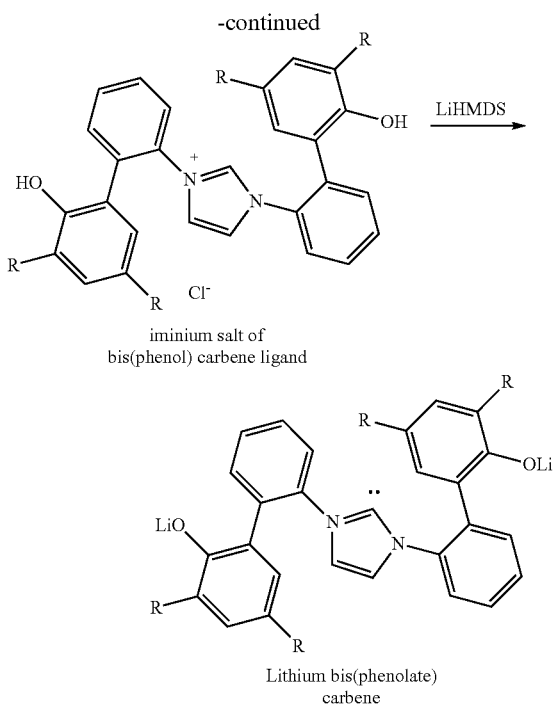

iminium salt of bis(phenol) carbene ligand

Lithium bis(phenolate) carbene

To substituted phenol (compound H) dissolved in methylene chloride, is added an equivalent of N-bromosuccinimide and 0.1 equivalent of diisopropylamine. After stirring at ambient temperature until completion, the reaction is quenched with a 10% solution of HCl. The organic portion is washed with brine, dried over magnesium sulfate, filtered, and concentrated under reduced pressure to give a bromophenol, typically as a solid. The substituted bromophenol, methoxymethylchloride, and potassium carbonate are dissolved in dry acetone and stirred at ambient temperature until completion of the reaction. The solution is filtered and the filtrate concentrated to give protected phenol (compound I). Alternatively, the substituted bromophenol and an equivalent of dihydropyran is dissolved in methylene chloride and cooled to 0° C. A catalytic amount of para-toluenesulfonic acid is added and the reaction stirred for 10 minutes, then quenched with trimethylamine. The mixture is washed with water and brine, then dried over magnesium sulfate, filtered, and concentrated under reduced pressure to give a tetrahydropyran-protected phenol.

Aryl bromide (compound I) is dissolved in THF and cooled to 78° C. n-Butyllithium is added slowly, followed by trimethoxy borate. The reaction is allowed to stir at ambient temperature until completion. The solvent is removed and the solid boronic ester washed with pentane. A boronic acid can be made from the boronic ester by treatment with HCl. The boronic ester or acid is dissolved in toluene with an equivalent of ortho-bromoaniline and a catalytic amount of palladium tetrakistriphenylphosphine. An aqueous solution of sodium carbonated is added and the reaction heated at reflux overnight. Upon cooling, the layers are separated and the aqueous layer extracted with ethyl acetate. The combined organic portions are washed with brine, dried (MgSO4), filtered, and concentrated under reduced pressure. Column chromatography is typically used to purify the coupled product (compound J).

The aniline (compound J) and dibromoethane (0.5 equiv.) are dissolved in acetonitrile and heated at 60° C. overnight. The reaction is filtered and concentrated to give an ethylene bridged dianiline. The protected phenol is deprotected by reaction with HCl to give a bridged bisamino(biphenyl)ol (compound K).

The diamine (compound K) is dissolved in triethylorthoformate. Ammonium chloride is added and the reaction heated at reflux overnight. A precipitate is formed which is collected by filtration and washed with ether to give the iminium salt. The iminium chloride is suspended in THF and treated with lithium or sodium hexamethyldisilylamide. Upon completion, the reaction is filtered and the filtrate concentrated to give the carbene ligand.

Preparation of Bis(Phenolate) Complexes

Transition metal or Lanthanide metal bis(phenolate) complexes are used as catalyst components for olefin polymerization in the present invention. The terms "catalyst" and "catalyst complex" are used interchangeably. The preparation of transition metal or Lanthanide metal bis(phenolate) complexes may be accomplished by reaction of the bis(phenol) ligand with a metal reactant containing anionic basic leaving groups. Typical anionic basic leaving groups include dialkylamido, benzyl, phenyl, hydrido, and methyl. In this reaction, the role of the basic leaving group is to deprotonate the bis(phenol) ligand. Suitable metal reactants for this type of reaction include, but are not limited to, $HfBn_4$ ($Bn=CH_2Ph$), $ZrBn_4$, $TiBn_4$, $ZrBn_2C_2(OEt_2)$, $HfBn_2Cl_2(OEt_2)_2$, $Zr(NMe_2)_2Cl_2$(dimethoxyethane), $Hf(NMe_2)_2Cl_2$(dimethoxyethane), $Hf(NMe_2)_4$, $Zr(NMe_2)_4$, and $Hf(NEt_2)_4$. Suitable metal reagents also include $ZrMe_4$, $HfMe_4$, and other group 4 alkyls that may be formed in situ and used without isolation.

A second method for the preparation of transition metal or Lanthanide bis(phenolate) complexes is by reaction of the bis(phenol) ligand with an alkali metal or alkaline earth metal base (e.g., Na, BuLi, $^i$PrMgBr) to generate deprotonated ligand, followed by reaction with a metal halide (e.g., $HfCl_4$, $ZrCl_4$) to form a bis(phenolate) complex. Bis(phenolate) metal complexes that contain metal-halide, alkoxide, or amido leaving groups may be alkylated by reaction with organolithium, Grignard, and organoaluminum reagents. In the alkylation reaction the alkyl groups are transferred to the bis(phenolate) metal center and the leaving groups are removed. Reagents typically used for the alkylation reaction include, but are not limited to, MeLi, MeMgBr, $AlMe_3$, $Al(^iBu)_3$, $AlOct_3$, and $PhCH_2MgCl$. Typically 2 to 20 molar equivalents of the alkylating reagent are added to the bis(phenolate) complex. The alkylations are generally performed in etherial or hydrocarbon solvents or solvent mixtures at temperatures typically ranging from −80° C. to 120° C.

2,6-Bis(imino)pyridyl Iron Complexes

As used herein, an "electron deficient side" or "electron withdrawing side" of a catalyst can be a portion of a catalyst that has one or more electron withdrawing groups (such as one, two, three, or more) such that the electron deficient side withdraws electron density toward it and away from an opposing (e.g., electron rich) side of the catalyst.

As used herein, an "electron rich side" or "electron donating side" of a catalyst can be a portion of a catalyst that has one or more electron donating groups (such as one, two, three, or more) such that the electron rich side donates electron density toward an opposing, electron deficient side of the catalyst.

In at least one embodiment, the present disclosure provides iron-containing catalysts having an aryl ligand, such as a 2,6-diiminoaryl ligand.

In at least one embodiment, iron catalyst compounds are also asymmetric, having an electron donating side of the catalyst and an electron deficient side of the catalyst. Furthermore, catalyst compounds of the present disclosure can produce polyolefin polymers with tailored molecular weight (e.g., high molecular weight polyolefin polymers, with an Mw value of 100,000 g/mol or more, or low molecular weight polyolefin polymers, with an Mw value of less that 100,000 g/mol).

The present disclosure relates to catalyst compounds represented by Formula (I):

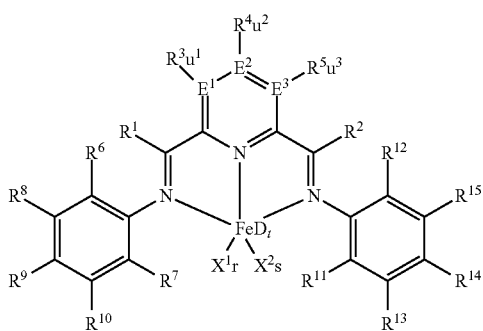

wherein:
- each of $R^1$ and $R^2$ is independently hydrogen, $C_1$-$C_{22}$ alkyl, $C_2$-$C_{22}$ alkenyl, $C_6$-$C_{22}$ aryl, arylalkyl wherein alkyl has from 1 carbon atom to 10 carbon atoms and aryl has from 6 carbon atoms to 20 carbon atoms, or five-, or six-, or seven-membered heterocyclic ring comprising at least one atom selected from the group consisting of N, P, O and S; wherein each of $R^1$ and $R^2$ is optionally substituted by halogen, —$OR^{16}$, —$NR^{17}_2$, or —$SiR^{18}_3$; wherein $R^1$ optionally bonds with $R^3$, and $R^2$ optionally bonds with $R^5$, in each case to independently form a five-, six-, or seven-membered ring;
- each of $R^3$, $R^4$, $R^5$, $R^8$, $R^9$, $R^{10}$, $R^{13}$, $R^{14}$, and $R^{15}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, —$OR^{16}$, —$NR^{17}_2$, halogen, —$SiR^{18}_3$ or five-, six- or seven-membered heterocyclic ring comprising at least one atom selected from the group consisting of N, P, O and S;
- wherein $R^3$, $R^4$, $R^5$, $R^8$, $R^9$, $R^{10}$, $R^{13}$, $R^{14}$, and $R^{15}$ are optionally substituted by halogen, —$OR^{16}$, —$NR^{17}_2$, or —$SiR^{18}_3$; wherein $R^3$ optionally bonds with $R^4$, $R^4$ optionally bonds with $R^5$, $R^7$ optionally bonds with $R^{10}$, $R^{10}$ optionally bonds with $R^9$, $R^9$ optionally bonds with $R^8$, $R^8$ optionally bonds with $R^6$, $R^{15}$ optionally bonds with $R^{14}$, $R^{14}$ optionally bonds with $R^{13}$, and $R^{13}$ optionally bonds with $R^{11}$, in each case to independently form a five-, six- or seven-membered carbocyclic or heterocyclic ring, the heterocyclic ring comprising at least one atom from the group consisting of N, P, O and S;
- each of $R^6$, $R^7$, $R^{11}$, and $R^{12}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, a heteroatom or a heteroatom-containing group (such as —$OR^{16}$, —$NR^{17}_2$, halogen, —$SiR^{18}_3$ or five-, six- or seven-membered heterocyclic ring including at least one atom selected from the group consisting of N, P, O and S); wherein $R^6$, $R^7$, $R^{11}$, and $R^{12}$ are optionally substituted by halogen, —$OR^{16}$, —$NR^{17}_2$, or —$SiR^{18}_3$, wherein $R^6$ optionally bonds with $R^8$, $R^{11}$ optionally bonds with $R^{13}$, or $R^{15}$ optionally bonds with $R^{12}$ in each case to independently form a five-, six- or seven-membered carbocyclic or heterocyclic ring, the heterocyclic ring including at least one atom from the group consisting of N, P, O and S; wherein at least one of $R^6$, $R^7$, $R^{11}$, and $R^{12}$ is independently a heteroatom or a heteroatom-containing group, or at least one of the $R^6$, $R^7$, $R^{11}$, and $R^{12}$ is not methyl, or if $R^{11}$ is H and $R^{12}$ is iPr, then at least one of $R^6$ and $R^7$ is not methyl;
- each of $R^{16}$, $R^{17}$, and $R^{18}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or —$SiR^{19}_3$, wherein each $R^{16}$, $R^{17}$, and $R^{18}$ is independently optionally substituted by halogen, or two $R^{16}$ radicals optionally bond to form a five- or six-membered ring, or two $R^{17}$ radicals optionally bond to form a five- or six-membered ring, or two $R^{18}$ radicals optionally bond to form a five- or six-membered ring;
- each $R^{19}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or two $R^{19}$ radicals optionally bond to form a five- or six-membered ring;
- each of $E^1$, $E^2$, and $E^3$ is independently carbon, nitrogen or phosphorus;
- each of $u^1$, $u^2$, and $u^3$ is independently 0 if $E^1$, $E^2$, or $E^3$ is nitrogen or phosphorus, and each of $u^1$, $u^2$, and $u^3$ is independently 1 if $E^1$, $E^2$, or $E^3$ is carbon;
- each of $X^1$ and $X^2$ is independently substituted hydrocarbyl, and the radicals X can be bonded with one another;
- r is 1 or 2;
- s is 1 or 2;
- D is a neutral donor; and
- t is 0 to 2.

In at least one embodiment, each of $R^1$ and $R^2$ is independently $C_1$-$C_{22}$ alkyl or $C_6$-$C_{22}$ aryl wherein each of $R^1$ and $R^2$ is optionally substituted by halogen. One or more of $R^1$ and $R^2$ may be independently selected from methyl, ethyl, propyl, butyl, pentyl, hexyl, heptyl, octyl, nonyl, decyl, undecyl, dodecyl, phenyl, substituted phenyl, biphenyl or an isomer thereof, which may be halogenated (such as perfluoropropyl, perfluorobutyl, perfluoroethyl, perfluoromethyl), substituted hydrocarbyl radicals and all isomers of substituted hydrocarbyl radicals including trimethylsilylpropyl, trimethylsilylmethyl, trimethylsilylethyl, phenyl, or all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, or dipropylmethylphenyl. In at least one embodiment, $R^1$ and $R^2$ are methyl.

In at least one embodiment, t is 0, in which case D is absent. In an alternate embodiment, D is a neutral donor such as a neutral Lewis base, such as, for example, amines, alcohols, ethers, ketones, aldehydes, esters, sulfides or phosphines, which can be bonded with the iron center or can still be contained in the complex as residual solvent from the preparation of the iron complexes.

In at least one embodiment, the catalyst compound represented by Formula (I) has an electron donating side. At least one of $R^6$ or $R^7$ is independently halogen, —$CF_3$, —OR$^{16}$, —NR$^{17}_2$, or —SiR$^{18}_3$. For example, at least one of R$^6$ or R$^7$ can independently be selected from fluorine, chlorine, bromine, or iodine. R$^8$, R$^9$, and R$^{19}$ can be independently hydrogen, C$_1$-C$_{22}$ alkyl, C$_2$-C$_{22}$ alkenyl, C$_6$-C$_{22}$ aryl, arylalkyl where alkyl has from 1 to 10 carbon atoms and aryl has from 6 to 20 carbon atoms, —OR$^{16}$, —NR$^{17}_2$, halogen, —SiR$^{18}_3$, or five-, six- or seven-membered heterocyclic ring including at least one atom selected from the group consisting of N, P, O and S; wherein R$^8$, R$^9$, and R$^{19}$ are optionally substituted by halogen, —OR$^{16}$, —NR$^{17}_2$, or —SiR$^{18}_3$.

Each of R$^{16}$ and R$^{17}$ is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, or —SiR$^{18}_3$, wherein R$^{16}$ and or R$^{17}$ is optionally substituted by halogen, or two R$^{16}$ and R$^{17}$ radicals optionally bond to form a five- or six-membered ring. Each R$^{18}$ is independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, or two R$^{18}$ radicals optionally bond to form a five- or six-membered ring.

In at least one embodiment, each of R$^3$, R$^4$, R$^5$ is independently selected from hydrogen, methyl, ethyl, propyl, butyl, pentyl, hexyl, heptyl, octyl, nonyl, decyl, dimethylpentyl, tert-butyl, isopropyl, or isomers thereof, such as R$^3$, R$^4$, and R$^5$ are hydrogen.

In at least one embodiment, at least one of R$^6$, R$^7$, R$^{11}$, or R$^{12}$ is independently halogen, —CF$_3$, —NR$^{17}_2$, or —SiR$^{18}_3$, such as at least one of the R$^6$, R$^7$, R$^{11}$, or R$^{12}$ is halogen, or at least one of the R$^6$, R$^7$, R$^{11}$, or R$^{12}$ is not methyl. For example, at least one of R$^6$, R$^7$, R$^{11}$, or R$^{12}$ is independently selected from fluorine, chlorine, bromine, or iodine. In at least one embodiment, R$^6$, R$^7$, R$^{11}$, and R$^{12}$ are independently selected from methyl, ethyl, tert-butyl, F, Br, Cl, and I. In at least one embodiment, at least one of R$^6$, R$^7$, R$^{11}$, or R$^{12}$ is Cl. R$^6$, R$^7$, R$^{11}$, or R$^{12}$ can be independently hydrogen, C$_1$-C$_{22}$ alkyl, C$_2$-C$_{22}$ alkenyl, C$_6$-C$_{22}$ aryl, arylalkyl where alkyl can have from 1 to 10 carbon atoms and aryl can have from 6 to 20 carbon atoms, or —SiR$^{19}_3$, wherein R$^6$, R$^7$, R$^{11}$, R$^{12}$ can be independently substituted by halogen, —OR$^{16}$, —NR$^{17}_2$, —or SiR$^{18}_3$; wherein R$^6$ optionally bonds with R$^8$, R$^8$ optionally bonds with R$^9$, R$^9$ optionally bonds with R$^{10}$, R$^{10}$ optionally bonds with R$^7$, R$^{11}$ optionally bonds with R$^{13}$, R$^{13}$ optionally bonds with R$^{14}$, R$^{14}$ optionally bonds with R$^{15}$, and R$^{15}$ optionally bonds with R$^{12}$, in each case to independently form a five-, six-, or seven-membered ring.

In at least one embodiment, the catalyst compound represented by Formula (I) has an electron withdrawing side. Each of R$^{11}$, R$^{12}$, R$^{13}$, R$^{14}$, and R$^{15}$ can be independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —OR$^{16}$, —NR$^{17}_2$, or —SiR$^{18}_3$, halogen, —NO$_2$, or five-, six-, or seven-membered heterocyclic ring including at least one atom selected from N, P, O, and S. R$^{11}$, R$^{12}$, R$^{13}$, R$^{14}$, and R$^{15}$ can be independently substituted by —NO$_2$, —CF$_3$, —CF$_2$CF$_3$, —CH$_2$CF$_3$, halogen, —OR$^{16}$, —NR$^{17}_2$, or —SiR$^{18}_3$. Furthermore, each of R$^{11}$, R$^{12}$, R$^{13}$, R$^{14}$, and R$^{15}$ can be independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, or alkylaryl where alkyl has from 1 to 10 carbon atoms and aryl has from 6 to 20 carbon atoms, where at least one of R$^{11}$, R$^{12}$, R$^{13}$, R$^{14}$, and R$^{15}$ can be substituted by —NO$_2$, —CF$_3$, —CF$_2$CF$_3$, —CH$_2$CF$_3$, halogen, —OR$^{16}$, —NR$^{17}_2$, or —SiR$^{18}_3$. In at least one embodiment, at least one of R$^{11}$, R$^{12}$, R$^{13}$, R$^{14}$, and R$^{15}$ is halogen or C$_1$-C$_{22}$-alkyl substituted with one or more halogen atoms. In at least one embodiment, each of R$^{11}$, R$^{12}$, R$^{13}$, R$^{14}$, and R$^{15}$ is independently hydrogen, halogen (such as fluorine, chlorine, bromine, or iodine), or trihalomethyl (such as trichloromethyl or trifluoromethyl), where at least one of R$^{11}$, R$^{12}$, R$^{13}$, R$^{14}$, and R$^{15}$ is halogen or trihalomethyl.

Each of R$^6$, R$^7$, R$^8$, R$^9$, R$^{10}$, R$^{11}$, R$^{12}$, R$^{13}$, R$^{14}$ and R$^{15}$ can be independently selected from hydrogen, methyl, ethyl, propyl, butyl, pentyl, hexyl, heptyl, octyl, nonyl, decyl, undecyl, dodecyl, phenyl, substituted phenyl, biphenyl or an isomer thereof, which may be halogenated (such as perfluoropropyl, perfluorobutyl, perfluoroethyl, perfluoromethyl), substituted hydrocarbyl radicals and all isomers of substituted hydrocarbyl radicals including trimethylsilylpropyl, trimethylsilylmethyl, trimethylsilylethyl, phenyl, or all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, or dipropylmethylphenyl, or isomers thereof.

In at least one embodiment, each of E$^1$, E$^2$, and E$^3$ is independently carbon, nitrogen or phosphorus, such as each of u$^1$, u$^2$, and u$^3$ is independently 0 if E$^1$, E$^2$, or E$^3$ is nitrogen or phosphorus, and each of u$^1$, u$^2$, and u$^3$ is independently 1 if E$^1$, E$^2$, or E$^3$ is carbon. Each of R$^3$, R$^4$, and R$^5$ can be independently hydrogen or C$_1$-C$_{22}$-alkyl. In at least one embodiment, E$^1$, E$^2$, and E$^3$ are carbon, and each of R$^3$, R$^4$, and R$^5$ is hydrogen. In another embodiment, R$^1$ and R$^2$ are methyl, and R$^3$, R$^4$, and R$^5$ are hydrogen.

In at least one embodiment, each instance of X$^1$ and X$^2$ is independently substituted hydrocarbyl, and the radicals X$^1$ and X$^2$ can be bonded with one another. For example, r can be 1 or 2, such as r can be 1. In another example, s can be 1 or 2, such as s can be 1. In at least one embodiment, r and s are the same. For example, each instance of X$^1$ and X$^2$ can be any suitable silane, such as (trialkylsilyl)C$_1$-C$_{20}$ alkyl-, such as (trialkylsilyl)C$_1$-C$_{10}$ alkyl-, such as (trialkylsilyl)C$_1$-C$_5$ alkyl-. In at least one embodiment, one or more X$^1$ and X$^2$ is independently selected from (trimethylsilyl)methyl-, (trimethylsilyl)methyl-, (trimethylsilyl)ethyl-, (trimethylsilyl)propyl-, (trimethylsilyl)butyl-, (trimethylsilyl)pentyl-, (trimethylsilyl)hexyl-, (trimethylsilyl)heptyl-, (trimethylsilyl)octyl-, (trimethylsilyl)nonyl-, (trimethylsilyl)decyl-, (triethylsilyl)methyl-, (triethylsilyl)methyl-, (triethylsilyl)ethyl-, (triethylsilyl)propyl-, (triethylsilyl)butyl-, (triethylsilyl)pentyl-, (triethylsilyl)hexyl-, (triethylsilyl)heptyl-, (triethylsilyl)octyl-, (triethylsilyl)nonyl-, (triethylsilyl)decyl-, (triisopropylsilyl)methyl-, (triisopropylsilyl)methyl-, (triisopropylsilyl)ethyl-, (triisopropylsilyl)propyl-, (triisopropylsilyl)butyl-, (triisopropylsilyl)pentyl-, (triisopropylsilyl)hexyl-, (triisopropylsilyl)heptyl-, (triisopropylsilyl)octyl-, (triisopropylsilyl)nonyl-, (triisopropylsilyl)decyl-, (t-BuPh$_2$Si)methyl-, (t-BuPh$_2$Si)methyl-, (t-BuPh$_2$Si)ethyl-, (t-BuPh$_2$Si)propyl-, (t-BuPh$_2$Si)butyl-, (t-BuPh$_2$Si)pentyl-, (triethylsilyl)hexyl-, (t-BuPh$_2$Si)heptyl-, (t-BuPh$_2$Si)octyl-, (t-BuPh$_2$Si)nonyl-, (t-BuPh$_2$Si)decyl-, or isomers thereof. For example, X$^1$ and X$^2$ can be (trimethylsilyl)methyl-.

In at least one embodiment, the catalyst compound represented by Formula (I) is one or more of:

1
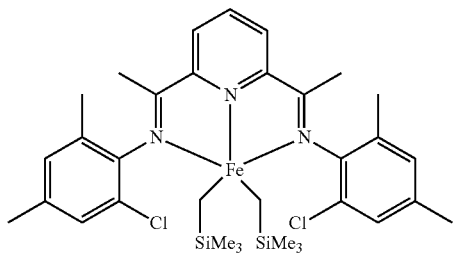
2
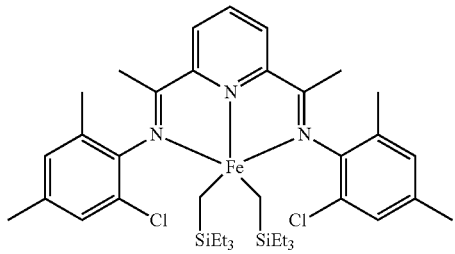
3
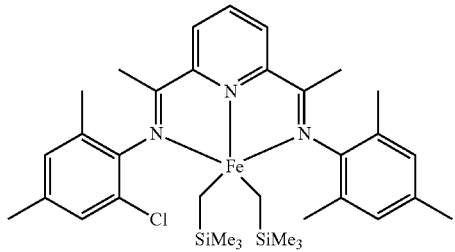
4
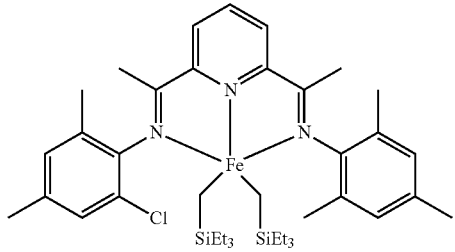
5
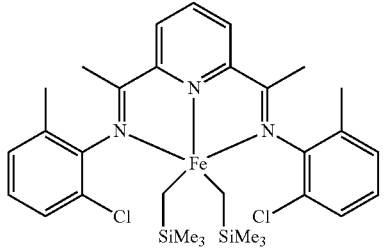
6
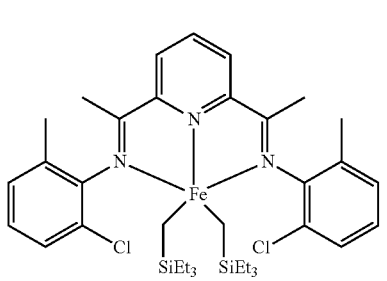
7
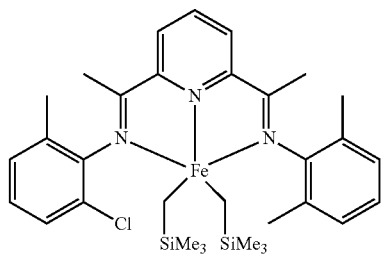
8
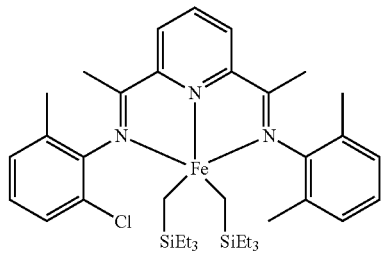
9
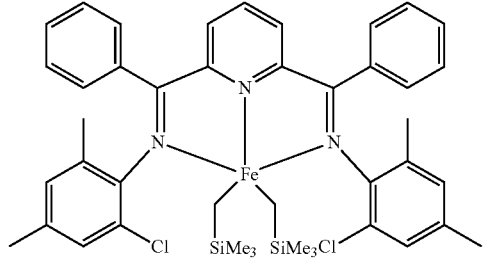
10
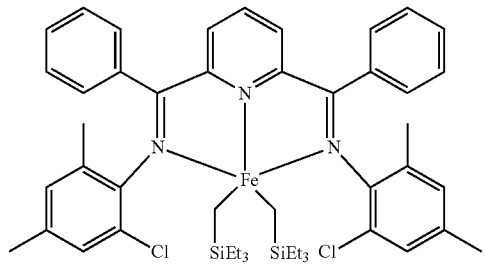
11
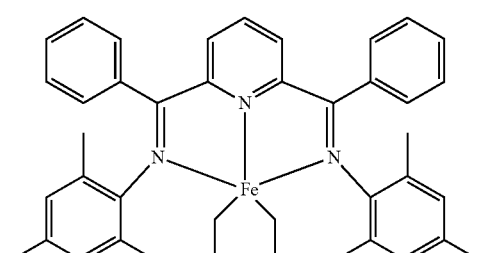
12
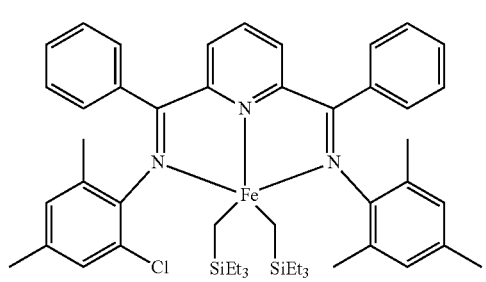

13
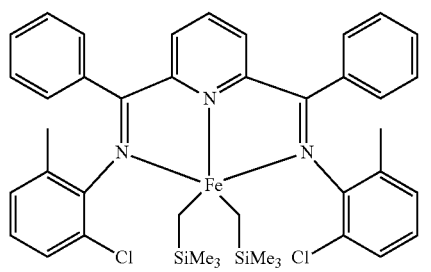
14
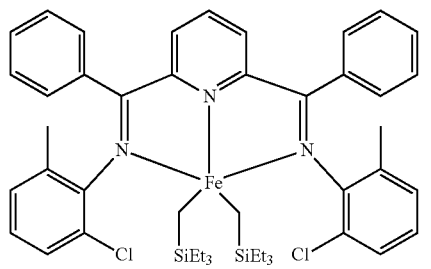
15
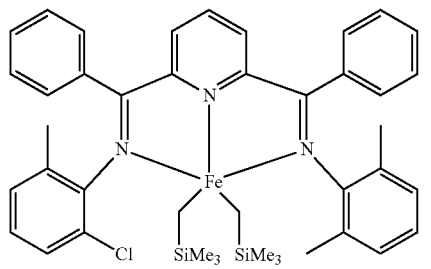
16
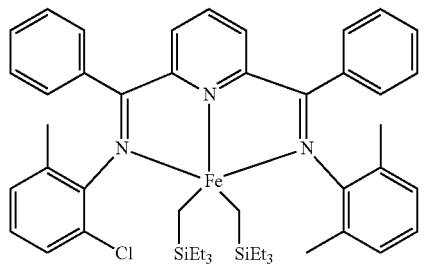
17
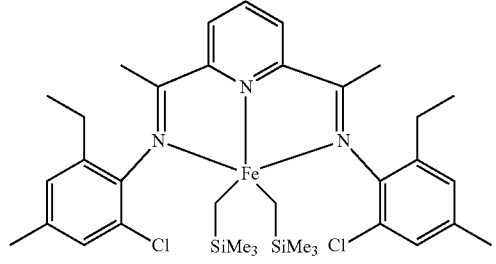
18
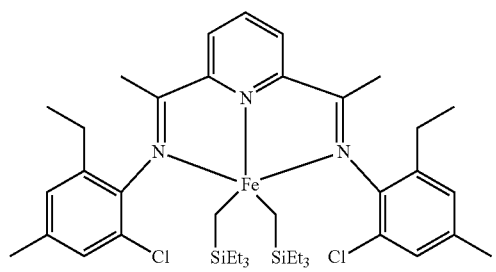
19
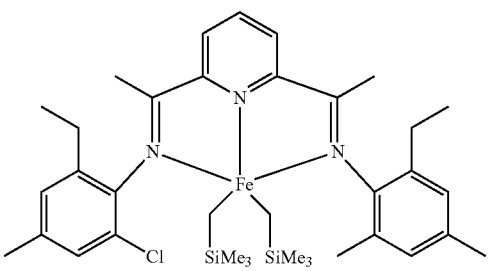
20
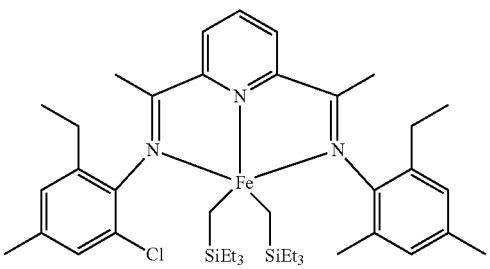
21
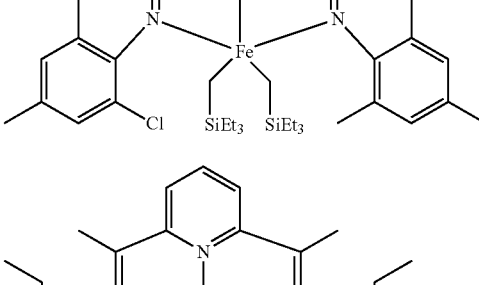
22
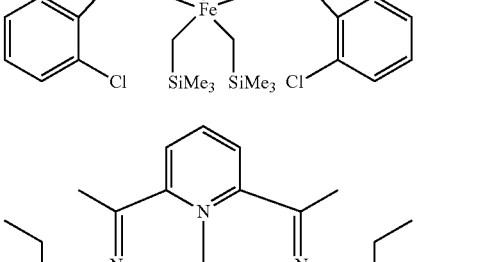
23
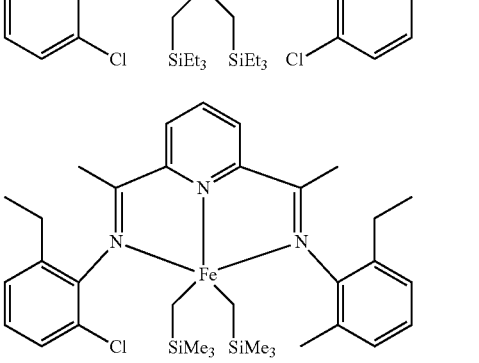
24
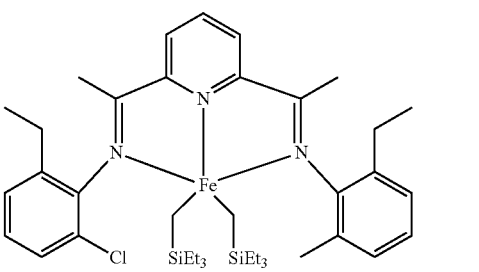

25
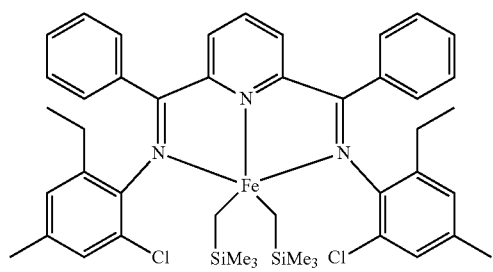
26
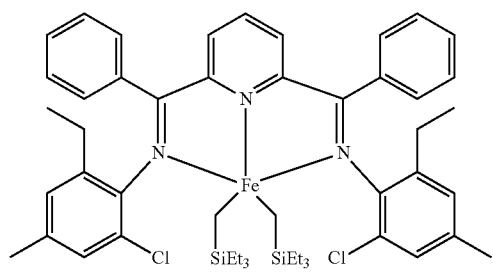
27
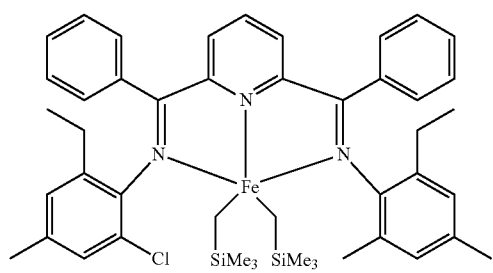
28
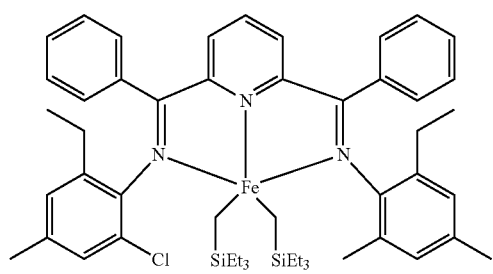
29
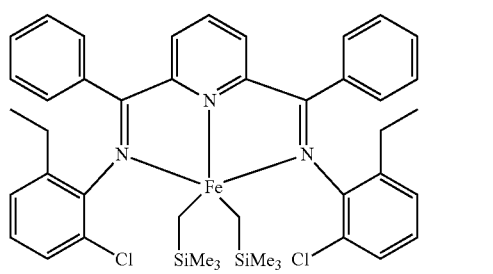
30
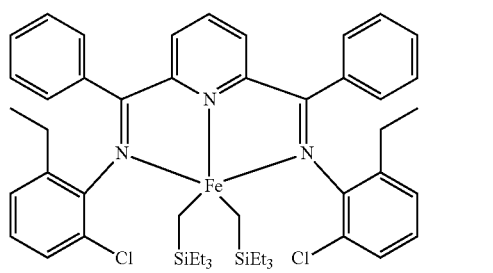
31
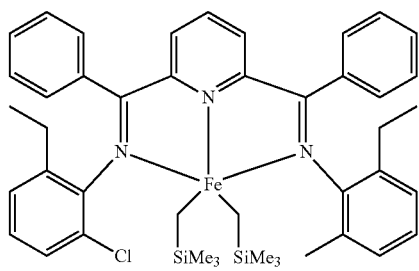
32
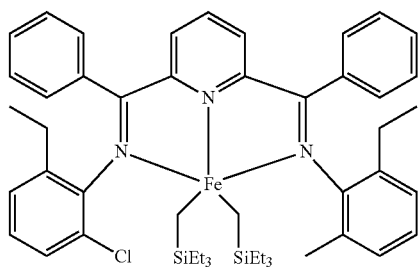
33
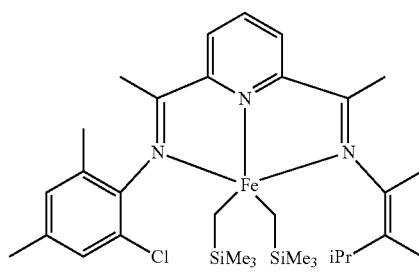
34
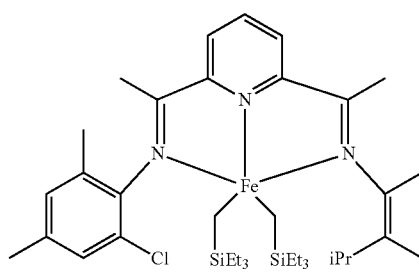
35
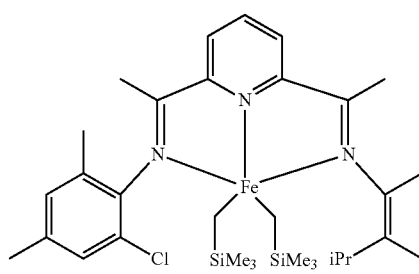
36
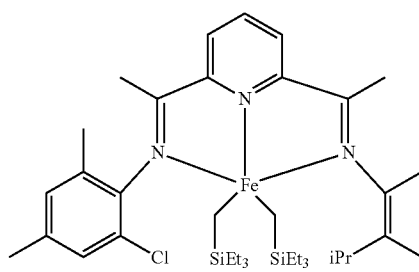

-continued
37
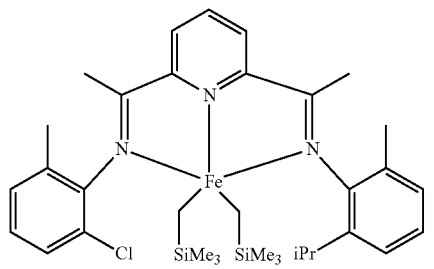
38
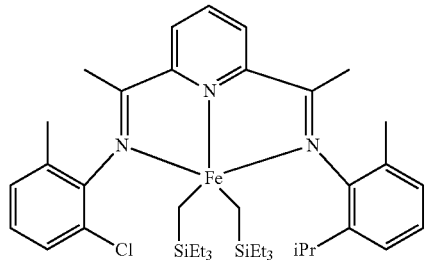
39
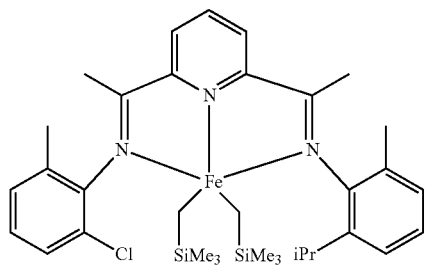
40
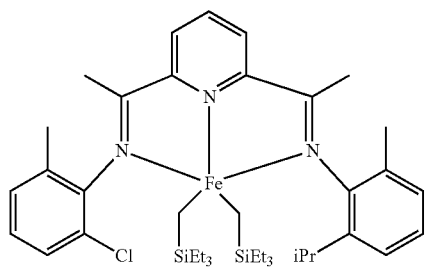
41
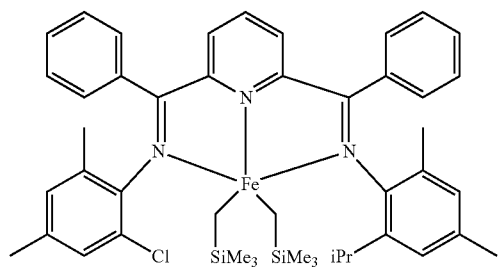
42
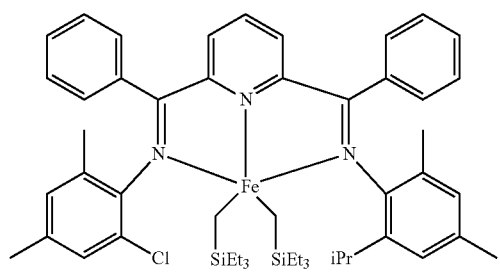
-continued
43
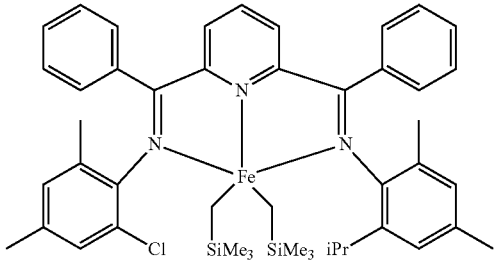
44
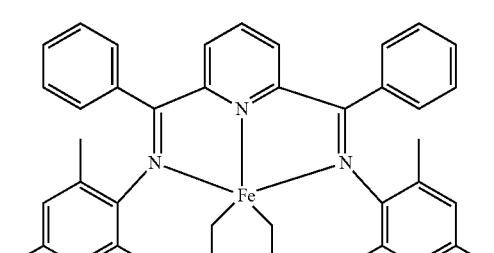
45
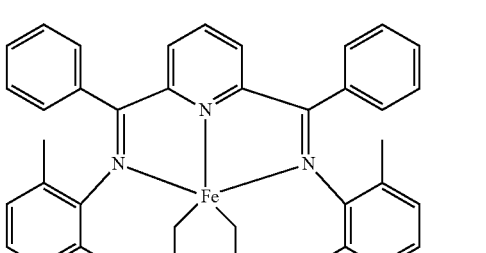
46
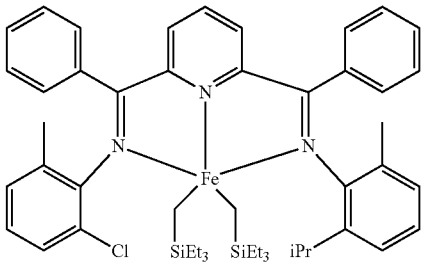
47
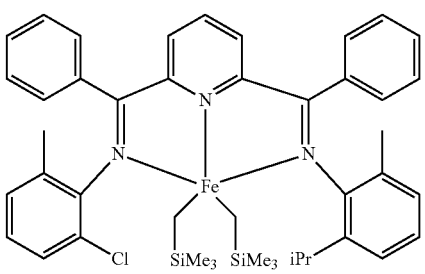

-continued

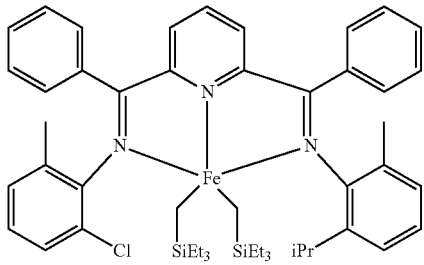

48

In at least one embodiment, the catalyst compound represented by Formula (I) is selected from:

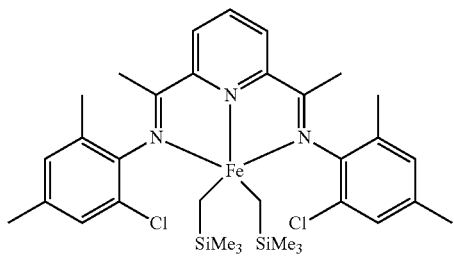

1

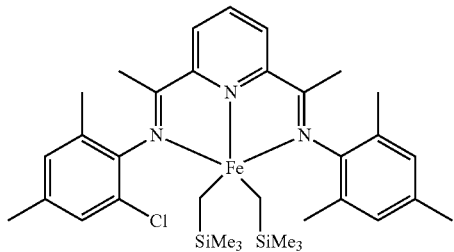

3

In at least one embodiment, the iron catalyst may be an iron complex represented by Formula (IIa) and/or Formula (IIb):

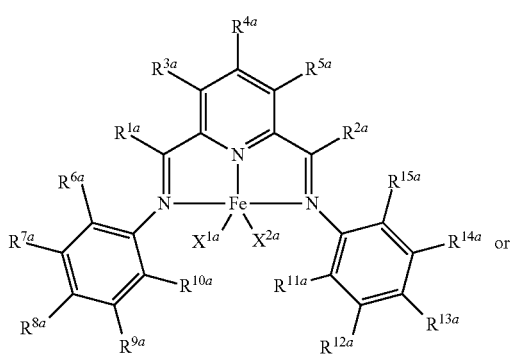

(IIa)

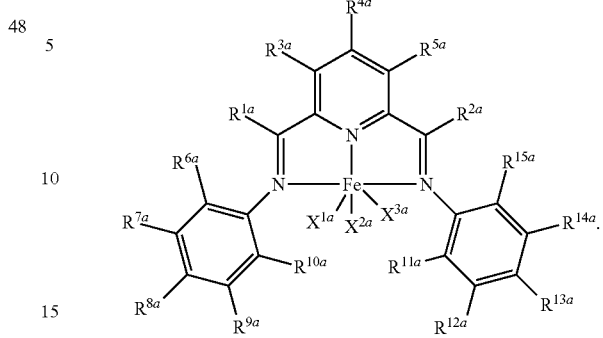

(IIb)

Formula (II), as used herein, refers to one or more of Formula (IIa) and/or Formula (IIb).

In at least one embodiment, each of $R^{6a}$, $R^{10a}$, $R^{11a}$, and $R^{15a}$ are independently halogen, —$CF_3$, or $C_1$-$C_{22}$-alkyl, $C_2$-$C_{22}$-alkenyl, $C_6$-$C_{22}$-aryl, arylalkyl (wherein alkyl has from 1 to 10 carbon atoms and aryl has from 6 to 20 carbon atoms), $NR'_2$, —$SiR''_3$ or five-, six- or seven-membered heterocyclyl comprising at least one atom selected from N, P, O and S. In at least one embodiment, each of $R^{6a}$, $R^{10a}$, $R^{11a}$, and $R^{15a}$ are independently fluorine, chlorine, bromine, or iodine. In at least one embodiment, each of $R^{6a}$, $R^{10a}$, $R^{11a}$, and $R^{15a}$ is independently optionally substituted by halogen, —$NR'_2$, —$OR'$, or —$SiR''_3$.

In at least one embodiment, each of $R^{1a}$ and $R^{2a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O and S, wherein each of $R^{1a}$ and $R^{2a}$ is optionally substituted by halogen, —$NR'_2$, —$OR'$ or —$SiR''_3$, wherein $R^{1a}$ optionally bonds with $R^{3a}$, and $R^{2a}$ optionally bonds with $R^{5a}$, in each case to independently form a five-, six- or seven-membered ring. In at least one embodiment, $R^{1a}$ and $R^{2a}$ are independently $C_1$-$C_{22}$-alkyl, substituted $C_1$-$C_{22}$-alkyl, unsubstituted phenyl, or substituted phenyl. In at least one embodiment, each of $R^{1a}$ and $R_{2a}$ is independently selected from methyl, ethyl, n-propyl, isopropyl, n-butyl, isobutyl, sec-butyl, tert-butyl, n-pentyl, isopentyl, sec-pentyl, tert-pentyl, n-hexyl, isohexyl, sec-hexyl, tert-hexyl, n-heptyl, isoheptyl, sec-heptyl, tert-heptyl, n-octyl, isooctyl, sec-octyl, tert-octyl, n-nonyl, isononyl, sec-nonyl, tert-nonyl, n-decyl, isodecyl, sec-decyl, and tert-decyl.

In at least one embodiment, each of $R^{3a}$, $R^{4a}$, $R^{5a}$, $R^{7a}$, $R^{8a}$, $R^{9a}$, $R^{12a}$, $R^{13a}$, and $R^{14a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, halogen, —$NR'_2$, —$SiR''_3$ or five-, six- or seven-membered heterocyclyl comprising at least one atom selected from N, P, O and S. Each of $R^{3a}$, $R^{4a}$, $R^{5a}$, $R^{7a}$, $R^{8a}$, $R^{9a}$, $R^{12a}$, $R^{13a}$, and $R^{14a}$ is independently optionally substituted by halogen, —$NR'_2$, —$OR'$, or —$SiR''_3$.

In at least one embodiment, each of $R^{8a}$ and $R^{13a}$ is independently selected from $C_1$-$C_{22}$-alkyl, wherein each of $R^{8a}$ and $R^{13a}$ is independently optionally substituted by halogen, —$NR'_2$, —$OR'$, or —$SiR''_3$. In at least one embodiment, $R^{7a}$, $R^{9a}$, $R^{12a}$, and $R^{14a}$ is hydrogen. In at least one embodiment, each of $R^{3a}$, $R^{4a}$, and $R^{5a}$ is hydrogen.

In at least one embodiment, each of $X^{1a}$, $X^{2a}$, and $X^{3a}$ is independently halogen, hydrogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —NR'$_2$, —OR', —SR', —SO$_3$R', —OC(O)R', —CN, —SCN, β-diketonate, —CO, —BF$_4$—, —PF$_6$— or bulky non-coordinating anion, or $X^{1a}$ and $X^{2a}$ optionally bond to form a five- or six-membered ring. Each R' is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or —SiR"$_3$, wherein R' is optionally substituted by halogen or nitrogen- or oxygen-containing groups, or two R' radicals optionally bond to form a five- or six-membered ring. Each R" is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, wherein each R" is optionally substituted by halogen or nitrogen- or oxygen-containing groups, or two R" radicals optionally bond to form a five- or six-membered ring. In at least one embodiment, $X^{1a}$ and $X^{2a}$ are chlorine.

In at least one embodiment, each of $R^{6a}$, $R^{10a}$, $R^{11a}$, and $R^{15a}$ is chlorine; each of $R^{1a}$ and $R^{2a}$ is $C_1$-$C_{20}$ hydrocarbyl; each of $R^{3a}$, $R^{4a}$, and $R^{5a}$ is hydrogen; each of $R^{8a}$ and $R^{13a}$ is $C_1$-$C_{20}$ hydrocarbyl; each of $R^{7a}$, $R^{9a}$, $R^{12a}$ and $R^{14a}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, halogen, —NR'$_2$, —OR', —SiR"$_3$ or five-, six- or seven-membered heterocyclyl comprising at least one atom selected from the group consisting of N, P, O and S; $R^{1a}$, $R^{2a}$, $R^{3a}$, $R^{4a}$, $R^{5a}$, $R^{7a}$, $R^{8a}$, $R^{9a}$, $R^{12a}$, and $R^{13a}$ are optionally substituted by halogen, —NR'$_2$, —OR' or —SiR"$_3$; each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —SiR"$_3$, wherein R' is optionally substituted by halogen, or two R' radicals optionally bond to form a five- or six-membered ring; each R" is independently hydrogen, $C_1$-$C_{22}$-alkyl, $C_2$-$C_{22}$-alkenyl, $C_6$-$C_{22}$-aryl or arylalkyl where alkyl has from 1 to 10 carbon atoms and aryl has from 6 to 20 carbon atoms, or two R" radicals optionally bond to form a five- or six-membered ring.

In at least one embodiment, an iron catalyst represented by Formula (II) is one or more of:

1
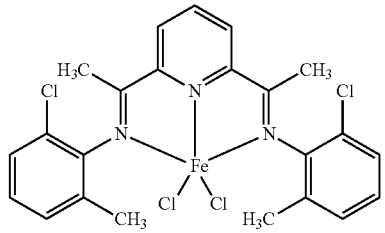

2
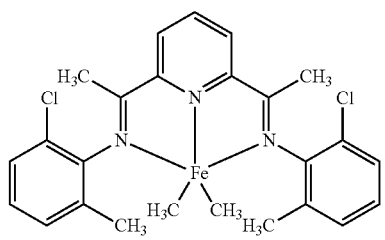

3
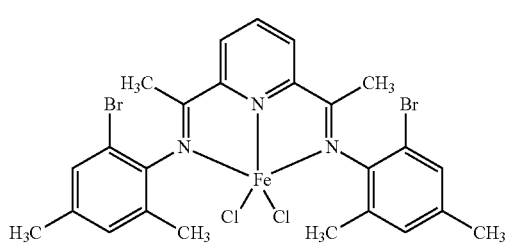

4
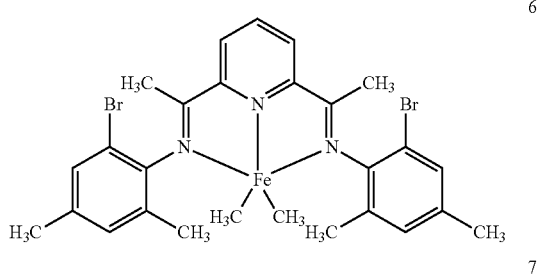

5
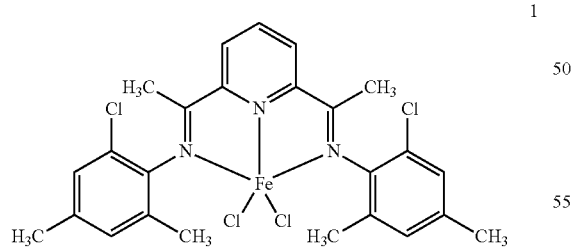

6
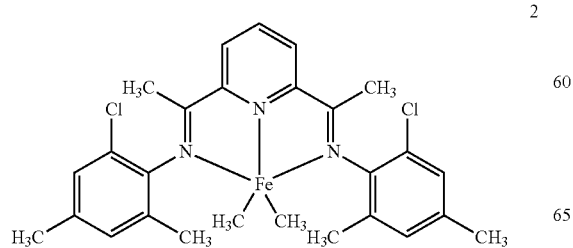

7
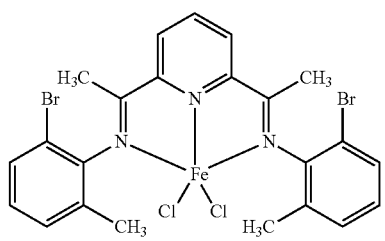

8
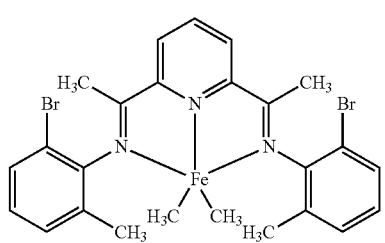

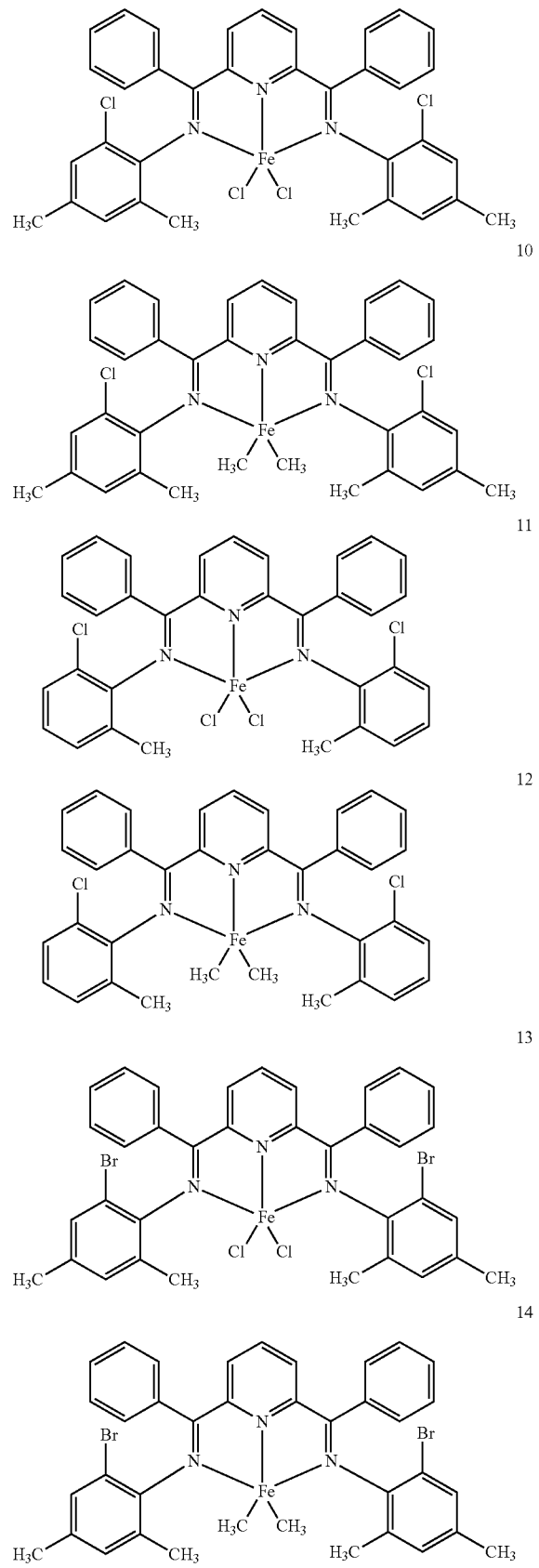
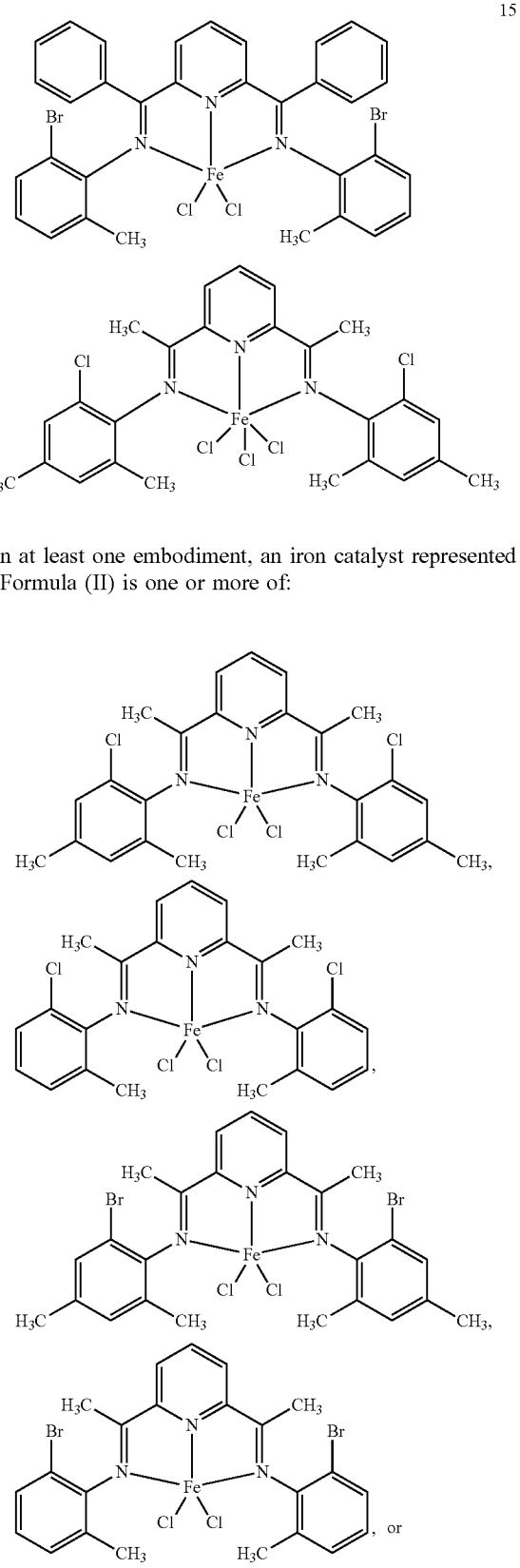
In at least one embodiment, an iron catalyst represented by Formula (II) is one or more of:

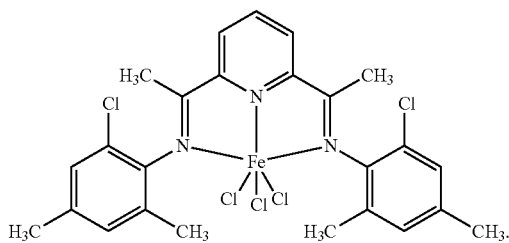

In at least one embodiment, an iron catalyst represented by Formula (II) is one or more of:

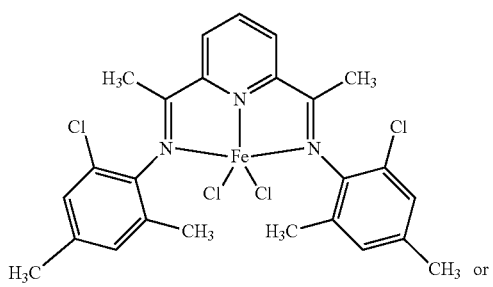

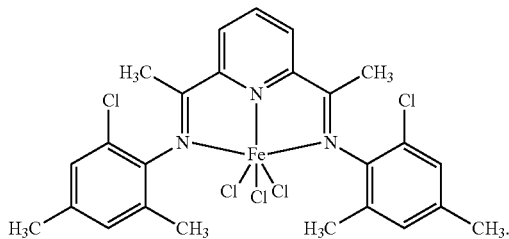

In at least one embodiment, the iron catalyst may be an iron complex represented by Formula (IIIa) and/or Formula (IIIb):

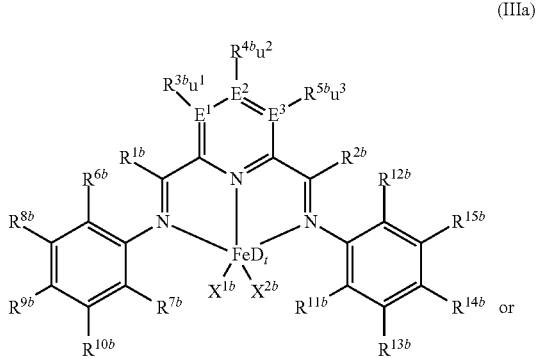

(IIIa)

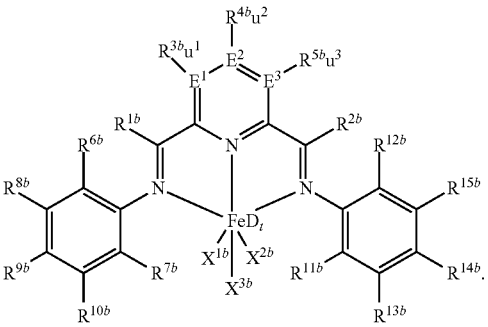

(IIIb)

Formula (III), as used herein, refers to one or more of Formula (IIIa) and/or Formula (IIIb).

In at least one embodiment, each of $R^{1b}$ and $R^{2b}$ is independently hydrogen, $C_1$-$C_{22}$ alkyl, $C_2$-$C_{22}$ alkenyl, $C_6$-$C_{22}$ aryl, arylalkyl wherein alkyl has from 1 carbon atom to 10 carbon atoms and aryl has from 6 carbon atoms to 20 carbon atoms, or five-, or six-, or seven-membered heterocyclic ring comprising at least one atom selected from the group consisting of N, P, O and S; wherein each of $R^{1b}$ and $R^{2b}$ is optionally substituted by halogen, —$OR^{16b}$, —$NR^{17b}{}_2$, or —$SiR^{18b}{}_3$; wherein $R^{1b}$ optionally bonds with $R^{3b}$, and $R^{2b}$ optionally bonds with $R^{5b}$, in each case to independently form a five-, six-, or seven-membered ring.

In at least one embodiment, each of $R^{3b}$, $R^{4b}$, $R^{5b}$, $R^{8b}$, $R^{9b}$, $R^{10b}$, $R^{13b}$, $R^{14b}$, and $R^{15b}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, —$OR^{16b}$, —$NR^{17b}{}_2$, halogen, —$SiR^{18b}{}_3$ or five-, six- or seven-membered heterocyclic ring comprising at least one atom selected from the group consisting of N, P, O and S.

In at least one embodiment, the catalyst compound represented by Formula (III) has an electron withdrawing side. Each of $R^{13b}$, $R^{14b}$, and $R^{15b}$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, alkylaryl where alkyl has from 1 to 10 carbon atoms and aryl has from 6 to 20 carbon atoms, —$OR^{16b}$, —$NR^{17b}{}_2$, or —$SiR^{18b}{}_3$, halogen, —$NO_2$, or five-, six-, or seven-membered heterocyclic ring including at least one atom selected from N, P, O, and S. $R^{13b}$, $R^{14b}$, and $R^{15b}$ can be independently substituted by —$NO_2$, —$CF_3$, —$CF_2CF_3$, —$CH_2CF_3$, halogen, —$OR^{16b}$, —$NR^{17b}{}_2$, or —$SiR^{18b}{}_3$. Furthermore, each of $R^{13b}$, $R^{14b}$, and $R^{15b}$ can be independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or alkylaryl where alkyl has from 1 to 10 carbon atoms and aryl has from 6 to 20 carbon atoms, where at least one of $R^{13b}$, $R^{14b}$, and $R^{15b}$ can be substituted by —$NO_2$, —$CF_3$, —$CF_2CF_3$, —$CH_2CF_3$, halogen, —$OR^{16b}$, —$NR^{17b}{}_2$, or —$SiR^{18b}{}_3$. In at least one embodiment, at least one of $R^{13b}$, $R^{14b}$, and $R^{15b}$ is halogen or $C_1$-$C_{22}$-alkyl substituted with one or more halogen atoms. In at least one embodiment, each of $R^{13b}$, $R^{14b}$, and $R^{15b}$ is independently hydrogen, halogen (such as fluorine, chlorine, bromine, or iodine), or trihalomethyl (such as trichloromethyl or trifluoromethyl), where at least one of $R^{13b}$, $R^{14b}$, and $R^{15b}$ is halogen or trihalomethyl.

In at least one embodiment, each of $R^{3b}$, $R^{4b}$, $R^{5b}$, $R^{8b}$, $R^{9b}$, $R^{10b}$, $R^{13b}$, $R^{14b}$, and $R^{15b}$ are optionally substituted by halogen, —OR$^{16b}$, —NR$^{17b}_2$, halogen, —SiR$^{18b}_3$; wherein R$^{3b}$ optionally bonds with R$^{4b}$, R$^{4b}$ optionally bonds with R$^{5b}$, R$^{7b}$ optionally bonds with R$^{10b}$, R$^{10b}$ optionally bonds with R$^{9b}$, R$^{9b}$ optionally bonds with R$^{8b}$, R$^{15b}$ optionally bonds with R$^{14b}$, R$^{14b}$ optionally bonds with R$^{13b}$, and R$^{13b}$ optionally bonds with R$^{11b}$, in each case to independently form a five-, six- or seven-membered carbocyclic or heterocyclic ring, the heterocyclic ring comprising at least one atom from the group consisting of N, P, O and S.

In some embodiments, each of R$^{6b}$, R$^{7b}$, R$^{11b}$, and R$^{12b}$ is independently C$_1$-C$_{22}$ alkyl, C$_2$-C$_{22}$ alkenyl, C$_6$-C$_{22}$ aryl, arylalkyl wherein alkyl has from 1 to 10 carbon atoms and aryl has from 6 to 20 carbon atoms, a heteroatom or a heteroatom-containing group (such as —OR$^{16b}$, —NR$^{17b}_2$, halogen, —SiR$^{13b}_3$ or five-, six- or seven-membered heterocyclic ring including at least one atom selected from the group consisting of N, P, O and S); wherein R$^{6b}$, R$^{7b}$, R$^{11b}$, and R$^{12b}$ are optionally substituted by halogen, —OR$^{16b}$, —NR$^{17b}_2$, —SiR$^{18b}_3$, wherein R$^{6b}$, optionally bonds with R$^{8b}$, R$^{11b}$ optionally bonds with R$^{13b}$, or R$^{15b}$ optionally bonds with R$^{12b}$ in each case to independently form a five-, six- or seven-membered carbocyclic or heterocyclic ring, the heterocyclic ring including at least one atom from the group consisting of N, P, O and S; wherein at least one of R$^{6b}$, R$^{7b}$, R$^{11b}$, and R$^{12b}$ is independently a heteroatom or a heteroatom-containing group. In at least one embodiment, each of R$^{16b}$, R$^{17b}$, and R$^{18b}$ is independently hydrogen, C$_1$-C$_{22}$ alkyl, C$_2$-C$_{22}$ alkenyl, C$_6$-C$_{22}$ aryl, arylalkyl where alkyl has from 1 to 10 carbon atoms and aryl has from 6 to 20 carbon atoms, or —SiR$^{19b}_3$, wherein each R$^{16b}$, R$^{17b}$, and R$^{18b}$ is independently optionally substituted by halogen, or two R$^{16b}$ radicals optionally bond to form a five- or six-membered ring, or two R$^{17b}$ radicals optionally bond to form a five- or six-membered ring, or two R$^{18b}$ radicals optionally bond to form a five- or six-membered ring. Each R$^{18b}$ can be independently hydrogen, C$_1$-C$_{22}$-alkyl, C$_2$-C$_{22}$-alkenyl, C$_6$-C$_{22}$-aryl, arylalkyl where alkyl has from 1 to 10 carbon atoms and aryl has from 6 to 20 carbon atoms, or two R$^{18b}$ radicals optionally bond to form a five- or six-membered ring.

In at least one embodiment, R$^{19b}$ is independently hydrogen, C$_1$-C$_{22}$ alkyl, C$_2$-C$_{22}$ alkenyl, C$_6$-C$_{22}$ aryl, arylalkyl where alkyl has from 1 to 10 carbon atoms and aryl has from 6 to 20 carbon atoms, or two R$^{19}$ radicals optionally bond to form a five- or six-membered ring.

In some embodiments each of E$^1$, E$^2$, and E$^3$ is independently carbon, nitrogen or phosphorus. In at least one embodiment, each of u$^1$, u$^2$, and u$^3$ is independently 0 if E$^1$, E$^2$, or E$^3$ is nitrogen or phosphorus, and each of u$^1$, u$^2$, and u$^3$ is independently 1 if E$^1$, E$^2$, or E$^3$ is carbon.

In at least one embodiment, each of X$^{1b}$ and X$^{2b}$ is independently substituted hydrocarbyl, and the radicals X$^{1b}$ and X$^{2b}$ can be bonded with one another. In some embodiments, D is a neutral donor; and/or t is 0 to 2.

In at least one embodiment, each of R$^{1b}$ and R$^{2b}$ is independently C$_1$-C$_{22}$ alkyl or C$_6$-C$_{22}$ aryl wherein each of R$^{1b}$ and R$^{2b}$ is optionally substituted by halogen. One or more of R$^{1b}$ and R$^{2b}$ may be independently selected from methyl, ethyl, propyl, butyl, pentyl, hexyl, heptyl, octyl, nonyl, decyl, undecyl, dodecyl, phenyl, substituted phenyl, biphenyl or an isomer thereof, which may be halogenated (such as perfluoropropyl, perfluorobutyl, perfluoroethyl, perfluoromethyl), substituted hydrocarbyl radicals and all isomers of substituted hydrocarbyl radicals including trimethylsilylpropyl, trimethylsilylmethyl, trimethylsilylethyl, phenyl, or all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, or dipropylmethylphenyl.

In at least one embodiment, R$^{1b}$ and R$^{2b}$ are methyl.

In at least one embodiment, t is 0, in which case D is absent. In an alternate embodiment, D is a neutral donor such as a neutral Lewis base, such as, for example, amines, alcohols, ethers, ketones, aldehydes, esters, sulfides or phosphines, which can be bonded with the iron center or can still be contained in the complex as residual solvent from the preparation of the iron complexes.

In at least one embodiment, the catalyst compound represented by Formula (III) has an electron donating side. At least one of R$^{6b}$ or R$^{7b}$ is independently halogen, —CF$_3$, —OR$^{16b}$, —NR$^{17b}_2$, or —SiR$^{18b}_3$. For example, at least one of R$^{6b}$ or R$^{7b}$ can independently be selected from fluorine, chlorine, bromine, or iodine. R$^{8b}$, R$^{9b}$, and R$^{10b}$ can be independently hydrogen, C$_1$-C$_{22}$ alkyl, C$_2$-C$_{22}$ alkenyl, C$_6$-C$_{22}$ aryl, arylalkyl where alkyl has from 1 to 10 carbon atoms and aryl has from 6 to 20 carbon atoms, —OR$^{16b}$, —NR$^{17b}_2$, or —SiR$^{18b}_3$, halogen, or five-, six- or seven-membered heterocyclic ring including at least one atom selected from the group consisting of N, P, O and S; wherein R$^{8b}$, R$^{9b}$, and R$^{10b}$ are optionally substituted by halogen, —OR$^{16b}$, —NR$^{17b}_2$, or —SiR$^{18b}_3$.

In at least one embodiment, each of R$_{3b}$, R$^{4b}$, R$^{5b}$ is independently selected from hydrogen, methyl, ethyl, propyl, butyl, pentyl, hexyl, heptyl, octyl, nonyl, decyl, dimethyl-pentyl, tert-butyl, isopropyl, or isomers thereof, such as R$_{3b}$, R$^{4b}$, R$^{5b}$ are hydrogen.

In some embodiments, each of R$^{6b}$, R$^{7b}$, R$^{8b}$, R$^{9b}$, R$^{10b}$, R$^{11b}$, R$^{12b}$, R$^{13b}$, R$^{14b}$, and R$^{15b}$ can be independently selected from methyl, ethyl, propyl, butyl, pentyl, hexyl, heptyl, octyl, nonyl, decyl, undecyl, dodecyl, phenyl, substituted phenyl, biphenyl or an isomer thereof, which may be halogenated (such as perfluoropropyl, perfluorobutyl, perfluoroethyl, perfluoromethyl), substituted hydrocarbyl radicals and all isomers of substituted hydrocarbyl radicals including trimethylsilylpropyl, trimethylsilylmethyl, trimethylsilylethyl, phenyl, or all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, or dipropylmethylphenyl, or isomers thereof. In at least one embodiment, each of R$^{8b}$, R$^{9b}$, R$_{10b}$, R$^{11b}$, R$^{12b}$, R$^{13b}$, R$^{14b}$, and R$^{15b}$ can be independently hydrogen.

In at least one embodiment, each instance of X$^{1b}$ and X$^{2b}$ is independently substituted hydrocarbyl, and the radicals X$^{1b}$ and X$^{2b}$ can be bonded with one another. For example, r can be 1 or 2, such as r can be 1. In another example, s can be 1 or 2, such as s can be 1. In at least one embodiment, r and s are the same. For example, each instance of X$^{1b}$ and X$^{2b}$ can be any suitable silane, such as (trialkylsilyl)C$_1$-C$_{20}$ alkyl-, such as (trialkylsilyl)C$_1$-C$_{10}$ alkyl-, such as (trialkylsilyl)C$_1$-C$_5$ alkyl-. In at least one embodiment, one or more X$^{1b}$ and X$^{2b}$ is independently selected from (trimethylsilyl)methyl-, (trimethylsilyl)methyl-, (trimethylsilyl)ethyl-, (trimethylsilyl)propyl-, (trimethylsilyl)butyl-, (trimethylsilyl)pentyl-, (trimethylsilyl)hexyl-, (trimethylsilyl)heptyl-, (trimethylsilyl)octyl-, (trimethylsilyl)nonyl-, (trimethylsilyl)decyl-, (triethylsilyl)methyl-, (triethylsilyl)methyl-, (triethylsilyl)ethyl-, (triethylsilyl)propyl-, (triethylsilyl)butyl-, (triethylsilyl)pentyl-, (triethylsilyl)hexyl-, (triethylsilyl)heptyl-, (triethylsilyl)octyl-, (triethylsilyl)nonyl-, (triethylsilyl)

decyl-, (triisopropylsilyl)methyl-, (triisopropylsilyl)methyl-, (triisopropylsilyl)ethyl-, (triisopropylsilyl)propyl-, (triisopropylsilyl)butyl-, (triisopropylsilyl)pentyl-, (triisopropylsilyl)hexyl-, (triisopropylsilyl)heptyl-, (triisopropylsilyl)octyl-, (triisopropylsilyl)nonyl-, (triisopropylsilyl)decyl-, (t-BuPh2Si)methyl-, (t-BuPh2Si)methyl-, (t-BuPh$_2$Si)ethyl-, (t-BuPh$_2$Si)propyl-, (t-BuPh$_2$Si)butyl-, (t-BuPh$_2$Si)pentyl-, (triethylsilyl)hexyl-, (t-BuPh$_2$Si)heptyl-, (t-BuPh$_2$Si)octyl-, (t-BuPh$_2$Si)nonyl-, (t-BuPh$_2$Si)decyl-, or isomers thereof. For example, $X^1$ and $X^2$ can be (trimethylsilyl)methyl.

In at least one embodiment, the catalyst compound represented by Formula (III) is one or more of:

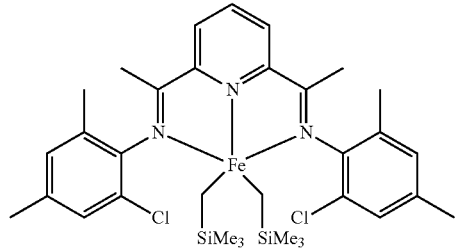

1

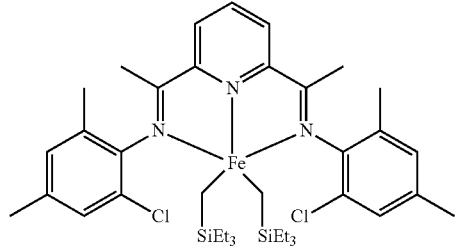

2

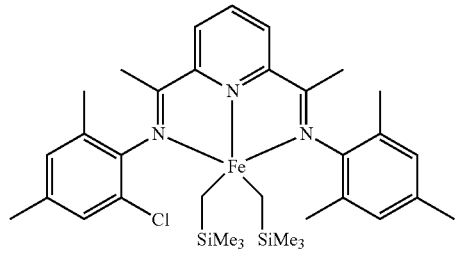

3

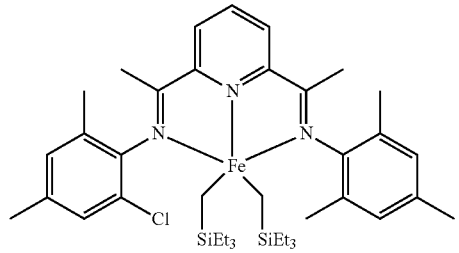

4

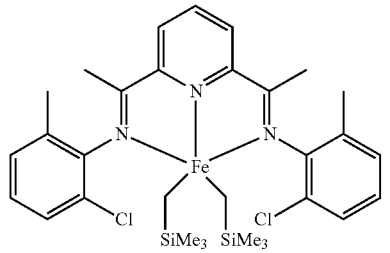

5

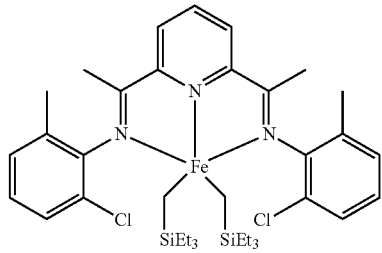

6

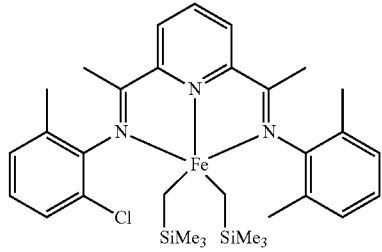

7

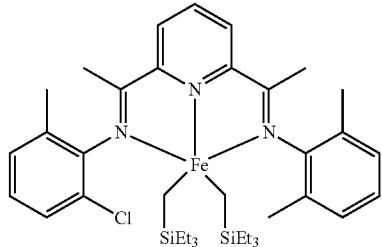

8

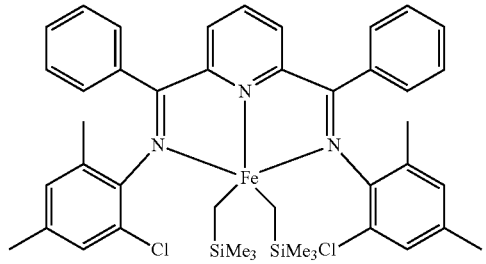

9

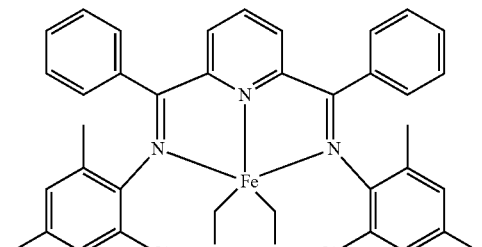

10

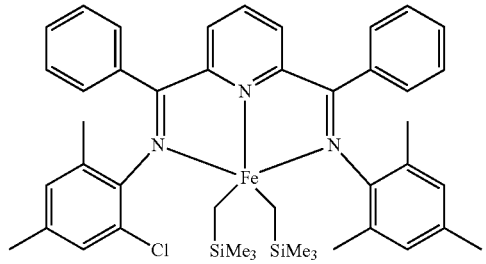

11

-continued
12
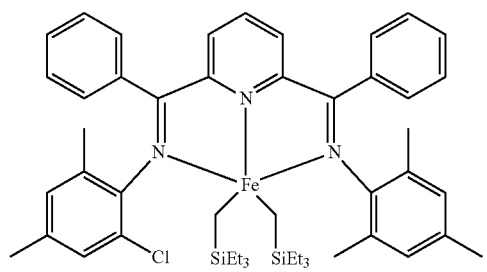
13
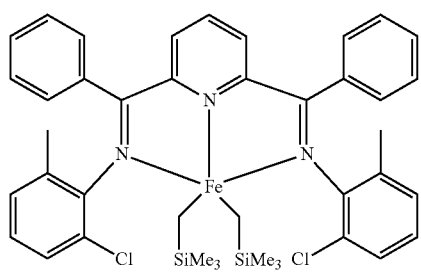
14
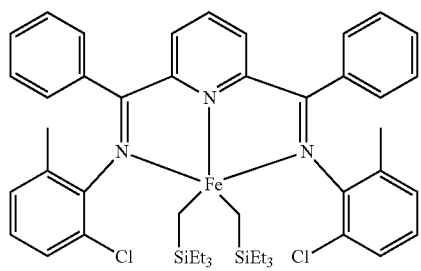
15
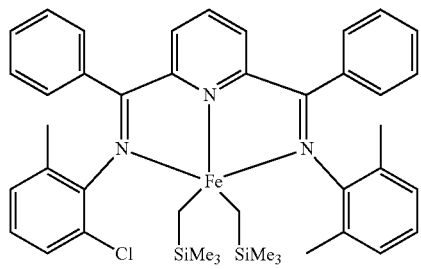
16
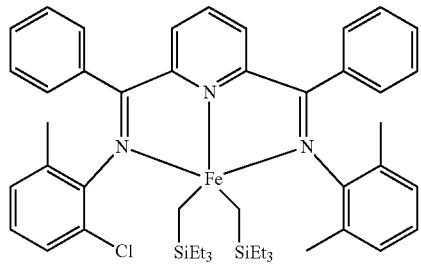
17
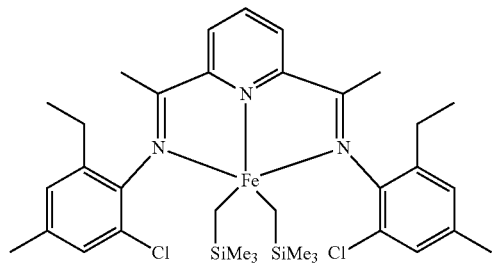
-continued
18
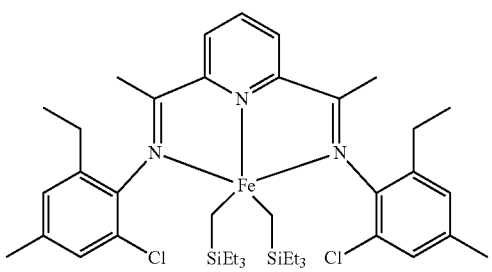
19
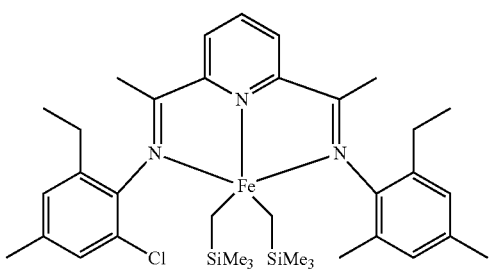
20
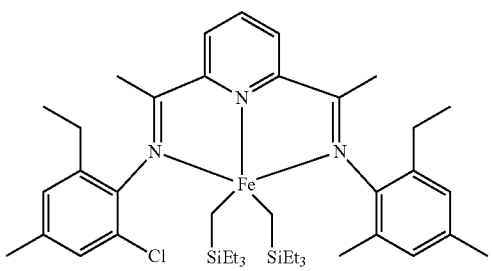
21
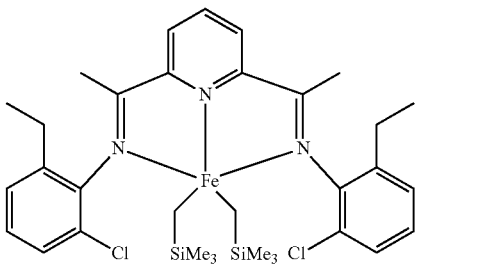
22
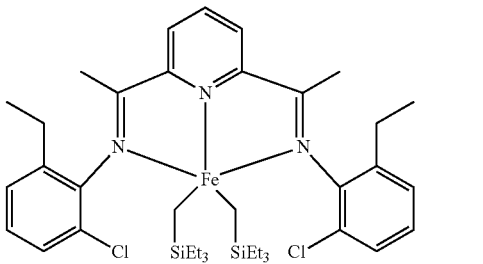
23
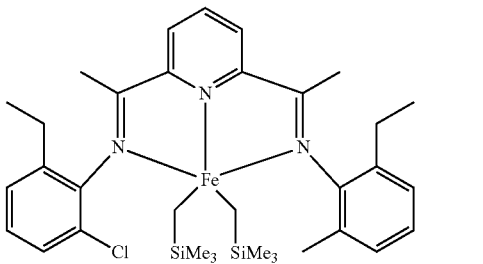

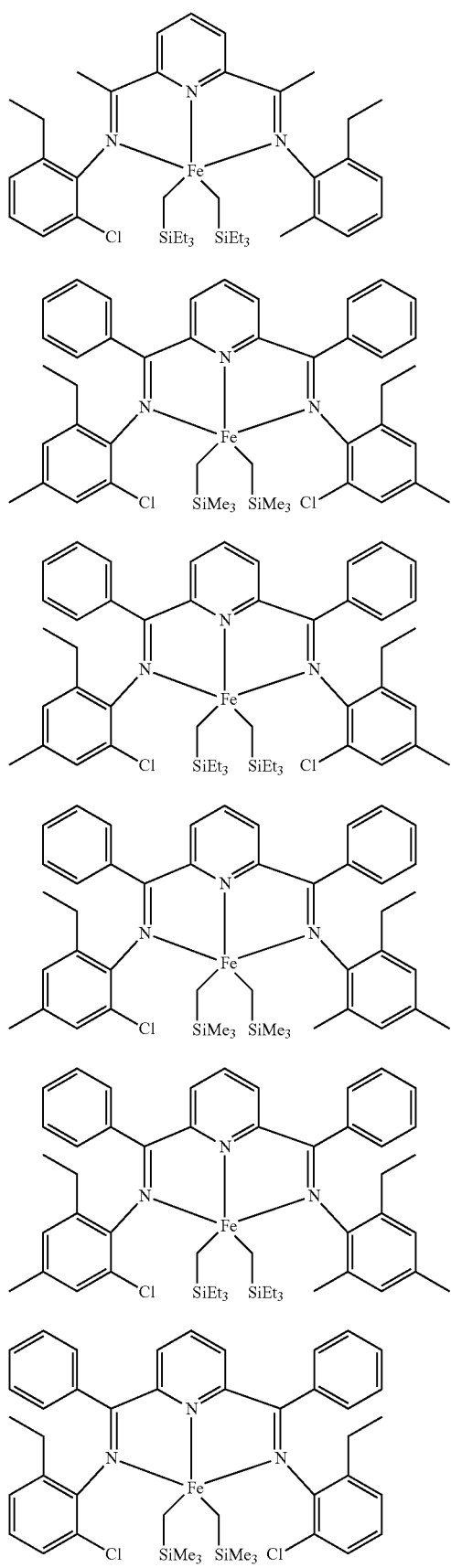
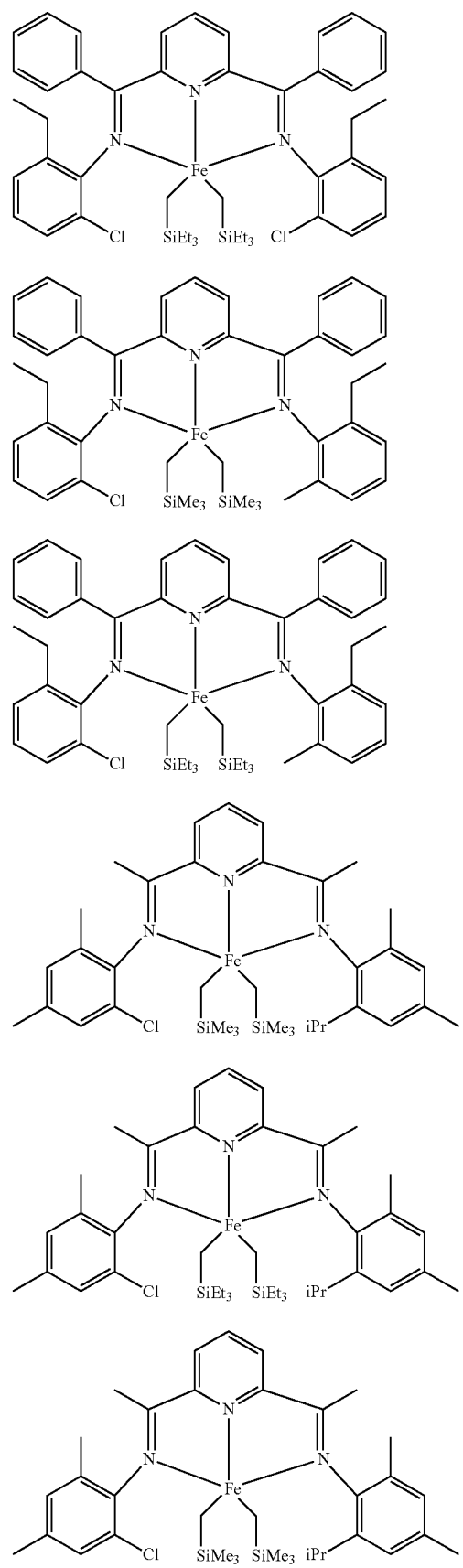

36
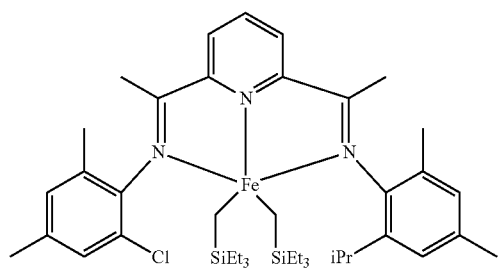
37
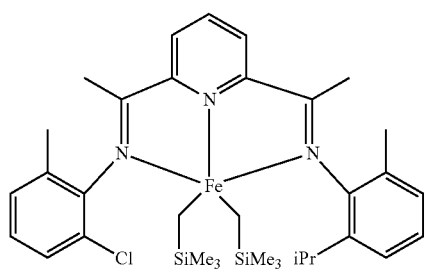
38
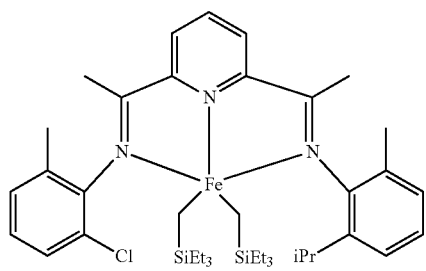
39
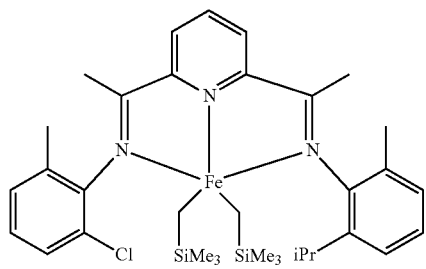
40
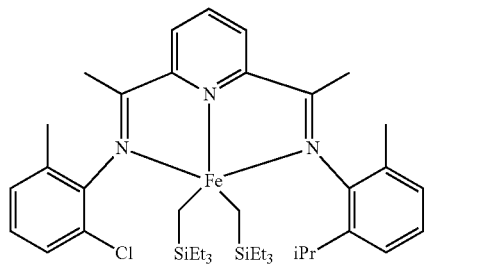
41
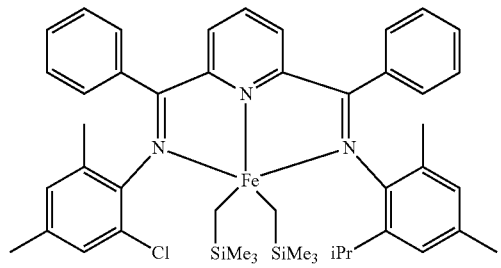
42
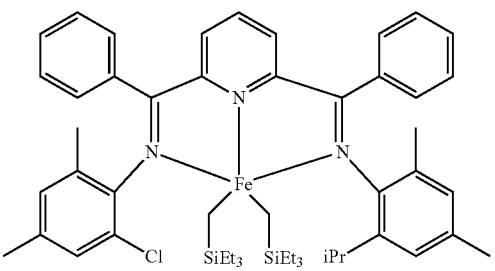
43
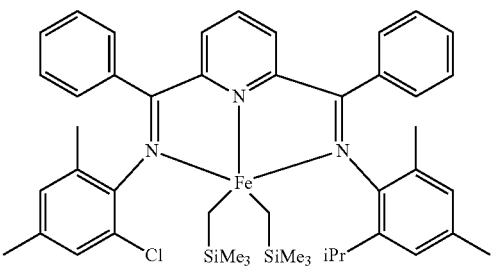
44
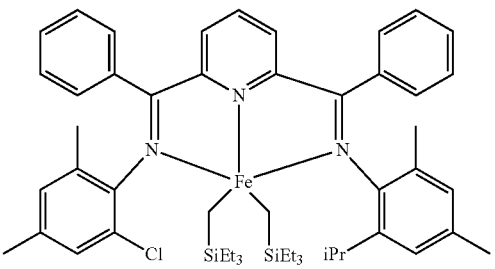
45
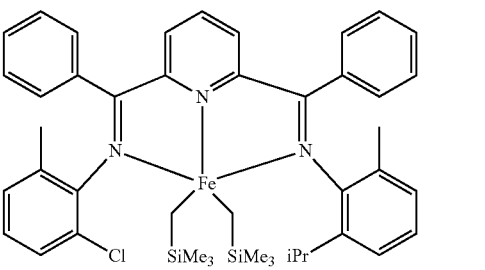
46
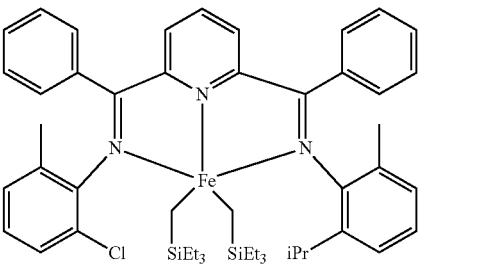
47
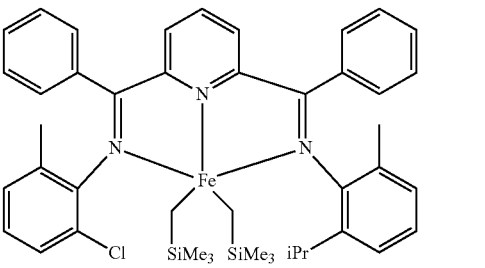

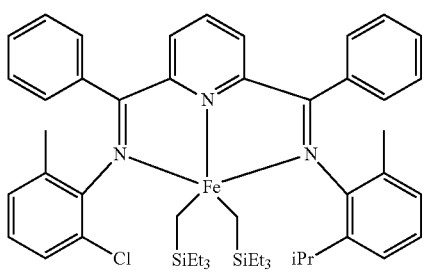

48

In at least one embodiment, the catalyst compound represented by Formula (III) is selected from:

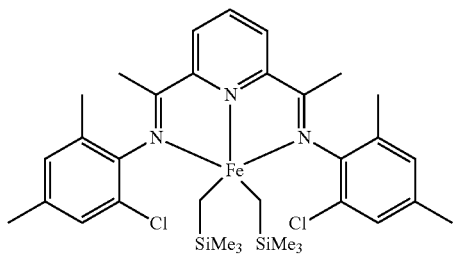

1

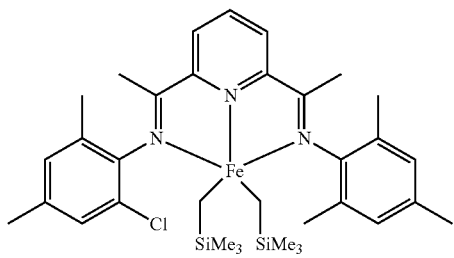

3

Methods to Prepare the Iron Compounds.

The following is a generic description to prepare a catalyst compound described herein and further exemplified in the examples. All air sensitive syntheses can be carried out in nitrogen purged dry boxes. All solvents are available from commercial sources. Substituted anilines; substituted pyridines; Grignard reagents; iron (II) chloride; and formic acid may be available from commercial sources. To a mixture of a diacetyl aryl ((e.g., 2,6-diacetylpyridine) and a polar protic solvent (e.g., MeOH), can be added an aniline (e.g., 2-chloro-4,6-dimethylaniline) and an acid (e.g., formic acid). The resulting compound can then be treated with iron(II) chloride to form an iron-chelated compound, which can be further treated with a substituted hydrocarbyl Grignard reagent, such as a silyl-containing alkylating reagent (e.g., $Me_3SiCH_2MgCl$), in order to form the iron bis(imino) aryl catalyst compound represented by Formula (I) including the substituted hydrocarbyl moiety described above.

Additionally or alternatively, synthesis of ligands, such as 1,1'-(pyridine-2,6-diyl)(N-(2-chloro-4,6-dimethylphenyl)ethan-1-imine)(N-(2,4,6-trimethylphenyl)ethan-1-imine), can be made using procedure described in WO 2007/080081.

Catalyst System

In at least one embodiment, two or more different catalyst compounds are present in a catalyst system. In at least one embodiment, two or more different catalyst compounds are present in the reaction zone where the process(es) described herein occur. When two transition metal compound based catalysts are used in one reactor as a mixed catalyst system, the two transition metal compounds can be chosen such that the two are compatible. A simple screening method such as by $^1H$ or $^{13}C$ NMR, known to those of ordinary skill in the art, can be used to determine which transition metal compounds are compatible. The same activator can be used for the transition metal compounds, however, two different activators, such as a non-coordinating anion activator and an alumoxane, can be used in combination. If one or more transition metal compounds contain an anionic ligand (such as $X^1$ or $X^2$ in Formula (I) or X in Formula (A)) which is not a hydride, hydrocarbyl, or substituted hydrocarbyl, then the alumoxane should be contacted with the transition metal compounds prior to addition of the non-coordinating anion activator.

The catalyst system useful herein may also be a mixed catalyst system comprising one, two or more different catalyst compounds represented by Formula (A), one, two or more different catalyst compounds represented by Formula (I), at least one activator, and at least one support.

Typically, the two or more different catalyst compounds can be present in the reaction zone where the process(es) described herein occur. The same activator can be used for the transition metal compounds, however, two different activators, such as a non-coordinating anion activator and an alumoxane, can be used in combination.

The two transition metal compounds (represented by Formulas (A) and (I)) may be used in any ratio. Molar ratios of (A) transition metal compound to (I) transition metal compound can be (A:I) of from 1:1000 to 1000:1, alternatively 1:100 to 500:1, alternatively 1:10 to 200:1, alternatively 1:1 to 100:1, alternatively 1:1 to 75:1, and alternatively 5:1 to 50:1. The suitable ratio chosen will depend on the exact pre-catalysts chosen, the method of activation, and the end product desired. In at least one embodiment, when using the two pre-catalysts, where both are activated with the same activator, mole percentages, based upon the molecular weight of the pre-catalysts, can be from 10% to 99.9% A to 0.1% to 90% I, alternatively 25% to 99% A to 0.5% to 75% I, alternatively 50% to 99% A to 1% to 50% I, and alternatively 75% to 99% A to 1% to 10% I.

Alternately, the group 4 bis(phenolate) complex is present a molar ratio of about 1% to about 99%, and the 2,6-bis(imino)pyridyl iron complex is present at a molar ratio of about 99% to about 1%, based on the combination of the catalyst compounds. Alternately, the group 4 bis(phenolate) complex is present a molar ratio of about 40% to about 99%, and the the 2,6-bis(imino)pyridyl iron complex is present at a molar ratio of about 1% to about 60%, based on the combination of the catalyst compounds. Alternately, the group 4 bis(phenolate) complex is present a molar ratio of about 50% to about 99%, and the 2,6-bis(imino)pyridyl iron complex is present at a molar ratio of about 1% to about 50%, based on the combination of the catalyst compounds.

The above two catalyst components can be chose to have different hydrogen responses (each having a different reactivity toward hydrogen) during the polymerization process. Hydrogen is often used in olefin polymerization to control the final properties of the polyolefin. The iron catalyst component can show a more negative response to changes of hydrogen concentration in reactor than the group 4 catalyst component. Owing to the differing hydrogen response of the catalyst components in the supported catalyst systems, the properties of resulting polymer are controllable. Changes of hydrogen concentration in reactor may affect molecular weight, molecular weight distributions, and other properties of the resulting polyolefin when using a combination of such two catalyst components. Thus, this invention further provides a multi-modal polyolefin obtained from polymerizations using the above supported catalyst systems. In embodiments of the invention, the catalyst system is absent metallocene catalyst compound. A metallocene catalyst compound is a group 3 to 12 (typically group 4) transition metal catalyst compound having one, two or three, typically one or two, substituted or unsubstituted cyclopentadienyl ligands bound to the transition metal, typically a metallocene catalyst is an organometallic compound containing at least one π-bound cyclopentadienyl moiety (or substituted cyclopentadienyl moiety). Substituted or unsubstituted cyclopentadienyl ligands include substituted or unsubstituted indenyl, fluorenyl, tetrahydro-s-indacenyl, tetrahydro-as-indacenyl, benz[f]indenyl, benz[e]indenyl, tetrahydrocyclopenta[b]naphthalene, tetrahydrocyclopenta[a]naphthalene, and the like.

Two or more of the catalysts as described herein (preferably at least one catalyst compound represented by Formula (A) and at least one catalyst compound represented by Formula (I)) may be used in a mixed catalyst system (also known as a dual catalyst system). The catalyst compounds are preferably co-supported, that is disposed on the same support material, optionally and in addition to, injected into the reactor(s) separately (with or without a support) or in different combinations and proportions together to "trim" or adjust the polymer product properties according to its target specification. This approach is very useful in controlling polymer product properties and insuring uniformity in high volume production of polyolefin polymers.

For example, catalyst combinations such as [2',2'''-(pyridine-2,6-diyl)bis(3-((3r,5r,7r)-adamantan-1-yl)-5-(tert-butyl)-[1,1'-biphenyl]-2-oxy)]zirconium dimethyl with 2,6-bis-[1-(2-chloro-4,6-dimethylphenylimino)ethyl]pyridine iron dichloride, may be used in a catalyst system herein. Particularly preferred catalyst systems comprise [2',2'''-(pyridine-2,6-diyl)bis(3-((3r,5r,7r)-adamantan-1-yl)-5-(tert-butyl)-[1,1'-biphenyl]-2-oxy)]zirconium dimethyl with 2,6-bis-[1-(2-chloro-4,6-dimethylphenylimino)ethyl]pyridine iron dichloride, a support such as silica, and an activator such as an alumoxane (typically, methylalumoxane).

Activators

The catalyst systems described herein typically comprise two catalyst complexes, as described above, a support and an activator such as alumoxane or a non-coordinating anion. These catalyst systems may be formed by combining the catalyst components described herein with activators in any manner known from the literature. Catalyst systems of the present disclosure may have one or more activators and two or more catalyst components. Activators are any compound which can activate any one of the catalyst compounds described above by converting the neutral metal compound to a catalytically active metal compound cation. Non-limiting activators, for example, include alumoxanes, ionizing activators, which may be neutral or ionic, and conventional-type cocatalysts. Preferred activators typically include alumoxane compounds, modified alumoxane compounds, and ionizing anion precursor compounds that abstract a reactive metal ligand making the metal compound cationic and providing a charge-balancing non-coordinating or weakly coordinating anion, e.g. a non-coordinating anion.

Alumoxane Activators

Alumoxane activators are utilized as activators in the catalyst systems described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Another useful alumoxane is solid polymethylaluminoxane as described in U.S. Pat. Nos. 9,340,630; 8,404,880; and 8,975,209.

When the activator is an alumoxane (modified or unmodified), typically the maximum amount of activator is at up to a 5,000-fold molar excess Al/M over the catalyst compound(s) (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced, typically by a neutral Lewis base. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

It is within the scope of this invention to use an ionizing activator, neutral or ionic. It is also within the scope of this invention to use neutral or ionic activators alone or in combination with alumoxane or modified alumoxane activators.

In embodiments of the invention, the activator is represented by the Formula (III):

$$(Z)_d{}^+(A^{d-}) \tag{III}$$

wherein Z is (L-H) or a reducible Lewis Acid, L is an neutral Lewis base; H is hydrogen; (L-H)⁺ is a Bronsted acid; $A^{d-}$ is a non-coordinating anion having the charge d−; and d is an integer from 1 to 3 (such as 1, 2 or 3). Optionally, Z is $(Ar_3C^+)$, where Ar is aryl or aryl substituted with a heteroatom, a $C_1$ to $C_{40}$ hydrocarbyl, or a substituted $C_1$ to $C_{40}$ hydrocarbyl. The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 40 carbon atoms (optionally with the proviso that in not more than 1 occurrence is Q a halide). Preferably, each Q is a fluorinated hydrocarbyl group having 1 to 40 (such as 1 to 30, such as 1 to 20) carbon atoms, more preferably each Q is a fluorinated aryl group, such as a perfluorinated aryl group and most preferably each Q is a pentafluoryl aryl group or perfluoronaphthalenyl group. Examples of suitable $A^{d-}$ also include diboron compounds as disclosed in U.S. Pat. No. 5,447,895, which is fully incorporated herein by reference.

When Z is the activating cation (L-H), it can be a Bronsted acid, capable of donating a proton to the transition metal catalytic precursor resulting in a transition metal cation, including ammoniums, oxoniums, phosphoniums, sulfoniums, and mixtures thereof, such as ammoniums of methylamine, aniline, dimethylamine, diethylamine, N-methylaniline, N-methyl-4-nonadecyl-N-octadecylaniline, N-methyl-4-octadecyl-N-octadecylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether, diethyl ether, tetrahydrofuran and dioxane, sulfoniums from thioethers, such as diethyl thioethers, tetrahydrothiophene, and mixtures thereof.

In particularly useful embodiments of the invention, the activator is soluble in non-aromatic-hydrocarbon solvents, such as aliphatic solvents.

In one or more embodiments, a 20 wt % mixture of the activator compound in n-hexane, isohexane, cyclohexane, methylcyclohexane, or a combination thereof, forms a clear homogeneous solution at 25° C., preferably a 30 wt % mixture of the activator compound in n-hexane, isohexane, cyclohexane, methylcyclohexane, or a combination thereof, forms a clear homogeneous solution at 25° C.

In embodiments of the invention, the activators described herein have a solubility of more than 10 mM (or more than 20 mM, or more than 50 mM) at 25° C. (stirred 2 hours) in methylcyclohexane.

In embodiments of the invention, the activators described herein have a solubility of more than 1 mM (or more than 10 mM, or more than 20 mM) at 25° C. (stirred 2 hours) in isohexane.

In embodiments of the invention, the activators described herein have a solubility of more than 10 mM (or more than 20 mM, or more than 50 mM) at 25° C. (stirred 2 hours) in methylcyclohexane and a solubility of more than 1 mM (or more than 10 mM, or more than 20 mM) at 25° C. (stirred 2 hours) in isohexane.

In a preferred embodiment, the activator is a non-aromatic-hydrocarbon soluble activator compound.

Non-aromatic-hydrocarbon soluble activator compounds useful herein include those represented by the Formula (V):

$$[R^{1'}R^{2'}R^{3'}EH]_{d^+}[Mt^{k+}Q_n]^{d-} \quad (V)$$

wherein:
E is nitrogen or phosphorous;
d is 1, 2 or 3; k is 1, 2, or 3; n is 1, 2, 3, 4, 5, or 6; n−k=d (preferably d is 1, 2 or 3; k is 3; n is 4, 5, or 6);
$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups,
wherein $R^{1'}$, $R^{2'}$, and $R^{3'}$ together comprise 15 or more carbon atoms;
Mt is an element selected from group 13 of the Periodic Table of the Elements, such as B or Al; and
each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VI):

$$[R^{1'}R^{2'}R^{3'}EH]^+[BR^{4'}R^{5'}R^{6'}R^{7'}]^- \quad (VI)$$

wherein: E is nitrogen or phosphorous; $R^{1'}$ is a methyl group; $R^{2'}$ and $R^{3'}$ are independently is $C_4$-$C_{50}$ hydrocarbyl group optionally substituted with one or more alkoxy groups, silyl groups, a halogen atoms, or halogen containing groups wherein $R^{2'}$ and $R^{3'}$ together comprise 14 or more carbon atoms; B is boron; and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VII) or Formula (VIII):

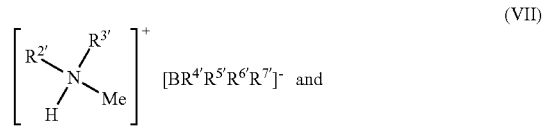

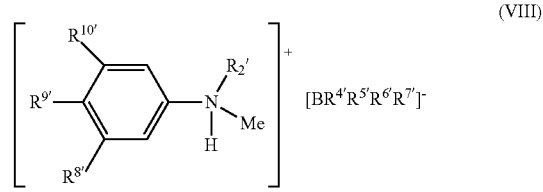

wherein:
N is nitrogen;
$R^{2'}$ and $R^{3'}$ are independently is $C_6$-$C_{40}$ hydrocarbyl group optionally substituted with one or more alkoxy groups, silyl groups, a halogen atoms, or halogen containing groups, preferably wherein $R^{8'}$, $R^{9'}$, $R^{10'}$ and $R^{2'}$ together comprise 7 or more carbon atoms;
$R^{8'}$, $R^{9'}$, and $R^{10'}$ are independently a $C_4$-$C_{30}$ hydrocarbyl or substituted $C_4$-$C_{30}$ hydrocarbyl group;
B is boron;
and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Optionally, in any of Formulas (V), (VI), (VII), or (VIII) herein, $R^{4'}$, $R^{5'}$, $R^{6'}$, and $R^{7'}$ are pentafluorophenyl.

Optionally, in any of Formulas (V), (VI), (VII), or (VIII) herein, $R^{4'}$, $R^{5'}$, $R^{6'}$, and $R^{7'}$ are pentafluoronaphthalenyl.

Optionally, in any embodiment of Formula (VIII) herein, $R^{8'}$ and $R^{10'}$ are hydrogen atoms and $R^{9'}$ is a $C_4$-$C_{30}$ hydrocarbyl group which is optionally substituted with one or more alkoxy groups, silyl groups, a halogen atoms, or halogen containing groups.

Optionally, in any embodiment of Formula (VIII) herein, $R^{9'}$ is a $C_8$-$C_{22}$ hydrocarbyl group which is optionally substituted with one or more alkoxy groups, silyl groups, a halogen atoms, or halogen containing groups.

Optionally, in any embodiment of Formula (VII) or (VIII) herein, $R^{2'}$ and $R^{3'}$ are independently a $C_{12}$-$C_{22}$ hydrocarbyl group.

Optionally, $R^{1'}$, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{8'}$, $R^{9'}$, and $R^{10'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{2'}$, $R^{8'}$, $R^{9'}$, and $R^{10'}$ together comprise 7 or more carbon atoms, sucn as 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, when Q is a fluorophenyl group, then $R^{2'}$ is not a $C_1$-$C_{40}$ linear alkyl group (alternately $R^{2'}$ is not an optionally substituted $C_1$-$C_{40}$ linear alkyl group).

Optionally, each of $R^{4'}$, $R^{5'}$, $R^{6'}$, and $R^{7'}$ is an aryl group (such as phenyl or naphthalenyl), wherein at least one of $R^{4'}$, $R^{5'}$, $R^{6'}$, and $R^{7'}$ is substituted with at least one fluorine atom, preferably each of $R^{4'}$, $R^{5'}$, $R^{6'}$, and $R^{7'}$ is a perfluoroaryl group (such as perfluorophenyl or perfluoronaphthalenyl).

Optionally, each Q is an aryl group (such as phenyl or naphthalenyl), wherein at least one Q is substituted with at least one fluorine atom, preferably each Q is a perfluoroaryl group (such as perfluorophenyl or perfluoronaphthalenyl).

Optionally, $R^{1'}$ is a methyl group; $R^{2'}$ is $C_6$-$C_{50}$ aryl group; and $R^{3'}$ is independently $C_1$-$C_{40}$ linear alkyl or $C_5$-$C_{50}$-aryl group.

Optionally, each of $R^{2'}$ and $R^{3'}$ is independently unsubstituted or substituted with at least one of halide, $C_1$-$C_{35}$ alkyl, $C_5$-$C_{15}$ aryl, $C_6$-$C_{35}$ arylalkyl, $C_6$-$C_{35}$ alkylaryl, wherein $R^2$, and $R^3$ together comprise 20 or more carbon atoms.

Optionally, each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, provided that when Q is a fluorophenyl group, then $R^{2'}$ is not a $C_1$-$C_{40}$ linear alkyl group, preferably $R^{2'}$ is not an optionally substituted $C_1$-$C_{40}$ linear alkyl group (alternately when Q is a substituted phenyl group, then $R^{2'}$ is not a $C_1$-$C_{40}$ linear alkyl group, preferably $R^{2'}$ is not an optionally substituted $C_1$-$C_{40}$ linear alkyl group). Optionally, when Q is a fluorophenyl group (alternately when Q is a substituted phenyl group), then $R^{2'}$ is a meta- and/or para-substituted phenyl group, where the meta and para substituents are, independently, an optionally substituted $C_1$ to $C_{40}$ hydrocarbyl group (such as a $C_6$ to $C_{40}$ aryl group or linear alkyl group, a $C_{12}$ to $C_{30}$ aryl group or linear alkyl group, or a $C_{10}$ to $C_{20}$ aryl group or linear alkyl group), an optionally substituted alkoxy group, or an optionally substituted silyl group. Optionally, each Q is a fluorinated hydrocarbyl group having 1 to 30 carbon atoms, more preferably each Q is a fluorinated aryl (such as phenyl or naphthalenyl) group, and most preferably each Q is a perflourinated aryl (such as phenyl or naphthalenyl) group. Examples of suitable $[Mt^{k+}Q_n]^{d-}$ also include diboron compounds as disclosed in U.S. Pat. No. 5,447,895, which is fully incorporated herein by reference. Optionally, at least one Q is not substituted phenyl. Optionally all Q are not substituted phenyl. Optionally at least one Q is not perfluorophenyl. Optionally all Q are not perfluorophenyl.

In some embodiments of the invention, $R^{1'}$ is not methyl, $R^{2'}$ is not $C_{18}$ alkyl and $R^{3'}$ is not $C_{18}$ alkyl, alternately $R^{1'}$ is not methyl, $R^{2'}$ is not $C_{18}$ alkyl and $R^{3'}$ is not $C_{18}$ alkyl and at least one Q is not substituted phenyl, optionally all Q are not substituted phenyl.

Useful cation components in Formulas (III) and (V) to (VIII) include those represented by the formula:

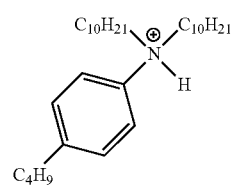

10

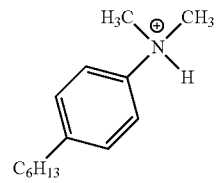

11

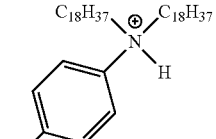

12

13

-continued
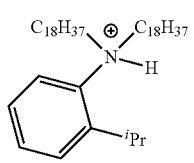
14
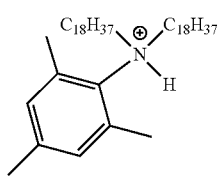
15
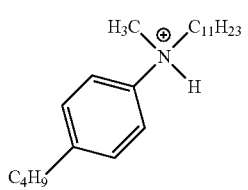
16
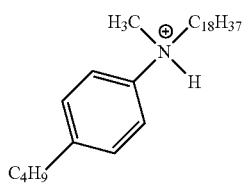
17
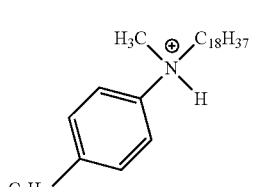
18
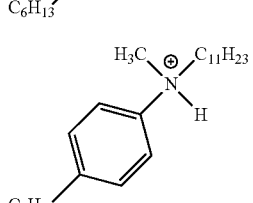
19
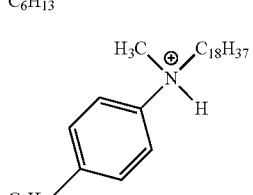
20
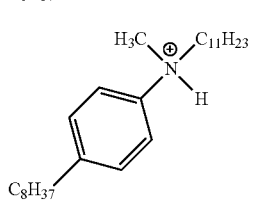
21
22
-continued
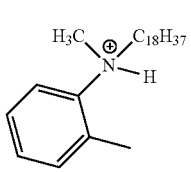
23
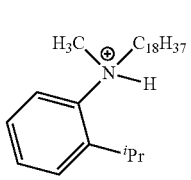
24
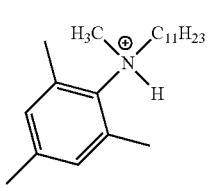
25
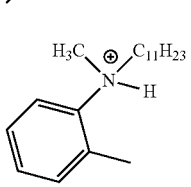
26
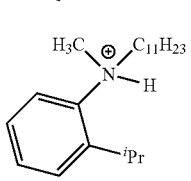
27
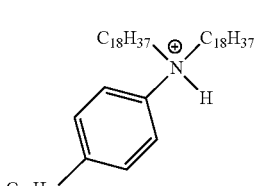
28
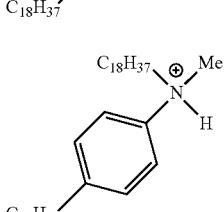
29
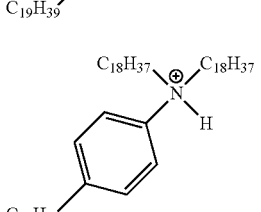
30
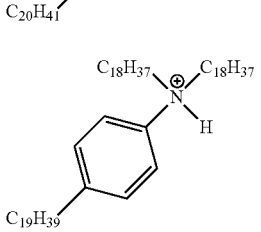
31

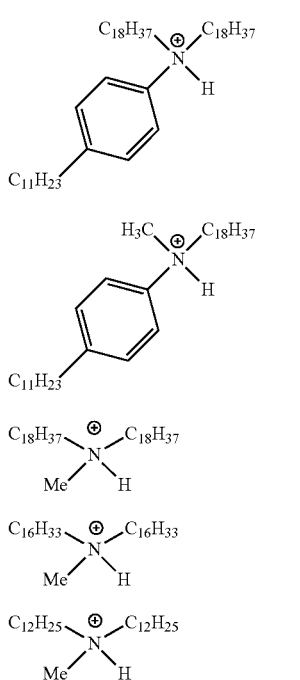

Useful cation components in Formulas (III) and (V) to (VIII) include those represented by the formulas:

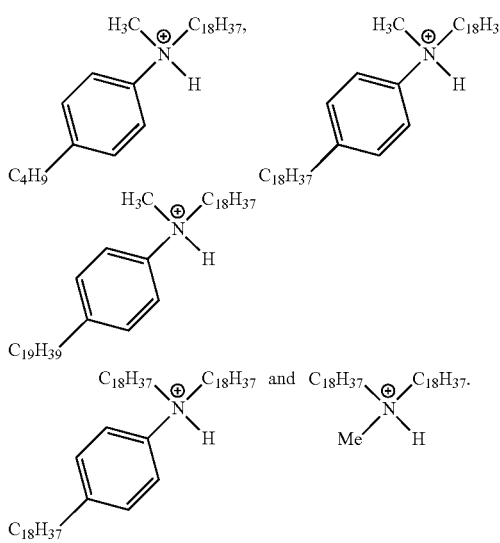

The anion component of the activators described herein includes those represented by the formula $[Mt^{k+}Q_n]^-$ wherein k is 1, 2, or 3; n is 1, 2, 3, 4, 5, or 6 (preferably 1, 2, 3, or 4), (preferably k is 3; n is 4, 5, or 6, preferably when M is B, n is 4); Mt is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the provision that in not more than 1 occurrence is Q a halide. Preferably, each Q is a fluorinated hydrocarbyl group, optionally having 1 to 20 carbon atoms, more preferably each Q is a fluorinated aryl group, and most preferably each Q is a perfluorinated aryl group. Preferably at least one Q is not substituted phenyl, such as perfluorophenyl, preferably all Q are not substituted phenyl, such as perfluorophenyl.

In one embodiment, the borate activator comprises tetrakis(heptafluoronaphth-2-yl)borateand or tetrakis(pentafluorophenyl)borate.

Anions for use in the non-coordinating anion activators described herein also include those represented by Formula (7), below:

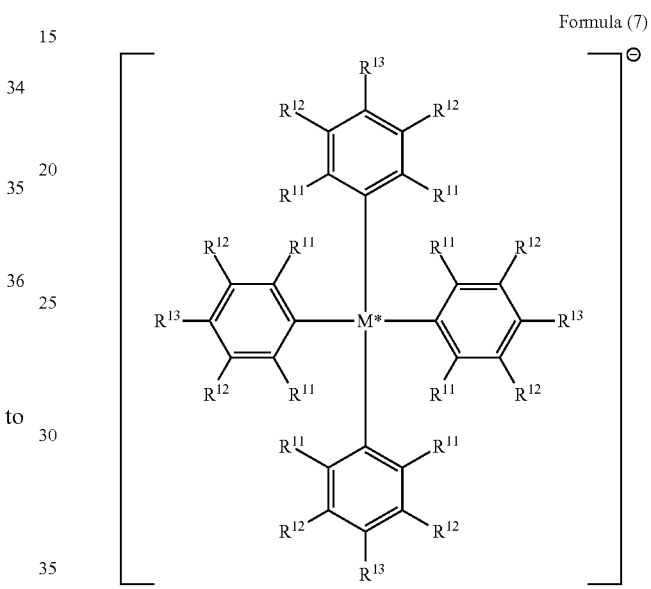

Formula (7)

wherein:
M* is a group 13 atom, preferably B or Al, preferably B;
each $R^{11}$ is, independently, a halide, preferably a fluoride;
each $R^{12}$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group, preferably $R^{12}$ is a fluoride or a perfluorinated phenyl group;
each $R^{13}$ is a halide, a $C_6$ to $C_{20}$ substituted aromatic hydrocarbyl group or a siloxy group of the formula —O—Si—$R_a$, where $R^a$ is a $C_1$ to $C_{20}$ hydrocarbyl or hydrocarbylsilyl group, preferably $R^{13}$ is a fluoride or a $C_6$ perfluorinated aromatic hydrocarbyl group;
wherein $R^{12}$ and $R^{13}$ can form one or more saturated or unsaturated, substituted or unsubstituted rings, preferably $R^{12}$ and $R^{13}$ form a perfluorinated phenyl ring. Preferably the anion has a molecular weight of greater than 700 g/mol, and, preferably, at least three of the substituents on the M* atom each have a molecular volume of greater than 180 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v.71(11), November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using Table A below of relative volumes. For fused rings, the $V_S$ is decreased by 7.5% per fused ring. The Calculated Total MV of the anion is the sum of the MV per substituent, for example, the MV of perfluorophenyl is 183 Å$^3$, and the Calculated Total MV for tetrakis(perfluorophenyl)borate is four times 183 Å$^3$, or 732 Å$^3$.

TABLE A

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary anions useful herein and their respective scaled volumes and molecular volumes are shown in Table B below. The dashed bonds indicate bonding to boron.

TABLE B

| Ion | Structure of Boron Substituents | Molecular Formula of Each Substituent | $V_S$ | MV Per subst. (Å$^3$) | Calculated Total MV (Å$^3$) |
| --- | --- | --- | --- | --- | --- |
| tetrakis(perfluorophenyl)borate | | $C_6F_5$ | 22 | 183 | 732 |
| tris(perfluorophenyl)-(perfluoronaphthalenyl)borate | | $C_6F_5$ $C_{10}F_7$ | 22 34 | 183 261 | 810 |
| (perfluorophenyl)tris-(perfluoronaphthalenyl)borate | | $C_6F_5$ $C_{10}F_7$ | 22 34 | 183 261 | 966 |
| tetrakis(perfluoronaphthalenyl)borate | | $C_{10}F_7$ | 34 | 261 | 1044 |
| tetrakis(perfluorobiphenyl)borate | | $C_{12}F_9$ | 42 | 349 | 1396 |

TABLE B-continued

| Ion | Structure of Boron Substituents | Molecular Formula of Each Substituent | MV Per subst. $V_S$ (Å³) | Calculated Total MV (Å³) |
|---|---|---|---|---|
| [(C₆F₃(C₆F₅)₂)₄B] | 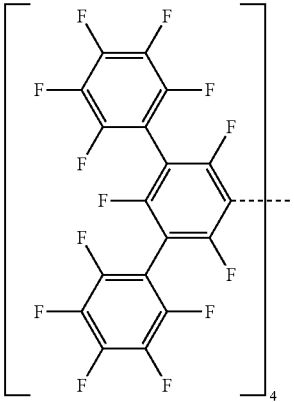 | $C_{18}F_{13}$ | 62 | 515 | 2060 |

The activators may be added to a polymerization in the form of an ion pair using, for example, [M2HTH]+ [NCA]– in which the di(hydrogenated tallow)methylamine ("M2HTH") cation reacts with a basic leaving group on the transition metal complex to form a transition metal complex cation and [NCA]–. Alternatively, the transition metal complex may be reacted with a neutral NCA precursor, such as $B(C_6F_5)_3$, which abstracts an anionic group from the complex to form an activated species.

Activator compounds that are particularly useful in this invention include one or more of:

N,N-di(hydrogenated tallow)methylammonium[tetrakis(pentafluorophenyl)borate],
N,N-di(octadecyl)tolylammonium [tetrakis(pentafluorophenyl)borate],
N,N-di(hydrogenated tallow)methylammonium[tetrakis(pentafluoronaphthyl)borate],
N,N-di(octadecyl)tolylammonium [tetrakis(pentafluoronaphthyl)borate],
N,N-dimethyl-anilinium [tetrakis(perfluorophenyl)borate],
N,N-dimethyl-anilinium [tetrakis(perfluoronaphthyl)borate],
N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl)borate],
N-octadecyl-N-hexadecyl-tolylammonium [tetrakis(perfluorophenyl)borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate], N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate],
N-dodecyl-N-decyl-tolylammonium [tetrakis(perfluorophenyl)borate],
N-methyl-N-octadecylanilinium [tetrakis(perfluorophenyl)borate],
N-methyl-N-hexadecylanilinium [tetrakis(perfluorophenyl)borate],
N-methyl-N-tetradecylanilinium [tetrakis(perfluorophenyl)borate],
N-methyl-N-dodecylanilinium [tetrakis(perfluorophenyl)borate],
N-methyl-N-decylanilinium [tetrakis(perfluorophenyl)borate], and
N-methyl-N-octylanilinium [tetrakis(perfluorophenyl)borate].

Preferred activators for use herein also include N-methyl-4-nonadecyl-N-octadecylbenzenaminium tetrakis(pentafluorophenyl)borate, N-methyl-4-nonadecyl-N-octadecylbenzenaminium tetrakis(perfluoronaphthalenyl)borate, N,N-dimethylanilinium tetrakis(perfluoronaphthalenyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthalenyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthalenyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, dioctadecylmethylammonium tetrakis(pentafluorophenyl)borate, dioctadecylmethylammonium tetrakis(perfluoronaphthalenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyeborate, trialkylammonium tetrakis(perfluoronaphthalenyl)borate, N,N-dialkylanilinium tetrakis(perfluoronaphthalenyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-all catalysts ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Additional useful activators and the synthesis of non-aromatic-hydrocarbon soluble activators, are described in U.S. Ser. No. 16/394,166 filed Apr. 25, 2019, U.S. Ser. No. 16/394,186, filed Apr. 25, 2019, and U.S. Ser. No. 16/394,197, filed Apr. 25, 2019, which are incorporated by reference herein. For a more detailed description of activators useful herein please see U.S. Pat. Nos. 8,658,556, 6,211,105, WO 2004/026921 page 72, paragraph [00119] to page 81 paragraph [00151]. A list of additionally particularly useful activators that can be used in the practice of this invention may be found at page 72, paragraph [00177] to page 74, paragraph of WO 2004/046214.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 (the disclosures of which are incorporated herein by reference in their entirety) which discuss the use of an alumoxane in combination with an ionizing activator).

Support Material

In embodiments of the invention herein, the catalyst systems comprise a support material. Preferably, the support material is a porous support material, for example, talc, and inorganic oxides. Other support materials include zeolites, clays, organoclays, or any other organic or inorganic support material, or mixtures thereof. As used herein, "support" and "support material" are used interchangeably.

Preferably, the support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include Al$_2$O$_3$, ZrO$_2$, SiO$_2$, and combinations thereof, more preferably, SiO$_2$, Al$_2$O$_3$, or SiO$_2$/Al$_2$O$_3$.

It is preferred that the support material, most preferably, an inorganic oxide, has a surface area in the range of from about 10 m$^2$/g to about 700 m$^2$/g, pore volume in the range of from about 0.1 cc/g to about 4.0 cc/g, and average particle size in the range of from about 5 μm to about 500 μm. More preferably, the surface area of the support material is in the range of from about 50 m$^2$/g to about 500 m$^2$/g, pore volume of from about 0.5 cc/g to about 3.5 cc/g, and average particle size of from about 10 μm to about 200 μm. Most preferably, the surface area of the support material is in the range of from about 100 m$^2$/g to about 400 m$^2$/g, pore volume from about 0.8 cc/g to about 3.0 cc/g, and average particle size is from about 5 μm to about 100 μm. The average pore size of the support material useful in the invention is in the range of from 10 to 1,000 Å, preferably, 50 to about 500 Å, and most preferably, 75 to about 350 Å. In some embodiments, the support material is a high surface area, amorphous silica (surface area ≥300 m$^2$/gm, pore volume ≥1.65 cm$^3$/gm), and is marketed under the tradenames of DAVISON 952 or DAVISON 955 by the Davison Chemical Division of W. R. Grace and Company, are particularly useful. In other embodiments, DAVIDSON 948 is used.

In some embodiments of this invention, the support material may be dry, that is, free of absorbed water. Drying of the support material can be achieved by heating or calcining at about 100° C. to about 1,000° C., preferably, at least about 600° C. When the support material is silica, it is typically heated to at least 200° C., preferably, about 200° C. to about 850° C., and most preferably, at about 600° C.; and for a time of about 1 minute to about 100 hours, from about 12 hours to about 72 hours, or from about 24 hours to about 60 hours. The calcined support material, preferably, has at least some reactive hydroxyl (OH) groups.

In a particularly useful embodiment, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is in the range of from 0.1 to 25 wt %, alternately 0.19 to 19 wt %, alternately from 0.6 to 3.5 wt %, based upon the weight of the support.

The above two metal catalyst components described herein are generally deposited on the support material at a loading level of 10-100 micromoles of metal per gram of solid support; alternately 20-80 micromoles of metal per gram of solid support; or 40-60 micromoles of metal per gram of support. But greater or lesser values may be used provided that the total amount of solid complex does not exceed the support's pore volume.

Scavengers, Chain Transfer Agents and/or Co-Activators

In addition to the activator compounds, scavengers, chain transfer agents or co-activators may also be used. Aluminum alkyl or organoaluminum compounds which may be utilized as scavengers or co-activators include, for example, one or more of those represented by the formula $AlR_3$, where each R is, independently, a $C_1$-$C_8$ aliphatic radical, preferably methyl, ethyl, propyl, butyl, pentyl, hexyl octyl or an isomer thereof), especially trimethylaluminum, triethylaluminum, triisobutylaluminum, tri-n-hexylaluminum, tri-n-octylaluminum or mixtures thereof.

In some embodiments, the catalyst systems will additionally comprise one or more scavenging compounds. Here, the term "scavenger" means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; and WO 1991/009882; WO 1994/003506; WO 1993/014132; and that of WO 1995/007941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethyl aluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Preferred aluminum scavengers useful in the invention include those where there is oxygen present. That is, the material per se or the aluminum mixture used as a scavenger, includes an aluminum/oxygen species, such as an alumoxane or alkylaluminum oxides, e.g., dialkylaluminum oxides, such as bis(diisobutylaluminum) oxide. In one aspect, aluminum containing scavengers can be represented by the formula $((R_z\text{—Al—})_yO\text{—})_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1.

Preparation of Mixed Catalyst Systems

The above two or more metal compound components can be combined to form a mixed catalyst system.

The two or more metal compounds can be added together in a desired ratio when combined, contacted with an activator, or contacted with a support material or a supported activator. The metal compounds may be added to the mixture sequentially or at the same time.

More complex procedures are possible, such as addition of a first metal compound to a slurry including a support or a supported activator mixture for a specified reaction time, followed by the addition of the second metal compound solution, mixed for another specified time, after which the mixture may be recovered for use in a polymerization reactor, such as by spray drying. Lastly, another additive, such as 1-hexene in about 10 vol % can be present in the mixture prior to the addition of the first metal catalyst compound.

The first metal compound may be supported via contact with a support material for a reaction time. The resulting supported catalyst composition may then be mixed with mineral oil to form a slurry, which may or may not include an activator. The slurry may then be admixed with a second metal compound prior to introduction of the resulting mixed catalyst system to a polymerization reactor. The second metal compounds may be admixed at any point prior to introduction to the reactor, such as in a polymerization feed vessel or in-line in a catalyst delivery system.

The mixed catalyst system may be formed by combining a first metal compound (for example a metal compound useful for producing a first polymer attribute, such as a high molecular weight polymer fraction or high comonomer content) with a support and activator, desirably in a first diluent such as an alkane or toluene, to produce a supported, activated catalyst compound. The supported activated catalyst compound, either isolated from the first diluent or not, is then combined in one embodiment with a high viscosity diluent such as mineral or silicon oil, or an alkane diluent comprising from 5 to 99 wt % mineral or silicon oil to form a slurry of the supported metal compound, followed by, or simultaneous to combining with a second metal compound (for example a metal compound useful for producing a second polymer attribute, such as a low molecular weight polymer fraction or low comonomer content), either in a diluent or as the dry solid compound, to form a supported activated mixed catalyst system ("mixed catalyst system"). The mixed catalyst system thus produced may be a supported and activated first metal compound in a slurry, the slurry comprising mineral or silicon oil, with a second metal compound that is not supported and not combined with additional activator, where the second metal compound may or may not be partially or completely soluble in the slurry. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and typically have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils or liquid polymers, polybutenes, refined naphthenic hydrocarbons, and refined paraffins known in the art, such as disclosed in *Blue Book* 2001, *Materials, Compounding Ingredients, Machinery And Services For Rubber* 189 247 (J. H. Lippincott, D. R. Smith, K. Kish & B. Gordon eds. Lippincott & Peto Inc. 2001). Preferred mineral and silicon oils useful in the present invention are those that exclude moieties that are reactive with the catalysts used herein, examples of which include hydroxyl and carboxyl groups.

The diluent may comprise a blend of a mineral, silicon oil, and/or and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend comprising mineral oil, the diluent may comprise from 5 to 99 wt % mineral oil. In some embodiments, the diluent may consist essentially of mineral oil.

In one embodiment, the first metal compound is combined with an activator and a first diluent to form a catalyst slurry that is then combined with a support material. Until such contact is made, the support particles are preferably, not previously activated. The first metal compound can be in any desirable form such as a dry powder, suspension in a diluent, solution in a diluent, liquid, etc. The catalyst slurry and support particles are then mixed thoroughly, in one embodiment at an elevated temperature, so that both the first metal compound and the activator are deposited on the support particles to form a support slurry.

After the first metal compound and activator are deposited on the support, a second metal compound may then be combined with the supported first metal compound, wherein the second is combined with a diluent comprising mineral or silicon oil by any suitable means either before, simultaneous to, or after contacting the second metal compound with the supported first metal compound. In one embodiment, the first metal compound is isolated form the first diluent to a dry state before combining with the second metal compound. Preferably, the second metal compound is not activated, that is, not combined with any activator, before being combined with the supported first metal compound. The resulting solids slurry (including both the supported first and second metal compounds) is then preferably, mixed thoroughly at an elevated temperature.

A wide range of mixing temperatures may be used at various stages of making the mixed catalyst system. For example, in a specific embodiment, when the first metal compound and at least one activator, such as methylalumoxane, are combined with a first diluent to form a mixture, the mixture is preferably, heated to a first temperature of from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

Next, that mixture is combined with a support material to provide a first support slurry. The support material can be heated, or dehydrated if desired, prior to combining. In one or more embodiments, the first support slurry is mixed at a temperature greater than 50° C., preferably, greater than 70° C., more preferably, greater than 80° C. and most preferably, greater than 85° C., for a period of time from 30 seconds to 12 hours, preferably, from 1 minute to 6 hours, more preferably, from 10 minutes to 4 hours, and most preferably, from 30 minutes to 3 hours. Preferably, the support slurry is mixed for a time sufficient to provide a collection of activated support particles that have the first metal compound deposited thereto. The first diluent can then be removed from the first support slurry to provide a dried supported first catalyst compound. For example, the first diluent can be removed under vacuum or by nitrogen purge.

Next, the second metal compound is combined with the activated first metal compound in the presence of a diluent comprising mineral or silicon oil in one embodiment. Preferably, the second metal compound is added in a molar ratio to the first metal compound in the range from 1:1 to 3:1. Most preferably, the molar ratio is approximately 1:1. The resultant slurry (or first support slurry) is preferably, heated to a first temperature from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

The first diluent is an aromatic or alkane, preferably, hydrocarbon diluent having a boiling point of less than 200° C. such as toluene, xylene, hexane, etc., may be removed from the supported first metal compound under vacuum or by nitrogen purge to provide a supported mixed catalyst system. Even after addition of the oil and/or the second (or other) catalyst compound, it may be desirable to treat the slurry to further remove any remaining solvents such as toluene. This can be accomplished by an $N_2$ purge or vacuum, for example Depending upon the level of mineral oil added, the resultant mixed catalyst system may still be a slurry or may be a free flowing powder that comprises an amount of mineral oil. Thus, the mixed catalyst system, while a slurry of solids in mineral oil in one embodiment, may take any physical form such as a free flowing solid. For example, the mixed catalyst system may range from 1 to 99 wt % solids content by weight of the mixed catalyst system (mineral oil, support, all catalyst compounds and activator(s)) in one embodiment.

Polymerization Processes

In embodiments herein, the invention relates to polymerization processes where monomer (such as ethpylene and or propylene), and optionally comonomer, are contacted with a catalyst system comprising at least one activator, at least one support and at least two catalyst compounds, such as the catalyst compounds described above. The support, catalyst compounds, and activator may be combined in any order, and are combined typically prior to contacting with the monomers.

Monomers useful herein include substituted or unsubstituted $C_2$ to $C_{40}$ olefins, preferably substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof.

In an embodiment of the invention, the monomer comprises propylene and an optional comonomers comprising one or more of ethylene and $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

In another embodiment of the invention, the monomer comprises ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a particularly preferred embodiment the process of the invention relates to the polymerization of ethylene and at least one comonomer having from 3 to 8 carbon atoms, preferably, 4 to 8 carbon atoms. Particularly, the comonomers are on or more of propylene, 1-butene, 4-methyl-1-pentene, 3-methyl-1-pentene, 1-hexene and 1-octene, the most preferred being 1-hexene, 1-butene and/or 1-octene.

Polymerization processes according to the present disclosure can be carried out in any manner known in the art. Any suspension, slurry, high pressure tubular or autoclave process, or gas phase polymerization process known in the art can be used under polymerizable conditions. Such processes can be run in a batch, semi-batch, or continuous mode. Heterogeneous polymerization processes (such as gas phase and slurry phase processes) are useful. A heterogeneous process is defined to be a process where the catalyst system is not soluble in the reaction media. Alternatively, in other embodiments, the polymerization process is not homogeneous. A homogeneous polymerization process is defined to be a process where preferably at least 90 wt % of the product is soluble in the reaction media. Alternatively, the polymerization process is not a bulk process. A bulk process is defined to be a process where monomer concentration in all feeds to the reactor is preferably 70 vol % or more. Alternatively, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means at least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

Gas Phase Polymerization

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired ethylene polymers and as described above. Typical pressures include pressures in the range of from about 0.35 MPa to about 10 MPa, preferably from about 0.45 MPa to about 6 MPa, or preferably from about 0.5 MPa to about 4 MPa in some embodiments.

In some embodiments, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In a class of embodiments, the polymerization is performed in the gas phase, preferably, in a fluidized bed gas phase process. Generally, in a fluidized bed gas phase process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase

In another embodiment of the invention, the polymerization is performed in the slurry phase. A slurry polymerization process generally operates between 1 to about 50 atmosphere pressure range (15 psi to 735 psi, 103 kPa to 5,068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process is typically operated above the reaction diluent critical temperature and pressure. Often, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is known in the art, and described in for instance U.S. Pat. No. 3,248,179. A preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. In one embodiment 500 ppm or less of hydrogen is added, or 400 ppm or less or 300 ppm or less. In other embodiments at least 50 ppm of hydrogen is added, or 100 ppm or more, or 150 ppm or more.

Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In a preferred embodiment, the catalyst system used in the polymerization comprises no more than two catalyst compounds. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

Useful reactor types and/or processes for the production of polyolefin polymers include, but are not limited to, UNIPOL™ Gas Phase Reactors (available from Univation Technologies); INEOS™ Gas Phase Reactors and Processes; Continuous Flow Stirred-Tank (CSTR) reactors (solution and slurry); Plug Flow Tubular reactors (solution and slurry); Slurry: (e.g., Slurry Loop (single or double loops)) (available from Chevron Phillips Chemical Company) and (Series Reactors) (available from Mitsui Chemicals)); BORSTAR™ Process and Reactors (slurry combined with gas phase); and Multi-Zone Circulating Reactors (MZCR) such as SPHERIZONE™ Reactors and Process available from Lyondell Basell.

MATT In several classes of embodiments, the catalyst activity of the polymerization reaction is at least 3,000 g/g*cat or greater, at least 4,250 g/g*cat or greater, at least 4,750 g/g*cat or greater, at least 5,000 g/g*cat or greater, at least 6,250 g/g*cat or greater, at least 8,500 g/g*cat or greater, at least 9,000 g/g*cat or greater, at least 9,500 g/g*cat or greater, or at least 9,700 g/g*cat or greater.

In a preferred embodiment, the polymerization:
1) is conducted at temperatures of 0 to 300° C. (preferably 25 to 150° C., preferably 40 to 120° C., preferably 45 to 80° C.);
2) is conducted at a pressure of atmospheric pressure to 10 MPa (preferably 0.35 to 10 MPa, preferably from 0.45 to 6 MPa, preferably from 0.5 to 4 MPa);
3) is conducted in an aliphatic hydrocarbon solvent (such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents);
4) wherein the catalyst system used in the polymerization preferably comprises at least one catalyst compound represented by Formula (I) and at least one catalyst compound represented by Formula (A), such as dimethylzirconium[2',2'''-(pyridine-2,6-diyl)bis(3-adamantan-1-yl)-5-(tert-butyl)-[1,1'-biphenyl]-2-olate)] and (1E,1'E)-1,1'-(pyridine-2,6-diyl)bis(N-(2-chloro-4,6-dimethylphenyl)ethan-1-imine)FeCl$_2$, a support such as silica, and an activator (such as methylalumoxane, N,N-dimethylanilinium tetrakis(pentafluorophenyl)borate, or N,N-dimethylanilinium tetrakis(perfluoronaphthyl)borate);

5) the polymerization preferably occurs in one reaction zone;

6) the productivity of the catalyst compound is at least 3,000 g/g*cat or greater, at least 4,250 g/g*cat or greater, at least 4,750 g/g*cat or greater, at least 5,000 g/g*cat or greater, at least 6,250 g/g*cat or greater, at least 8,500 g/g*cat or greater, at least 9,000 g/g*cat or greater, at least 9,500 g/g*cat or greater, or at least 9,700 g/g*cat or greater;

7) optionally scavengers (such as trialkyl aluminum compounds) are absent (e.g. present at zero mol %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)).

Polyolefin Products

This invention also relates to compositions of matter produced by the methods described herein.

In a preferred embodiment, the process described herein produces ethylene homopolymers or ethylene copolymers, such as ethylene-alpha-olefin (preferably C$_3$ to C$_{20}$) copolymers (such as ethylene-butene copolymers, ethylene-hexene and/or ethylene-octene copolymers).

In a preferred embodiment, the ethylene copolymers produced herein have 100 to 75 mol % ethylene and from 0 to 25 mole % (alternately from 0.5 to 20 mole %, alternately from 1 to 15 mole %, preferably from 3 to 10 mole %) of one, two, three, four or more C$_3$ to C$_{40}$ olefin monomers, for example, C$_3$ to C$_{20}$ α-olefin monomers (such as propylene, butene, hexene, octene, decene, dodecene, preferably propylene, butene, hexene, octene, or a mixture thereof).

The polyethylene composition may comprise from 99.0 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt %, of polymer units derived from ethylene and about 1.0 to about 20.0 wt %, 1.0 to 15.0 wt %, 0.5 to 12.5 wt %, 1.0 to 10.0 wt %, 1.0 to 7.5 wt %, 1.0 to 5.0 wt %, or 1.0 to 3.0 wt % of polymer units derived from one or more C$_3$ to C$_{20}$ α-olefin comonomers, preferably C$_3$ to C$_{10}$ α-olefins, and more preferably C$_4$ to C$_8$ α-olefins, such as hexene and octene. The α-olefin comonomer may be linear or branched, and two or more comonomers may be used, if desired.

Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene, and mixtures thereof.

The polyethylene composition may have a melt index (MI, I$_{2.16}$, ASTM 1238, 2.16 kg, 190° C.) of about 0.10 g/10 min or more, alternately 0.15 g/10 min or more, alternately about 0.18 g/10 min or more, alternately 0.20 g/10 min or more, alternately 0.22 g/10 min or more, alternately 0.25 g/10 min or more, alternately 0.28 g/10 min or more, alternately 0.30 g/10 min or more, alternately 30 g/10 min or less, alternately 20 g/10 min or less, alternately 10 g/10 min or less, alternately 1 g/10 min or less, alternately about 0.10 to about 0.30 g/10 min, 0.15 to 0.25 g/10 min, about 0.18 to about 0.22 g/10 min, 0.1 to 30 g/10 min, 20 to 30 g/10 min.

The polyethylene composition may have a high load melt index (HLMI, I$_{21.6}$, (ASTM 1238, 21.6 kg, 190° C.) of, from 1 to 100 g/10 min, from 1 to 60 g/10 min, 5 to 40 g/10 min, 5 to 50 g/10 min, 15 to 50 g/10 min, or 20 to 50 g/10 min.

The polyethylene composition may have a melt index ratio (MIR), from 10 to 150, alternately from 15 to 150, alternately from 20 to 45, alternately from 25 to 60, alternately from 30 to 55, alternately from 35 to 55, and alternately from 35 to 50 or 35 to 45. MIR is defined as I$_{21.6}$/I$_{2.16}$.

The polyethylene composition may have a density of 0.910 g/cc or more, alternately 0.915 g/cc or more; alternately 0.93 g/cc or more; alternately 0.935 g/cc or more, alternately 0.938 g/cc or more, alternately the polyethylene composition has a density of 0.910 to 0.967 g/cc, alternately 0.915 to 0.940, alternately 0.915 to 0.935 g/cc. Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm$^3$).

The polyethylene composition may have a weight average molecular weight, Mw, as determined by GPC-4D, of 100,000 to 1,000,000 g/mol, such as from 50,000 to 800,000 g/mol, such as form 70,000 to 700,000 g/mol.

The polyethylene composition may have a molecular weight distribution (MWD, defined as M$_w$/M$_n$) of about 2 to about 50, about 5 to about 50.

"BOCD" refers to a Broad Orthogonal Composition Distribution in which the comonomer of a copolymer is incorporated predominantly in the high molecular weight chains or species of a polyolefin polymer or composition. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights of polymer chains. BOCD has been described, for example, in U.S. Pat. No. 8,378,043, Col. 3, line 34, bridging Col. 4, line 19, and U.S. Pat. No. 8,476,392, line 43, bridging Col. 16, line 54.

The breadth of the composition distribution is characterized by the T$_{75}$-T$_{25}$ value, wherein T$_{25}$ is the temperature at which 25% of the eluted polymer is obtained and T$_{75}$ is the temperature at which 75% of the eluted polymer is obtained in a TREF experiment as described herein. The composition distribution is further characterized by the F$_{80}$ value, which is the fraction of polymer that elutes below 80° C. according to the TREF-LS method described herein. A higher F$_{80}$ value indicates a higher fraction of comonomer in the polymer molecule. An orthogonal composition distribution is defined by a $M_{60}/M_{90}$ value that is greater than 1, wherein $M_{60}$ is the molecular weight of the polymer fraction that elutes at 60° C. in a TREF-LS experiment and $M_{90}$ is the molecular weight of the polymer fraction that elutes at 90° C. according to the TREF-LS method described herein.

In a class of embodiments, the polymers as described herein may have a BOCD characterized in that the $T_{75}$-$T_{25}$ value is 1 or greater, 2.0 or greater, 2.5 or greater, 4.0 or greater, 5.0 or greater, 7.0 or greater, 10.0 or greater, 11.5 or greater, 15.0 or greater, 17.5 or greater, 20.0 or greater, 25.0 or greater, 30.0 or greater, 35.0 or greater, 40.0 or greater, or 45.0 or greater, wherein $T_{25}$ is the temperature at which 25% of the eluted polymer is obtained and $T_{75}$ is the temperature at which 75% of the eluted polymer is obtained according to the TREF-LS method described herein.

The polymers as described herein may further have a BOCD characterized in that $M_{60}/M_{90}$ value is 1.5 or greater, 2.0 or greater, 2.25 or greater, 2.50 or greater, 3.0 or greater, 3.5 or greater, 4.0 or greater, 4.5 or greater, or 5.0 or greater, wherein $M_{60}$ is the molecular weight of the polymer fraction that elutes at 60° C. according to the TREF-LS method described herein and $M_{90}$ is the molecular weight of the polymer fraction that elutes at 90° C. iaccording to the TREF-LS method described herein.

In any of the embodiments described herein, the polyethylene composition may be a multimodal polyethylene composition such as a bimodal polyethylene composition. As used herein, "multimodal" means that there are at least two distinguishable peaks in a molecular weight distribution curve (as determined using gel permeation chromatography (GPC) or other recognized analytical technique) of a polyethylene composition. For example, if there are two distinguishable peaks in the molecular weight distribution curve such composition may be referred to as bimodal composition. Typically, if there is only one peak (e.g., monomodal), no obvious valley between the peaks, either one of the peaks is not considered as a distinguishable peak, or both peaks are not considered as distinguishable peaks, then such a composition may be referred to as non-bimodal. For example, in U.S. Pat. Nos. 8,846,841 and 8,691,715, FIGS. 1-5 illustrate representative bimodal molecular weight distribution curves. In these figures, there is a valley between the peaks, and the peaks can be separated or deconvoluted. Often, a bimodal molecular weight distribution is characterized as having an identifiable high molecular weight component (or distribution) and an identifiable low molecular weight component (or distribution). In contrast, in U.S. Pat. Nos. 8,846,841 and 8,691,715, FIGS. 6 to 11 illustrate representative non-bimodal molecular weight distribution curves. These include unimodal molecular weight distributions as well as distribution curves containing two peaks that cannot be easily distinguished, separated, or deconvoluted.

Blends

In another embodiment, the polymer (preferably the ethylene homo- or co-polymer) produced herein is combined with one or more additional polymers in a blend prior to being formed into a film, molded part, or other article. As used herein, a "blend" may refer to a dry or extruder blend of two or more different polymers, and in-reactor blends, including blends arising from the use of multi or mixed catalyst systems in a single reactor zone, and blends that result from the use of one or more catalysts in one or more reactors under the same or different conditions (e.g., a blend resulting from in series reactors (the same or different) each running under different conditions and/or with different catalysts).

Useful additional polymers include other polyethylenes, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the ethylene-homo- or co-polymer) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

End Uses

Any of the foregoing polymers and compositions in combination with optional additives (see, for example, US Patent Application Publication No. 2016/0060430, paragraphs [0082]-[0093]) may be used in a variety of end-use applications. Such end uses may be produced by methods known in the art. Exemplary end uses are films, film-based products, sheets, wire and cable coating compositions, articles formed by molding techniques, e.g., injection or blow molding, extrusion coating, foaming, casting, and combinations thereof. Preferred end use applications include fiber extrusion and co-extrusion, including melt spinning, solution spinning and melt blown fiber operations for use in woven or non-woven form to make filters, diaper fabrics, medical garments, geotextiles, etc. Preferred end use applications also include gas-assisted injection molding, extrusion blow molding, injection blow molding, injection stretch blow molding, compression molding, rotational molding, foam molding, thermoforming, sheet extrusion, and profile extrusion. Additional end uses also include products made from films or sheets, e.g., bags, packaging, housewrap and personal care films, diaper backsheets, pouches, medical products, such as for example, medical films and intravenous (IV) bags.

Films

Films include monolayer or multilayer films. Films include those film structures and film applications known to those skilled in the art. Specific end use films include, for example, blown films, cast films, stretch films, stretch/cast films, stretch cling films, stretch handwrap films, machine stretch wrap, shrink films, shrink wrap films, green house films, laminates, and laminate films. Exemplary films are prepared by any conventional technique known to those skilled in the art, such as for example, techniques utilized to prepare blown, extruded, and/or cast stretch and/or shrink films (including shrink-on-shrink applications).

In one embodiment, multilayer films or multiple-layer films may be formed by methods well known in the art. The total thickness of multilayer films may vary based upon the application desired. A total film thickness of about 5-100 µm, more typically about 10-50 µm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In one embodiment the multilayer films are composed of five to ten layers.

To facilitate discussion of different film structures, the following notation is used herein. Each layer of a film is denoted "A" or "B". Where a film includes more than one A layer or more than one B layer, one or more prime symbols (', ", "', etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner layer disposed between two outer layers would be denoted A/B/A'. Similarly, a five-layer film of alternating layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes described herein. The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 µm each and a B layer of 30 µm is denoted as 20/60/20.

The thickness of each layer of the film, and of the overall film, is not particularly limited, but is determined according to the desired properties of the film. Typical film layers have a thickness of from about 1 to about 1,000 µm, more typically from about 5 to about 100 µm, and typical films have an overall thickness of from about 10 to about 100 µm.

In some embodiments, and using the nomenclature described above, the present invention provides for multilayer films with any of the following exemplary structures: (a) two-layer films, such as A/B and B/B'; (b) three-layer films, such as A/B/A', A/A'/B, B/A/B' and B/B'/B"; (c) four-layer films, such as A/A'/A"/B, A/A'/B/A", A/A'/B/B", A/B/A'/B', A/B/B'/A', B/A/A'/B', A/B/B'/B", B/A/B'/B" and B/B'/B"/B"'; (d) five-layer films, such as A/A'/A"/A"'/B, A/A'/A"/B/A"', A/A'/B/A'/A"', A/A'/A"/B/B', A/A'/B/A"/B', A/B/B'/A", A/B/A'/B'/A", A/B/A'/A"/B, B/A/A'/A"/B', A/B/B'/B", A/B/A'/B"/B', A/B/B'/B"/A', B/A/A'/B'/B", B/A/B'/A'/B", B/A/B'/B"/A', A/B/B'/B"'/B"", B/A/B'/B"/B"", B/B'/A/B'"", and B/B'/B"/B"'/B""; and similar structures for films having six, seven, eight, nine, twenty-four, forty-eight, sixty-four, one hundred, or any other number of layers. It should be appreciated that films having still more layers.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films may also be used as coatings for substrates such as paper, metal, glass, plastic, and other materials capable of accepting a coating.

The films can further be embossed, or produced or processed according to other known film processes. The films can be tailored to specific applications by adjusting the thickness, materials and order of the various layers, as well as the additives in or modifiers applied to each layer.

Stretch Films

The polymers and compositions as described above may be utilized to prepare stretch films. Stretch films are widely used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include conventional additives, such as cling-enhancing additives such as tackifiers, and non-cling or slip additives, to tailor the slip/cling properties of the film.

Shrink Films

The polymers and compositions as described above may be utilized to prepare shrink films. Shrink films, also referred to as heat-shrinkable films, are widely used in both industrial and retail bundling and packaging applications. Such films are capable of shrinking upon application of heat to release stress imparted to the film during or subsequent to extrusion. The shrinkage can occur in one direction or in both longitudinal and transverse directions. Conventional shrink films are described, for example, in WO 2004/022646.

Industrial shrink films are commonly used for bundling articles on pallets. Typical industrial shrink films are formed in a single bubble blown extrusion process to a thickness of about 80 to 200 µm, and provide shrinkage in two directions, typically at a machine direction (MD) to transverse direction (TD) ratio of about 60:40.

Retail films are commonly used for packaging and/or bundling articles for consumer use, such as, for example, in supermarket goods. Such films are typically formed in a single bubble blown extrusion process to a thickness of about 35 to 80, µm, with a typical MD:TD shrink ratio of about 80:20.

Films may be used in "shrink-on-shrink" applications. "Shrink-on-shrink," as used herein, refers to the process of applying an outer shrink wrap layer around one or more items that have already been individually shrink wrapped (herein, the "inner layer" of wrapping). In these processes, it is desired that the films used for wrapping the individual items have a higher melting (or shrinking) point than the film used for the outside layer. When such a configuration is used, it is possible to achieve the desired level of shrinking in the outer layer, while preventing the inner layer from melting, further shrinking, or otherwise distorting during shrinking of the outer layer. Some films described herein have been observed to have a sharp shrinking point when subjected to heat from a heat gun at a high heat setting, which indicates that they may be especially suited for use as the inner layer in a variety of shrink-on-shrink applications.

Greenhouse Films

The polymers and compositions as described above may be utilized to prepare stretch to prepare greenhouse films. Greenhouse films are generally heat retention films that, depending on climate requirements, retain different amounts of heat. Less demanding heat retention films are used in warmer regions or for spring time applications. More demanding heat retention films are used in the winter months and in colder regions.

Bags

Bags include those bag structures and bag applications known to those skilled in the art. Exemplary bags include shipping sacks, trash bags and liners, industrial liners, produce bags, and heavy duty bags.

Packaging

Packaging includes those packaging structures and packaging applications known to those skilled in the art. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers, and various like goods normally containerized and/or palletized for shipping, storage, and/or display.

Blow Molded Articles

The polymers and compositions described above may also be used in blow molding processes and applications. Such processes are well known in the art, and involve a process of inflating a hot, hollow thermoplastic preform (or parison) inside a closed mold. In this manner, the shape of the parison conforms to that of the mold cavity, enabling the production of a wide variety of hollow parts and containers.

In a typical blow molding process, a parison is formed between mold halves and the mold is closed around the parison, sealing one end of the parison and closing the parison around a mandrel at the other end. Air is then blown through the mandrel (or through a needle) to inflate the parison inside the mold. The mold is then cooled and the part formed inside the mold is solidified. Finally, the mold is opened and the molded part is ejected. The process lends itself to any design having a hollow shape, including but not limited to bottles, tanks, toys, household goods, automobile parts, and other hollow containers and/or parts.

Blow molding processes may include extrusion and/or injection blow molding. Extrusion blow molding is typically suited for the formation of items having a comparatively heavy weight, such as greater than about 12 ounces, including but not limited to food, laundry, or waste containers. Injection blow molding is typically used to achieve accurate and uniform wall thickness, high quality neck finish, and to process polymers that cannot be extruded. Typical injection blow molding applications include, but are not limited to, pharmaceutical, cosmetic, and single serving containers, typically weighing less than 12 ounces.

Injection Molded Articles

The polymers and compositions described above may also be used in injection molded applications. Injection molding is a process commonly known in the art, and is a process that usually occurs in a cyclical fashion. Cycle times generally range from 10 to 100 seconds and are controlled by the cooling time of the polymer or polymer blend used.

In a typical injection molding cycle, polymer pellets or powder are fed from a hopper and melted in a reciprocating screw type injection molding machine. The screw in the machine rotates forward, filling a mold with melt and holding the melt under high pressure. As the melt cools in the mold and contracts, the machine adds more melt to the mold to compensate. Once the mold is filled, it is isolated from the injection unit and the melt cools and solidifies. The solidified part is ejected from the mold and the mold is then closed to prepare for the next injection of melt from the injection unit.

Injection molding processes offer high production rates, good repeatability, minimum scrap losses, and little to no need for finishing of parts. Injection molding is suitable for a wide variety of applications, including containers, household goods, automobile components, electronic parts, and many other solid articles.

Extrusion Coating

The polymers and compositions described above may be used in extrusion coating processes and applications. Extrusion coating is a plastic fabrication process in which molten polymer is extruded and applied onto a non-plastic support or substrate, such as paper or aluminum in order to obtain a multi-material complex structure. This complex structure typically combines toughness, sealing and resistance properties of the polymer formulation with barrier, stiffness or aesthetics attributes of the non-polymer substrate. In this process, the substrate is typically fed from a roll into a molten polymer as the polymer is extruded from a slot die, which is similar to a cast film process. The resultant structure is cooled, typically with a chill roll or rolls, and would into finished rolls.

Extrusion coating materials are typically used in food and non-food packaging, pharmaceutical packaging, and manufacturing of goods for the construction (insulation elements) and photographic industries (paper).

Tubing or pipe may be obtained by profile extrusion for uses in medical, potable water, land drainage applications or the like. Tubing or pipe may be unvulcanized or vulcanized. Vulcanization can be performed using, for example, a peroxide or silane during extrusion of the pipe. The profile extrusion process involves the extrusion of molten polymer through a die. The extruded tubing or pipe is then solidified by chill water or cooling air into a continuous extruded article.

Foamed Articles

The polymers and compositions described above may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, aerospace, transportation, electric and electronics, and manufacturing.

Wire and Cable Applications

Also provided are electrical articles and devices including one or more layers formed of or comprising the polymers and compositions described above. Such devices include, for example, electronic cables, computer and computer-related equipment, marine cables, power cables, telecommunications cables or data transmission cables, and combined power/telecommunications cables.

Electrical devices described herein can be formed by methods well known in the art, such as by one or more extrusion coating steps in a reactor/extruder equipped with a cable die. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

This invention further relates to:

1. A supported catalyst system comprising: (i) at least one first catalyst component comprising a group 4 bis (phenolate) complex; (ii) at least one second catalyst component comprising a 2,6-bis(imino)pyridyl iron complex; (iii) activator; and (iv) support; wherein, the group 4 bis(phenolate) complex is represented by Formula (A):

wherein:

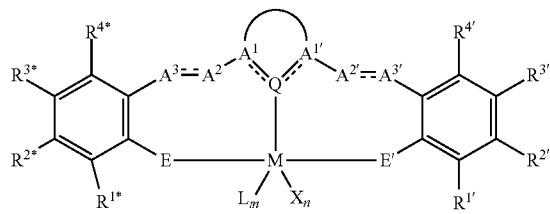

(A)

M is a group 3-6 transition metal or Lanthanide;

E and E' are each independently O, S, or $NR^9$, where $R^9$ is independently hydrogen, $C_1-C_{40}$ hydrocarbyl, $C_1-C_{40}$ substituted hydrocarbyl, or a heteroatom-containing group;

Q is group 14, 15, or 16 atom that forms a dative bond to metal M;

$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is selected from hydrogen, $C_1-C_{20}$ hydrocarbyl, $C_1-C_{20}$ substituted hydrocarbyl;

$A^3 \text{===} A^2$ is a divalent group containing 2 to 40 non-hydrogen atoms that links $A^1$ to the E-bonded aryl group via a 2-atom bridge;

$A^{2'} \text{===} A^{3'}$ is a divalent group containing 2 to 40 non-hydrogen atoms that links $A^{1'}$ to the E'-bonded aryl group via a 2-atom bridge;

L is a neutral Lewis base;

X is an anionic ligand;

n is 1, 2 or 3;

m is 0, 1, or 2;

n+m is not greater than 4;

each of $R^{1*}$, $R^{2*}$, $R^{3*}$, $R^{4*}$, $R^{1'}$, $R^{2'}$, $R^{3'}$, and $R^{4'}$ is independently hydrogen, $C_1-C_{40}$ hydrocarbyl, $C_1-C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group; and the 2,6-bis(imino)pyridyl iron complex is represented by Formula (I):

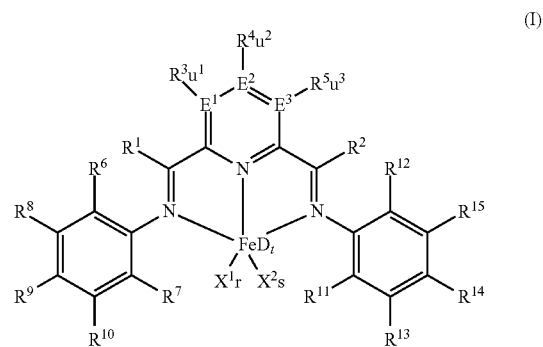

(I)

wherein:

each of $R^1$ and $R^2$ is independently hydrogen, $C_1-C_{22}$ alkyl, $C_2-C_{22}$ alkenyl, $C_6-C_{22}$ aryl, arylalkyl wherein alkyl has from 1 carbon atom to 10 carbon atoms and aryl has from 6 carbon atoms to 20 carbon atoms, or five-, or six-, or seven-membered heterocyclic ring comprising at least one atom selected from the group consisting of N, P, O and S; wherein each of $R^1$ and $R^2$ is optionally substituted by halogen, $-OR^{16}$, $-NR^{17}_2$, or $-SiR^{18}_3$; wherein $R^1$ optionally bonds with $R^3$, and $R^2$ optionally bonds with $R^5$, in each case to independently form a five-, six-, or seven-membered ring;

each of $R^3$, $R^4$, $R^5$, $R^8$, $R^9$, $R^{10}$, $R^{13}$, $R^{14}$, and $R^{15}$ is independently hydrogen, $C_1-C_{22}$ alkyl, $C_2-C_{22}$ alkenyl, $C_6-C_{22}$ aryl, arylalkyl wherein alkyl has from 1 to 10 carbon atoms and aryl has from 6 to 20 carbon atoms, $-OR^{16}$, $-NR^{17}_2$, halogen, $-SiR^{18}_3$ or five-, six- or seven-membered heterocyclic ring comprising at least one atom selected from the group consisting of N, P, O and S;

wherein $R^3$, $R^4$, $R^5$, $R^8$, $R^9$, $R^{10}$, $R^{13}$, $R^{14}$, and $R^{15}$ are optionally substituted by halogen, $-OR^{16}$, $-NR^{17}_2$, or $-SiR^{18}_3$; wherein $R^3$ optionally bonds with $R^4$, $R^4$ optionally bonds with $R^5$, $R^7$ optionally bonds with $R^{10}$, $R^{10}$ optionally bonds with $R^9$, $R^9$ optionally bonds with $R^8$, $R^8$ optionally bonds with $R^6$, $R^{15}$ optionally bonds with $R^{14}$, $R^{14}$ optionally bonds with $R^{13}$, and $R^{13}$ optionally bonds with $R^{11}$, in each case to independently form a five-, six- or seven-membered carbocyclic or heterocyclic ring, the heterocyclic ring comprising at least one atom from the group consisting of N, P, O and S;

each of $R^6$, $R^7$, $R^{11}$, and $R^{12}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, a heteroatom or a heteroatom-containing group (such as —$OR^{16}$, —$NR^{17}_2$, halogen, —$SiR^{18}_3$ or five-, six- or seven-membered heterocyclic ring comprising at least one atom selected from the group consisting of N, P, O and S); wherein $R^6$, $R^7$, $R^{11}$, and $R^{12}$ are optionally substituted by halogen, —$OR^{16}$, —$NR^{17}_2$, or —$SiR^{18}_3$, wherein $R^6$ optionally bonds with $R^8$, $R^{11}$ optionally bonds with $R^{13}$, or $R^{15}$ optionally bonds with $R^{12}$ in each case to independently form a five-, six- or seven-membered carbocyclic or heterocyclic ring, the heterocyclic ring comprising at least one atom from the group consisting of N, P, O and S; wherein at least one of $R^6$, $R^7$, $R^{11}$, and $R^{12}$ is independently a heteroatom or a heteroatom-containing group, or at least one of the $R^6$, $R^7$, $R^{11}$, and $R^{12}$ is not methyl, or if $R^{11}$ is H and $R^{12}$ is iPr, then at least one of $R^6$ and $R^7$ is not methyl;

each of $R^{16}$, $R^{17}$, and $R^{18}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or —$SiR^{19}_3$, wherein each $R^{16}$, $R^{17}$, and $R^{18}$ is independently optionally substituted by halogen, or two $R^{16}$ radicals optionally bond to form a five- or six-membered ring, or two $R^{17}$ radicals optionally bond to form a five- or six-membered ring, or two $R^{18}$ radicals optionally bond to form a five- or six-membered ring;

each $R^{19}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or two $R^{19}$ radicals optionally bond to form a five- or six-membered ring;

each of $E^1$, $E^2$, and $E^3$ is independently carbon, nitrogen or phosphorus;

each of $u^1$, $u^2$, and $u^3$ is independently 0 if $E^1$, $E^2$, or $E^3$ is nitrogen or phosphorus, and each of $u^1$, $u^2$, and $u^3$ is independently 1 if $E^1$, $E^2$, or $E^3$ is carbon;

each of $X^1$ and $X^2$ is independently substituted hydrocarbyl, and the radicals X can be bonded with one another;

r is 1 or 2;

s is 1 or 2;

D is a neutral donor; and t is 0 to 2.

2. A supported catalyst system according to paragraph 1, wherein the group 4 bis(phenolate) complex is represented by the Formula (A-II):

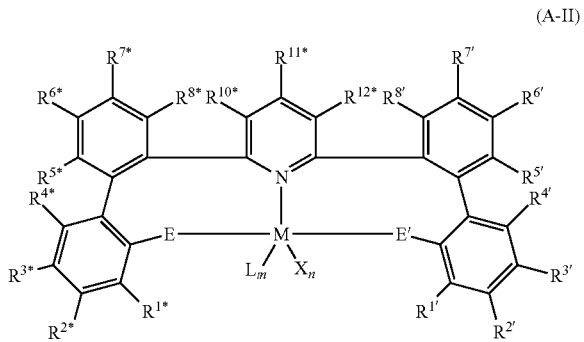

(A-II)

wherein:

M is a group 3, 4, 5, or 6 transition metal or a Lanthanide (such as Hf, Zr or Ti);

E and E' are each independently O, S, or $NR^{9*}$, where $R^{9*}$ is independently hydrogen, $C_1$-$C_{40}$ hydrocarbyl, $C_1$-$C_{40}$ substituted hydrocarbyl, or a heteroatom-containing group;

each L is independently a Lewis base;

each X is independently an anionic ligand;

n is 1, 2 or 3;

m is 0, 1, or 2;

n+m is not greater than 4;

each of $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group;

each of $R^{5*}$, $R^{6*}$, $R^{7*}$, $R^{8*}$, $R^{5'}$, $R^{6'}$, $R^{7'}$, $R^{8'}$, $R^{10*}$, $R^{11*}$, and $R^{12*}$ is independently hydrogen, $C_1$-$C_{40}$ hydrocarbyl, $C_1$-$C_{40}$ substituted hydrocarbyl, a heteroatom or a heteroatom-containing group, or one or more of $R^{5*}$ and $R^{6*}$, $R^{6*}$ and $R^{7*}$, $R^{7*}$ and $R^{8*}$, $R^{5'}$ and $R^{6'}$, $R^{6'}$ and $R^{7'}$, $R^{7'}$ and $R^{8'}$, $R^{10*}$ and $R^{11*}$, or $R^{11*}$ and $R^{12*}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

3. The supported catalyst system of paragraph 2, wherein E and E' are each independently O.

4. The supported catalyst system of paragraph 2, wherein the group 4 bis(phenolate) complex is present a molar ratio 1% to 99%, and the 2,6-bis(imino)pyridyl iron complex is present at a molar ratio of 99% to 1%, based on the combination of the catalyst compounds.

5. The supported catalyst system of paragraph 1, wherein the group 4 bis(phenolate) complex is one or more of:

dimethylzirconium[2',2'''-(pyridine-2,6-diyl)bis(3-adamantan-1-yl)-5-(tert-butyl)-[1,1'-biphenyl]-2-olate1], dimethylhafnium[2',2'''-(pyridine-2,6-diyl)bis(3-adamantan-1-yl)-5-(tert-butyl)-[1,1'-biphenyl]-2-olate)], dimethylzirconium[6,6'-(pyridine-2,6-diylbis(benzo[b]thiophene-3,2-diyl))bis(2-adamantan-1-yl)-4-methylphenolatel], dimethylhafnium[6,6'-(pyridine-2,6-diylbis(benzo[b]thiophene-3,2-diyl))bis(2-adamantan-1-yl)-4-methylphenolatel], dimethylzirconium[2',2+'''-(pyridine-2,6-diyl)bis(3-((3r,5r,7r)-adamantan-1-yl)-5-methyl-[1,1'-biphenyl]-2-olate1], dimethylhafnium[2',2'''-(pyridine-2,6-diyl)bis(3-((3r,5r,7r)-adamantan-1-yl)-5-methyl-[1,1'-biphenyl]-2-olate)], dimethylzirconium[2',2'''-(pyridine-2,6-diyl)bis(3-((3r,5r,7r)-adamantan-1-yl)-4',5-dimethyl-[1,1'-biphenyl]-2-olate)], dimethylhafnium[2',2'''-(pyridine-2,6-diyl)bis(3-((3r,5r,7r)-adamantan-1-yl)-4',5-dimethyl-[1,1'-biphenyl]-2-olate)];
Complex 1
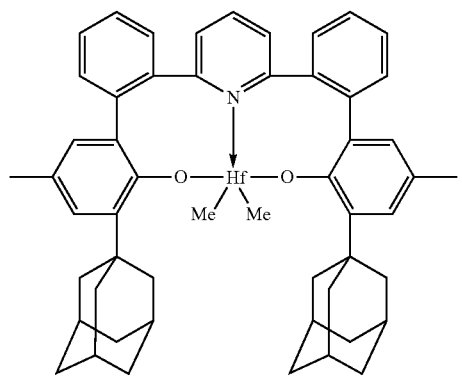
Complex 2
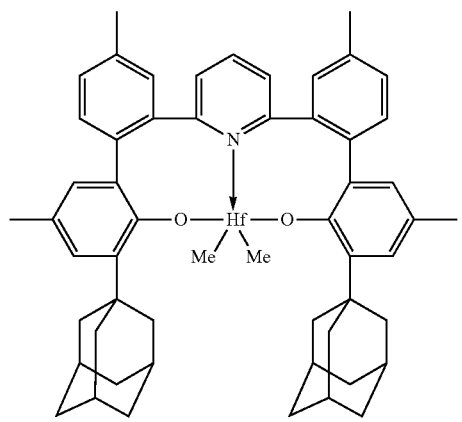
Complex 3
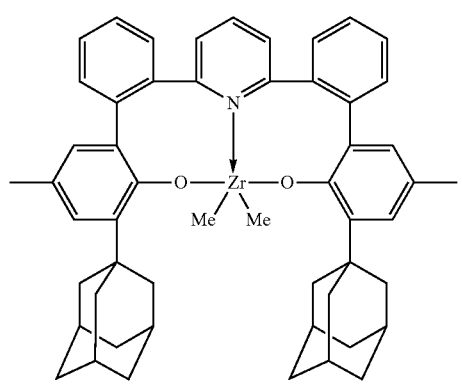
Complex 4
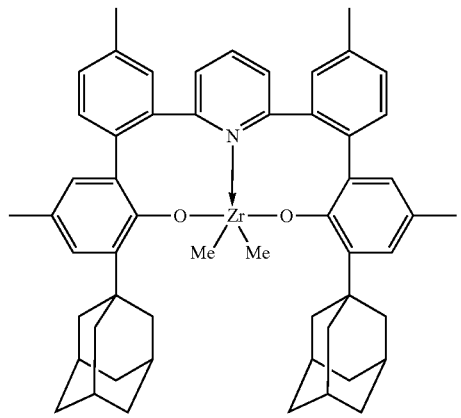
Complex 5
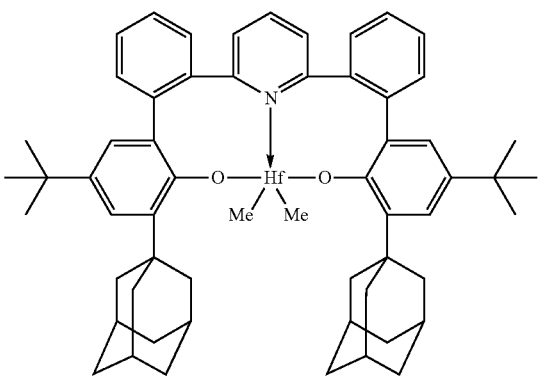
Complex 6
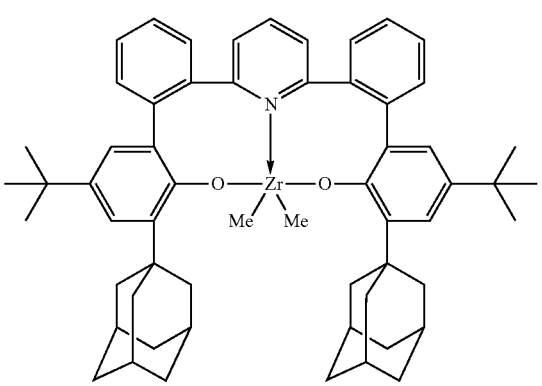

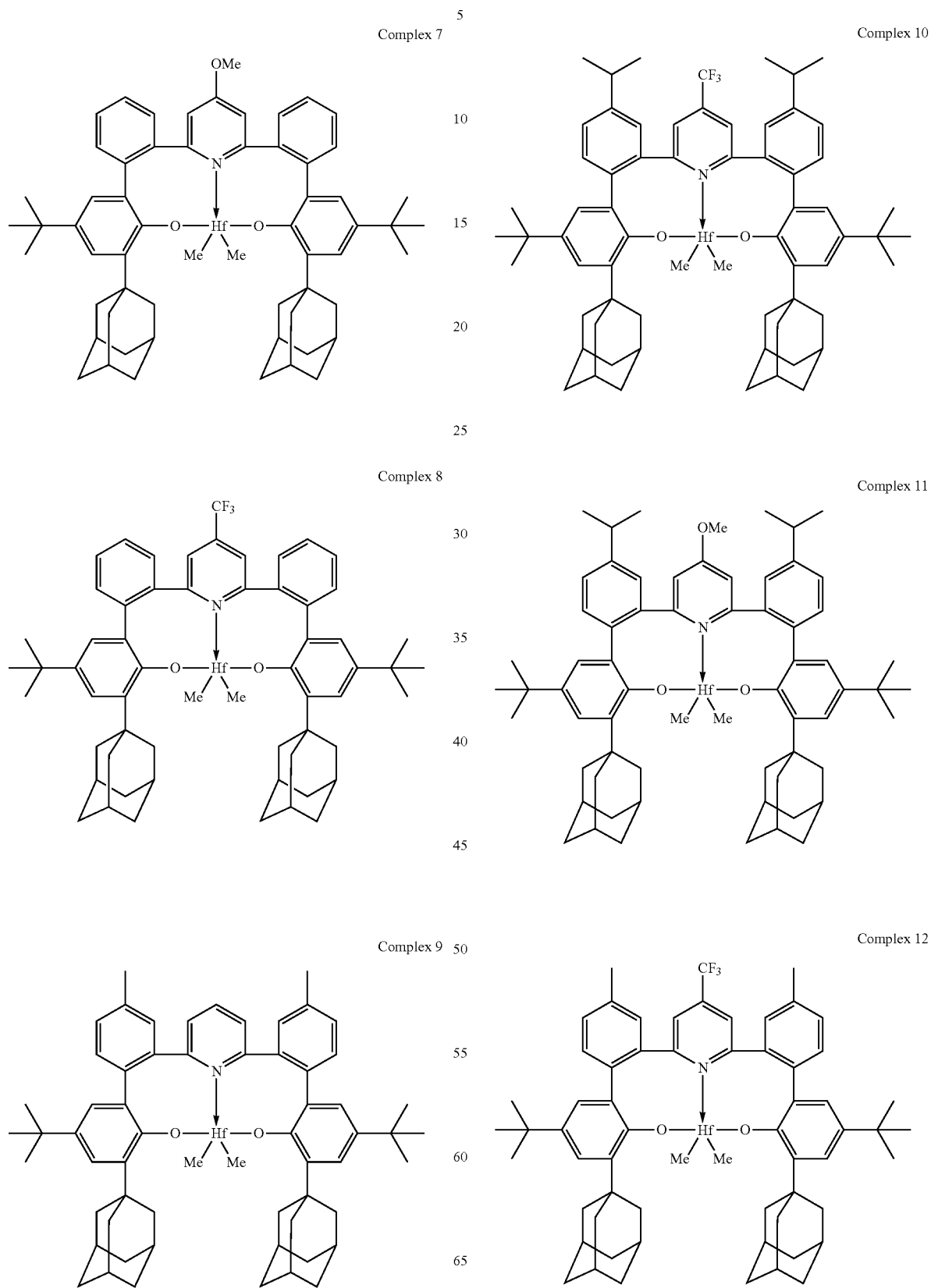

Complex 13
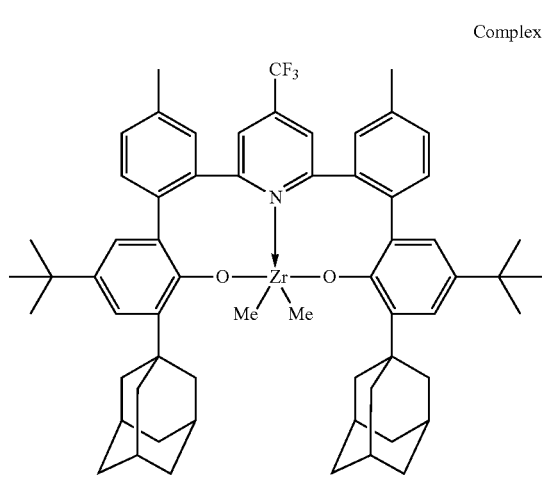
Complex 16
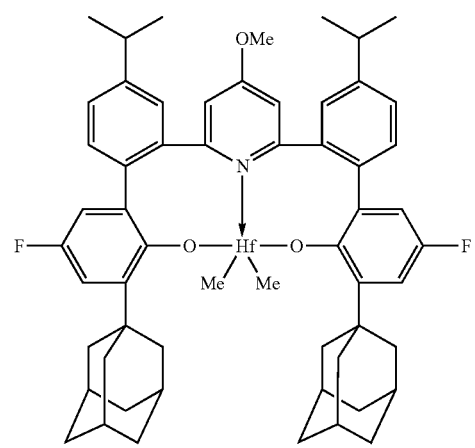
Complex 14
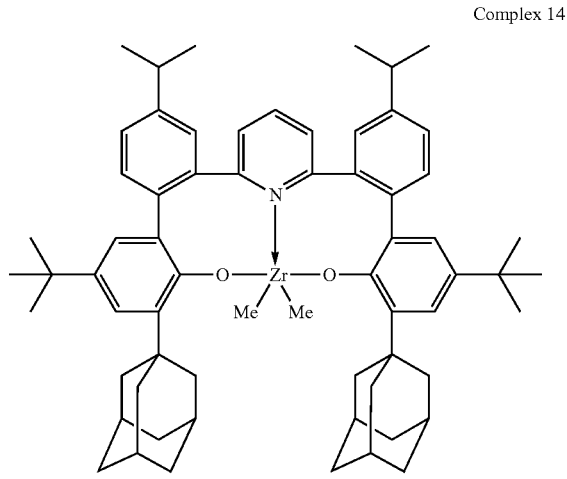
Complex 17
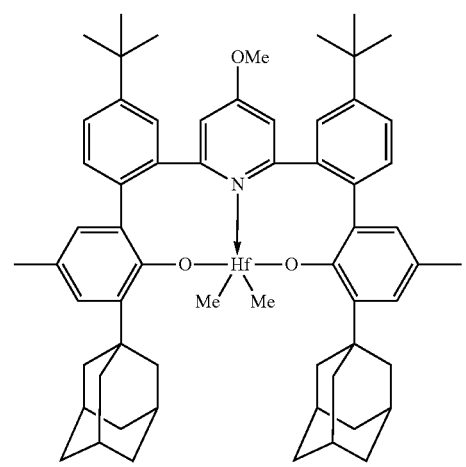
Complex 15
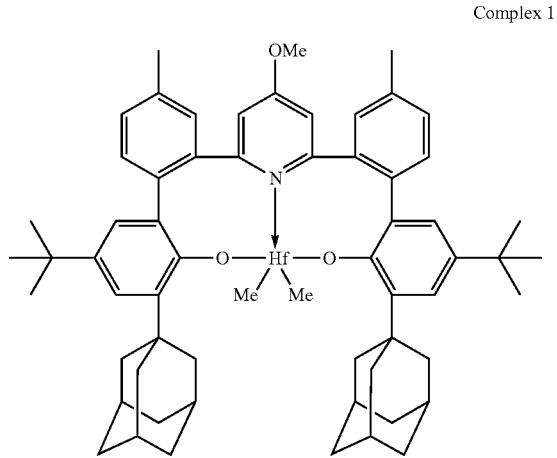
Complex 18
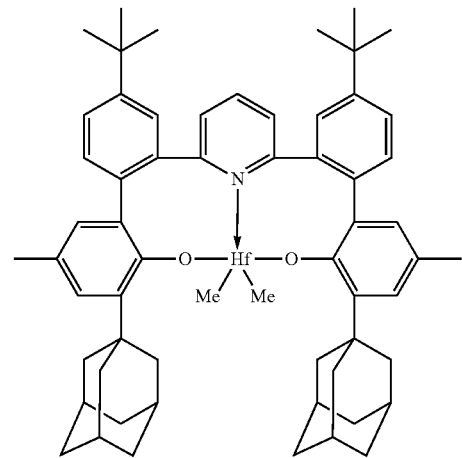

Complex 19
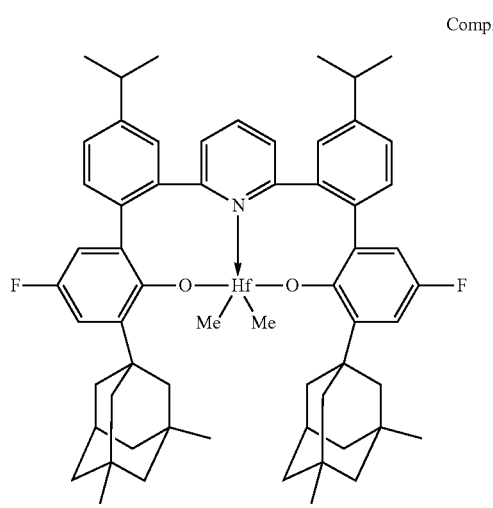
Complex 20
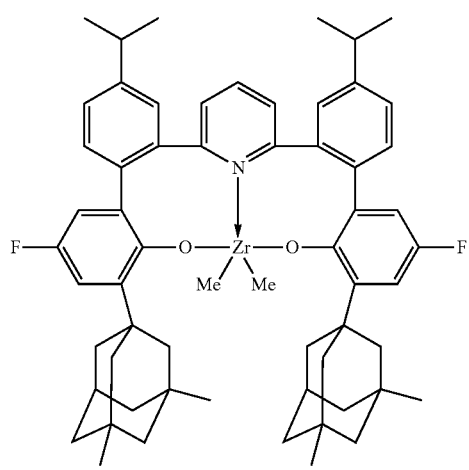
Complex 21
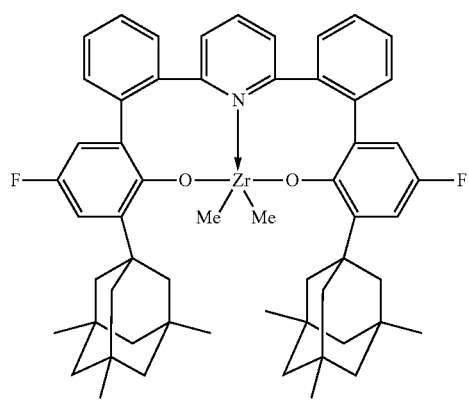
Complex 22
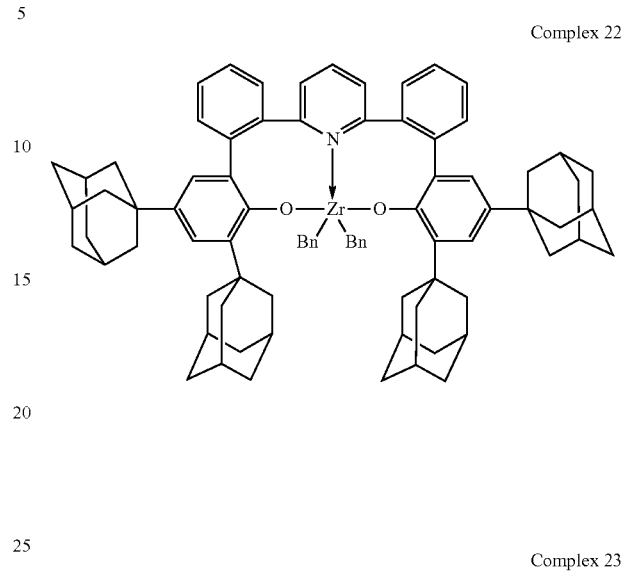
Complex 23
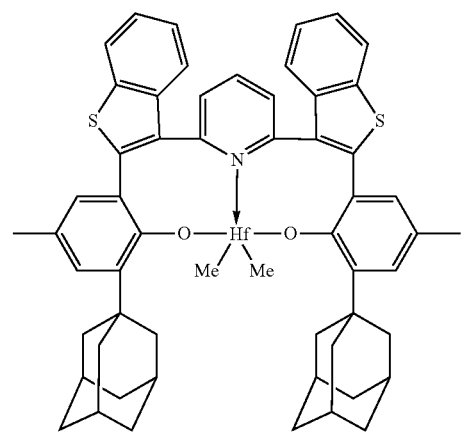
Complex 24
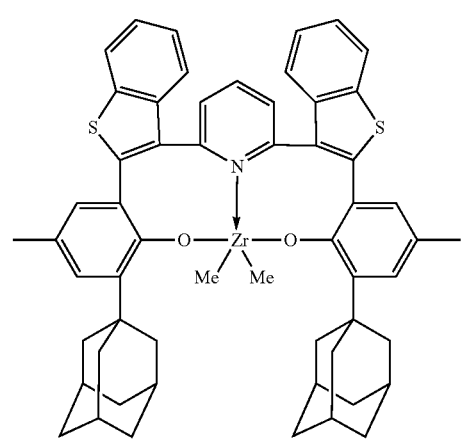

-continued

Complex 25

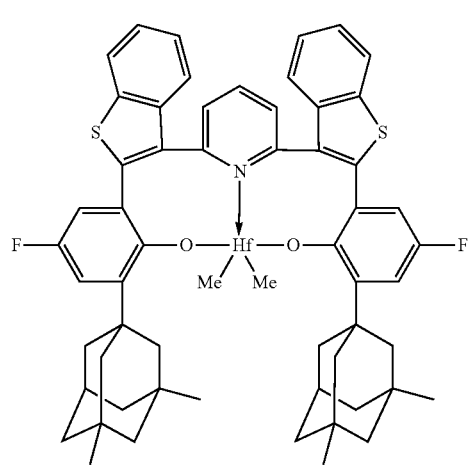

Complex 26

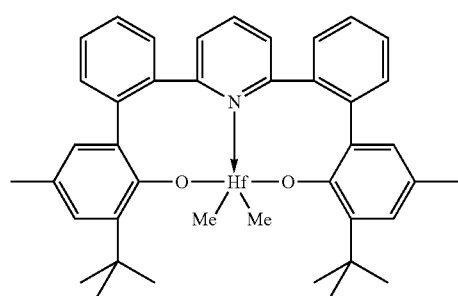

Complex 27

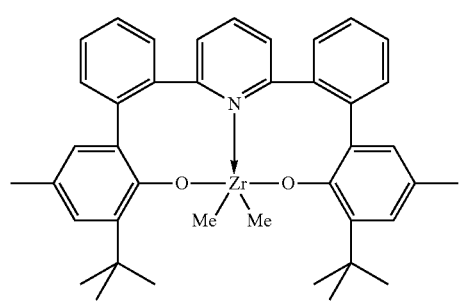

Complex 29

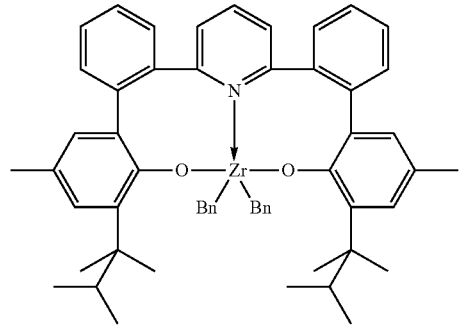

-continued

Complex 30

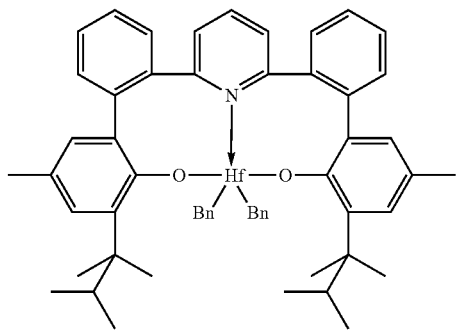

Complex 31

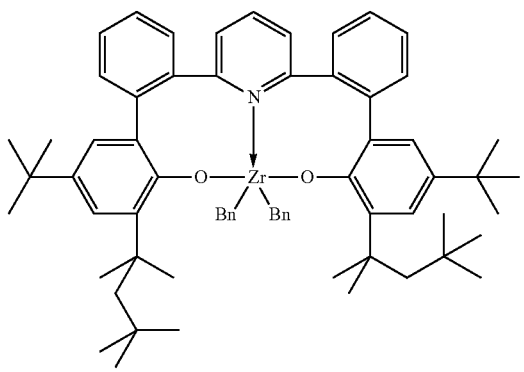

Complex 32

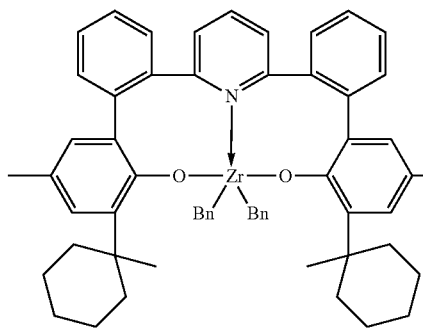

6. The supported catalyst system of any of paragraphs 1 to 5, wherein the support comprises silica.
7. The supported catalyst system of any of paragraphs 1 to 6, wherein the catalyst system comprises less than 0.1 wt % aromatic solvent.
8. The supported catalyst system of any of paragraphs 1 to 7, wherein the 2,6-bis(imino)pyridyl iron complex is one or more of:

1

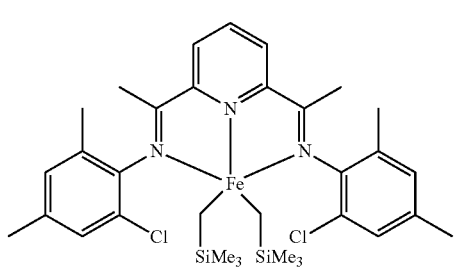

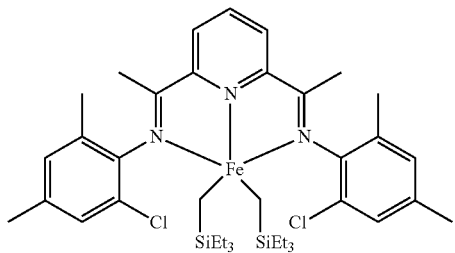
2
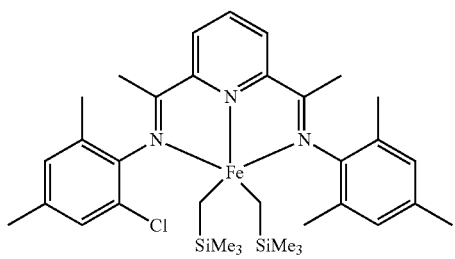
3
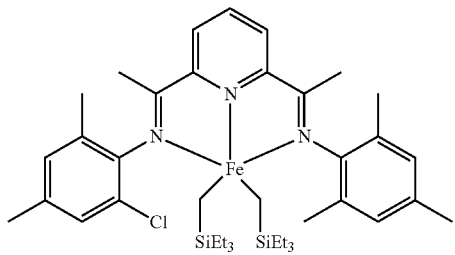
4
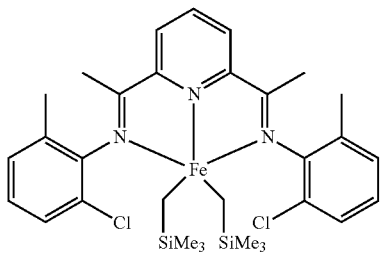
5
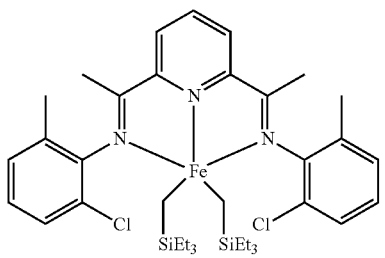
6
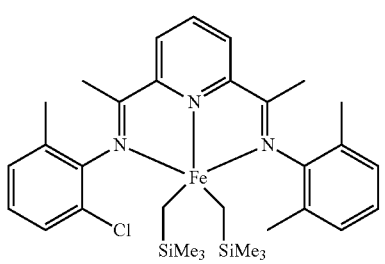
7
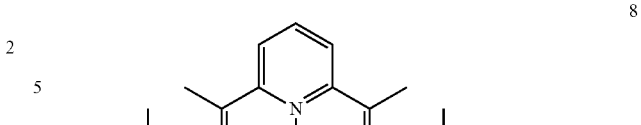
8
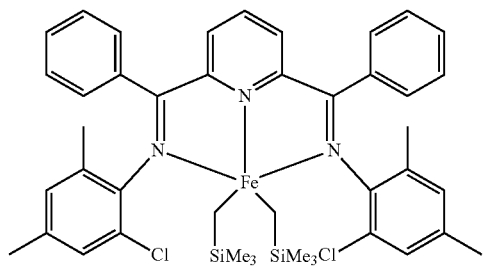
9
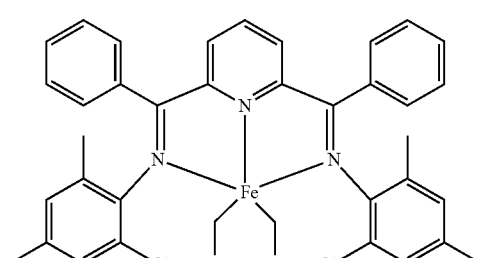
10
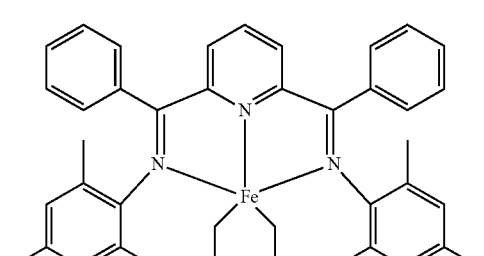
11
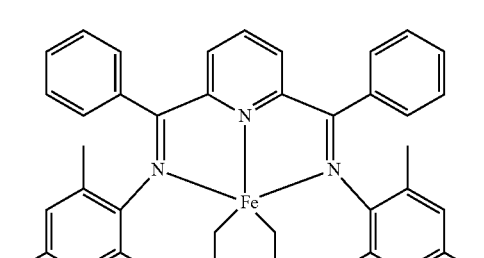
12
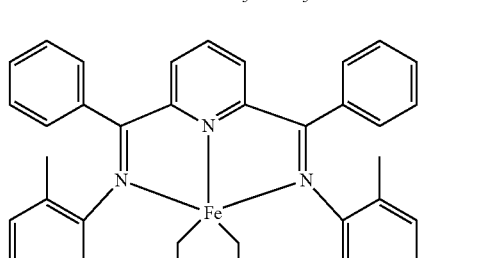
13

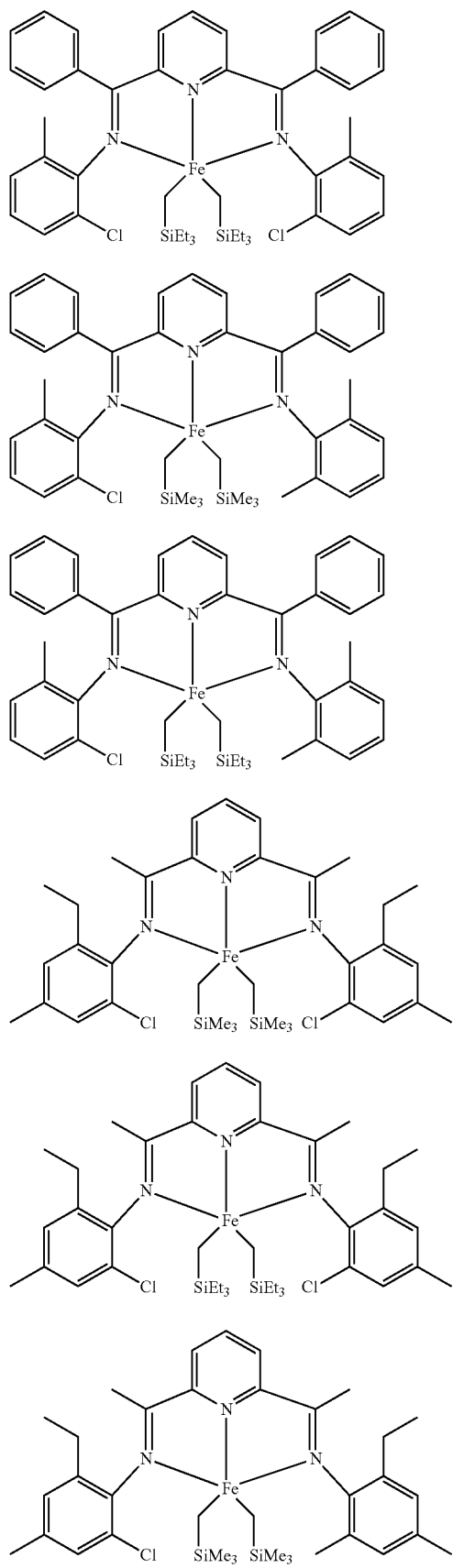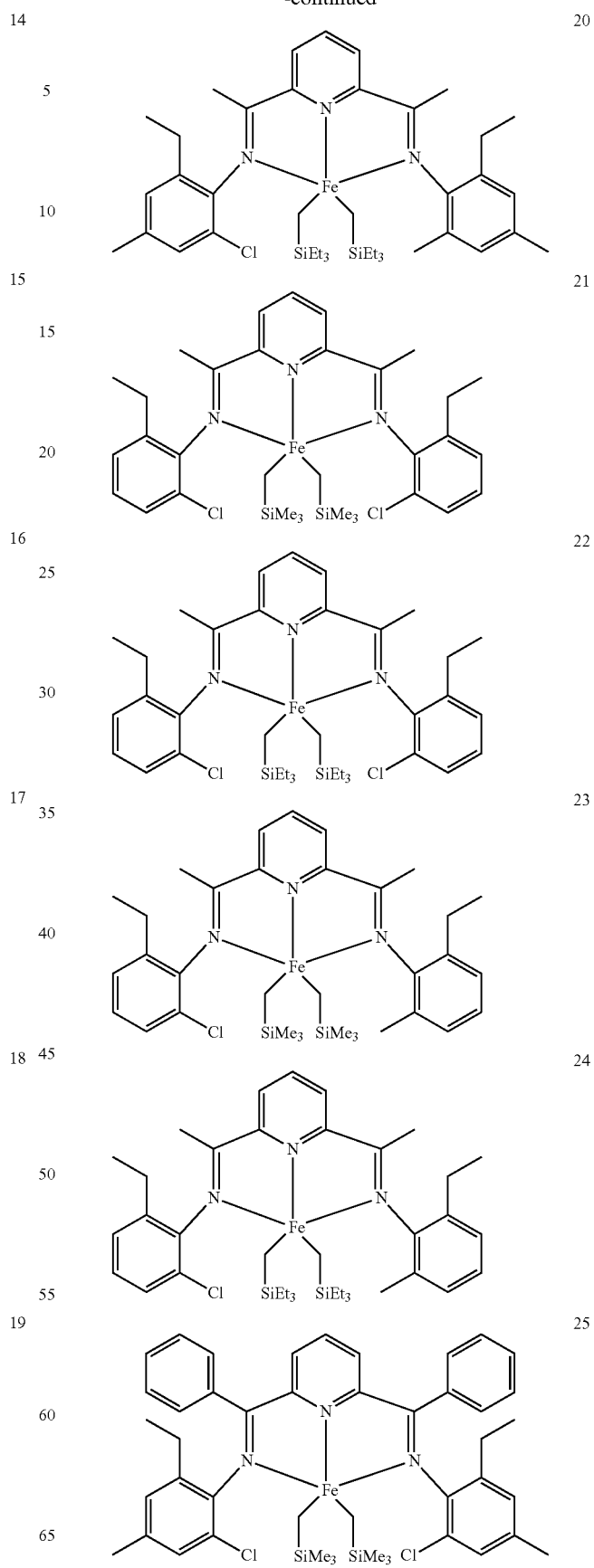

119
-continued
26
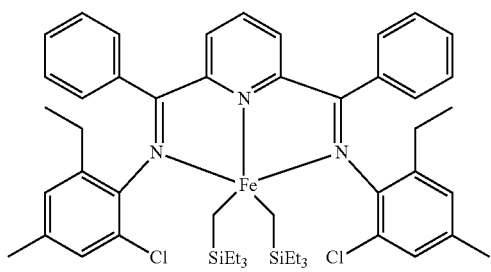
27
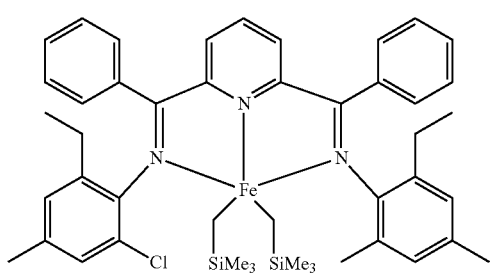
28
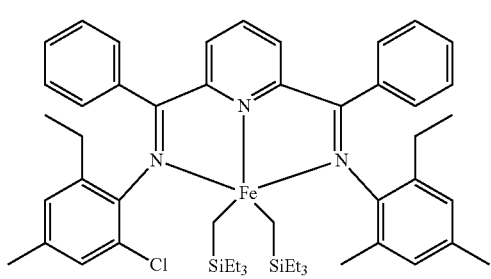
29
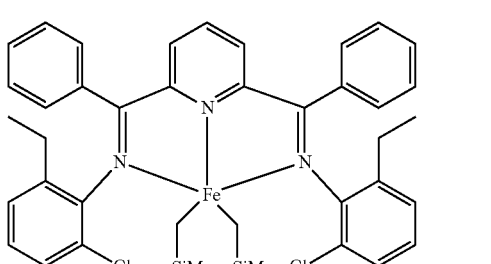
30
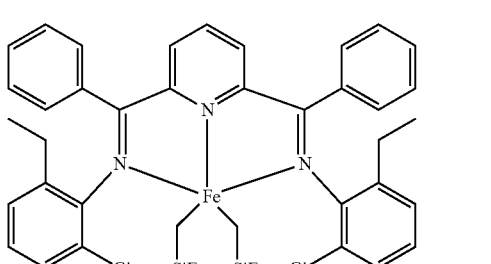
31
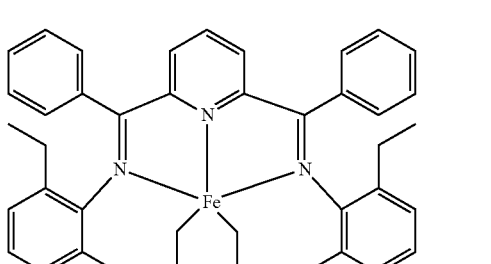
120
-continued
32
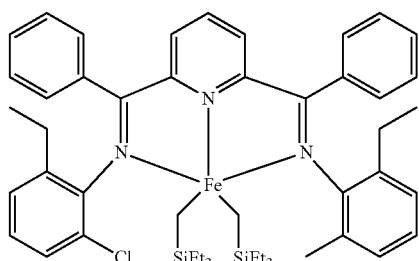
33
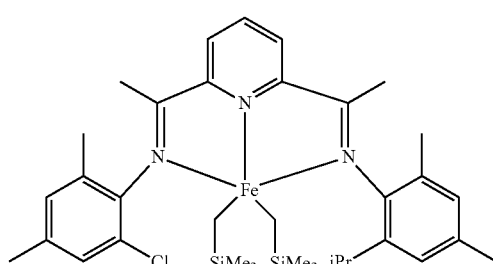
34
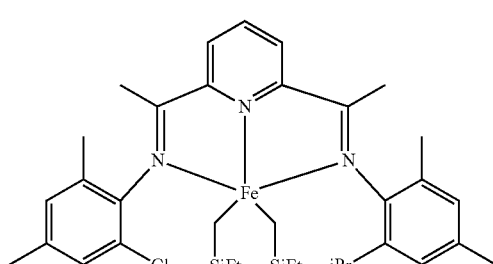
35
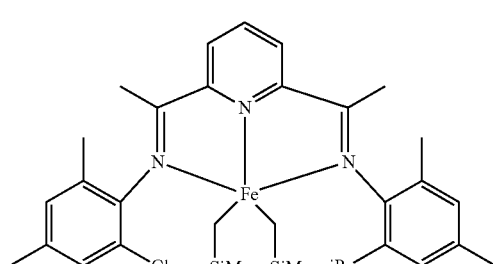
36
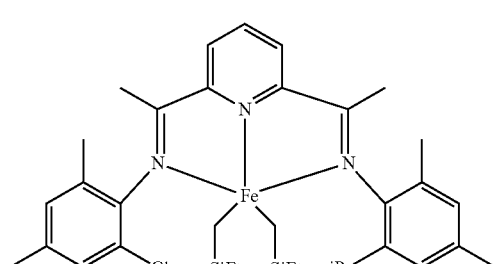
37
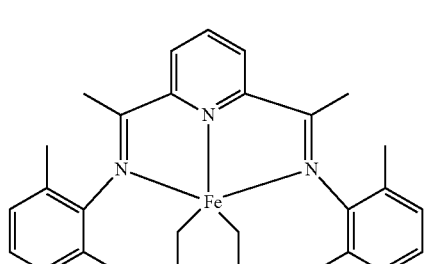

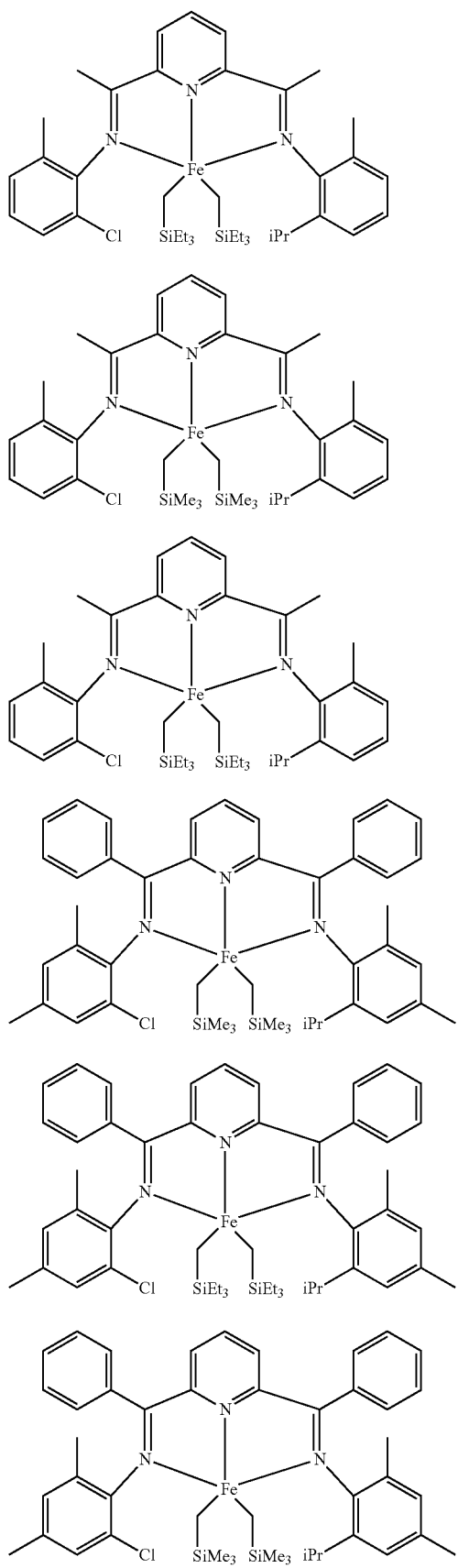

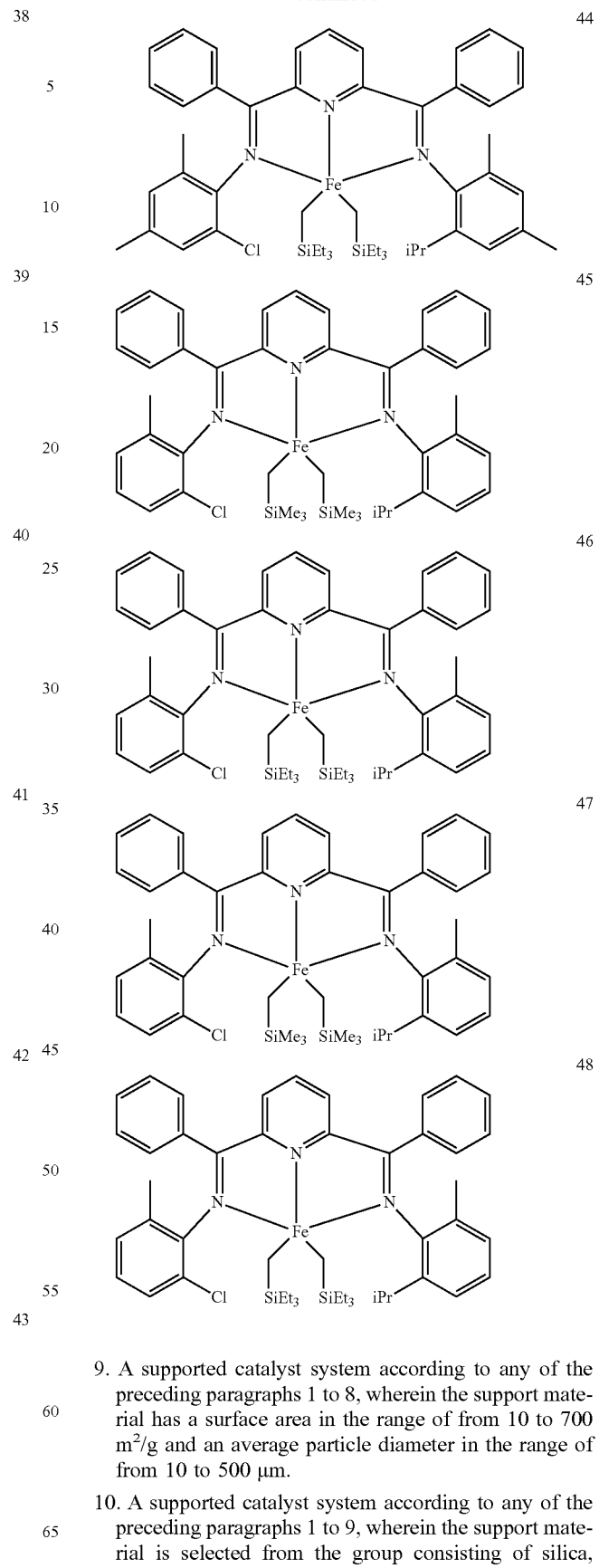

9. A supported catalyst system according to any of the preceding paragraphs 1 to 8, wherein the support material has a surface area in the range of from 10 to 700 m²/g and an average particle diameter in the range of from 10 to 500 μm.

10. A supported catalyst system according to any of the preceding paragraphs 1 to 9, wherein the support material is selected from the group consisting of silica, alumina, silica-alumina, and combinations thereof.

11. A supported catalyst system according to any of the preceding paragraphs 1 to 10, wherein the support material is fluorided.
12. A supported catalyst system of paragraph 11, wherein the support material has a fluorine concentration in the range of 0.6 to 3.5 wt %, based upon the weight of the support material.
13. A supported catalyst system according to any of the preceding paragraphs 1 to 12, wherein the activator comprises alumoxane.
14. A supported catalyst system according to any of the preceding paragraphs 1 to 13, wherein the activator comprises a non-coordinating anion.
15. A supported catalyst system according to any of the preceding paragraphs 1 to 11, wherein the activator comprises one or more of:

N,N-dimethyl-anilinium [tetrakis(perfluorophenyl)borate],
N,N-dimethylanilinium tetrakis(perfluoronaphthyl)borate,
N,N-dimethylanilinium tetrakis(perfluorobiphenyl)borate,
N,N-dimethylanilinium tetrakis(perfluorophenyl)borate,
N,N-dimethylanilinium tetrakis(3,5-bis(trifluoromethyl)phenyl)borate,
triphenylcarbenium tetrakis(perfluoronaphthyl)borate,
triphenylcarbenium tetrakis(perfluorobiphenyl)borate,
triphenylcarbenium tetrakis(3,5-bis(trifluoromethyl)phenyl) borate,
triphenylcarbenium tetrakis(perfluorophenyl)borate, $[Me_3NH^+][B(C_6F_5)_4^-]$;

1-(4-(tris(pentafluorophenyl)borate)-2,3,5,6-tetrafluorophenyl) pyrrolidinium;
4-(tris(pentafluorophenyl)borate)-2,3,5,6-tetrafluoropyridine,
N,N-di(hydrogenated tallow)methylammonium [tetrakis (perfluorophenyl) borate],
N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyeborate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl) borate],
N-octadecyl-N-hexadecyl-tolylammonium [tetrakis(perfluorophenyl)borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyeborate],
N-tetradecyl-N-decyl-tolylammonium [tetrakis(perfluorophenyl)borate],
N-dodecyl-N-decyl-tolylammonium [tetrakis(perfluorophenyl)borate],
N-methyl-N-octadecylanilinium [tetrakis(perfluorophenyl) borate],
N-methyl-N-hexadecylanilinium [tetrakis(perfluorophenyl) borate],
N-methyl-N-tetradecylanilinium [tetrakis(perfluorophenyl) borate],
N-methyl-N-dodecylanilinium [tetrakis(perfluorophenyl) borate],
N-methyl-N-decylanilinium [tetrakis(perfluorophenyl)borate], and
N-methyl-N-octylanilinium [tetrakis(perfluorophenyl)borate].

16. A process for polymerization of olefin monomers comprising contacting one or more monomers with a supported catalyst system of any of paragraphs 1 to 15 and obtaining olefin polymer.
17. A process according to paragraph 16, wherein the first catalyst component and the second catalyst component show different hydrogen responses.
18. A process according to paragraph 16 or 17, wherein the monomer is selected from the group consisting of ethylene, propylene, 1-hexene, 1-octene and combinations thereof.
19. A process according to any of paragraphs 16 to 18, wherein the polymerization is carried out in slurry.
20. A process according to any of paragraphs 16 to 18, wherein the polymerization is carried out in gas phase.

21. A process according to any of paragraphs 16 to 20 further comprising obtaining a polyolefin having a multi-modal GPC trace.
22. A process to make an article comprising forming the olefin polymer obtain from the processof any of paragraphs 16 to 21 into an article.

Experimental

Test Methods

Flexural Properties (1% Secant Flexural Modulus) were measured following ASTM D790-17 (Procedure B) on Instron (Serial #C10201) testing machine using compression molded ASTM Type I specimen at the testing speed of 0.05 or 0.5 in/min Specimens were preconditioned for 40 Hours at 23°±2° C. and 50±10% relative humidity before the testing (ASTM D618-10).

Tensile Properties (tensile stress at yield and tensile stress at break) were measured following ASTM D638-14 on Instron 5966 testing machine using compression molded ASTM Type IV specimen at the testing speed of 2 in/min. Specimens were preconditioned for 40 Hours at 23°±2° C. and 50±10% relative humidity before the testing (ASTM D618-10).

Shear-thinning Index (STI) was determined according to ASTM E3070-18 as the viscosity at the lower frequency (shear rate) divided by the viscosity at the higher frequency (shear rate). Small Amplitude Oscillatory Shear (SAOS) Testing was used to measure the viscoelastic properties of the samples using a rotational rheometer within linear viscoelastic region (typical shear strain of 3 to 6%). Complex viscosities were used in the STI determination and 0.1 rad/s and 100 rad/s were chosen as the lower and higher frequency, respectively.

Notched, Constant Ligament-Stress (NCLS) test was employed to determine the Slow-Crack-Growth Resistance of the samples, following ASTM F2136-18. Specimens were preconditioned for 40 Hours at 23°±2° C. and 50±10% relative humidity before the testing.

Melt Index (MI, $I_2$ or $I_{21.6}$) is determined according to ASTM D-1238 2.16 kg (MI), 190° C.

High Load Melt Index (HLMI, $I_{21}$ or $I_{21.6}$) is determined according to ASTM D-1238 21.6 kg (MI), 190° C.

Density is determined according to ASTM D1505, column density. Samples were molded under ASTM D4703-10a, Procedure C, then conditioned under ASTM D618-08 (23°±2° C. and 50±10% Relative Humidity) for 40 hours before testing.

TREF Method

Unless otherwise indicated, the TREF-LS data are measured using an analytical size TREF instrument (Polymerchar, Spain), with a column of the following dimension: inner diameter (ID) 7.8 mm and outer diameter (OD) 9.53 mm and a column length of 150 mm. The column was filled with steel beads. 0.5 mL of a 6.4% (w/v) polymer solution in orthodichlorobenzene (ODCB) containing 6 g BHT/4 L were charged onto the column and cooled from 140° C. to 25° C. at a constant cooling rate of 1.0° C./min. Subsequently, the ODCB was pumped through the column at a flow rate of 1.0 ml/min and the column temperature was increased at a constant heating rate of 2° C./min to elute the polymer. The polymer concentration in the eluted liquid was detected by means of measuring the absorption at a wavenumber of 2,857 cm$^{-1}$ using an infrared detector. The concentration of the ethylene-α-olefin copolymer in the eluted liquid was calculated from the absorption and plotted as a function of temperature. The molecular weight of the ethylene-α-olefin copolymer in the eluted liquid was measured by light scattering using a Minidawn Tristar light scattering detector (Wyatt, Calif., USA). The molecular weight was also plotted as a function of temperature.

GPC 4D Procedure: Molecular Weight, Comonomer Composition and Long Chain Branching Determination by GPC-IR Hyphenated with Multiple Detectors The distribution and the moments of molecular weight ($M_w$, $M_n$m $M_w/M_n$, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80 μL flow marker (Heptane) added to it. After loading the vial in the autos ampler, polymer is automatically dissolved in the instrument with 8 ml added TCB solvent. The polymer is dissolved at 160° C. with continuous shaking for about 1 hour for PE samples or 2 hour for PP samples. The TCB densities used in concentration calculation are 1.463 g/ml at about 23° C. temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, $\alpha_{PS}$=0.67 and $K_{PS}$=0.000175 while α and K are for other materials as calculated and published in literature (Sun, T. et al. *Macromolecules* 2001, 34, 6812), except that for purposes of this invention and claims thereto, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for linear butene copolymer where w2b is a bulk weight percent of butene comonomer, α is 0.695 and K is 0.000579*(1−0.0075*w2b) for ethylenehexene copolymer where w2b is a bulk weight percent of hexene comonomer, and α is 0.695 and K is 0.000579*(1−0.0077*w2b) for ethyleneoctene copolymer where w2b is a bulk weight percent of octene comonomer, and α=0.695 and K=0.000579 for all other linear ethylene polymers. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000 TC) as a function of molecular weight. The short-chain branch (SCB) content per 1,000 TC (SCB/1000 TC) is then computed as a function of molecular weight by applying a chain-end correction to the $CH_3$/1000 TC function, assuming each chain to be linear and terminated by a methyl group at each end. The wt % comonomer is then obtained from the following expression in which f is 0.3, 0.4, 0.6, 0.8, and so on for $C_3$, $C_4$, $C_6$, $C_8$, and so on co-monomers, respectively:

$$w2 = f * SCB/1000 \ TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000 TC as a function of molecular weight, is applied to obtain the bulk CH3/1000 TC. A bulk methyl chain ends per 1,000 TC (bulk CH3end/1000 TC) is obtained by weight-averaging the chain-end correction over the molecular-weight range. Then $$w2b = f * \text{bulk CH3/1000 TC}$$

bulk SCB/1000 TC=bulk CH3/1000 TC−bulk CH3end/1000 TC and bulk SCB/1000 TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $f$, c is the polymer concentration determined from the IR5 analysis, A2 is the second virial coefficient, P(θ) is the form factor for a monodisperse random coil, and Ko is the optical constant for the system:

$$K_o = \frac{4\pi^2 n^2 (dn/dc)^2}{\lambda^4 N_A},$$

where NA is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, |dn/dc=0.1048 ml/mg and A2=0.0015; for analyzing ethylene-butene copolymers, dn/dc=0.1048*(1−0.00126*w2) ml/mg and A2=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, ηs, for the solution flowing through the viscometer is calculated from their outputs. The intrinsic viscosity, [η], at each point in the chromatogram is calculated from the equation [η]=res/c, where c is concentration and is determined from the IR5 broadband channel output. The viscosity MW at each point is calculated as $$M = K_{PS} M^{\alpha_{PS}+1}/[\eta], \text{ where } \alpha_{ps} \text{ is 0.67 and } K_{ps} \text{ is 0.000175}.$$

The branching index ($g'_{vis}$) is calculated using the output of the GPC-IR5-LS-VIS method as follows. The average intrinsic viscosity, [η]avg, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ defined as $$g'_{vis} = \frac{[\eta]_{avg}}{KM_v^\alpha},$$

where Mv is the viscosity-average molecular weight based on molecular weights determined by LS analysis and the K and α are for the reference linear polymer, which are, for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, α is 0.695 and K is 0.000579*(1−0.0077*w2b) for ethylene-octene copolymer where w2b is a bulk weight percent of octene comonomer, and α=0.695 and K=0.000579 for all other linear ethylene polymers. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc.):

$$x2 = -\frac{200w2}{-100n - 2w2 + nw2}.$$

Then the molecular-weight distribution, W(z) where $z = \log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W' dz,$$

and a modified weight-average molecular weight ($M_w'$) is calculated over the effectively reduced range of molecular weights as follows:

$$M_w' = \int_{-\infty}^{\infty} 10^z * W' dz.$$

The RCI,m is then computed as $$RCI, m = \int_{-\infty}^{\infty} x2(10^z - M_w') W' dz.$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100} (10^z - M_w') W' dz.$$

In the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)},$$

$$CDR\text{-}2, w = \frac{w2(Mz)}{w2\left(\frac{Mw + Mn}{2}\right)},$$

$$CDR\text{-}3, w = \frac{w2\left(\frac{Mz + Mw}{2}\right)}{w2\left(\frac{Mw + Mn}{2}\right)},$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as $$CDR\text{-}1, m = \frac{x2(Mz)}{x2(Mw)},$$

$$CDR\text{-}2, m = \frac{x2(Mz)}{x2\left(\frac{Mw + Mn}{2}\right)},$$

$$CDR\text{-}3, m = \frac{x2\left(\frac{Mz + Mw}{2}\right)}{x2\left(\frac{Mw + Mn}{2}\right)},$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

Cross-Fractionation Chromatography (CFC)

Cross-fractionation chromatography (CFC) analysis was done using a CFC-2 instrument from *Polymer Char*, S. A., Valencia, Spain. The principles of CFC analysis and a general description of the particular apparatus used are given in the article by Ortin, A.; Monrabal, B.; Sancho-Tello, 257 *J. Macromol. Symp.* V.13 (2007). A general schematic of the apparatus used is shown in FIG. 1 of this article. Pertinent details of the analysis method and features of the apparatus used are as follows.

The solvent used for preparing the sample solution and for elution was 1,2-dichlorobenzene (ODCB) which was stabilized by dissolving 2 g of 2,6-bis(1,1-dimethylethyl)-4-methylphenol (butylated hydroxytoluene) in a 4-L bottle of fresh solvent at ambient temperature. The sample to be analyzed (25-125 mg) was dissolved in the solvent (25 ml metered at ambient temperature) by stirring (200 rpm) at 150° C. for 75 min. A small volume (0.5 ml) of the solution was introduced into a TREF column (stainless steel; o.d., ⅜"; length, 15 cm; packing, non-porous stainless steel micro-balls) at 150° C., and the column temperature was stabilized for 30 min at a temperature (120-125° C.) approximately 20° C. higher than the highest-temperature fraction for which the GPC analysis was included in obtaining the final bivariate distribution. The sample volume was then allowed to crystallize in the column by reducing the temperature to an appropriate low temperature (30, 0, or −15° C.) at a cooling rate of 0.2° C./min. The low temperature was held for 10 min before injecting the solvent flow (1 ml/min) into the TREF column to elute the soluble fraction (SF) into the GPC columns (3× PLgel 10 μm Mixed-B 300×7.5 mm, Agilent Technologies, Inc.); the GPC oven was held at high temperature (140° C.). The SF was eluted for 5 min from the TREF column and then the injection valve was put in the "load" position for 40 min to completely elute all of the SF through the GPC columns (standard GPC injections). All subsequent higher-temperature fractions were analyzed using overlapped GPC injections wherein at each temperature step the polymer was allowed to dissolve for at least 16 min and then eluted from the TREF column into the GPC column for 3 min. The IR4 (Polymer Char) infrared detector was used to generate an absorbance signal that is proportional to the concentration of polymer in the eluting flow.

The universal calibration method was used for determining the molecular weight distribution (MWD) and molecular-weight averages ($M_n$, $M_w$, etc.) of eluting polymer fractions. Thirteen narrow molecular-weight distribution polystyrene standards (obtained from Agilent Technologies, Inc.) within the range of 1.5-8200 kg/mol were used to generate a universal calibration curve. Mark-Houwink parameters were obtained from Appendix I of Mori, S.; Barth, H. G. *Size Exclusion Chromatography*; Springer, 1999. For polystyrene K=1.38×10$^{-4}$ dl/g and α=0.7; and for polyethylene K=5.05×10$^{-4}$ dl/g and α=0.693 were used. For a polymer fraction, which eluted at a temperature step, that has a weight fraction (weight % recovery) of less than 0.5%, the MWD and the molecular-weight averages were not computed; additionally, such polymer fractions were not included in computing the MWD and the molecular-weight averages of aggregates of fractions.

Measuring Tw1, Tw2, Mw1 and Mw2 from CFC

A new technique has been developed for determining both MWD and SCBD compositional information, using cryogenic cross fractionation (cryo CFC), to compare the experimental polymers to competitive products on the market. The procedures for the determination of CFC data are discussed in more detail below.

Figure 2:
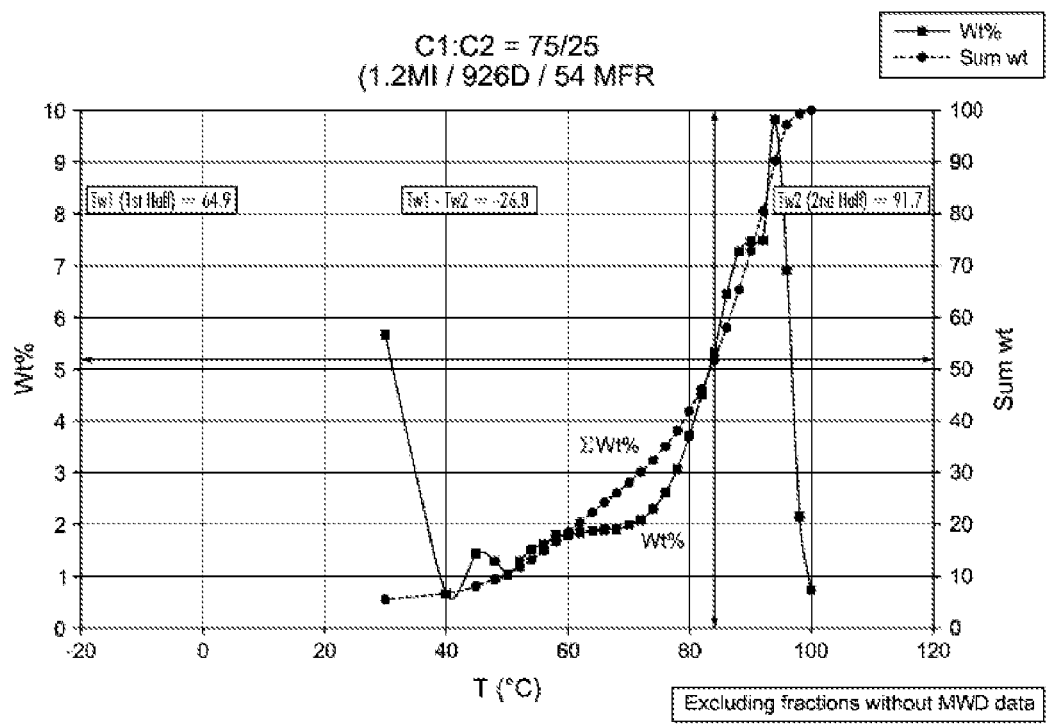
FIG. 2 is a plot illustrating the calculations used to determine CFC results where, the x-axis represents the elution temperature in centigrade, while the right hand y-axis represents the value of the integral of the weights of polymer that have been eluted up to an elution temperature.
Figure 3:
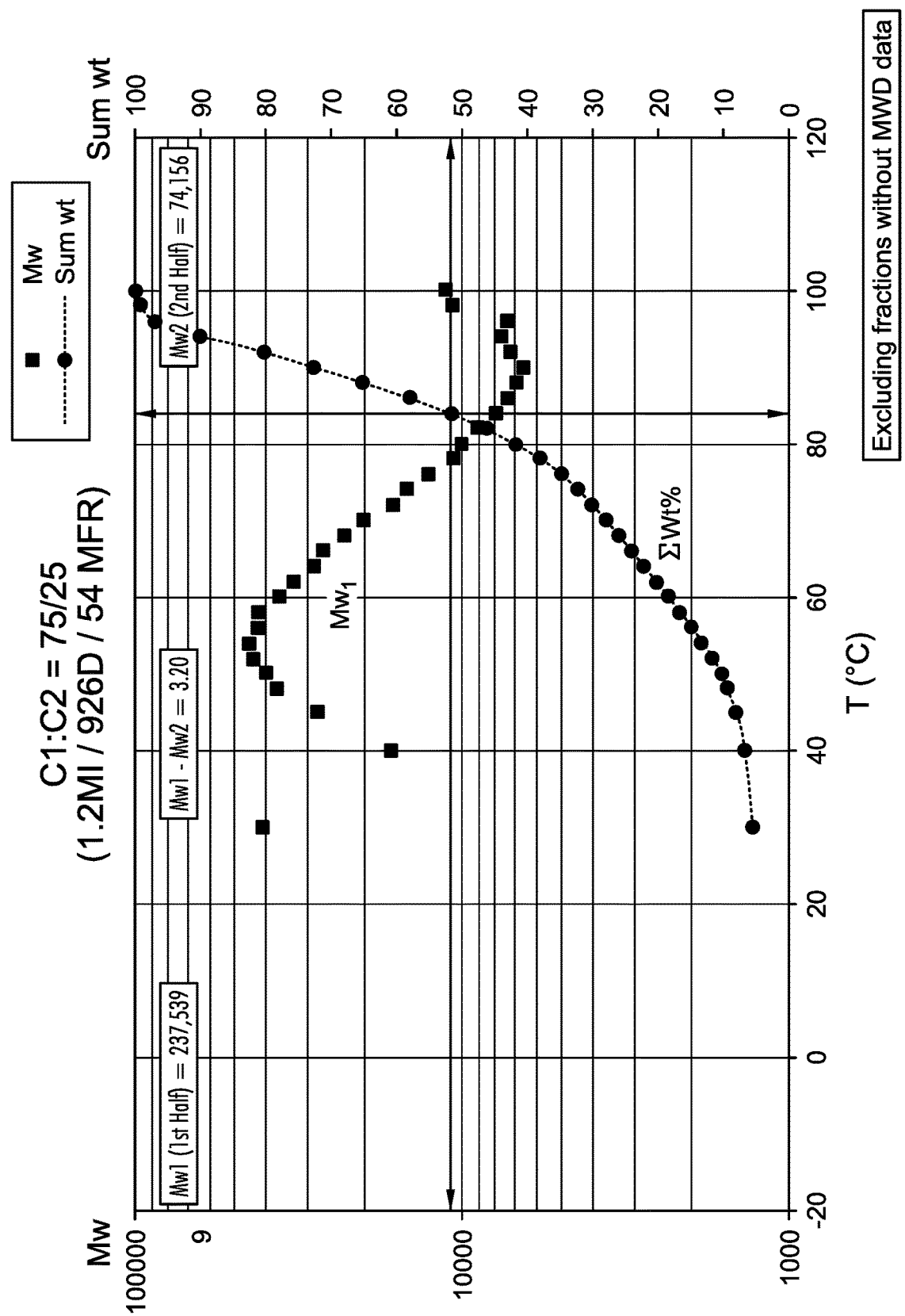
FIG. 3 is a plot illustrating the calculations used to determine CFC results where, the x-axis represents the elution temperature in centigrade, while the right hand y-axis represents the value of the integral of the weights of polymer that have been eluted up to an elution temperature.
Figure 4:
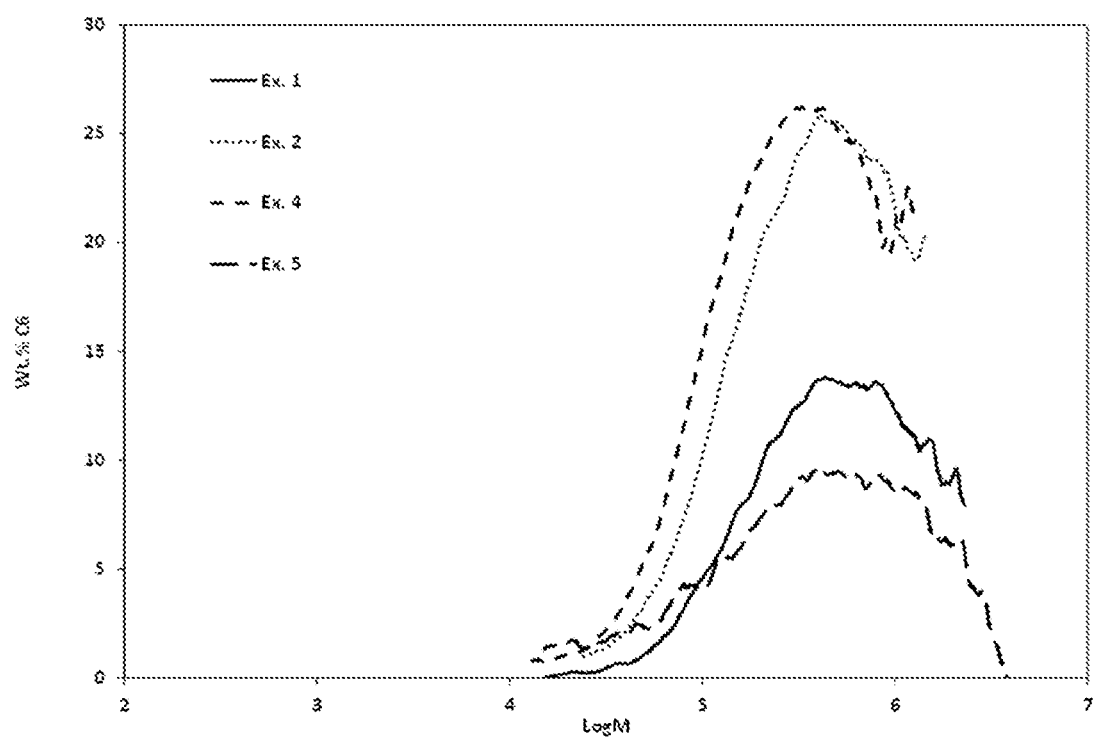
FIG. 4 is an overlay of GPC plots for hexene content for examples 1, 2, 4 and 5.

In the section of "Fraction summary" in the CFC data file, each fraction is listed by its fractionation temperature (Ti) along with its normalized wt. % value (Wi), cumulative wt. %, i.e., Sum wt. on FIG. 2 and FIG. 3, and various moments of molecular weight averages (including weight average molecular weight, Mwi).

FIG. 2 and FIG. 3 are plots that graphically illustrate the calculations used to determine the CFC result. Only fractions having MWD data are considered. In both FIG. 2 and FIG. 3, the x-axis represents the elution temperature in centigrade, while the right hand y-axis represents the value of the integral of the weights of polymer that have been eluted up to an elution temperature. The temperature at which 100% of the material has eluted in this example is about 100° C. The closest point at which 50% of the polymer has eluted is determined by the integral, which is used then to divide each of the plots into a $1^{st}$-half and a $2^{nd}$-half.

To calculate values of Tw1, Tw2, Mw1 and Mw2, the data in "Fraction summary" was divided into two roughly equal halves. Weight averages of Ti and Mwi; for each half were calculated according to the conventional definition of weight average. Fractions which did not have sufficient quantity (i.e., <0.5 wt. %) to be processed for molecular weight averages in the original data file were excluded from the calculation of Tw1, Tw2, Mw1 and Mw2.

The first part of the process is illustrated by FIG. 2. From the section of fraction summary in the CFC data file, the fraction whose cumulative wt. % (i.e., Sum wt) is closest to 50 is identified (e.g., the fraction at 84° C. on FIG. 2). The Fraction summary data is divided into two halves, e.g., Ti<=84° C. as the 1st half and Ti>84° C. as the 2nd half on FIG. 2. Fractions which do not have molecular weight averages reported in the original data file are excluded, e.g., excluding the fractions with Ti between 25° C. and 40° C. on FIG. 2.

In FIG. 2, the left hand y-axis represents the wt % of the eluted fraction. Using the procedure above to divide the curves into two halves, these values are used to calculate the weight average elution temperature for each half using the formula shown in Eqn. 1.

$$Tw = \frac{\sum TiWi}{\sum Wi} \qquad \text{Eqn. 1}$$

In Eqn. 1, Ti represents the elution temperature for each eluted fraction, and Wi represents the normalized weight % (polymer amount) of each eluted fraction. For the example shown in FIG. 2, this provides a weight average elution temperature of 64.9° C. for the first half, and 91.7° C. for the second half.

In FIG. 3, the left hand axis represents the weight average molecular weight (Mwj) of each eluted fraction. These values are used to calculate the weight average molecular weight for each half using the formula shown in Eqn. 2.

$$Mw = \frac{\sum MwiWi}{\sum Wi} \qquad \text{Eqn. 2}$$

In Eqn. 2, Mw; represents the weight average molecular weight of each eluted fraction, and Wj represents the normalized weight % (polymer amount) of each eluted fraction. For the example shown in FIG. 3, this provides a weight average molecular weight of 237,539 g/mole for the first half, and 74,156 g/mole for the second half. The values calculated using the techniques described above may be used to classify the MWDxSCBD for experimental polymers and control polymers.

Unless otherwise indicated, room/ambient temperature is approximately 23° C.

Materials

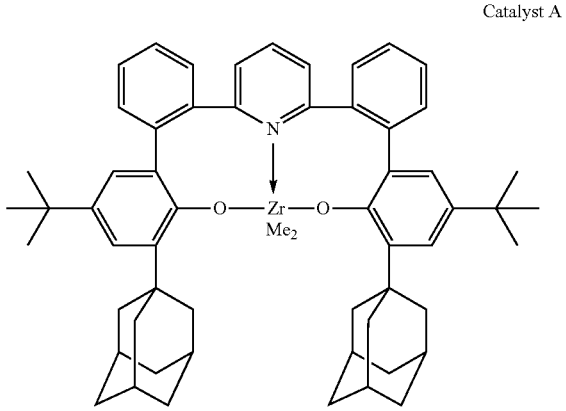

Catalyst A

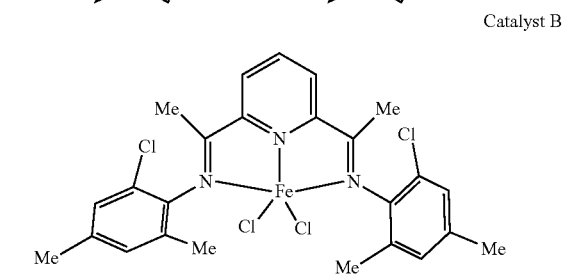

Catalyst B

ES70™ silica was obtained from PQ Corporation (Conshohocken, Pa.).

Methylalumoxane (MAO) was obtained from Grace (15 wt % in toluene).

AL55-003™ HDPE is a high denesity polyethylene resin available from ExxonMobil Chemical Company (Houston, Tex.) having a density of 0.954 g/cc and a melt index of 0.30 g/10 min.

HYA-600™ HDPE is a high denesity polyethylene resin available from ExxonMobil Chemical Company (Houston, Tex.) having a density of 0.954 g/cc and a melt index of 0.35 g/10 min.

Evolue™ H SP5505™ HDPE is a high denesity polyethylene resin available from Prime Polymer Co. having a density of 0.951 g/cc and a melt index of 0.28 g/10 min.

Marlex™ HHN 5502 BN™ HDPE is a high denesity polyethylene resin available from Chevron Phillips Chemical Company, Houston Tex.) having a density of 0.955 g/cc and a melt index of 0.35 g/10 min.

General Considerations and Reagents

All manipulations were performed under an inert atmosphere using glove box techniques unless otherwise stated. Toluene and Pentane (Sigma Aldrich) were degassed and dried over 3 Å molecular sieves overnight prior to use. Methylalumoxane was purchased from Grace and used as received.

Catalyst A (dimethylzirconium[2',2'''-(pyridine-2,6-diyl) bis(3-adamantan-1-yl)-5-(tert-butyl)-[1,1'-biphenyl]-2-olate]) was prepared as follows.

2-(Adamantan-1-yl)-6-bromo-4-(tert-butyl)phenol

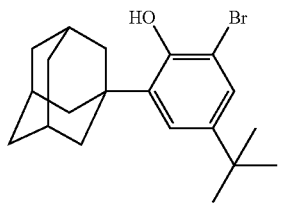 [SMILES: CC(C)(C)c1cc(Br)c(O)c(C23CC4CC(CC(C4)C2)C3)c1]

To a solution of 57.6 g (203 mmol) of 2-(adamantan-1-yl)-4-(tert-butyl)phenol in 400 ml of chloroform a solution of 10.4 ml (203 mmol) of bromine in 200 ml of chloroform was added dropwise for 30 minutes at room temperature. The resulting mixture was diluted with 400 ml of water. The obtained mixture was extracted with dichloromethane (3×100 ml), the combined organic extract was washed with 5% NaHCO₃, dried over Na₂SO₄, and then evaporated to dryness. Yield 71.6 g (97%) of a white solid. $^1$H NMR (CDCl₃, 400 MHz): δ 7.32 (d, J=2.3 Hz, 1H), 7.19 (d, J=2.3 Hz, 1H), 5.65 (s, 1H), 2.18-2.03 (m, 9H), 1.78 (m, 6H), 1.29 (s, 9H). $^{13}$C NMR (CDCl₃, 100 MHz): δ 148.07, 143.75, 137.00, 126.04, 123.62, 112.11, 40.24, 37.67, 37.01, 34.46, 31.47, 29.03.

1-(3-bromo-5-(tert-butyl)-2-(methoxymethoxy)phenyl)adamantane

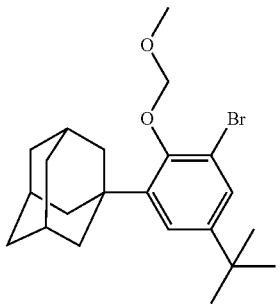 [SMILES: COCOc1c(Br)cc(C(C)(C)C)cc1C12CC3CC(CC(C3)C1)C2]

To a solution of 71.6 g (197 mmol) of 2-(adamantan-1-yl)-6-bromo-4-(tert-butyl)phenol in 1,000 ml of THF 8.28 g (207 mmol, 60% wt. in mineral oil) of sodium hydride was added portionwise at room temperature. To the resulting suspension 16.5 ml (217 mmol) of methoxymethyl chloride was added dropwise for 10 minutes at room temperature. The obtained mixture was stirred overnight, then poured into 1,000 ml of water. The obtained mixture was extracted with dichloromethane (3×300 ml), the combined organic extract was washed with 5% NaHCO₃, dried over Na₂SO₄ and then evaporated to dryness. Yield 80.3 g (~quant.) of a white solid. $^1$H NMR (CDCl₃, 400 MHz): δ 7.39 (d, J=2.4 Hz, 1H), 7.27 (d, J=2.4 Hz, 1H), 5.23 (s, 2H), 3.71 (s, 3H), 2.20-2.04 (m, 9H), 1.82-1.74 (m, 6H), 1.29 (s, 9H). $^{13}$C NMR (CDCl₃, 100 MHz): δ 150.88, 147.47, 144.42, 128.46, 123.72, 117.46, 99.53, 57.74, 41.31, 38.05, 36.85, 34.58, 31.30, 29.08.

(2-(3-adamantan-1-yl)-5-(tert-butyl)-2-(methoxymethoxy)phenyl)-4,4,5,5-tetramethyl-1,3,2-dioxaborolane

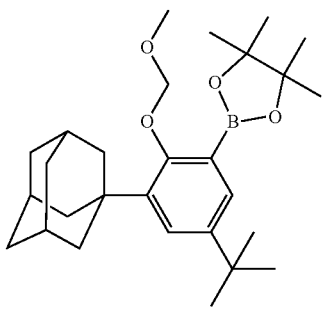 [SMILES: COCOc1c(B2OC(C)(C)C(C)(C)O2)cc(C(C)(C)C)cc1C12CC3CC(CC(C3)C1)C2]

To a solution of 22.5 g (55.0 mmol) of 1-(3-bromo-5-(tert-butyl)-2-(methoxymethoxy)phenyl)adamantane in 300 ml of dry THF 23.2 ml (57.9 mmol, 2.5 M) of $^n$BuLi in hexanes was added dropwise for 20 minutes at −80° C. The reaction mixture was stirred at this temperature for 1 hour followed by addition of 14.5 ml (71.7 mmol) of 2-isopropoxy-4,4,5,5-tetramethyl-1,3,2-dioxaborolane. The obtained suspension was stirred at room temperature for 1 hour, then poured into 300 ml of water. The obtained mixture was extracted with dichloromethane (3×300 ml), the combined organic extract was dried over Na₂SO₄, and then evaporated to dryness. Yield 25.0 g (~quant.) of a colorless viscous oil. ¹H NMR (CDCl₃, 400 MHz): δ 7.54 (d, J=2.5 Hz, 1H), 7.43 (d, J=2.6 Hz, 1H), 5.18 (s, 2H), 3.60 (s, 3H), 2.24-2.13 (m, 6H), 2.09 (br. s., 3H), 1.85-1.75 (m, 6H), 1.37 (s, 12H), 1.33 (s, 9H). ¹³C NMR (CDCl₃, 100 MHz): δ 159.64, 144.48, 140.55, 130.58, 127.47, 100.81, 83.48, 57.63, 41.24, 37.29, 37.05, 34.40, 31.50, 29.16, 24.79.

1-(2'-Bromo-5-(tert-butyl)-2-(methoxymethoxy)-[1,1'-biphenyl]-3-yl)adamantane

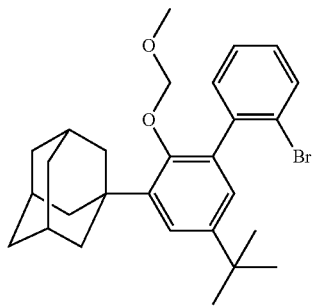 [SMILES: COCOc1c(-c2ccccc2Br)cc(C(C)(C)C)cc1C12CC3CC(CC(C3)C1)C2]

To a solution of 25.0 g (55.0 mmol) of (2-(3-adamantan-1-yl)-5-(tert-butyl)-2-(methoxymethoxy)phenyl)-4,4,5,5-tetramethyl-1,3,2-dioxaborolane in 200 ml of dioxane 15.6 g (55.0 mmol) of 2-bromoiodobenzene, 19.0 g (137 mmol) of potassium carbonate, and 100 ml of water were subsequently added. The mixture obtained was purged with argon for 10 minutes followed by addition of 3.20 g (2.75 mmol) of Pd(PPh₃)₄. Thus obtained mixture was stirred for 12 hours at 100° C., then cooled to room temperature and diluted with 100 ml of water. The obtained mixture was extracted with dichloromethane (3×100 ml), the combined organic extract was dried over Na₂SO₄ and then evaporated to dryness. The residue was purified by flash chromatography on silica gel 60 (40-63 um, eluent: hexane-dichloromethane=10:1, vol.). Yield 23.5 g (88%) of a white solid. ¹H NMR (CDCl₃, 400 MHz): δ 7.68 (dd, J=1.0, 8.0 Hz, 1H), 7.42 (dd, J=1.7, 7.6 Hz, 1H), 7.37-7.32 (m, 2H), 7.20 (dt, J=1.8, 7.7 Hz, 1H), 7.08 (d, J=2.5 Hz, 1H), 4.53 (d, J=4.6 Hz, 1H), 4.40 (d, J=4.6 Hz, 1H), 3.20 (s, 3H), 2.23-2.14 (m, 6H), 2.10 (br. s., 3H), 1.86-1.70 (m, 6H), 1.33 (s, 9H). ¹³C NMR (CDCl₃, 100 MHz): δ 151.28, 145.09, 142.09, 141.47, 133.90, 132.93, 132.41, 128.55, 127.06, 126.81, 124.18, 123.87, 98.83, 57.07, 41.31, 37.55, 37.01, 34.60, 31.49, 29.17.

2-(3'-(Adamantan-1-yl)-5'-(tert-butyl)-2'-(methoxymethoxy)-[1,1'-biphenyl]-2-yl)-4,4,5,5-tetramethyl-1,3,2-dioxaborolane

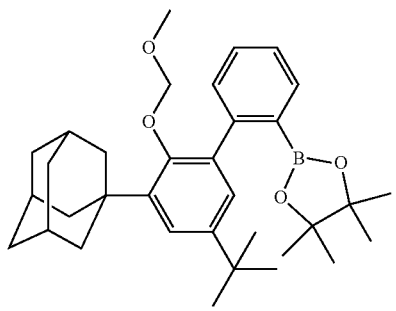 [SMILES: COCOc1c(-c2ccccc2B2OC(C)(C)C(C)(C)O2)cc(C(C)(C)C)cc1C12CC3CC(CC(C3)C1)C2]

To a solution of 30.0 g (62.1 mmol) of 1-(2'-bromo-5-(tert-butyl)-2-(methoxymethoxy)-[1,1'-biphenyl]-3-yl)adamantane in 500 ml of dry THF 25.6 ml (63.9 mmol, 2.5 M) of ⁿBuLi in hexanes was added dropwise for 20 minutes at −80° C. The reaction mixture was stirred at this temperature for 1 hour followed by addition of 16.5 ml (80.7 mmol) of 2-isopropoxy-4,4,5,5-tetramethyl-1,3,2-dioxaborolane. The obtained suspension was stirred at room temperature for 1 hour, then poured into 300 ml of water. The obtained mixture was extracted with dichloromethane (3×300 ml), the combined organic extract was dried over Na₂SO₄ and then evaporated to dryness. Yield 32.9 g (~quant.) of a colorless glassy solid. ¹H NMR (CDCl₃, 400 MHz): δ 7.75 (d, J=7.3 Hz, 1H), 7.44-7.36 (m, 1H), 7.36-7.30 (m, 2H), 7.30-7.26 (m, 1H), 6.96 (d, J=2.4 Hz, 1H), 4.53 (d, J=4.7 Hz, 1H), 4.37 (d, J=4.7 Hz, 1H), 3.22 (s, 3H), 2.26-2.14 (m, 6H), 2.09 (br. s., 3H), 1.85-1.71 (m, 6H), 1.30 (s, 9H), 1.15 (s, 6H), 1.10 (s, 6H). ¹³C NMR (CDCl₃, 100 MHz): δ 151.35, 146.48, 144.32, 141.26, 136.15, 134.38, 130.44, 129.78, 126.75, 126.04, 123.13, 98.60, 83.32, 57.08, 41.50, 37.51, 37.09, 34.49, 31.57, 29.26, 24.92, 24.21.

(2',2'''-(Pyridine-2,6-diyl)bis((3-adamantan-1-yl)-5-(tert-butyl)-[1,1'-biphenyl]-2-ol))

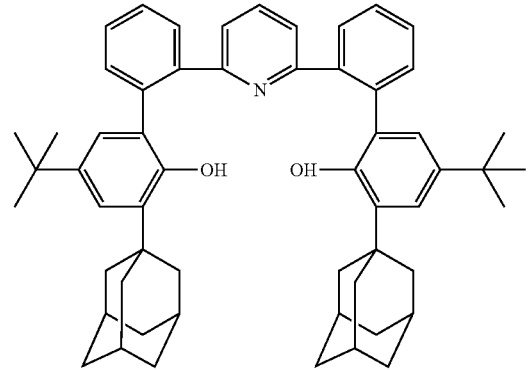 [SMILES: CC(C)(C)c1cc(-c2ccccc2-c2cccc(-c3ccccc3-c3cc(C(C)(C)C)cc(C45CC6CC(CC(C6)C4)C5)c3O)n2)c(O)c(C23CC4CC(CC(C4)C2)C3)c1]

To a solution of 32.9 g (62.0 mmol) of 2-(3'-(adamantan-1-yl)-5'-(tert-butyl)-2'-(methoxymethoxy)-[1,1'-biphenyl]-2-yl)-4,4,5,5-tetramethyl-1,3,2-dioxaborolane in 140 ml of dioxane 7.35 g (31.0 mmol) of 2,6-dibromopyridine, 50.5 g (155 mmol) of cesium carbonate and 70 ml of water were subsequently added. The mixture obtained was purged with argon for 10 minutes followed by addition of 3.50 g (3.10 mmol) of Pd(PPh₃)₄. This mixture was stirred for 12 hours at 100° C., then cooled to room temperature and diluted with 50 ml of water. The obtained mixture was extracted with dichloromethane (3×50 ml), the combined organic extract was dried over Na₂SO₄ and then evaporated to dryness. To the resulting oil 300 ml of THF, 300 ml of methanol, and 21 ml of 12 N HCl were subsequently added. The reaction mixture was stirred overnight at 60° C. and then poured into 500 ml of water. The obtained mixture was extracted with dichloromethane (3×350 ml), the combined organic extract was washed with 5% NaHCO₃, dried over Na₂SO₄, and then evaporated to dryness. The residue was purified by flash chromatography on silica gel 60 (40-63 um, eluent: hexane-ethyl acetate=10:1, vol.). The obtained glassy solid was triturated with 70 ml of n-pentane, the precipitate obtained was filtered off, washed with 2×20 ml of n-pentane, and dried in vacuo. Yield 21.5 g (87%) of a mixture of two isomers as a white powder. $^1$H NMR (CDCl$_3$, 400 MHz): δ 8.10+6.59 (2s, 2H), 7.53-7.38 (m, 10H), 7.09+7.08 (2d, J=2.4 Hz, 2H), 7.04+6.97 (2d, J=7.8 Hz, 2H), 6.95+6.54 (2d, J=2.4 Hz), 2.03-1.79 (m, 18H), 1.74-1.59 (m, 12H), 1.16+1.01 (2s, 18H). $^{13}$C NMR (CDCl$_3$, 100 MHz, minor isomer shifts labeled with *): δ 157.86, 157.72*, 150.01, 149.23*, 141.82*, 141.77, 139.65*, 139.42, 137.92, 137.43, 137.32*, 136.80, 136.67*, 136.29*, 131.98*, 131.72, 130.81, 130.37*, 129.80, 129.09*, 128.91, 128.81*, 127.82*, 127.67, 126.40, 125.65*, 122.99*, 122.78, 122.47, 122.07*, 40.48, 40.37*, 37.04, 36.89*, 34.19*, 34.01, 31.47, 29.12, 29.07*.

Dimethylzirconium(2',2'''-(Pyridine-2,6-diyl)bis((3-adamantan-1-yl)-5-(tert-butyl)-[1,1'-biphenyl]-2-olate)) (Complex 5089)

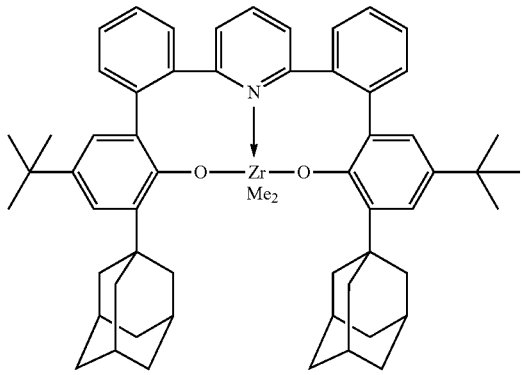

To a suspension of 2.92 g (12.56 mmol) of zirconium tetrachloride in 300 ml of dry toluene 18.2 ml (52.7 mmol, 2.9 M) of MeMgBr in diethyl ether was added in one portion via syringe at 0° C. To the resulting suspension 10.00 g (12.56 mmol) of (2',2'''-(Pyridine-2,6-diyl)bis((3-adamantan-1-yl)-5-(tert-butyl)-[1,1'-biphenyl]-2-oil) was immediately added in one portion. The reaction mixture was stirred for 2 hours at room temperature and then evaporated to near dryness. The solid obtained was extracted with 2×100 ml of hot toluene, and the combined organic extract was filtered through a thin pad of Celite 503. Next, the filtrate was evaporated to dryness. The residue was triturated with 50 ml of n-hexane, the obtained precipitate was filtered off (G3), washed with n-hexane (2×20 ml), and then dried in vacuo. Yield 8.95 g (74%, ~1:0.5 solvate with n-hexane) of a beige solid. Anal. Calc. for C$_{59}$H$_{69}$ZrNO$_2$×0.5(C$_6$H$_{14}$): C, 77.69; H, 7.99; N, 1.46. Found: C 77.90; H, 8.15; N 1.36. $^1$H NMR (C$_6$D$_6$, 400 MHz): δ 7.56 (d, J=2.6 Hz, 2H), 7.20-7.17 (m, 2H), 7.14-7.07 (m, 4H), 7.07 (d, J=2.5 Hz, 2H), 6.98-6.94 (m, 2H), 6.52-6.34 (m, 3H), 2.65-2.51 (m, 6H), 2.49-2.36 (m, 6H), 2.19 (br.s., 6H), 2.07-1.93 (m, 6H), 1.92-1.78 (m, 6H), 1.34 (s, 18H), 0.09 (s, 6H). $^{13}$C NMR (C$_6$D$_6$, 100 MHz): δ 159.20, 158.22, 143.79, 140.60, 139.55, 138.05, 133.77, 133.38, 133.04, 131.49, 131.32, 127.94, 125.78, 124.65, 124.52, 42.87, 41.99, 38.58, 37.86, 34.82, 32.34, 30.04.

Catalyst B was preppared as follows:

(1E,1'E)-1,1'-pyridine-2,6-diyl)bis(N-(2-chloro-4,6-dimethylphenyl)ethan-1-imine 2,6-bisacetyl pyridine (4.409 g, 0.027 mol) and 2-chloro-4,6-dimethylaniline (9.252 g, 0.059 mol) were dissolved in ethanol and few drops of acetic acid were added to the mixture and the reaction mixture was refluxed for 3 days resulting in the formation of mono-substituted derivative. Another equivalent of aniline was added and refluxed in toluene in the presence of molecular sieves. The crude was filtered out and the solvent was dried under vacuum. The crude material was dissolved in minimal amount of toluene and product was crystallized out as a yellow solid. The product was isolated and washed with cold pentane and dried under vacuum (2.598 g, 60%). $^1$H NMR (400 MHz, CD$_2$Cl$_2$, ppm) δ: 8.50, 7.99, 7.15, 7.03, 2.35, 2.10.

2,6-bis-[1-(2-chloro-4,6-dimethylphenylimino)ethyl] pyridine Iron dichloride (Catalyst B)

(1E,1'E)-1,1'-pyridine-2,6-diyl)bis(N-(2-chloro-4,6-dimethylphenyl)ethan-1-imine ligand (4.710, 0.01 mol) was dissolved in THF (100 ml) and FeCl$_2$ (1.362, 0.01 mol) was added to the solution of ligand in one portion. The reaction mixture was allowed to stir overnight at room temperature under the atmosphere of N$_2$. The reaction mixture turned to dark blue instantly. The solvent from the reaction mixture was dried under vacuum resulting in a dark blue precipitate. The crude material was again dissolved in 50 ml of dichloromethane (DCM) and allowed to stir overnight to extract maximum amount of product. The dark blue crude solution was passed thought a glass filter to remove insoluble impurities. Excess DCM was removed under vacuum. The product was washed with 3×50 ml of hexane, in which the product was insoluble and it helps to remove any starting material from the complex. The intensively dark solid was dried again under vacuum to remove residual solvent yielding 3.2 g (52.7%) of blue solid. $^1$H NMR (400 MHz, CD$_2$Cl$_2$, ppm) δ: −23.25, −20.95, 0.90, 2.34, 3.77, 5.38, 9.09, 12.34, 15.38, 18.54, 19.51, 22.46, 32.28, 33.34.

Support of Catalysts A and B on Silica (50:50)

ES70™ Silica (38.9 g) was loaded in a Celestir™ followed by the addition of 200 ml of toluene. The mixture was stirred for few seconds to achieve homogeneity. MAO (47.0 g) was added through the side arm slowly over 15 minutes with constant stirring. The mixture was allowed to stir for 2 hours at room temperature under N$_2$. Then Catalyst B, 0.599 g (20 micromol) and Catalyst A, 0.970 g (20 micromol) were added to the reaction mixture as one portion and allowed to stir overnight at room temperature. The slurry was filtered through glass frit and washed with toluene (100 ml) and followed by pentane (200 ml). Then the supported catalyst was then dried under vacuum overnight yields white free flowing solid of approximately 53 g.

Support of Catalysts A and B on Silica (80:20)

ES70™ Silica (38.9 g) was loaded in a Celestir™ followed by the addition of 200 ml of toluene. The mixture was stirred for few seconds to achieve homogeneity. MAO (47.0 g) was added through the side arm slowly over 15 minutes with constant stirring. The mixture was allowed to stir for 2 hours at room temperature under N$_2$. Then Catalyst B, 0.240 g (8 micromol) and Catalyst A, 1.53 g (32 micromol) were added to the reaction mixture as one portion and allowed to stir overnight at room temperature. The slurry was filtered through glass frit and washed with toluene (100 ml) and followed by pentane (200 ml). Then the supported catalyst was then dried under vacuum overnight yields white free flowing solid of approximately 53 g.

Polymerization

Polymerization was performed in a 7 foot tall gas-phase fluidized bed reactor with a 4 foot tall 6" diameter body and a 3 foot tall 10" diameter expanded section. Cycle and feed gases were fed into the reactor body through a perforated distributor plate, and the reactor was controlled at 300 psi and 70 mol % ethylene. Reactor temperature was maintained by heating the cycle gas. Supported catalyst was fed as a 10 wt % slurry in Sono Jell® from Sonneborn (Parsippany, N.J.). The slurry was delivered to the reactor by nitrogen and isopentane feeds in a ⅛" diameter catalyst probe. Polymer was collected from the reactor as necessary to maintain the desired bed weight. Average process conditions for the polymer collection are shown in Table 1 below.

The run began with no hydrogen or hexane feeds to the reactor, and any hydrogen produced was produced by catalyst. Comonomer (1-hexene) was then introduced and the product was allowed to stabilize before collecting data. Polymer characterization data are reported in Table 2.

TABLE 1

Average process conditions for collection

| | Example 1 | Example 2 | Example 3 | Example 4 | Example 5 |
|---|---|---|---|---|---|
| PROCESS DATA | | | | | |
| H2 conc. (molppm) | 206 | 800 | 3832 | 4003 | 4996 |
| Hydrogen flow (sccm) | 4.00 | 17.75 | 104.08 | 52.82 | 159.81 |
| C6/C2 Ratio (mol %/mol %) | 0.018 | 0.033 | 0.032 | 0.031 | 0.007 |
| Comonomer conc. (mol %) | 1.23 | 2.30 | 2.24 | 1.55 | 0.53 |
| C2 conc. (mol %) | 70.1 | 70.4 | 70.1 | 50.0 | 70.1 |
| Comonomer/C2 Flow Ratio | 0.038 | 0.075 | 0.075 | 0.072 | 0.020 |
| C2 flow (g/hr) | 1474 | 1422 | 1575 | 606 | 1926 |
| H2/C2 Ratio | 2.9 | 11.4 | 54.7 | 80.0 | 71.2 |
| Rx. Pressure (psig) | 300 | 300 | 300 | 300 | 300 |
| Reactor Temp (F) | 185 | 185 | 185 | 185 | 185 |
| Avg. Bedweight (g) | 2436 | 2434 | 2331 | 2333 | 2343 |
| Production (g/hr) | 306 | 239 | 290 | 211 | 416 |
| Residence Time (hr) | 8.0 | 10.2 | 8.0 | 11.1 | 5.6 |
| C2 Utilization (gC2/gC2 poly) | 4.82 | 5.95 | 5.42 | 2.88 | 4.63 |
| Avg Velocity (ft/s) | 1.42 | 1.46 | 1.55 | 1.53 | 1.55 |
| Catalyst Slurry Feed (ml/hr) | 1.9 | 1.8 | 2.0 | 2.4 | 2.3 |
| Catalyst Slurry Conc. (wt frac.) | 0.1 | 0.1 | 0.1 | 0.1 | 0.1 |
| Catalyst Slurry Density (g/ml) | 0.88 | 0.88 | 0.88 | 0.88 | 0.88 |
| Catalyst Feed (g/hr) | 0.171 | 0.159 | 0.175 | 0.209 | 0.201 |
| Cat Activity (g poly/g cat) | 1786 | 1503 | 1658 | 1005 | 2070 |
| Bulk Density | 0.3451 | 0.3173 | 0.3101 | 0.2850 | 0.3490 |

TABLE 2

| | Example 1 | Example 2 | Example 3 | Example 4 | Example 5 |
|---|---|---|---|---|---|
| Catalyst A/Catalyst B | (50:50) | (50:50) | (50:50) | (50:50) | (80:20) |
| $I_2$ (g/10 min) | 11.5 | ~ | 27.2 | ~ | ~ |
| $I_{21}$ (g/10 min) | ~ | ~ | ~ | ~ | 16.2 |
| $I_{21}/I_2$ | ~ | ~ | ~ | ~ | ~ |

TABLE 2-continued

| | Example 1 | Example 2 | Example 3 | Example 4 | Example 5 |
|---|---|---|---|---|---|
| Density (g/cm³) | 0.9636 | ~ | 0.9568 | | 0.9542 |
| $M_n$ | 8,089 | 7,514 | 7,373 | 7573 | 8,968 |
| $M_w$ | 153,294 | 128,822 | 94,198 | 120299 | 343,719 |
| $M_z$ | 1,702,501 | 1,867,564 | 996,978 | 1388461 | 2,436,251 |
| $M_w/M_n$ | 19.0 | 17.1 | 12.8 | 15.9 | 38.3 |
| $M_z/M_w$ | 11.1 | 14.5 | 10.6 | 11.5 | 7.1 |
| hexene (wt %) | 1.59 | 3.91 | | 5.85 | 4.69 |
| g'$_{(vis)}$ | 0.894 | 0.777 | | 0.741 | 0.877 |
| ¹STI$_{0.1/100}$ | ~ | ~ | ~ | | 100.9 |
| 1% Secant Flexural Modulus (kpsi) at | 225 | ~ | 186 | | 163 |
| Tensile Stress Yield (MPa) | ~ | ~ | ~ | | 24.1 |
| Tensile Stress at Break (MPa) | 25.8 | ~ | 22.2 | | 24.2 |
| ²NCLS 600 psi (hr) | ~ | ~ | ~ | | ~ |
| ²NCLS 800 psi (hr) | <1 | ~ | <1 | | 431.8 |

¹Shear Thinning Index = [Viscosity at 0.1 rad/s]/[Viscosity at 100 rad/s]
²Notched, Constant Ligament-Stress test in 10% Igepal at 50° C. under specified stress reported as failure time Co-supporting Catalyst A and catalyst B provides active mixed catalyst systems with contribution from both catalyst types yielding polymers with broad multimodal behavior. Uniquely, the Catalyst B is unresponsive to hydrogen, producing a low Mw high density PE component, while Catalyst A is responsive to hydrogen producing a higher Mw polymer, where the high molecular weight polymers shift the high Mw's lower, see FIGS. 1 and 4. Table 1 depicts analytical data from 5 collections at differing process conditions.

TABLE 3

(Comparative polymers).

| Materials | AL55-003 ™ HDPE | HYA-600 ™ HDPE | Evolue ™ H SP5505 ™ HDPE | Marlex ™ HHN 5502 BN ™ |
|---|---|---|---|---|
| $I_2$ (g/10 min) | 0.33 | 0.41 | 0.1 | 0.38 |
| $I_{21}$ (g/10 min) | 34.03 | 32.0 | 11.9 | 34.6 |
| $I_{21}/I_2$ | 103.1 | 78.2 | 119.4 | 92.2 |
| Density (g/cm³) | 0.9543 | 0.9545 | 0.9477 | 0.9549 |
| $M_n$ | 16,168 | 12,920 | 14,182 | 17,080 |
| $M_w$ | 137,458 | 140,466 | 231,420 | 157,646 |
| $M_z$ | 881,792 | 910,201 | 1,958,327 | 1,313,360 |
| $M_w/M_n$ | 8.5 | 10.9 | 16.3 | 9.2 |
| $M_z/M_w$ | 6.4 | 6.5 | 8.5 | 8.3 |
| ¹STI$_{0.1/100}$ | 30.5 | 20.6 | 33.6 | 22.0 |
| 1% Secant Flexural Modulus (kpsi) | 151/169 | 164/123 | 111 | 151 |
| Tensile Stress at Yield (MPa) | 28.3 | 28.1 | 23.2 | 29.7 |
| Tensile Stress at Break (MPa) | 21.1 | 29.6 | 32.6 | 21.7 |
| ²NCLS 600 psi (hr) | 3.2 | 6.0/5.8 | 400.6 | 6.7 |
| ²NCLS 800 psi (hr) | 2.2 | 3.8/— | 261.9 | — |

¹Shear Thinning Index = [Viscosity at 0.1 rad/s]/[Viscosity at 100 rad/s]
²Notched, Constant Ligament-Stress test in 10% Igepal at 50° C. under specified stress reported as failure time All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa, e.g., the terms "comprising," "consisting essentially of," "consisting of" also include the product of the combinations of elements listed after the term.

What is claimed is:

1. A supported catalyst system comprising: (i) at least one first catalyst a component comprising a tridentate complex; (ii) at least one second catalyst component comprising a 2,6-bis(imino)pyridyl iron complex; (iii) activator; and (iv) support; wherein,
a tridentate complex is represented by Formula (A):

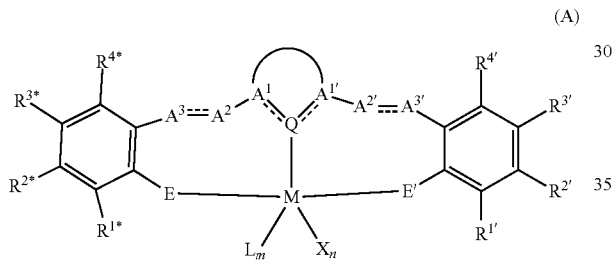

wherein:
M is a group 3-6 transition metal or Lanthanide;
E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group;
a Q is group 15, or 16 atom that forms a dative bond to metal M;
$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is selected from hydrogen, $C_1$-$C_{20}$ hydrocarbyl, $C_1$-$C_{20}$ substituted hydrocarbyl;
$A^3$═$A^2$ is a divalent group containing 2 to 40 non-hydrogen atoms that links $A^1$ to the E-bonded aryl group via a 2-atom bridge;
$A^{2'}$═$A^{3'}$ is a divalent group containing 2 to 40 non-hydrogen atoms that links $A^{1'}$ to the E'-bonded aryl group via a 2-atom bridge;
L is a neutral Lewis base;
X is an anionic ligand;
n is 1, 2 or 3;
m is 0, 1, or 2;
n+m is not greater than 4;
each of $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ are optionally joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring optionally join to form additional rings;
any two L groups are optionally joined together to form a bidentate Lewis base;
an X group is optionally joined to an L group to form a monoanionic bidentate group;
any two X groups are optionally joined together to form a dianionic ligand group; and
the 2,6-bis(imino)pyridyl iron complex is represented by Formula (I):

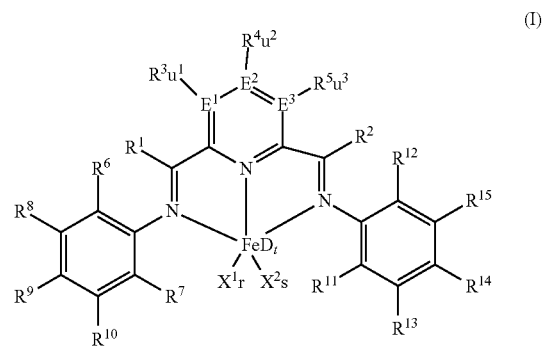

wherein:
each of $R^1$ and $R^2$ is independently hydrogen, $C_1$-$C_{22}$ alkyl, $C_2$-$C_{22}$ alkenyl, $C_6$-$C_{22}$ aryl, arylalkyl wherein alkyl has from 1 carbon atom to 10 carbon atoms and aryl has from 6 carbon atoms to 20 carbon atoms, or five-, or six-, or seven-membered heterocyclic ring comprising at least one atom selected from the group consisting of N, P, O and S; wherein each of $R^1$ and $R^2$ is optionally substituted by halogen, —$OR^{16}$, —$NR^{17}_2$, or —$SiR^{18}_3$; wherein $R^1$ optionally bonds with $R^3$, and $R^2$ optionally bonds with $R^5$, in each case to independently form a five-, six-, or seven-membered ring;
each of $R^3$, $R^4$, $R^5$, $R^8$, $R^9$, $R^{10}$, $R^{13}$, $R^{14}$, and $R^{15}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, —$OR^{16}$, —$NR^{17}_2$, halogen, —$SiR^{18}_3$ or five-, six- or seven-membered heterocyclic ring comprising at least one atom selected from the group consisting of N, P, O and S;
wherein $R^3$, $R^4$, $R^5$, $R^8$, $R^9$, $R^{10}$, $R^{13}$, $R^{14}$, and $R^{15}$ are optionally substituted by halogen, —$OR^{16}$, —$NR^{17}_2$ or —$SiR^{18}_3$; wherein $R^3$ optionally bonds with $R^4$, $R^4$ optionally bonds with $R^5$, $R^7$ optionally bonds with $R^{10}$, $R^{10}$ optionally bonds with $R^9$, $R^9$ optionally bonds with $R^8$, $R^8$ optionally bonds with $R^6$, $R^{15}$ optionally bonds with $R^{14}$, $R^{14}$ optionally bonds with $R^{13}$, and $R^{13}$ optionally bonds with $R^{11}$, in each case to independently form a five-, six- or seven-membered carbocyclic or heterocyclic ring, the heterocyclic ring comprising at least one atom from the group consisting of N, P, O and S;

each of $R^6$, $R^7$, $R^{11}$, and $R^{12}$ is independently hydrogen, $C_1$-$C_{22}$ alkyl, $C_2$-$C_{22}$ alkenyl, $C_6$-$C_{22}$ aryl, arylalkyl wherein alkyl has from 1 to 10 carbon atoms and aryl has from 6 to 20 carbon atoms, a heteroatom or a heteroatom-containing group; wherein $R^6$, $R^7$, $R^{11}$, and $R^{12}$ are optionally substituted by halogen, —$OR^{16}$, —$NR^{17}_2$ or —$SiR^{18}_3$, wherein $R^6$ optionally bonds with $R^8$, $R^{11}$ optionally bonds with $R^{13}$, or $R^{15}$ optionally bonds with $R^{12}$ in each case to independently form a five-, six- or seven-membered carbocyclic or heterocyclic ring, the heterocyclic ring comprising at least one atom from the group consisting of N, P, O and S; wherein at least one of $R^6$, $R^7$, $R^{11}$, and $R^{12}$ is independently a heteroatom or a heteroatom-containing group, or at least one of the $R^6$, $R^7$, $R^{11}$, and $R^{12}$ is not methyl, or when $R^{11}$ is H and $R^{12}$ is iPr, then at least one of $R^6$ and $R^7$ is not methyl;

each of $R^{16}$, $R^{17}$, and $R^{18}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or —$SiR^{19}_3$, wherein each $R^{16}$, $R^{17}$, and $R^{18}$ is independently optionally substituted by halogen, or two $R^{16}$ radicals optionally bond to form a five- or six-membered ring, or two $R^{17}$ radicals optionally bond to form a five- or six-membered ring, or two $R^{18}$ radicals optionally bond to form a five- or six-membered ring;

each $R^{19}$ is independently hydrogen, $C_1$-$C_{22}$ alkyl, $C_2$-$C_{22}$ alkenyl, $C_6$-$C_{22}$ aryl, arylalkyl where alkyl has from 1 to 10 carbon atoms and aryl has from 6 to 20 carbon atoms, or two $R^{19}$ radicals optionally bond to form a five- or six-membered ring;

each of $E^1$, $E^2$, and $E^3$ is independently carbon, nitrogen or phosphorus;

each of $u^1$, $u^2$, and $u^3$ is independently 0 when $E^1$, $E^2$, or $E^3$ is nitrogen or phosphorus, and each of $u^1$, $u^2$, and $u^3$ is independently 1 when $E^1$, $E^2$, or $E^3$ is carbon;

each of $X^1$ and $X^2$ is independently a substituted hydrocarbyl, and the radicals X are optionally bonded with one another;

r is 1 or 2;

s is 1 or 2;

D is a neutral donor; and t is 0 to 2.

2. The supported catalyst system of claim 1, wherein the tridentate complex is represented by the Formula (A-II):

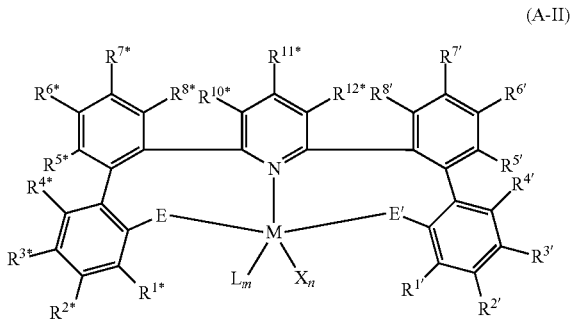

(A-II)

wherein:
M is a group 3, 4, 5, or 6 transition metal or a Lanthanide;

E and E' are each independently O, S, or $NR^{9*}$, where $R^{9*}$ is independently hydrogen, $C_1$-$C_{40}$ hydrocarbyl, $C_1$-$C_{40}$ substituted hydrocarbyl, or a heteroatom-containing group;

each L is independently a Lewis base;

each X is independently an anionic ligand;

n is 1, 2 or 3;

m is 0, 1, or 2;

n+m is not greater than 4;

each of $R^{1*}$, $R^{2*}$, $R^{3*}$, $R^{4*}$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^{1*}$ and $R^{2*}$, $R^{2*}$ and $R^{3*}$, $R^{3*}$ and $R^{4*}$, $R^{1'}$ and $R^{2'}$, $R^{2'}$ and $R^{3'}$, $R^{3'}$ and $R^{4'}$ are optionally joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring optionally join to form additional rings;

any two L groups are optionally joined together to form a bidentate Lewis base;

an X group is optionally joined to an L group to form a monoanionic bidentate group;

any two X groups are optionally joined together to form a dianionic ligand group;

each of $R^{5*}$, $R^{6*}$, $R^{7*}$, $R^{8*}$, $R^{5'}$, $R^{6'}$, $R^{7'}$; $R^{8'}$, $R^{10*}$, $R^{11*}$, and $R^{12*}$ is independently hydrogen, $C_1$-$C_{40}$ hydrocarbyl, $C_1$-$C_{40}$ substituted hydrocarbyl, a heteroatom or a heteroatom-containing group, or one or more of $R^*$ and $R^{6*}$, $R^{6*}$ and $R^{7*}$, $R^{7*}$ and $R^{8*}$, $R^{5'}$ and $R^{6'}$, $R^{6'}$ and $R^{7'}$, $R^{7'}$ and $R^{8'}$, $R^{10*}$ and $R^{11*}$, or $R^{11*}$ and $R^{12*}$ are optionally joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring optionally join to form additional rings.

3. The supported catalyst system of claim 2, wherein E and E' are each independently O.

4. The supported catalyst system of claim 2, wherein the tridentate complex is present a molar ratio 1% to 99%, and the 2,6-bis(imino)pyridyl iron complex is present at a molar ratio of 99% to 1%, based on the combination of the catalyst compounds.

5. The supported catalyst system of claim 1, wherein the tridentate complex is one or more of:
dimethylzirconium[2',2'''-(pyridine-2,6-diyl)bis(3-adamantan-1-yl)-5-(tert-butyl)-[1,1'-biphenyl]-2-olate)],
dimethylhafnium[2',2'''-(pyridine-2,6-diyl)bis(3-adamantan-1-yl)-5-(tert-butyl)-[1,1'-biphenyl]-2-olate)],
dimethylzirconium[6,6'-(pyridine-2,6-diylbis(benzo[b]thiophene-3,2-diyl))bis(2-adamantan-1-yl)-4-methylphenolate)],
dimethylhafnium[6,6'-(pyridine-2,6-diylbis(benzo[b]thiophene-3,2-diyl))bis(2-adamantan-1-yl)-4-methylphenolate)],
dimethylzirconium[2',2'''-(pyridine-2,6-diyl)bis(3-((3r,5r,7r)-adamantan-1-yl)-5-methyl-[1,1'-biphenyl]-2-olate)],
dimethylhafnium[2',2'''-(pyridine-2,6-diyl)bis(3-((3r,5r,7r)-adamantan-1-yl)-5-methyl-[1,1'-biphenyl]-2-olate)], dimethylzirconium[2',2'''-(pyridine-2,6-diyl)bis(3-((3r,5r,7r)-adamantan-1-yl)-4',5-dimethyl-[1,1'-biphenyl]-2-olate)],
dimethylhafnium[2',2'''-(pyridine-2,6-diyl)bis(3-((3r,5r,7r)-adamantan-1-yl)-4',5-dimethyl-[1,1'-biphenyl]-2-olate)];
4
Complex 1
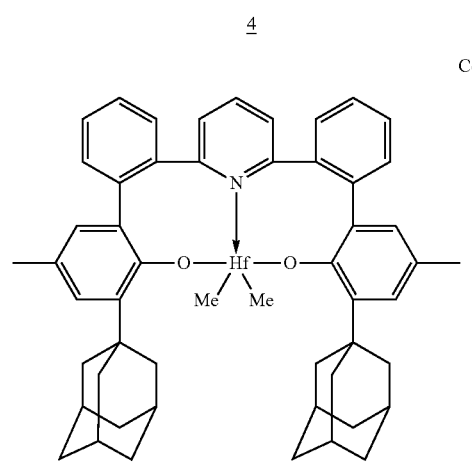
Complex 2
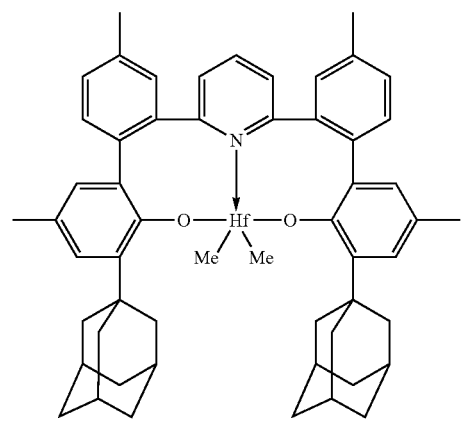
Complex 3
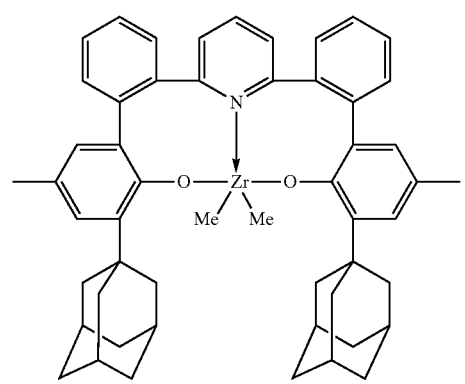
Complex 4
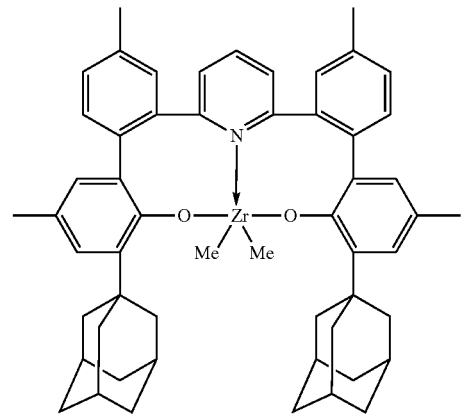
Complex 5
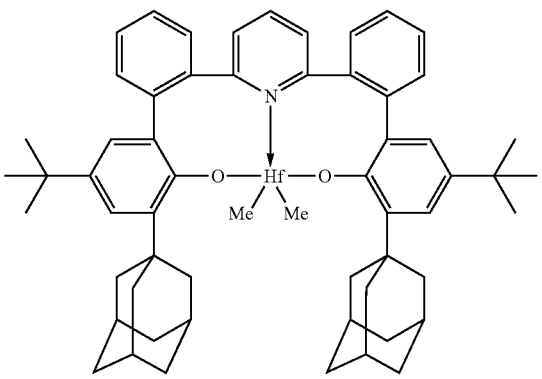
Complex 6
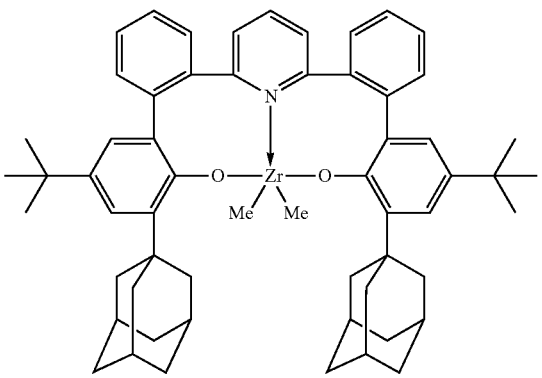

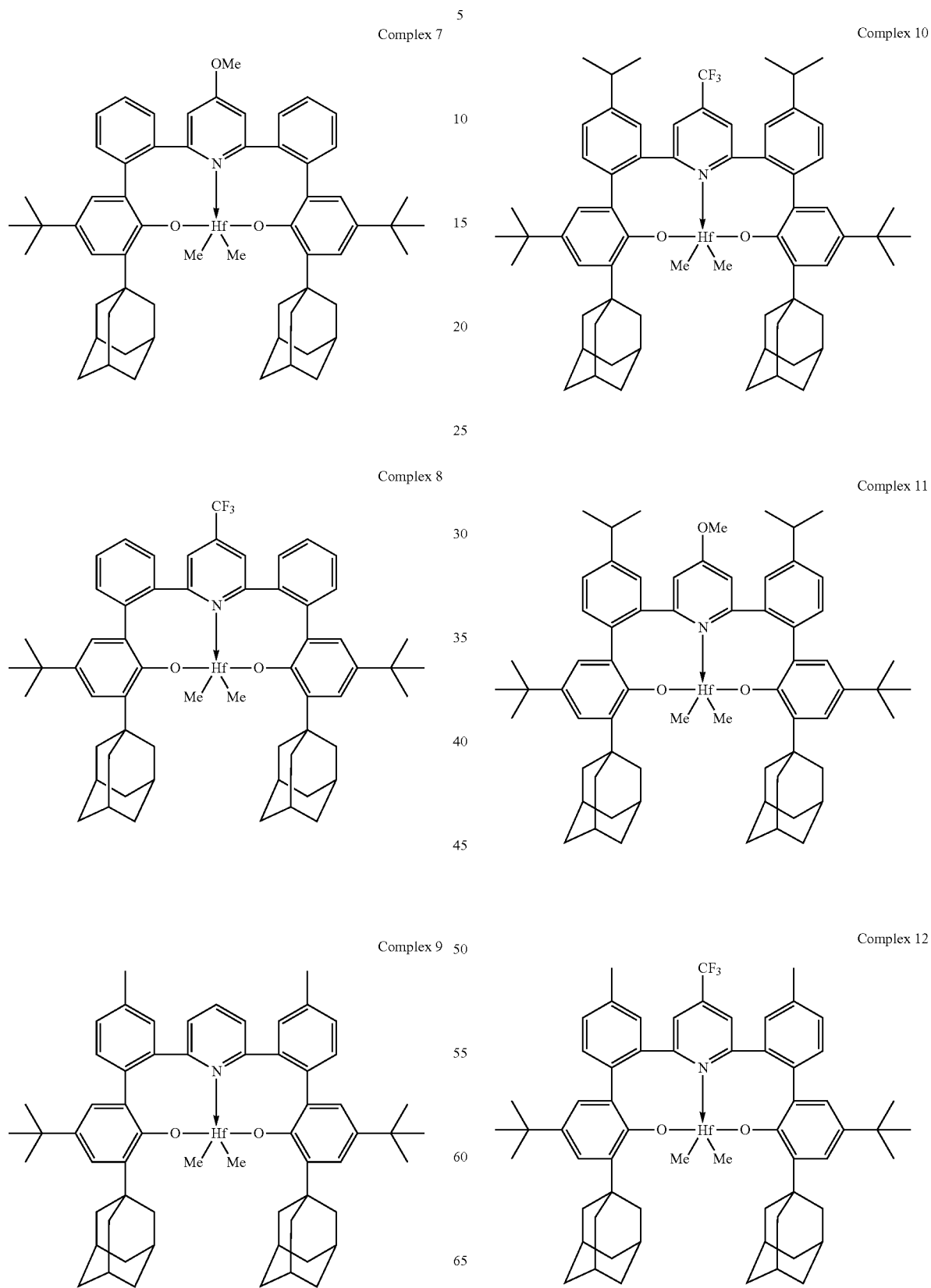

-continued
Complex 13
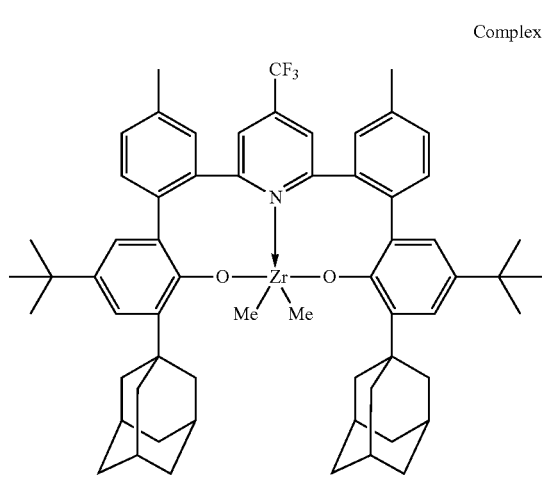
Complex 14
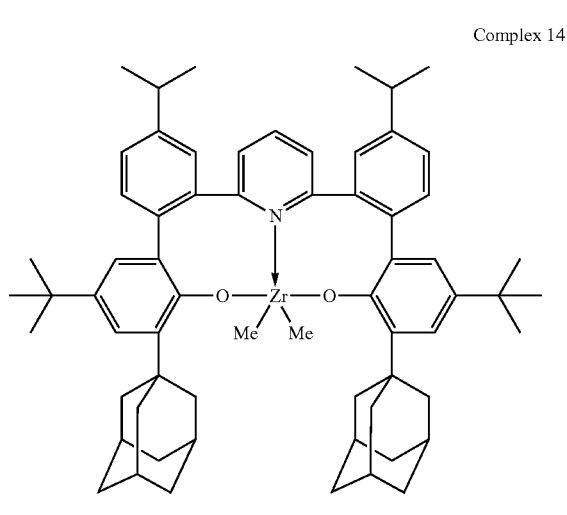
Complex 15
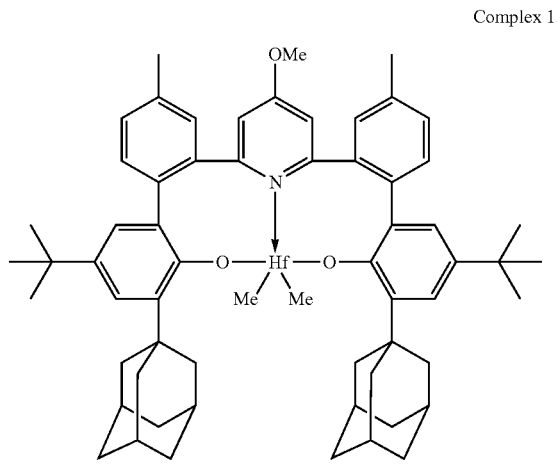
-continued
Complex 16
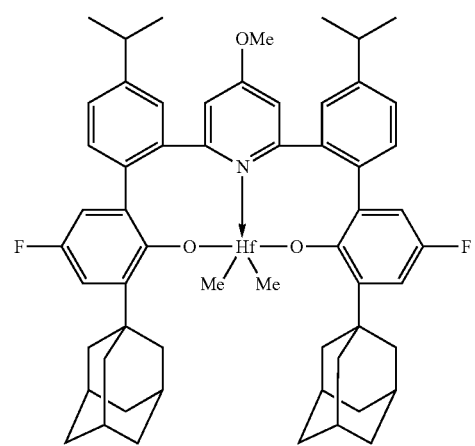
Complex 17
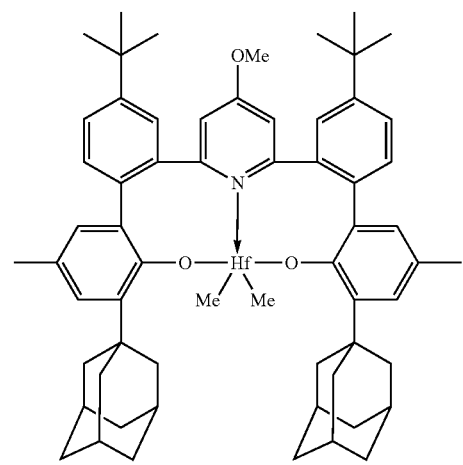
Complex 18
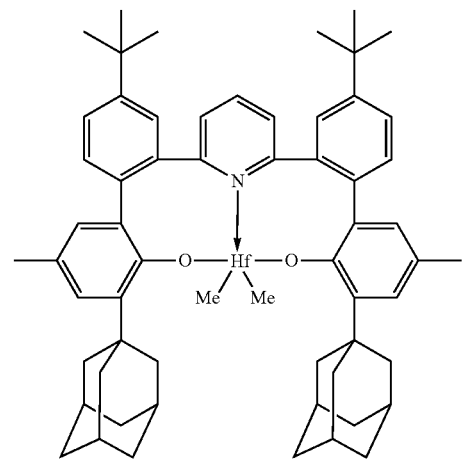

Complex 19
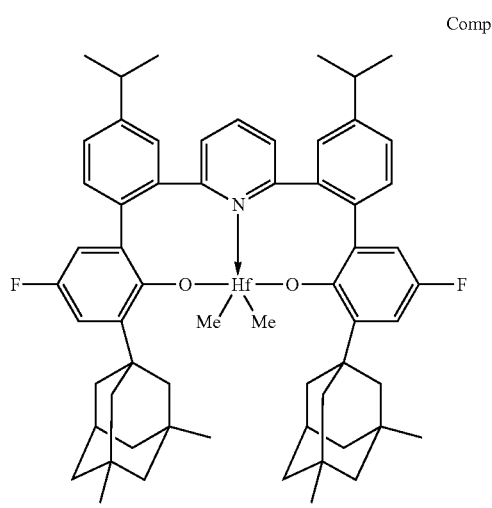
Complex 22
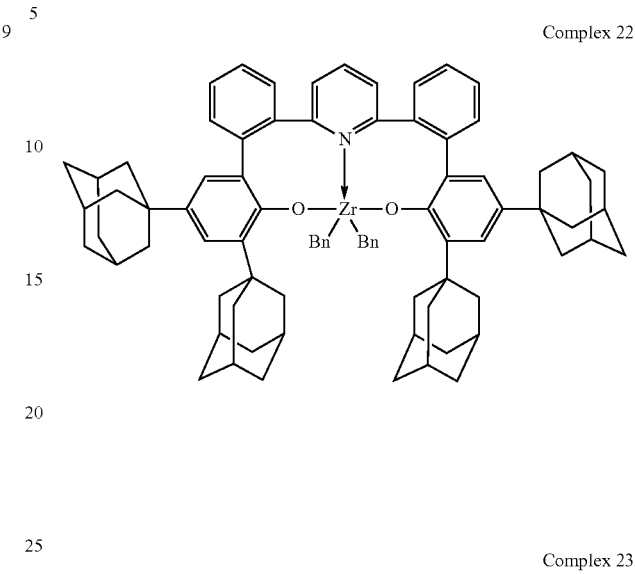
Complex 20
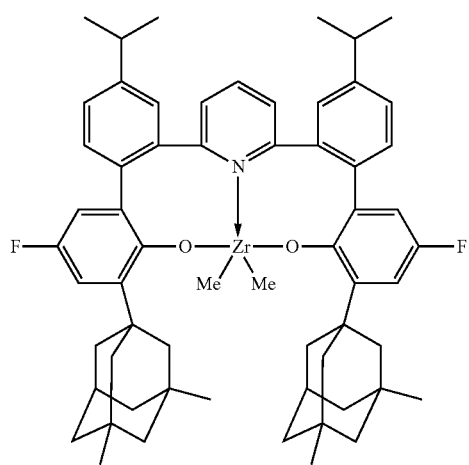
Complex 23
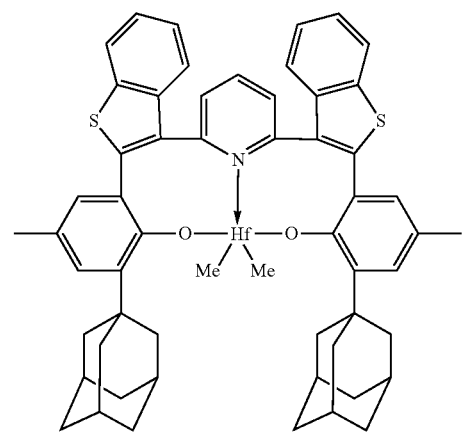
Complex 21
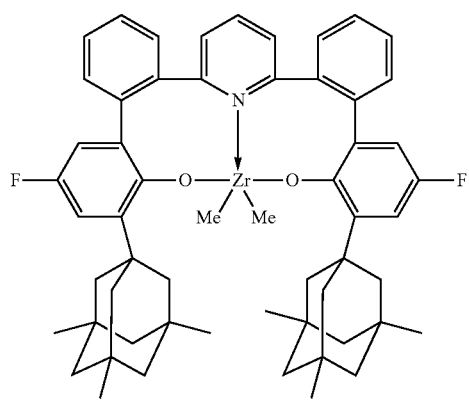
Complex 24
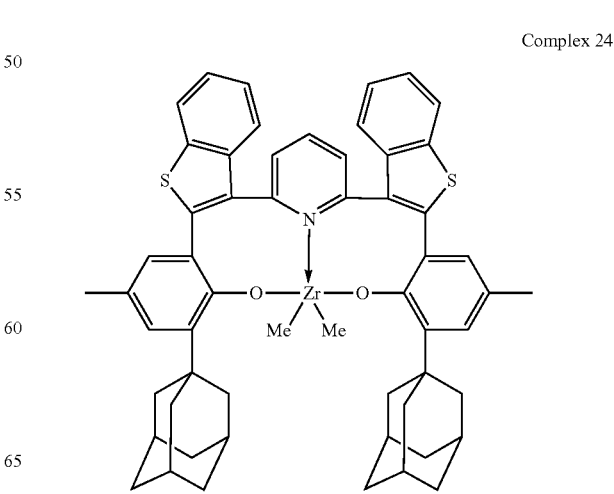

Complex 25
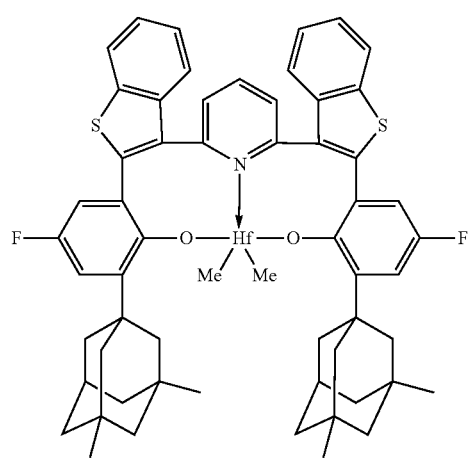
Complex 26
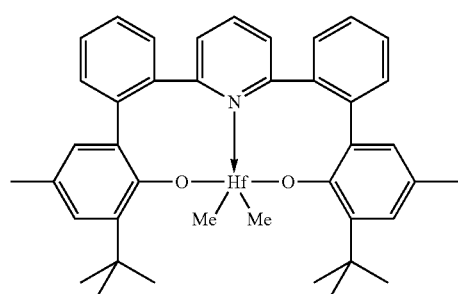
Complex 27
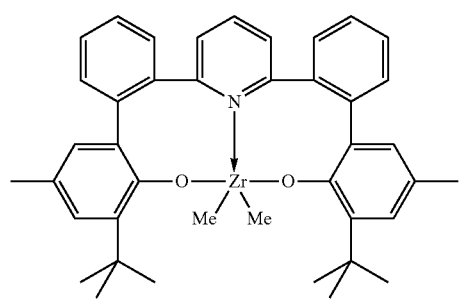
Complex 29
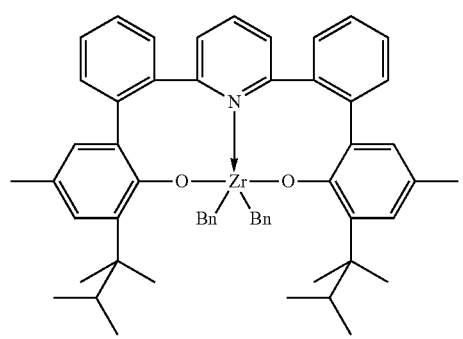
Complex 30
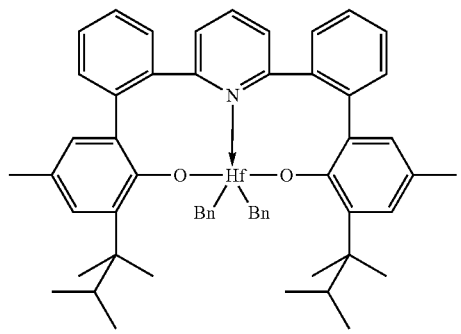
Complex 31
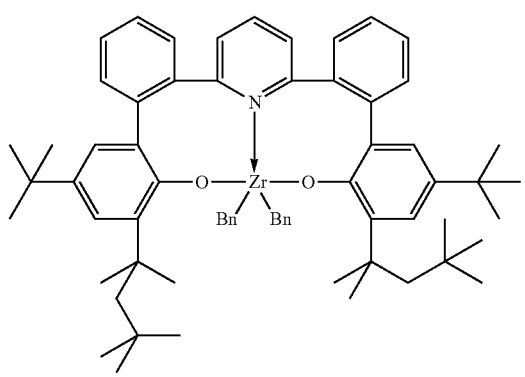
Complex 32
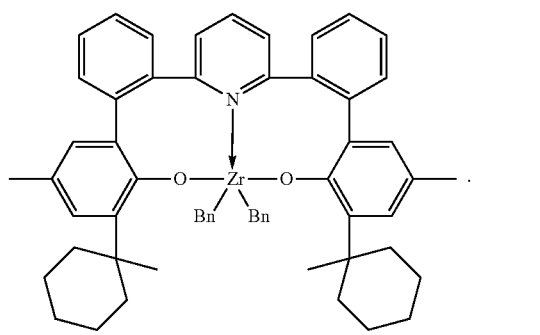
6. The supported catalyst system of claim 1, wherein the support comprises silica.
7. The supported catalyst system of claim 1, wherein the catalyst system comprises less than 0.1 wt % aromatic solvent.
8. The supported catalyst system of claim 1, wherein the 2,6-bis(imino)pyridyl iron complex is one or more of:
1
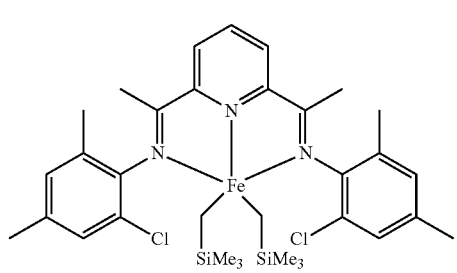

-continued
2
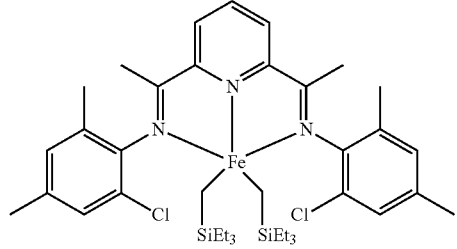
3
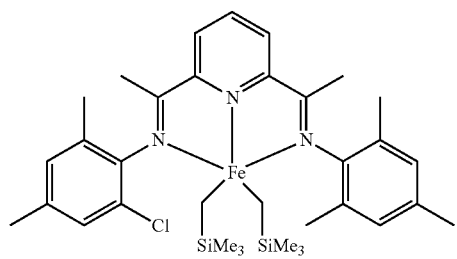
4
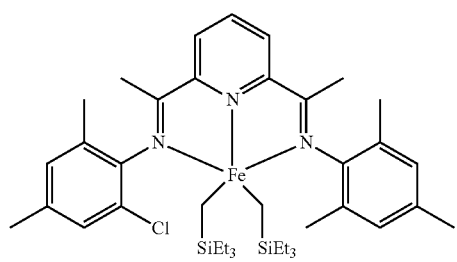
5
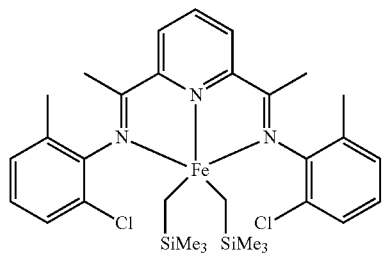
6
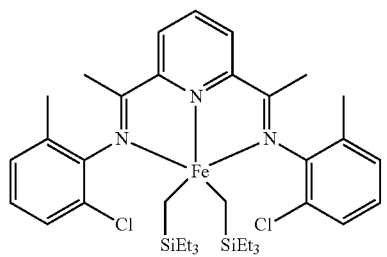
7
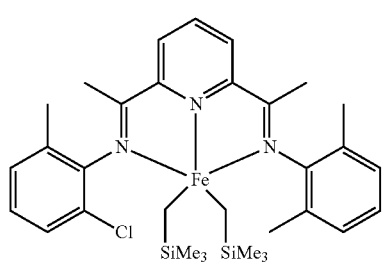
-continued
8
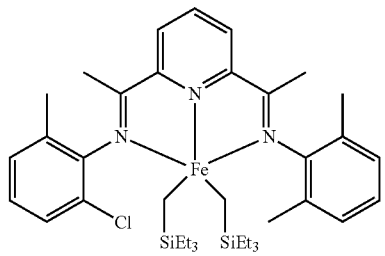
9
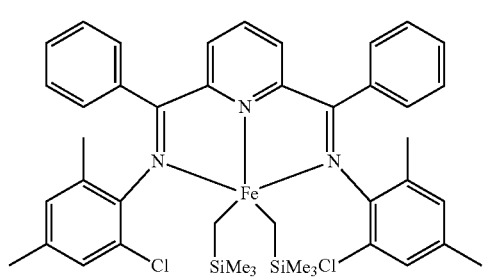
10
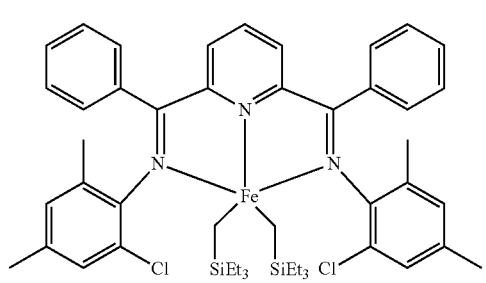
11
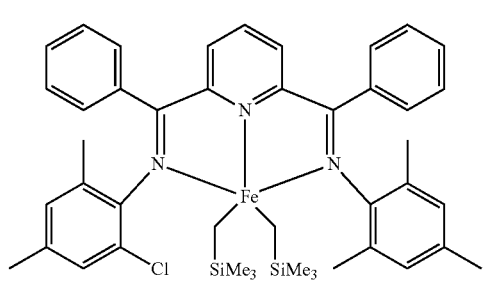
12
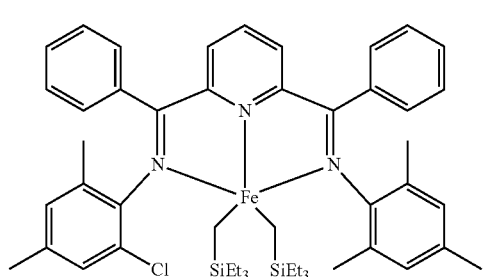
13
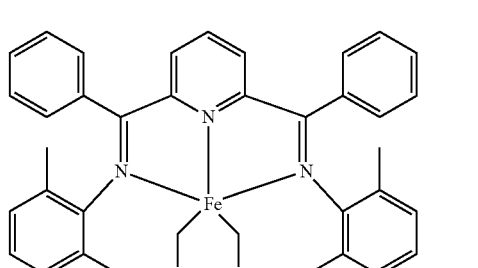

-continued
14
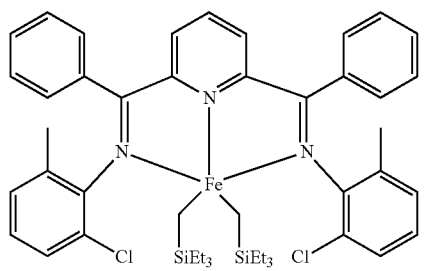
15
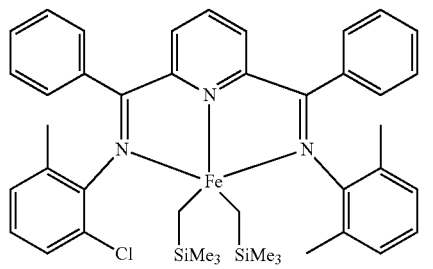
16
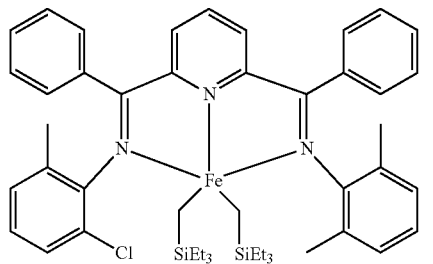
17
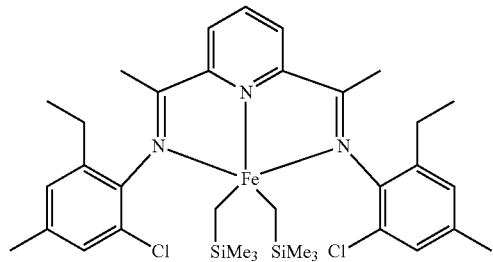
18
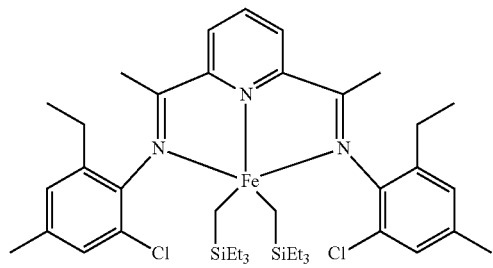
19
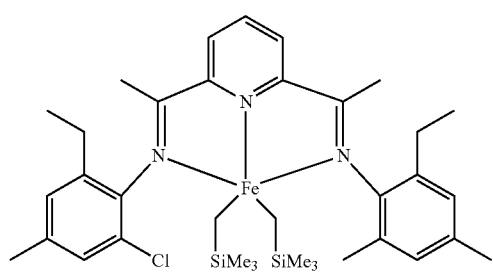
-continued
20
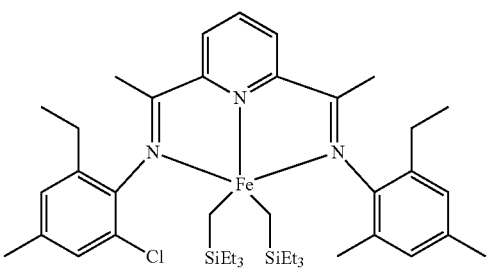
21
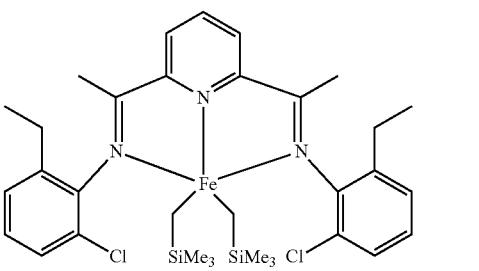
22
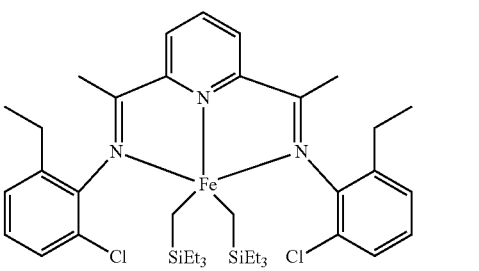
23
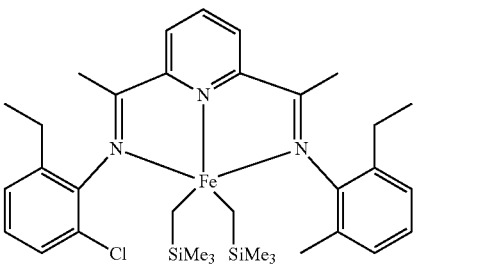
24
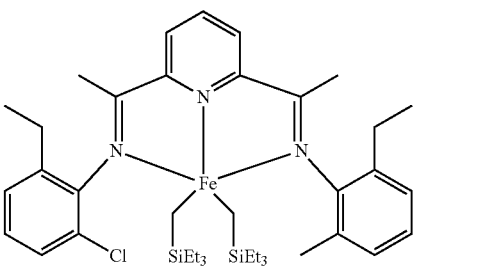
25
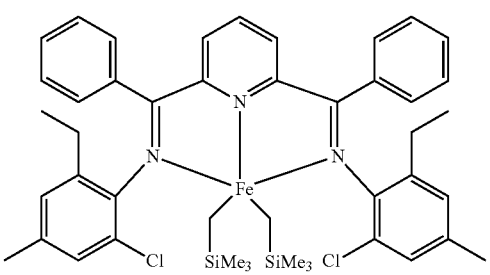

-continued
26
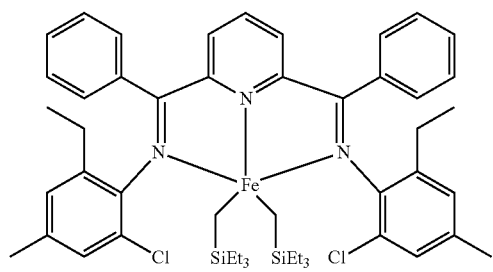
27
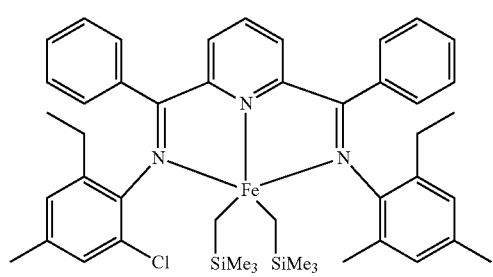
28
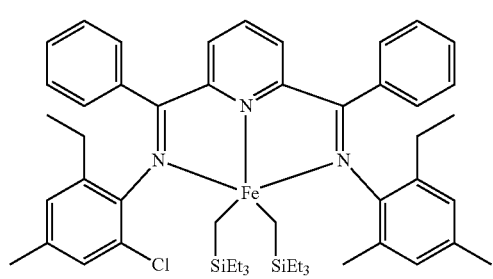
29
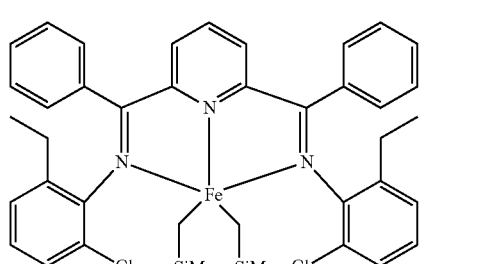
30
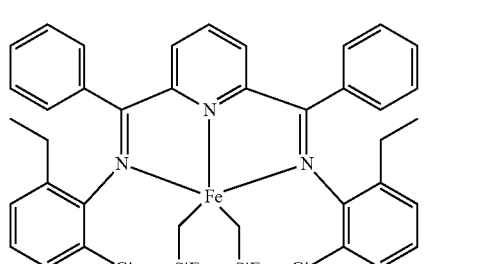
31
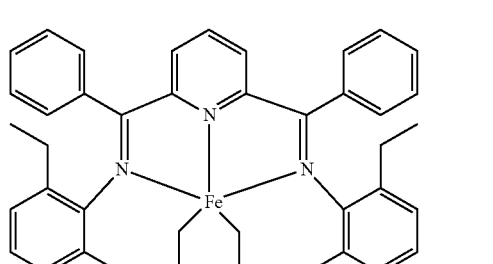
-continued
32
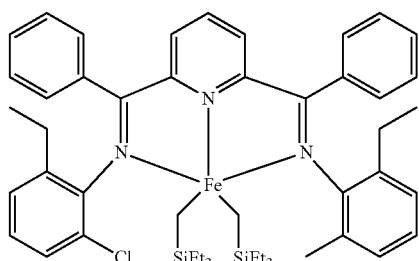
33
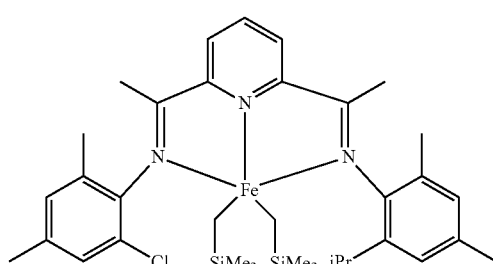
34
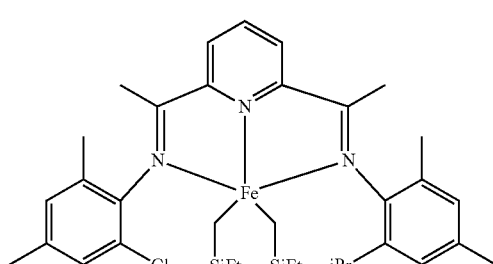
35
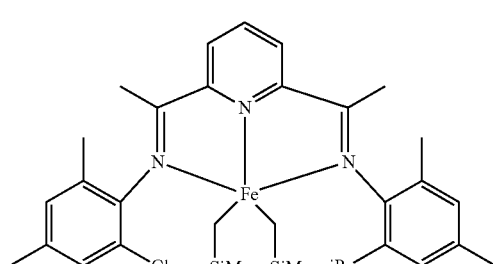
36
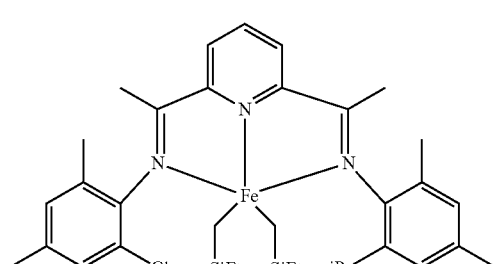
37
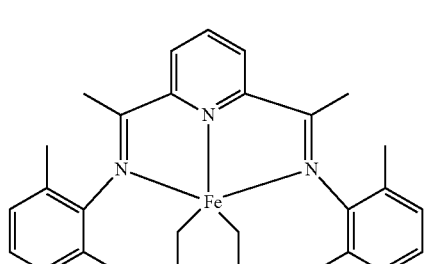

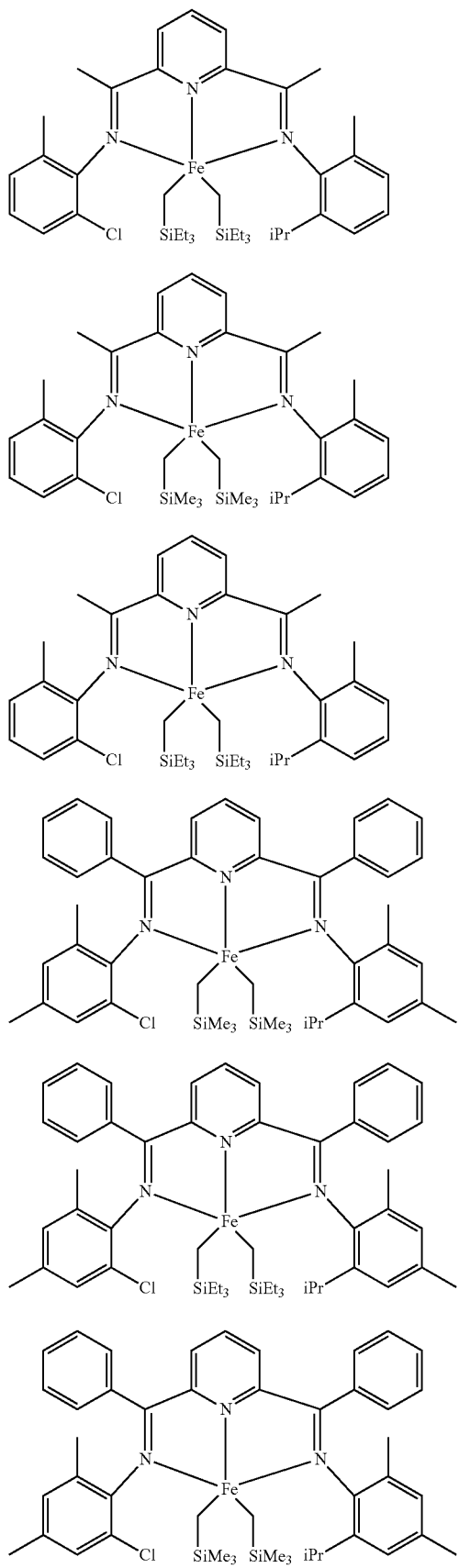

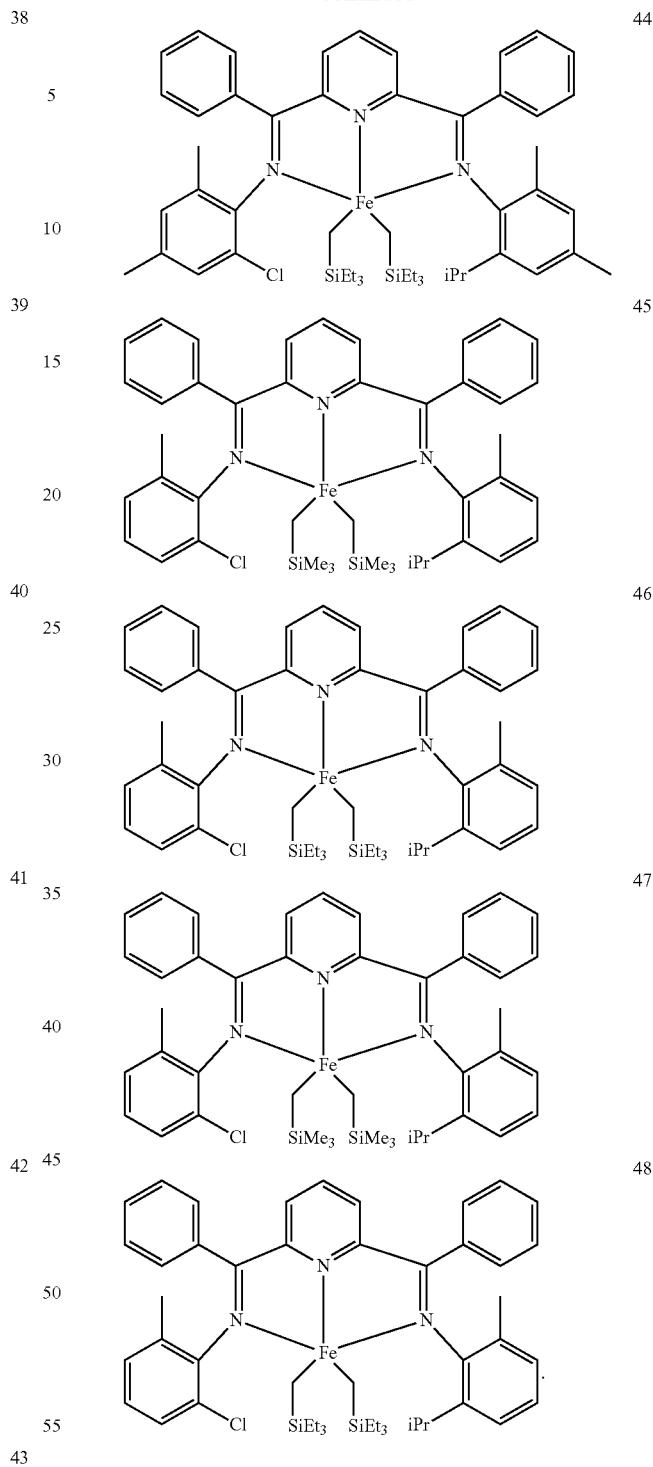

9. The supported catalyst system of claim 1, wherein the support material has a surface area in the range of from 10 to 700 square meters per gram ($m^2/g$) and an average particle diameter in the range of from 10 to 500 micrometers (m).

10. The supported catalyst system of claim 1, wherein the support material is selected from the group consisting of silica, alumina, silica-alumina, and combinations thereof.

11. The supported catalyst system of claim 1, wherein the support material is fluorided.

12. The supported catalyst system of claim 11, wherein the support material has a fluorine concentration in the range of 0.6 to 3.5 weight percent (wt %), based upon the weight of the support material.

13. The supported catalyst system of claim 1, wherein the activator comprises alumoxane.

14. The supported catalyst system of claim 1, wherein the activator comprises a non-coordinating anion.

15. The supported catalyst system of claim 1, wherein the activator comprises one or more of:

N,N-dimethyl-anilinium [tetrakis(perfluorophenyl)borate],
N,N-dimethylanilinium tetrakis(perfluoronaphthyl)borate,
N,N-dimethylanilinium tetrakis(perfluorobiphenyl)borate,
N,N-dimethylanilinium tetrakis(perfluorophenyl)borate,
N,N-dimethylanilinium tetrakis(3,5-bis(trifluoromethyl)phenyl)borate,
triphenylcarbenium tetrakis(perfluoronaphthyl)borate,
triphenylcarbenium tetrakis(perfluorobiphenyl)borate,
triphenylcarbenium tetrakis(3,5-bis(trifluoromethyl)phenyl)borate,
triphenylcarbenium tetrakis(perfluorophenyl)borate, $[Me_3NH^+][B(C_6F_5)_4^-]$;

1-(4-(tris(pentafluorophenyl)borate)-2,3,5,6-tetrafluorophenyl) pyrrolidinium;
4-(tris(pentafluorophenyl)borate)-2,3,5,6-tetrafluoropyridine,
N,N-di(hydrogenated tallow)methylammonium [tetrakis(perfluorophenyl) borate],
N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl)borate],
N-octadecyl-N-hexadecyl-tolylammonium [tetrakis(perfluorophenyl)borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate],
N-dodecyl-N-decyl-tolylammonium [tetrakis(perfluorophenyl)borate],
N-methyl-N-octadecylanilinium [tetrakis(perfluorophenyl)borate],
N-methyl-N-hexadecylanilinium [tetrakis(perfluorophenyl)borate],
N-methyl-N-tetradecylanilinium [tetrakis(perfluorophenyl)borate],
N-methyl-N-dodecylanilinium [tetrakis(perfluorophenyl) borate],
N-methyl-N-decylanilinium [tetrakis(perfluorophenyl) borate], and
N-methyl-N-octylanilinium [tetrakis(perfluorophenyl)borate].

16. A process for polymerization of olefin monomers comprising contacting one or more monomers with the supported catalyst system of claim 1 and obtaining olefin polymer.

17. The process of claim 16, wherein the first catalyst component and the second catalyst component show different hydrogen responses.

18. The process of claim 16, wherein the monomer is selected from the group consisting of ethylene, propylene, 1-hexene, 1-octene and combinations thereof.

19. The process of claim 16, wherein the polymerization is carried out in slurry.

20. The process of claim 16, wherein the polymerization is carried out in gas phase.

* * * * *